United States Patent [19]
Nielsen et al.

[11] Patent Number: 5,173,855
[45] Date of Patent: Dec. 22, 1992

[54] DISTRIBUTED MULTIPLE IRRIGATION CONTROLLER MANAGEMENT SYSTEM

[75] Inventors: Wyn Y. Nielsen, La Jolla; Jonathan M. Luck, San Diego, both of Calif.

[73] Assignee: Solatrol, Inc., San Diego, Calif.

[21] Appl. No.: 787,738

[22] Filed: Nov. 4, 1991

Related U.S. Application Data

[63] Continuation of Ser. No. 255,150, Oct. 4, 1988, abandoned.

[51] Int. Cl.⁵ .................. G05B 11/01; G05B 17/00; A01G 27/00
[52] U.S. Cl. .................................. 364/420; 364/145; 239/69
[58] Field of Search ........................................ 364/145

[56] References Cited

U.S. PATENT DOCUMENTS

| | | | |
|---|---|---|---|
| 3,578,245 | 5/1971 | Brock | 239/69 |
| 3,726,477 | 4/1973 | Shapiro | 239/70 |
| 4,015,366 | 4/1977 | Hall, III | 239/69 |
| 4,185,650 | 1/1980 | Neves et al. | 239/69 |
| 4,419,738 | 11/1983 | Takahashi et al. | 364/900 |
| 4,592,505 | 6/1986 | Bruninga et al. | 239/69 |
| 4,626,984 | 12/1986 | Unruh et al. | 239/69 |
| 4,646,224 | 2/1987 | Ransburg et al. | 364/143 |
| 4,648,066 | 3/1987 | Pitt | 364/900 |
| 4,760,547 | 7/1988 | Duxbury | 364/420 |
| 4,851,991 | 7/1989 | Toda et al. | 364/200 |
| 4,937,732 | 6/1990 | Brundisini | 364/145 |

FOREIGN PATENT DOCUMENTS

| | | | |
|---|---|---|---|
| 0030381 | 3/1979 | Japan | 364/420 |
| 0164870 | 8/1985 | Japan | 364/420 |
| 8605945 | 10/1986 | World Int. Prop. O. | 239/69 |
| 8704275 | 7/1987 | World Int. Prop. O. | 239/69 |

OTHER PUBLICATIONS

Calikoglu et al., "A centralized agricultural irrigation system", *Microcomputer Application in Process Control/Selected Papers from the IFAC Symposium*, 1987, pp. 167-171.

*Primary Examiner*—Dale M. Shaw
*Assistant Examiner*—David Huntley
*Attorney, Agent, or Firm*—William C. Fuess

[57] ABSTRACT

Separate, but related, firmware programs for multiple microprocessor-controlled irrigation controllers that are interrelated in their control of irrigation within an irrigation system are generated off-line at a personal computer. The programs are downloaded into a transportable memory device that holds sixty-four separate programs. The memory device is transported to each irrigation controller and plugged to a digital communication channel. The device automatically identifies itself to the controller, and vice versa. The appropriate program is automatically uploaded from the device to the controller. The controller's old program and its historical irrigation record data is loaded into the device and delivered to the personal computer for validation and analysis. A wireless remote test command assembly, an extension maintenance panel, or a radio-link central module may be alternatively connected to the controller's digital communication channel. The controller is powered by the memory device during the uploading.

14 Claims, 25 Drawing Sheets

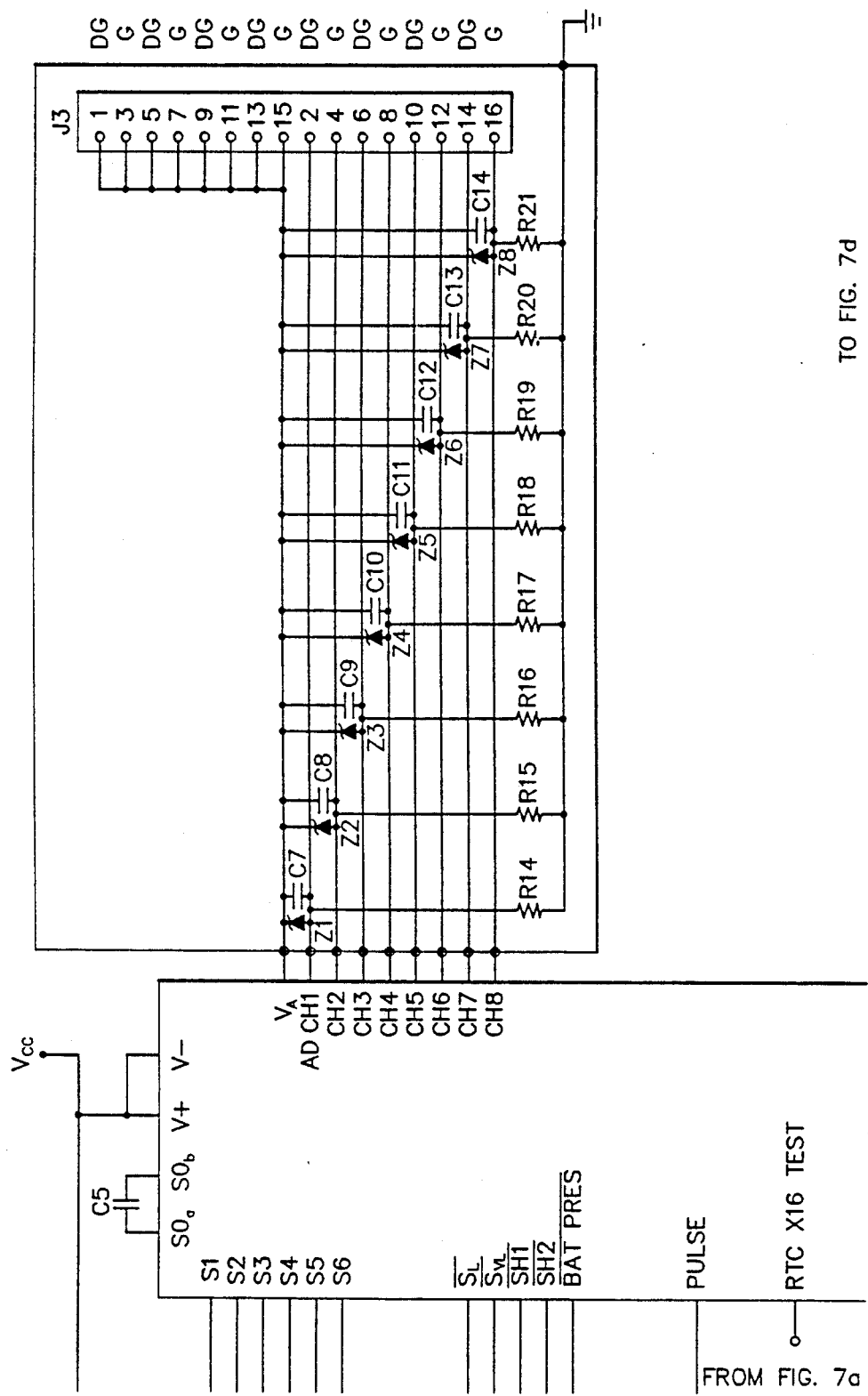

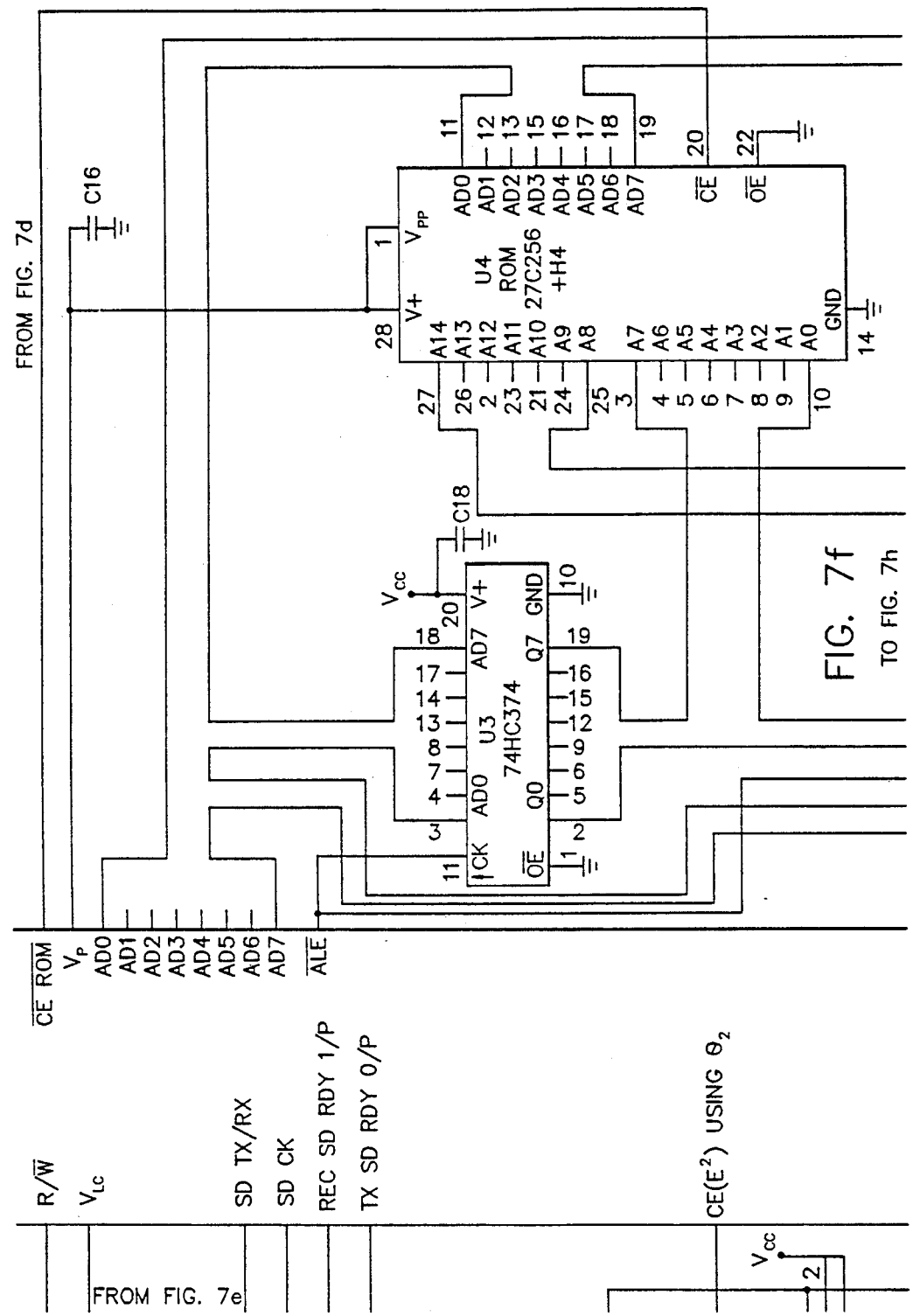

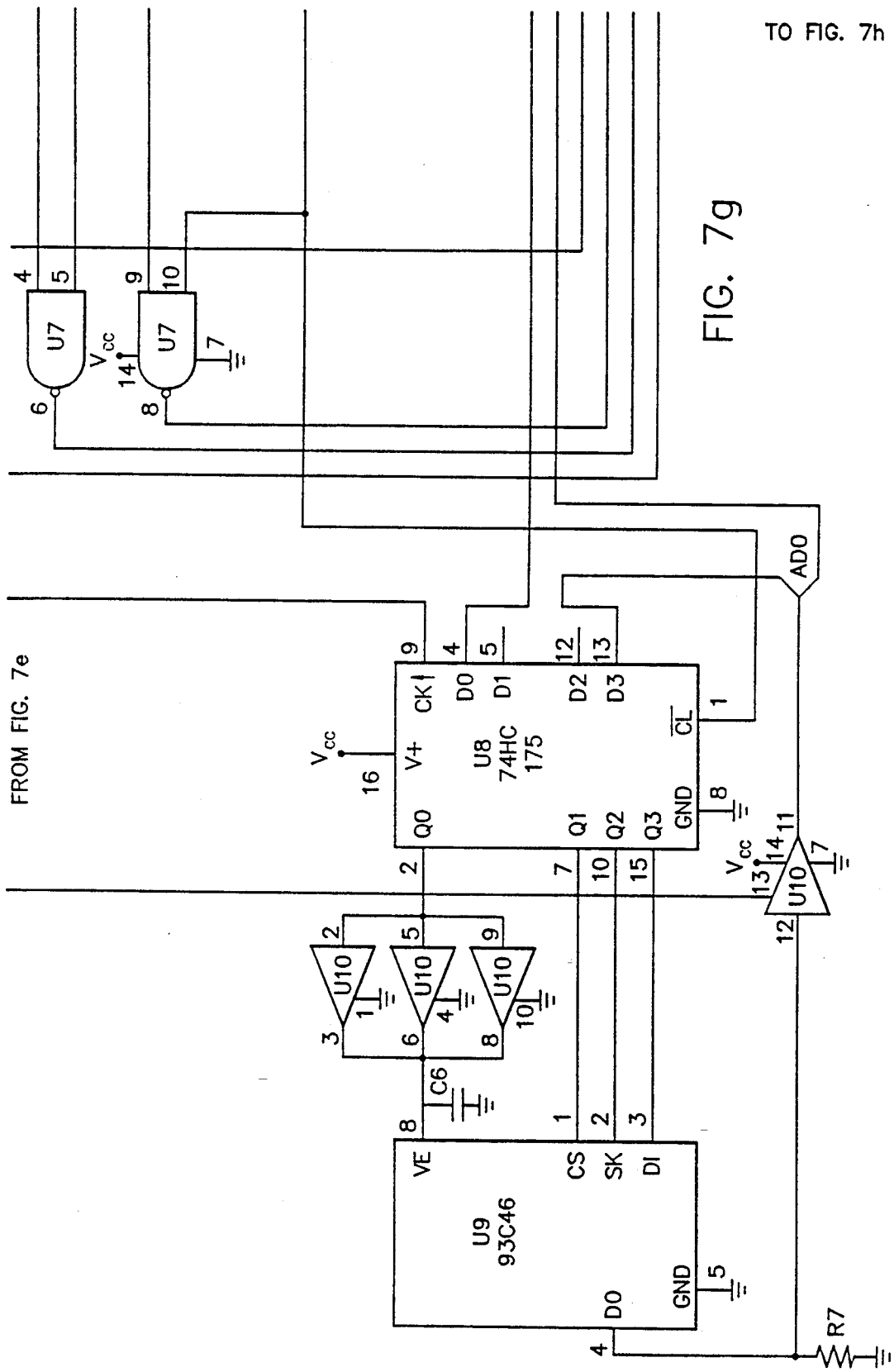

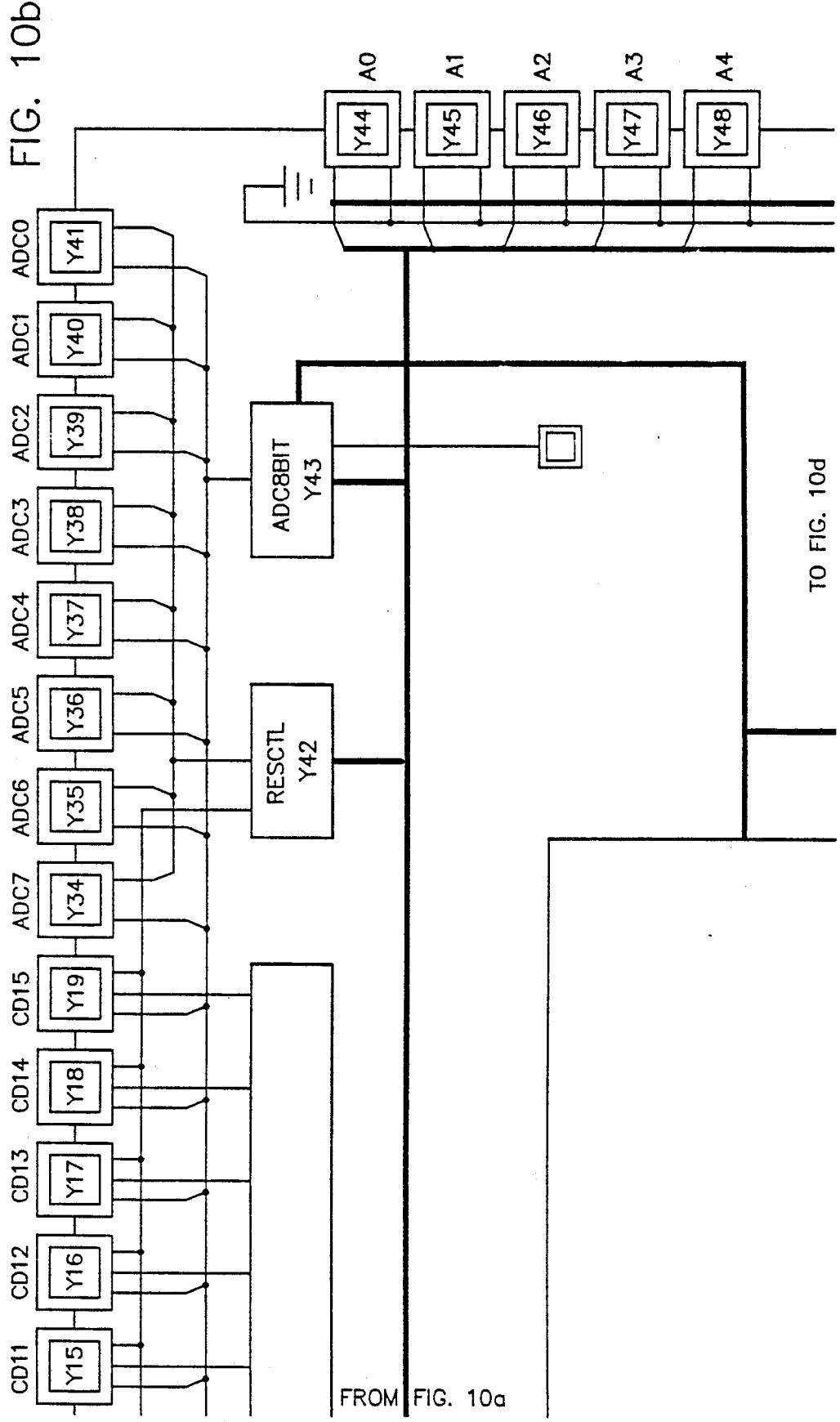

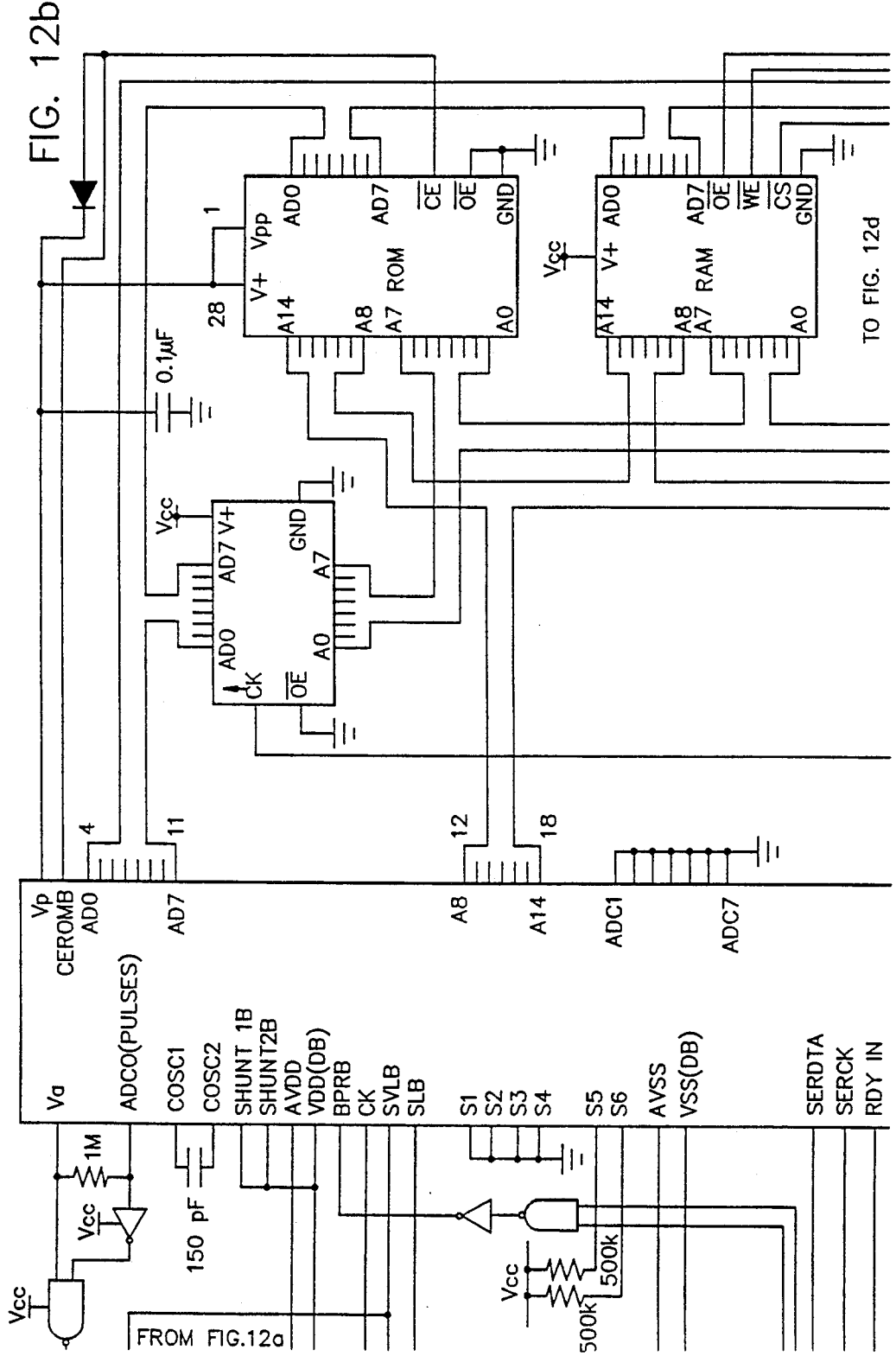

DISTRIBUTED MULTIPLE IRRIGATION CONTROLLER MANAGEMENT SYSTEM

This application is a continuation of application Ser. No. 07/255,150, filed Oct. 4, 1988, now abandoned.

BACKGROUND OF THE INVENTION 1.0 Field of the Invention

The present invention concerns the coordinated programming and test control of multiple independent, but irrigation-function interrelated, programmable electronic irrigation controllers within an irrigation system.

2.0 Background of the Invention

Large irrigation systems, such as those for golf courses and parks, typically use many dozens of independently operative irrigation controllers. Each irrigation controller controls a number of valves that gate the flow of irrigation water, typically to eight valves per controller. Because each irrigation controller must be electrically wired to all valves that it controls, it is infeasible to have the many hundreds or thousands of valves in a large area irrigation system controlled by a single controller.

Although each irrigation controller is independent in its operation, the irrigation control exercised by multiple irrigation controllers is typically interrelated, and must be coordinated. This is because the piping of irrigation water to the stations, or valves, of a number of irrigation controllers is usually in series, one station to the next. A fundamental rule of irrigation control is that only such numbers of irrigation stations should be simultaneously enabled for irrigation watering as do not, resultant to the drop on hydrostatic pressure and flow caused by each "on" station, adversely affect irrigation watering pressures, flows, and patterns at any one(s) of the simultaneously enabled stations. Because most irrigation piping is of minimal diameter and cost consonant with the water flow and pressure requirements of a single irrigation station, application of the rule normally requires that only one irrigation station should be enabled any one time.

Enabling one only irrigation station, or valve, to be on at one time among all the valves controlled by a single irrigation controller is merely a matter of the setup, or programming, of that one irrigation controller. However, if separate and independent irrigation controllers must be coordinated, as is typically required due to the plumbing of irrigation water, then matters become more difficult. A programmer/user of interrelated irrigation controllers must understand the hydrodynamic relationships of the valves controlled by each. These relationships may be several and may be at several hydrodynamic levels within a large irrigation system. In accordance with this understanding, the programmer/user must program irrigation at each irrigation controller in consideration of his/her programming of the other irrigation controllers.

Even when the necessary coordination of irrigation control programming is kept track of on paper, its actual implementation is difficult and fraught with error. The irrigation controllers themselves are typically difficult and time consuming to program. They are required to be programmed where located, meaning in the field. The weather conditions under which the irrigation controllers must be programmed, and the caliber and diligence of the workers that must tend to the programming, are not always good. Considerable difficulty of coordination between irrigation controllers is experienced. It is hard to affect any appreciable change at any one controller until all controllers are reasonably well coordinated.

These difficulties tend to impart a great deal of undesired rigidity to the entire irrigation programming process. The system wide reprogramming of an irrigation system because of variations in rainfall, seasonal variations, changed site requirements and numerous other reasons is often undesirably foregone simply because it is excessively difficult to plan, setup, or repeatedly setup coordinated irrigation control.

One previous approach in dealing with the difficulties in the coordinated setup, or programming, of multiple independent but functionally interrelated irrigation controllers within a single irrigation system has been based on the establishment of one master and several satellite irrigation controllers. The master irrigation controller communicates with its satellite irrigation controllers to sequence their respective operations. Flexibility in scheduling is typically constrained by the nature of the sequential control of the satellite irrigation controllers. The expense of a wired communication network is incurred. The problem of coordinating multiple interrelated irrigation controllers is simply moved to a higher level because multiple master irrigation controllers may themselves now require coordinated set-up, now at typically increased complexity, one to another.

SUMMARY OF THE INVENTION

The present invention contemplates (i) generating one or more programs for one or more potentially interrelated irrigation controllers at a central computer, (ii) downloading the one or more programs from the central computer into a transportable memory device, (iii) transporting, and communicatively connecting, the transportable memory device to each one of the one or more potentially interrelated irrigation controllers in series, and (iv) uploading a program from the transportable memory device into each one of the one or more irrigation controllers.

The central program generation preferably transpires on a digital computer, typically on a personal computer. The computer permits the assembly (or compilation) of the programs that will be executed by the actual irrigation controllers. Each irrigation controller preferably contains a microprocessor, nominally a type 6502 contained within an Application Specific Integrated Circuit, and executes firmware programs to effect irrigation control. The personal computer generates these firmware programs by running commercially available assemblers (or compilers) for this popular microprocessor. These programs are individualized as required or desired to each irrigation controller.

Moreover, the personal computer is preferably programmed so as to emulate the irrigation controllers both individually and collectively. This emulation is particularly of the manual input control and, in the form a display, the valve control and/or displays that would be produced by an actual irrigation controller as it would execute a particular actual program. The personal computer does not produce control signals to valves during its emulation of an irrigation controller, although it could do so. It is sufficient for the purposes of the present invention that the personal computer should merely emulate the responses of an irrigation controller as it executes a particular program.

Because each irrigation controller is entirely controlled by only four pushbutton switches (OK/YES, NO, HELP, and STOP), because each controller generates only a modest number of relatively short messages and the on/off control of only eight valves, and because each controller runs firmware that is easily emulated in execution by the personal computer meanwhile that the controller's emulation need not be (and is usually not) conducted in real time, the emulation of one or more irrigation controllers by the personal computer is straightforward. This simultaneous emulation of one or more controllers permits debug of the control program of any one controller and, importantly, visibility (on the screen of the personal computer's monitor) of the diurnal irrigation control arising from multiple interrelated controllers. A central programmer's task in coordinating a number of interrelated irrigation controllers for the control of irrigation within a single irrigation system is thus much facilitated.

The transportable memory device preferably interfaces to the personal computer by a standard digital serial interface type RS-232C, and to each irrigation controller by a custom digital interface. The custom digital interface is functionally distinguished by starting automatically upon physical electrical connection of the memory device and an irrigation controller, by having the controller automatically identify itself to the memory device and vice versa, and by automatically uploading the appropriate program from the memory device into each individual controller.

The memory device can preferably carry up to sixty-four (64) complete irrigation control programs simultaneously. It preferably employs the same microprocessor (type 6502 contained within an Application Specific Integrated Circuit) that is also used within the irrigation controller. The automated, microprocessor-managed, interchange of unit identities and the automated transfer of an appropriate program minimizes any required human involvement and/or skills at the controllers' field sites, and permits the complex programmed setup of many irrigation controllers to be quickly and easily accomplished by unskilled field workers.

The irrigation controllers each keep a time-of-day clock. Each controls the conduct of irrigation in accordance with schedules computed by its microprocessor from execution of its individually associated firmware program. Because the programs that were generated at the central source are coordinated for the timed control of irrigation at many dozens or hundreds of stations (valves) within an irrigation system, the actual timed irrigation control effected by the irrigation controllers is also so coordinated. In particular, a number of physically separate and independent irrigation controllers that are interrelated in their required functional control of irrigation may readily be coordinated so as to respond as a single virtual controller. For example, three irrigation controllers controlling eight stations each may readily be coordinated in operation to act as one virtual controller controlling twenty-four stations. The concept of virtual irrigation controllers—which virtual controllers are readily created and programmed at the personal computer—much facilitates the ease with which a programmer may think about the programming of coordinated irrigation control within an irrigation system.

The present invention further contemplates that the irrigation controllers should load information into the portable memory device, and that this information should be carried back to the central station personal computer to be offloaded for analysis, verification, and/or printout. The loaded information commonly comprises both the existing, previous, firmware program to that one being uploaded (if any is) plus data in the form of actual historic operational occurrences (normally for the prior 30 days). Ability to recover the existing irrigation controller firmware program permits the study and analysis of programs installed in the field, or the verification whether or not programs previously believed to have been installed were so installed in fact. The ability to recover actual historical data permits analysis of irregular occurrences, improvement of irrigation watering amounts and schedules in accordance with actual site conditions (especially as sensed by optional moisture sensors), and validation of proper irrigation system performance.

The present invention still further contemplates that other devices than the transportable memory device should be selectively connectable to the custom digital interface of the irrigation controller. Each device identifies itself to the irrigation controller and to its microprocessor operating under firmware program control. The irrigation controller thus normally requires no manual intervention other than physical connection of each device in order to cooperatively interoperate with such device.

A portable maintenance panel extender device connects a substitutionary or additional maintenance panel for that maintenance panel that is customarily under a cover plate of the irrigation controller. One benefit so derived is the capability of placing the irrigation controller, which is light-energized, upon a high pole where it is substantially immune from vandalism while maintaining the connection for this portable extended maintenance panel, normally within a strong locked enclosure, at a height whereat it may be conveniently accessed.

A radio-linked central programming system for multiple irrigation controllers uses a radio transceiver that is connected to each controller's digital interface port. A central or mobile radio transceiver sends and receives controller-specific information at prescheduled times, typically diurnally. The irrigation controller typically does not have much stored energy to power its connected radio transceiver. The radio transceiver is correspondingly inactive at all times save for prescheduled time intervals when an individual controller may be addressed.

A wireless remote test command system permits manual test operation of the valves connected to an irrigation controller. The valves that are connected to an irrigation controller may generally be locally exercised through the maintenance panel of the irrigation controller. In the remote test command system, a self-powered transceiver is temporarily plugged into the digital interface of the irrigation controller. A hand-held transceiver that is carried by an installer or maintenance person is used to test the operation of valves (and the readings of optional soil sensors, if implemented) without the necessity of physically returning to the controller. Considerable time and walking may be saved in testing for sprinkler and pipe performance, for leaks or obstructions, in checking for soil sensor performance, and in validating all repairs.

These and other aspects and attributes of the present invention will become increasingly clear upon refer-

BRIEF DESCRIPTION OF THE DRAWINGS

FIG. 12 comprising FIGS. 12a–12d, is a detail schematic diagram of the preferred embodiment of the multiprogrammer previously seen in FIGS. 3 and 11.

DESCRIPTION OF THE PREFERRED EMBODIMENT

Figure 1:
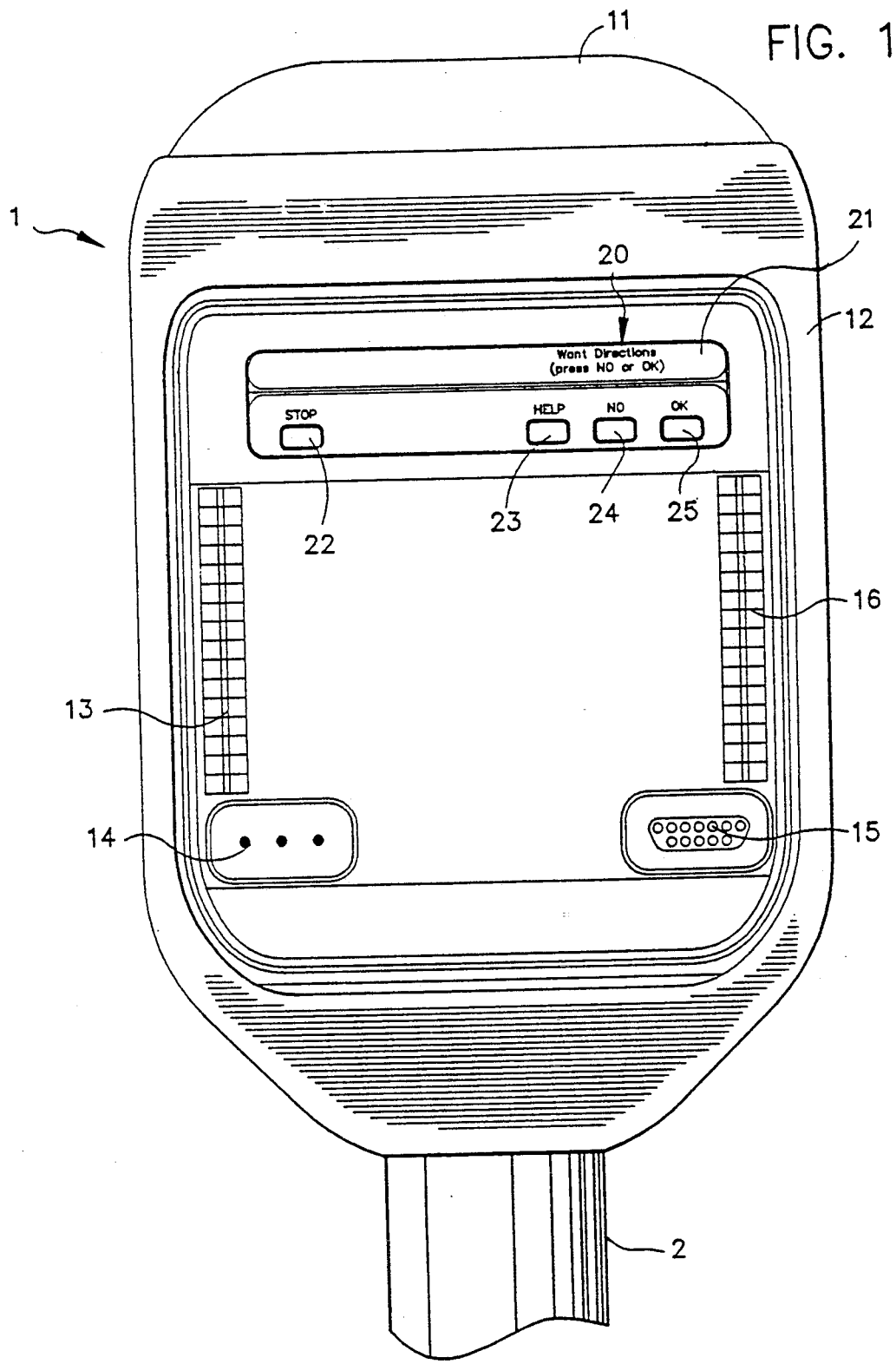
FIG. 1 is a pictorial diagram of an irrigation controller in accordance with the present invention.

1.0 The Preferred Embodiment System of the Invention Includes a Light-Energized Irrigation Technology Controller The present invention is embodied in a system for the programming and test control of an irrigation controller. The irrigation controller is preferably light-energized for the control of irrigation through eight stations, or valves, of up to 128 total cycles per day. The irrigation controller is spoken of as being "light-energized" and (along with the irrigation valves that it controls) to embody "Light-Energized Irrigation Technology" (LEIT). This description is in lieu of describing, for example, the controller to be "solar powered" because it employs an extremely small area light (solar) collector. Resultant to the small energy collected, the controller uses extremely little energy for all irrigation functions, including control of up to eight (8) valves. The acronym LEIT when applied to irrigation controllers is a trademark of Solatrol, Inc. (assignee of the present invention), i.e., LEIT TM Irrigation Controllers.

1.1 Operational Specification of the Preferred Embodiment of an Irrigation Controller in Accordance with the Present Invention No electrical power input is required. Light energy required is 0.4 milliwatts/sq cm incident light for a minimum of 7 hrs/day. This is approximately equivalent to one tenth of the amount of light at 55° northern latitude (e.g., in Canada) on a cloudy winter's day.

The power for the controller's display (when actuated) is derived from a POWERKEY TM (trademark of Solatrol, Inc.) power source. The POWERKEY TM power source packages a 9-volt alkaline battery that is used to energize the Liquid Crystal Display (LCD) of the controller during installation and programming.

The signal output of the controller to its controlled valves is 3.5 volts DC, 0.04 amps for 0.04 seconds. No circuit breaker and no transformer are required.

Up to 8 valves (including up to 4 Master Valves) may be connected to each controller. Up to 8 electronic soil moisture sensors or optionally, other compatible electronic sensing devices, may also be connected to each controller.

A user-defined emergency backup program and critical system parameters are stored in non-volatile memory in case of memory loss from prolonged light interruption; no batteries are needed.

1.2 The Preferred Embodiment of a LEIT TM Irrigation Controller Interfaces with Other Devices in Order to Be Remotely Programmed and/or Controlled The preferred embodiment of a LEIT Irrigation controller in accordance with the present invention interfaces with other devices for the loading of irrigation control programs and the manual exercise of irrigation valves and sensors.

A POWERKEY TM (trademark of Solatrol, Inc.) power source is a combination keyring and keyfob-cased battery for powering the irrigation controller and its display during programming and/or interactive operation. The POWERKEY TM power source is manually plugged to the controller. It provides power to the controller for its very first use, and thereafter during each episode of the programming/parameterization of the controller's operation and/or the reviewing of data in the controller's memory. The POWERKEY TM power source also provides power to the built-in illumination of the controller's display and control switches. The power source that is used during operation of the controller to control irrigation may be the POWERKEY TM power source if it is still pluggably attached (an abnormal condition), but is normally light (even extremely dim light, such as moonlight) that falls upon the controller.

A Multiprogrammer TM unit plugs into the digital interface of the controller for uploading and downloading the irrigation watering program that is executed by the controller. The Multiprogrammer unit simultaneously holds the programs for up to 64 controllers.

A remote test command assembly mounts in position as a replacement controller face-plate. It plugs into the digital interface of the controller and receives signals from a hand-held transceiver carried by a maintainer in order to allow wireless remote "manual" operation of the controllers valves and sensors. This remote operation characteristically occurs while the maintainer inspects the valve or sensor locations.

An extension maintenance panel substitutes for, or replicates (as is specified and configured during build of the irrigation controller) the normal maintenance and control panel of the irrigation controller. The extension maintenance panel is remotely situated from the controller in a position where it may be accessed. The controller is typically located atop a high pole so as to collect light while being isolated from damage due to accident or vandalism. The extension maintenance and control panel contains only four switches and a display. It interfaces to the controller's digital interface.

A radio-link module mounts permanently to the controller at its digital interface. The module acts as a transceiver for wireless communication between the controller and a radio-link central system. The same program and data information is normally communicated by radio as is alternatively carried in the Multiprogrammer unit.

Only one of the Multiprogrammer unit, the remote test command assembly, or the radio-link central module attaches to the irrigation controller at its digital interface at one time. Each device identifies itself to the controller, and the individual controller (of which their may be many in an irrigation system) is likewise identified to the device. The Multiprogrammer unit, the extension maintenance panel, the radio-link module and the remote test command assembly provide their own power.

The controller-mounted transceiver of the radio link module is energized but momentarily on a daily schedule. Messages communicated by radio normally include operating programs to be downloaded into the controller, or historical data to be uploaded to the central station. If a message is to be passed, then a controller's radio-link module will remain energized for the duration of the message. Otherwise the powering of the radio link is only momentary.

Up to 8 optional soil moisture sensor units can connect to the controller to give precise irrigation system control based on readings of available soil moisture tension, or optionally, percentage soil saturation.

1.3 Features and Benefits of the Preferred Embodiment of a LEIT Irrigation Controller in Accordance with the Present Invention The preferred embodiment of an irrigation controller in accordance with the present invention is light-energized with a built-in incident light collector. It exhibits sufficient energy storage to drive a custom CMOS ultra-low-power microcomputer with 32K RAM memory and to cycle up to eight (8) ultra-low-power irrigation valves up to sixteen (16) times each per twenty-four (24) hour period. This provides complete independence from any need for AC power, saving on energy and installation costs and permitting the controller to be located closer to the valves.

An easy to read two-line LCD display with automatic prompting is implemented. The user is guided through the programming process with easy to understand two-line "prompts," thus substantially eliminating confusion, mistakes, and requirements to repeatedly reference printed or human authority.

Two-button programming with "best guess" defaults is used for all settings. All programming is done by answering simple questions with OK or NO answers. The controller automatically gives the user "best guess" defaults where applicable.

An on-line help feature gives directions and information for each operational mode and parameter insertion.

These on-line help messages are available at any time by pressing a HELP key.

The design is modular in that multiple 8-valve-station controller units can be integrated together. The individual 8-valve-station controller units can be networked together into optionally radio-linked centrally controlled systems, or, alternatively, multiple unrelated controllers on various sites can be centrally managed by optional multi-programming equipment.

Each of the 8 stations for a single controller unit can be independently programmed within one of six different runtime modes (Mini, Autosplit, Ration, One-Time, and Special. This gives the Irrigation Controller great programming flexibility. Options for (i) simplified "Mini" setups, (ii) "Autosplit" setups with automatically programmed split cycles and sequential non-overlapping operation, (iii) "Ration" setups for odd/even (day of month) water rationing, (iv) "ISC" setups with complete independence between stations, (v) "Special" setup for lights, fountains, and pump-start relays, (vi) periodic or one-time "Add-on Soak Cycle" setups, and (vii) for multiple "Add-on Syringe Cycle" setups are implemented.

Controller timing control of the irrigation valves is from 1 minute to 240 minutes in one minute increments. Thus one minute precision in starting or stopping irrigation is combined with the ability to set watering durations of up to 4 hours for each start time. One-time or periodic "soak cycles" can have a duration of up to 8 hours.

A calendar is maintained based on "perpetual calendar" data in permanent memory. Schedules may be established for specific days or every "so many" days. This permits flexible day cycles for irrigation, and allows different stations to operate on different day cycles.

Up to 128 automatic starts per day are enabled, thereby meeting the most demanding applications.

The controller's split cycle capability permits watering times to be split into up to 16 substantially equal increments. This minimizes runoff and puddling by splitting the programmed watering duration into shorter cycles each of which is separated by a programmable minimum "off" time.

A System Budgeting Factor of 10 to 200% acts to determine the numbers of split cycles. The System (water) Budgeting Factor increases or decreases the number of split cycles instead of acting as a total duration multiplier which can lead to runoff and puddling. Monthly budgeting with pre-set default values for each month is also available. This allows an entire year's scheduling to be set up.

An Integrated Moisture Sensor control with programmable "wet" and "dry" trigger levels is optionally implemented for each valve station. This keeps the soil moisture level for each valve within the optimal range for the growth of the type of vegetation being watered by that valve, instead of merely using the optional moisture sensors as switches to override cycle starts.

Automatic sequential program generation permits "Excluded Time Intervals". The controller automatically generates a sequential matrix of start times for all active valves and split irrigation cycles based on user input for determined total watering durations by valve, either site information selection or operator entered number of split cycles, and on any user-defined "Excluded Time Intervals" when no watering is desired.

For very simple applications a "Mini" setup is available. This simple setup mode is extremely easy to use, and it is designed for applications where some of the more sophisticated features of the controller are not needed.

Another option, the "Special setup, can be used for control of non-valve devices such as pumps, or lighting equipment.

One-time or periodic "Soak" cycles can be overlaid on any regular watering program. This feature can be used for watering in fertilizer, for periodically deep watering trees and shrubs in turf areas, and for periodically leaching salts in drip applications.

Multiple daily cooling or frost-wipe "Syringe" cycles can be overlaid on any regular watering program for any preprogrammed month(s) when needed. These cycles help prevent wilting and scorching of plant materials during hot summer months or damage from freezing or morning dew in cold weather months.

Even and odd days can be automatically excluded as watering days in the "Ration" setup mode. This allows for odd/even water rationing schedules to be easily programmed where this is mandated by law.

A programmable "Delay Start" permits watering to be suspended for up to 14 days during rainy weather, and at the end of the programmed "Rain Delay" the regular watering schedule will automatically resume.

A special "View Info" mode allows the user to review all settings or to view an event report which displays the controller history and current operational setup. This permits the user to easily review the current controller settings or to view a list of the last 128 events (watering cycles, program changes, etc.) in chronological order starting from the earliest event.

Built-in wire continuity and short testing, system self-test and report functions are implemented. The user is alerted if shorted or open valve wires exist, and the unit performs a self-diagnostic test when requested.

A "Test Sequence" allows each valve to be operated in sequence for one to thirty minutes. This allows the irrigation system to be easily periodically tested. A STOP key lets the operator immediately stop the test sequence if broken sprinklers or pipes are found.

Both valve stations and sensors can be operated automatically, semi-automatically, or manually. In semi-automatic mode, all or selected valves can be run once using the "One-Time" setup. This allows the user to do a one-time soak for watering in fertilizer or new plantings. The controller then automatically reverts to the automatic "Run" mode.

Three level access codes provide security and render the controller useless if stolen. Separate codes for gardeners, supervisors, and factory personnel insure that only authorized individuals can change the controller settings, and that codes can be easily changed as operating personnel change.

2.0 Overview of the Preferred Embodiment of An Irrigation Controller

The preferred embodiment of an irrigation controller in accordance with the present invention uses Light Energized Irrigation Technology (LEIT TM). It can operate with the amount of incident light available in northern latitudes on a worst-case cloudy winter's day without needing any of the batteries, external solar panels, or the A.C. power connections required for traditional controllers. It is also extremely flexible and versatile in its operation.

A diagrammatic view of the preferred embodiment of the controller, with its cover plate removed and operator's panel area exposed, is shown in FIG. 1. Controller 1 is typically attached to post 2. A photovoltaic device 10 (not shown) is located under transparent lid 11 to case 12.

Various electrical connectors are presented. A valve connector block 13 permits electrical connection by wires (not shown) to up to eight (8) electromagnetically actuated valves. A control key socket 14 accepts a pluggable POWERKEY TM power source (not shown), being a 9 vdc battery suitably packaged so as to plug into socket 14. A digital accessory connector 15 permits communication connection to a Multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid crystal display (LCD) 21 for showing information, questions, and directives. The control panel 20 also contains pushbutton switches 22-25. A STOP switch 22 stops the present controller 1 operation and turns off any valves previously turned on. A HELP switch 23 causes the controller 1 to display more information and/or instructions, keyed to the current operation or displayed questions, in LCD 21. The NO switch 24 and the OK switch 25 are used to answer controller-presented questions about the installation and the parameters of irrigation (e.g., the watering schedule) and to enable selectable readout of controller stored data.

The controller 1 is controlled in its operation by firmware running on a special Application Specific Integrated Circuit (ASIC) that includes a microprocessor. The explanation of the controller 1 hardware is contained in major sections 3-5 of this specification. The firmware executed by controller 1 is attached as Appendix A to this specification. This major section 2 deals with the user interface to controller 1, and serves to show its many unique aspects in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed". In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

2.1 Overview of the Preferred Embodiment of an Irrigation System

Figure 2:
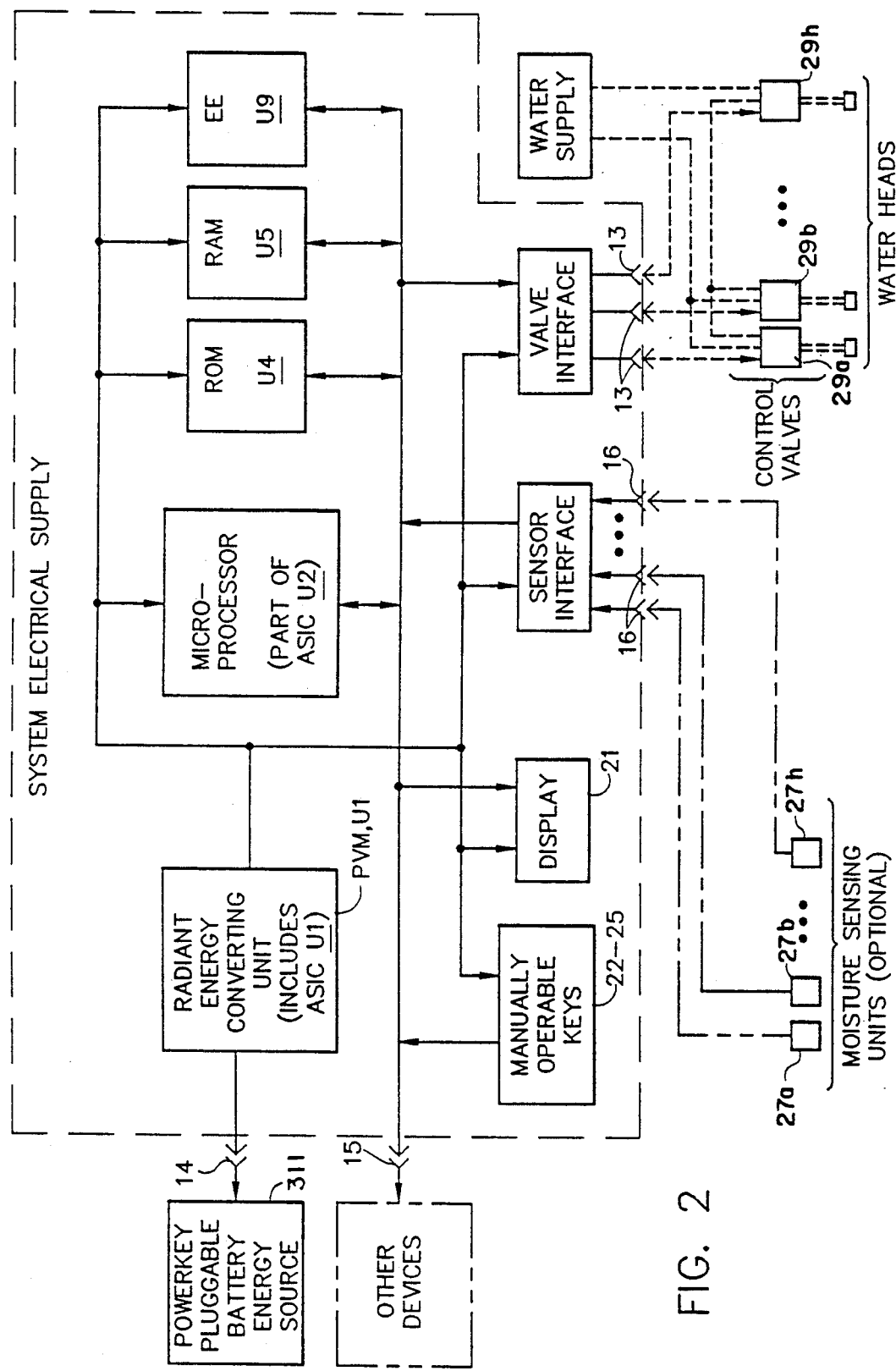
FIG. 2 is a block diagram of an irrigation system in accordance with the present invention including the irrigation controller illustrated in FIG. 1.

A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22-25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plugjack 16 (shown in FIG. 1) to up to eight MOISTURE SENSING UNITS (optional) 27a-27h (shown in phantom line). This optional communication is the purpose of sensing soil moisture at up to eight locations. The MICROPROCESSOR U2 (partial) communicates through VALVE INTERFACE 28 of plugjack 13 (shown in FIG. 1) to up to eight electromagnetically actuated CONTROL VALVES 29a-29h (shown in dashed lines). This communication is for the purpose of gating the flow of pressurized water from WATER SUPPLY 30 through a selected one of CONTROL VALVES 29a-29h at any one time to a corresponding one of WATERING HEADS 31a-31h (shown in dashed line).

The MICROPROCESSOR U2 (partial) may optionally communicate through plugjack 15 (shown in FIG. 1) to OTHER DEVICES 32 (shown in phantom line) for purposes of receiving the download of firmware programs, parameters, and/or commands. This interface need not be enabled to operate the irrigation controller 1, which in a preferred embodiment comes from the factory with that control program that is appendicized to this specification within its ROM memory U4 and EE memory U9, and which in the preferred embodiment may have all necessary parameters and control entered through MANUALLY OPERABLE KEYS 22-25. Indeed, if necessary firmware could be entered into controller 1 through it's MANUALLY OPERABLE KEYS 22-25. The digital interface to OTHER DEVICES 32 simply represents a less tedious way of communicating.

The preferred embodiment of the controller 1 normally derives all its power, and all power for MOISTURE SENSING UNITS 27a-27h and CONTROL VALUES 29a-29h, during quiescent operation both day and night from radiant light energy impinging upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVM1, U1, and ASSOCIATED circuitry but rather by electrical connection through plugjack 14 (shown in FIG. 1) to the POWERKEY TM PLUGGABLE BATTERY ENERGY SOURCE 34. This SOURCE 34, normally not a part of irrigation controller 1 during its quiescent operation, is shown neither in shadow line for being optional, nor in dashed line for being related to the controller 1 of the present invention but not part thereof. Rather, the POWERKEY TM PLUGGABLE BATTERY ENERGY SOURCE is shown in solid line in order to illustrate that for the purposes of programming the controller in accordance with the present invention it must be present.

This required presence is because the SOURCE 34 supplies the greater power that the MICROPROCESSOR U2 (partial) needs to exit the predominantly somnolent (inactive) state that it only intermittently and momentarily leaves to effect irrigation control in accordance with the schedules, and to assume a high duty cycle at operation. The SOURCE 34 also supplies the power requirements of MANUALLY OPERABLE KEYS 22-25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 34 actually charges the energy storage means within the RADIANT ENERGY CONVERTING UNIT, and always leaves the controller 1 fully powered and ready to control irrigation of the end of a user programming sequence.

2.2 The Multiprogramming System

Figure 3:
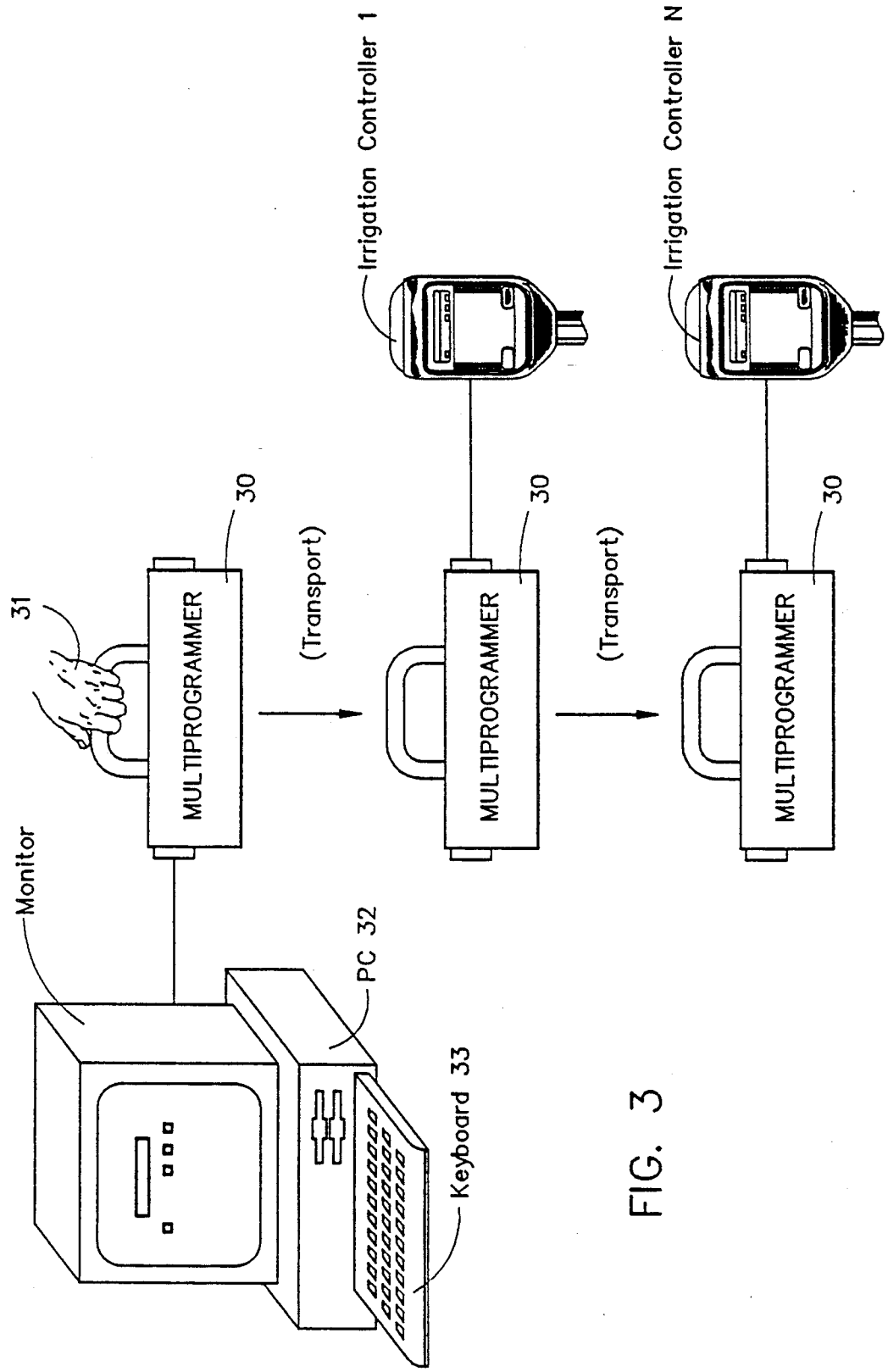
FIG. 3 is a pictorial diagram of a multiprogrammer unit in accordance with the present invention in use to transport programs to the irrigation controller.

The preferred embodiment of a system for delivering programs from a central program generation device to one or more independent irrigation controllers is pictorially illustrated in FIG. 3.

A MULTIPROGRAMMER unit 30 is carried by a maintenance person 31. It contains all the programming instructions for up to 64 controllers. The MULTIPROGRAMMER unit 30 plugs into one of the IRRIGATION CONTROLLERs 1 through N whereupon the controller identifies itself to the MULTIPROGRAMMER unit and receives any new programming instructions intended uniquely for that controller. During the same communication episode the MULTIPROGRAMMER unit 30 receives and stores existing programs and history data from the controller. Later, back at the maintenance office, the MULTIPROGRAMMER unit 30 plugs into any personal computer PC 32 and reads out this information for verification and/or printout.

The PC 30 runs software used for programming the IRRIGATION CONTROLLERs, and for emulating their function. The preferred software is the "6502 ASSEMBLER" for the 6502 microprocessor chip available from 2500AD Software, Inc., 17200 E. Ohio Drive, Aurora, Colo. 80017. The PC 30 may optionally emulate an IRRIGATION CONTROLLER, at least to the extent of accepting the same input control as an actual CONTROLLER and producing an output display that shows a display that would be upon an actual CONTROLLER's maintenance panel. The emulation further shows the valve actuations of the CONTROLLER and the times at which such occur.

The emulation is based on inputting data from KEYBOARD 33 into the PC 32 and then into appropriate data storage addresses of an actual irrigation control program that is resident within the PC. The time-of-day clock memory storage location of the irrigation control program is set. The irrigation control program is run under its previously mentioned assembler. Certain memory storage locations that represent results of execution of the irrigation control program, such as the message buffer and/or the valve states, are then inspected.

This series of operations can all be done piecemeal under the operating system of PC 30, normally under the MS-DOS operating system. However, the necessary interfacing is normally accomplished by use of a small executive program. The executive program leads the operator through those same programming steps which are used in setting up a controller on-site, but also employs the computer's screen graphics and printer capabilities in order to give the operator more information with less effort. The executive program also facilitates user archiving of program and system histories.

Custom graphics support can be provided for large users. In the case of a golf course, this would include course maps to allow the user to point to a subsystem he wants to work on rather than identifying it by code.

Figure 11:
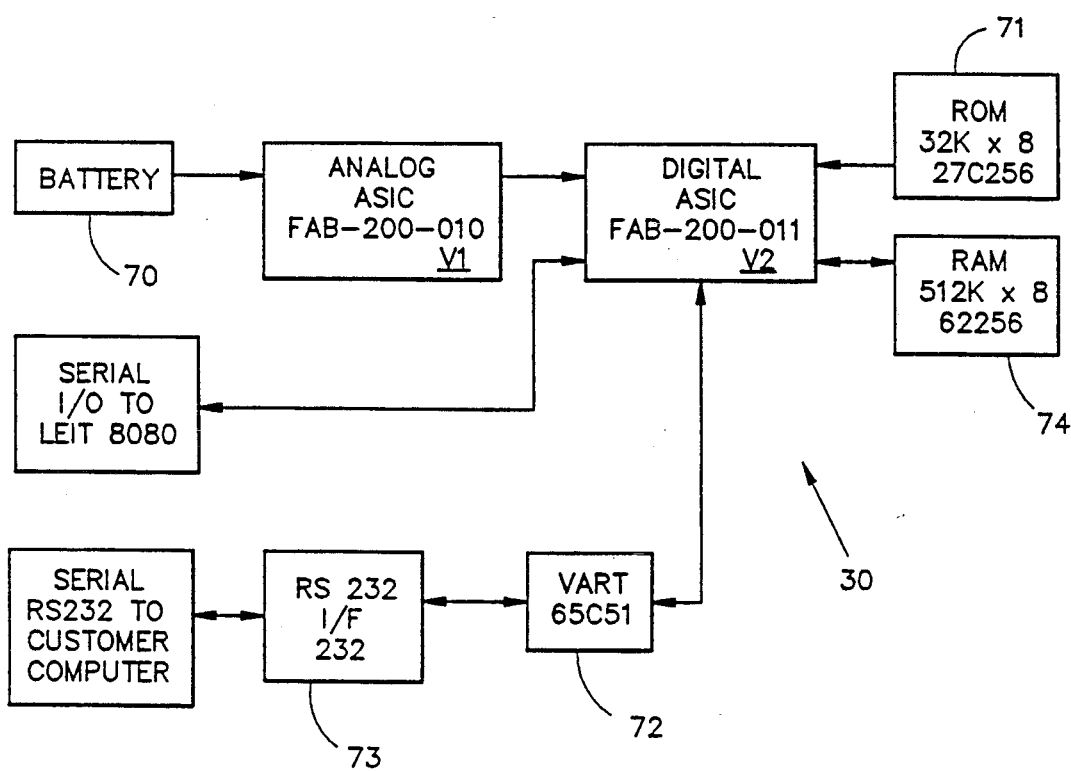
FIG. 11 is a schematic block diagram of a preferred embodiment of the multiprogrammer previously seen in FIG. 3.

An electrical schematic of a preferred embodiment of MULTIPROGRAMMER 30 is discussed in conjunction with FIG. 11.

2.3 Extension Maintenance Panel

Figure 4:
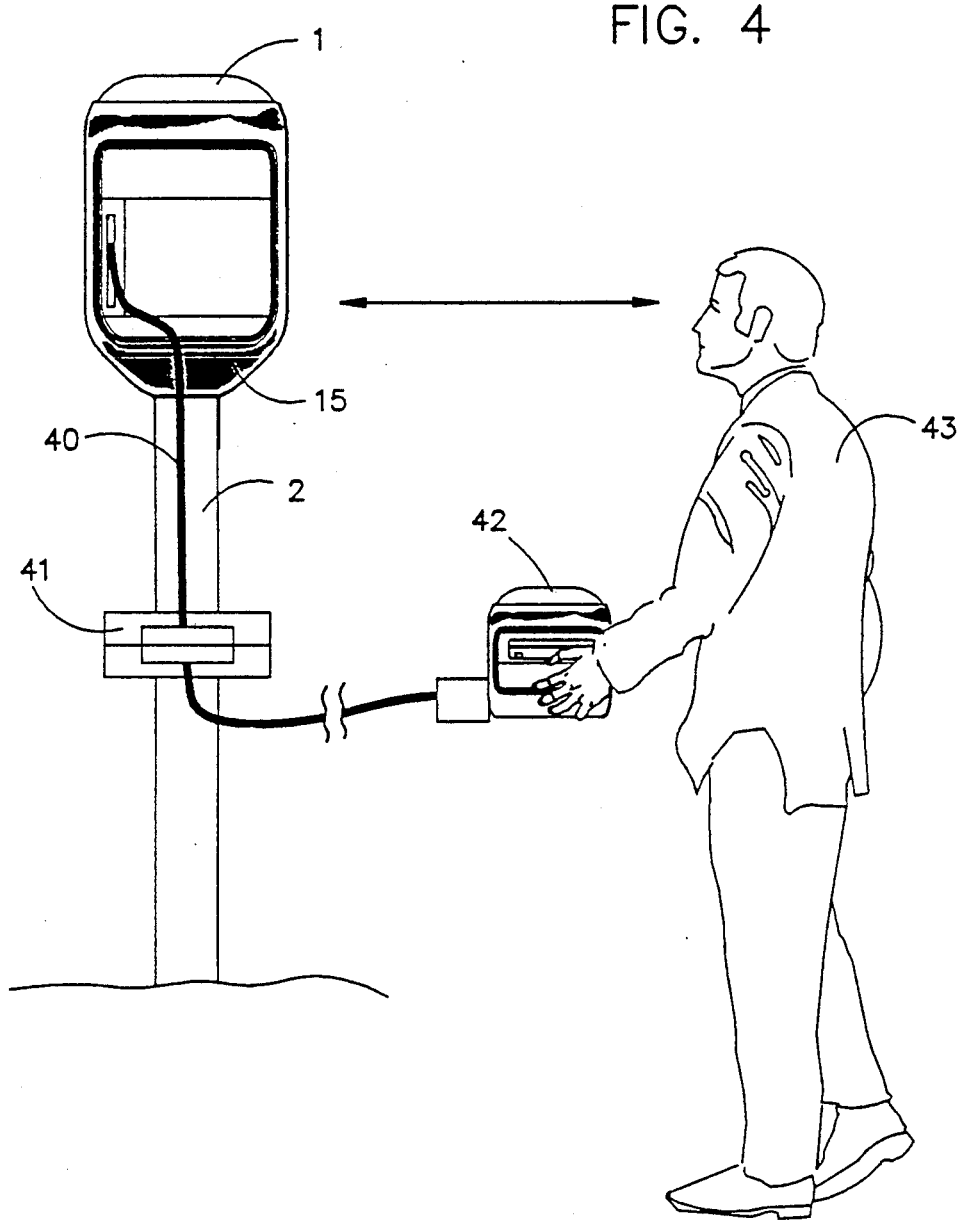
FIG. 4 is a pictorial diagram of a maintenance panel extender to the irrigation controller.

A pictorial diagram of the extension maintenance panel in operational use is shown in FIG. 4. An irrigation controller 1 that is normally modified so as to not have a control panel 20 (shown in FIG. 1) is mounted at the top of a post 2. The post 2 may be ten feet or greater in height so as to protect the irrigation controller from inadvertent or intentional damage. A RIBBON cable 40 connection of digital accessory connector 14 (also shown in FIG. 14) is extended interior to the hollow post 2 to JUNCTION BOX 41. The JUNCTION BOX 41 typically contains a coiled EXTENSION SERIAL CABLE, normally six feet in length. At the end of this cable an EXTENSION MAINTENANCE PANEL 42 is plugged.

The EXTENSION MAINTENANCE PANEL 42 replicates the same, or equivalent, display 21 and pushbutton switches 21-25 that are within the control panel 20 (shown in FIG. 1). The maintainer-user 43 may realize equivalent control and exercise of the irrigation controller 1 through EXTENSION MAINTENANCE PANEL 42 as is normally realized through control panel 20.

2.4 Radio-Linked Central Programming and Monitoring System TM

Figure 5:
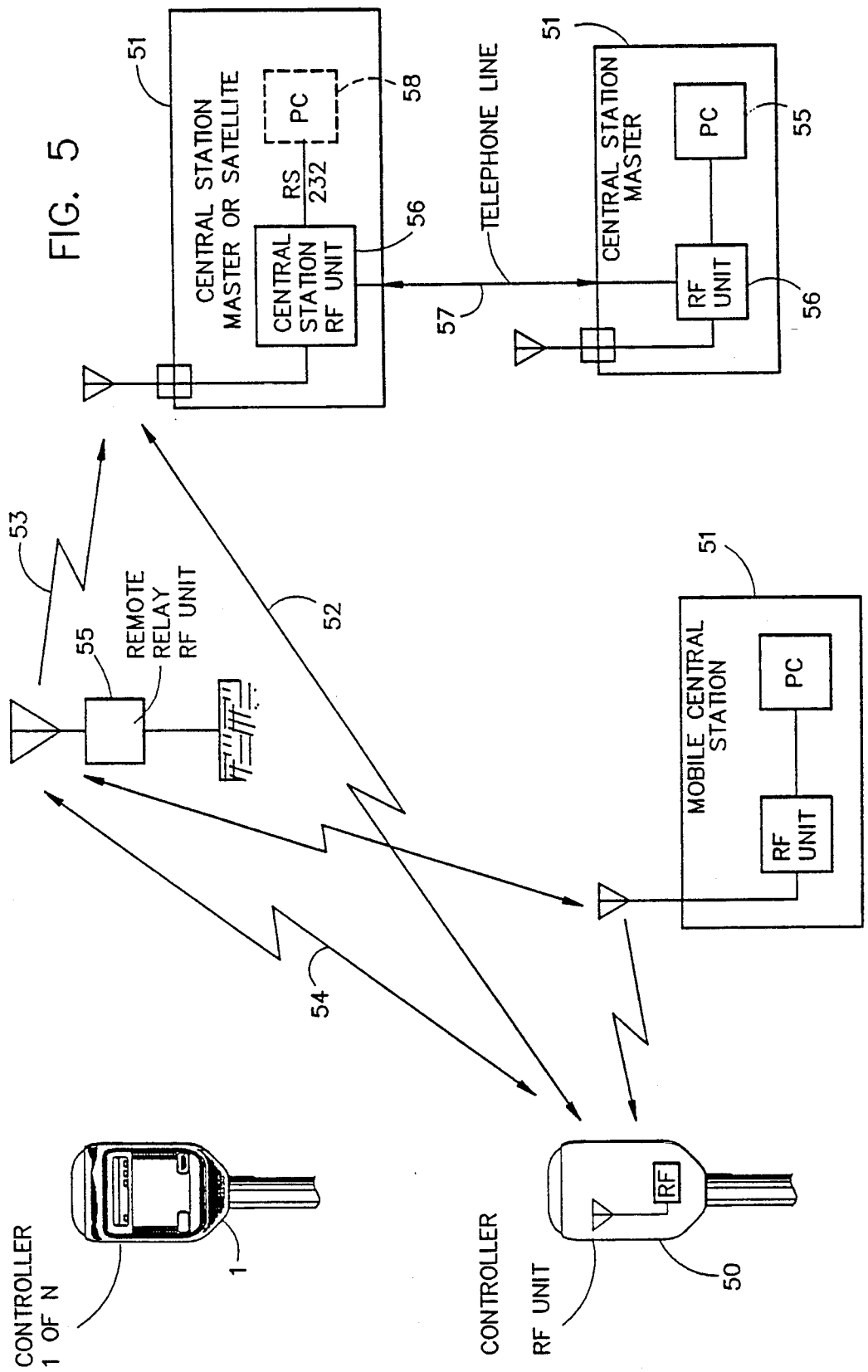
FIG. 5 is a pictorial diagram of a radio-linked central programming system for communication with irrigation controllers.

A pictorial diagram of the radio-link central programming and monitoring system is shown in FIG. 5. A radio-link module 50 mounts permanently below the controller 1 on the mounting pipe and serves as a transceiver for wireless communication between the controller and the radio-link CENTRAL STATION 51. This radio communication may be direct via path 52 or indirect via paths 53, 54 via a REMOTE RELAY RF UNIT 55.

The radio-link CENTRAL STATION 51 may be a MASTER or a SATELLITE. A MASTER CENTRAL STATION contains a personal computer (PC) 55 that drives a local CENTRAL STATION RF UNIT 56. Alternatively, a SATELLITE CENTRAL STATION 51 contains only a CENTRAL STATION RF UNIT 56 that communicates with the PC 55 of another, MASTER, CENTRAL STATION 51 via the RF UNIT 56 of that station and the TELEPHONE LINES 57. The TELEPHONE LINES 57 do not, of course, carry an RF signal. They can, however, carry that information which is either received or broadcast. RF to telephone conversion is implemented through a modem located in the RF unit.

A CENTRAL STATION 51 may be MOBILE, and mounted in a vehicle. In such a case the N irrigation controllers 1 may typically be programmed during drive-bys (insofar as the normal condition of the controller not to be energized is overcome). Typically a tuned RF circuit within the controller may be sufficiently energized by strong RF radiation so as to produce a voltage capable of bringing the irrigation controller 1, and its attached radio-link module 50, awake.

The radio-link CENTRAL STATION connects into same personal computer 55 that sends radio commands to the controller 1 via the radio link and receives information about the performance of the individual controllers and valves, along with data about soil moisture and other environmental parameters. The computer stores program information for all the controllers in the system in its memory and can operate the entire system remotely, via an emulated display panel identical to the on-site controllers. Sophisticated screen graphics and printer capabilities may be used to enhance operator convenience.

2.5 Remote Test Command System

Figure 6:
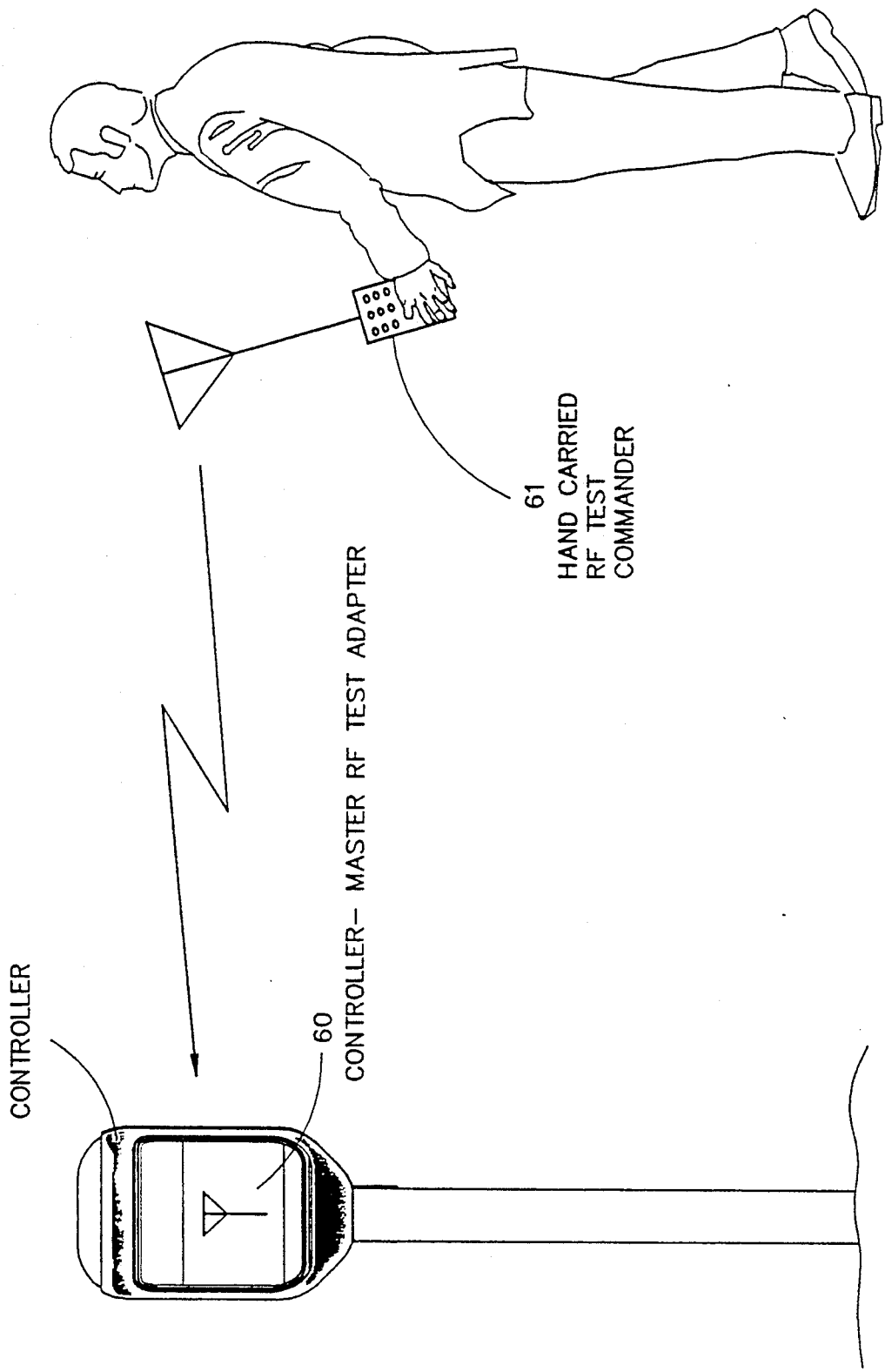
FIG. 6 is a pictorial diagram of a remote test command system for exercising and testing irrigation controllers.

A pictorial diagram of a wireless remote test command system is shown in FIG. 6. The remote test command system permits wireless remote "manual operation" of the valves and soil sensors of irrigation controller 1, in conjunction with an RF Test Adapter 60. This transceiver unit 60 is temporarily plugged into the controller 1 and receives "manual mode" commands from the hand-carried test commander 61. It also transmits soil sensor readings back to the hand-carried test commander 61. The portable hand-carried test commander 61 units are designed to be moved from controller to controller for installation, testing and maintenance purposes.

The hand-carried test commander 61 is a hand held transceiver carried by the installer or maintenance person. It is used for remote "manual mode" or test sequence operation of the valves and reading of soil sensors without having to return to the controller. This feature is especially useful in large systems. The hand-carried test commander 61 can save the installer/maintenance person considerable time, and miles per day of unnecessary walking, in testing for sprinkler performance, leaks, obstructions, and in checking soil sensor performance. The hand-carried test commander 61 will be used for a variety of applications such as activating watering zones only as long as necessary to clean out the irrigation system, speeding up testing and inspections, and pinpointing cracks in pipe by turning water on briefly from the repair site, without flooding the entire area and for verifying proper operation after repairs are completed.

3.0 Functional Description of the Preferred Embodiment of An Irrigation Controller in Accordance with the Present Invention A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22-25 (previously seen in FIG. 1) for receipt of data and control. It interfaces with DISPLAY 21 (previously seen in FIG. 1) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plugjack 16 (shown in FIG. 1) to up to eight MOISTURE SENSING UNITS (optional) 27a-27h (shown in phantom line). This optional communication is the purpose of sensing soil moisture at up to eight locations. The MICROPROCESSOR U2 (partial) communicates through VALVE INTERFACE 28 of plugjack 13 (shown in FIG. 1) to up to eight electromagnetically actuated CONTROL VALVES 29a-29h (shown in dashed lines). This communication is for the purpose of gating the flow of pressurized water from WATER SUPPLY 30 through a selected one of CONTROL VALVES 29a-29h at any one time to a corresponding one of WATERING HEADS 31a-31h (shown in dashed line).

The MICROPROCESSOR U2 (partial) may optionally communicate through plugjack 15 (shown in FIG. 1) to OTHER DEVICES 32 (shown in dashed line) for purposes of receiving the download of firmware programs, parameters, and/or commands. This interface need not be enabled to operate the irrigation controller 1, which in preferred embodiment comes from the factory with that control program that is appendicized to this specification within its ROM memory U4 and EE memory U9, and which in the preferred embodiment may have all necessary parameters and control entered through MANUALLY OPERABLE KEYS 22-25. Indeed, if necessary firmware could be entered into controller 1 through it's MANUALLY OPERABLE KEYS 22-25. The digital interface to OTHER DEVICES 32 simply represents a less tedious way of communicating.

The preferred embodiment of the controller 1 normally derives all its power, and all power for MOISTURE SENSING UNITS 27a-27h and CONTROL VALUES 29a-29h, during quiescent operation both day and night from radiant light energy impinging upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVM1, U1, and ASSOCIATED circuitry but rather by electrical connection through plugjack 14 (shown in FIG. 1) to the POWERKEY TM PLUGGABLE BATTERY ENERGY SOURCE 34. This SOURCE 34, normally not a part of irrigation controller 1 during its quiescent operation, is shown neither in shadow line for being optional, nor in dashed line for being related to the controller 1 of the present invention but not part thereof. Rather, the POWERKEY TM PLUGGABLE BATTERY ENERGY SOURCE is shown in solid line in order to illustrate that for the purposes of programming the controller in accordance with the present invention it must be present.

This required presence is because the SOURCE 34 supplies the greater power that the MICROPROCESSOR U2 (partial) needs to exit the predominantly somnolent (inactive) state that it only intermittently and momentarily leaves to effect irrigation control in accordance with the schedules, and to assume a high duty cycle at operation. The SOURCE 34 also supplies the power requirements of MANUALLY OPERABLE KEYS 22-25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 34 actually charges the energy storage means within the RADIANT ENERGY CONVERTING UNIT, and always leaves the controller 1 fully powered and ready to control irrigation of the end of a user programming sequence.

3.1 Hardware Description of the Preferred Embodiment of An Irrigation Controller in Accordance with the Present Invention The schematic diagram of FIG. 2, substantially a block diagram because the very substantial function of the circuit shown is contained in two Application Specific Integrated Circuits (ASICs) U1 (shown in FIG. 8) and U2 (shown in FIG. 10)—shows the preferred embodiment of irrigation controller 1 (previously seen in FIGS. 1 and 2) in accordance with the present invention.

Commencing in FIG. 7, primary power is provided to the irrigation controller in accordance with the present invention by photovoltaic module PVM 1 or, alternatively, by a POWERKEY TM power source. The POWERKEY TM power source 34 is a battery that is connected between terminals BAT + and BAT −. During programming of the irrigation controller 1 the POWERKEY TM power source 34 (shown in FIG. 2) is always connected. Thereby the battery provides the considerable power necessary to energize the display LCD 1, and, importantly, operate the entire controller 1 at the high duty cycle necessary to conduct communications with the operator. The battery also serves to initially charge the capacitor power storage (both at a current limited rate) each time the POWERKEY TM battery power source 34 is replugged to its receptacle 14 (shown in FIGS. 1 and 2). This insures that after each user interface communication the controller is always left in a fully charged condition.

During normal, quiescent, operation all low-power CMOS circuitry and the low-power valves are energized by energy stored in supercapacitors (SUPERCAPS) C1, C2. It is the function of first ASIC U1 to manage the voltage and power levels of the irrigation controller, and, most particularly, to control the charging of SUPERCAPS C1, C2 by PVM 1 and the POWERKEY TM power source 34. The SUPERCAPS C1, C2 will automatically be charged by connection of the POWERKEY TM power source 34. The ASIC U1 operates to control this charging through a constant current source implemented by transistors Q3, Q4 and resistor R2. This constant current source is controlled by a switching regulator implemented from transistor Q2, inductance L1, diode D4, and capacitors C3, C4, all under the control of ASIC U1. The switching regulator and constant current source act jointly to pass, during the presence of bright sunshine or of the POWERKEY TM power source 34, up to 63 milliamperes through steering diode D3 to charge SUPER- CAPS C1, C2. The diodes D1, D2 prevent discharge of the charged SUPERCAPS C1, C2.

Figure 7A:
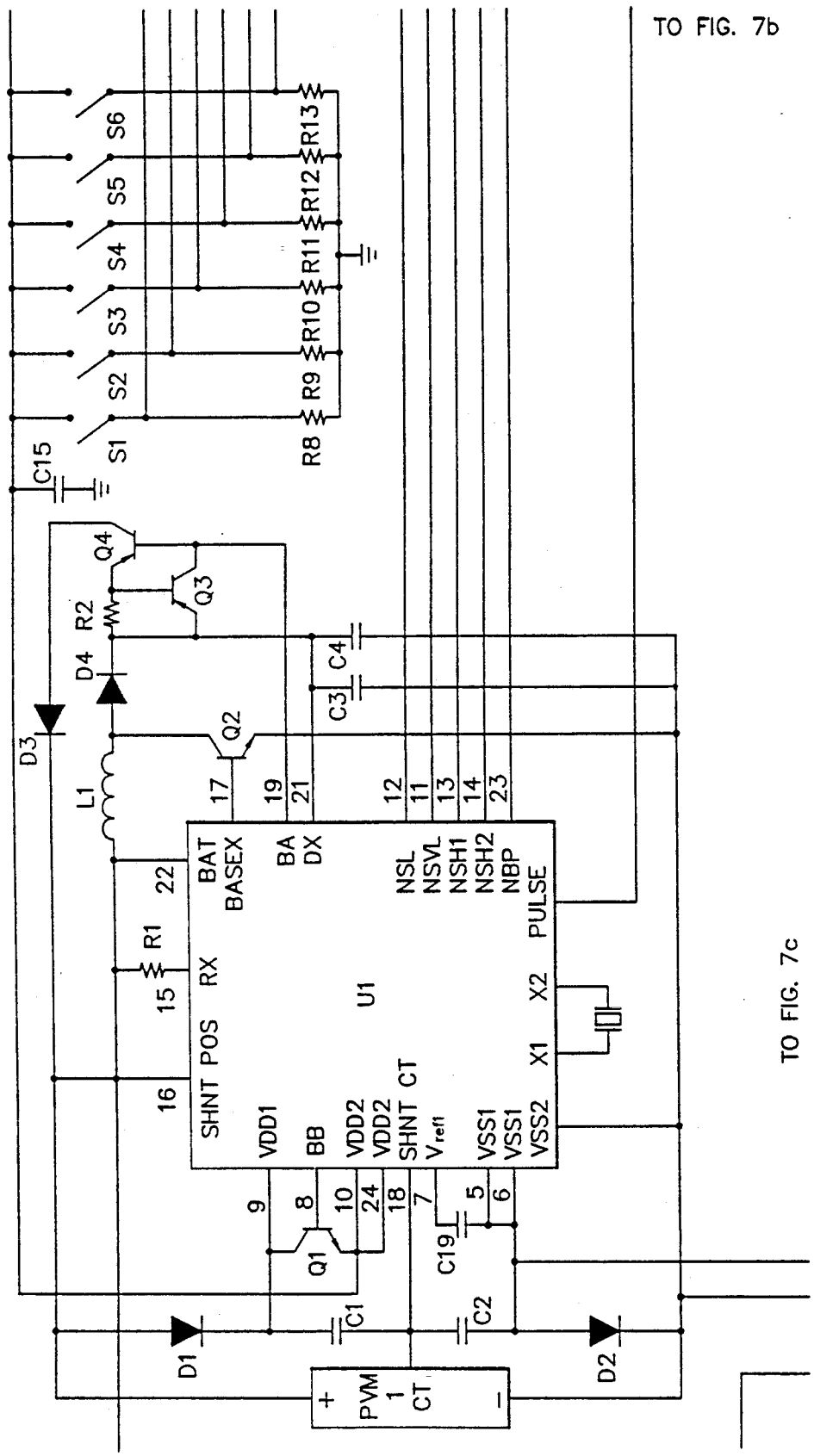
FIG. 7 consisting of FIG. 7a through FIG. 7h, is a schematic diagram of the preferred embodiment of an irrigation controller in accordance with the present invention.
Figure 7C:
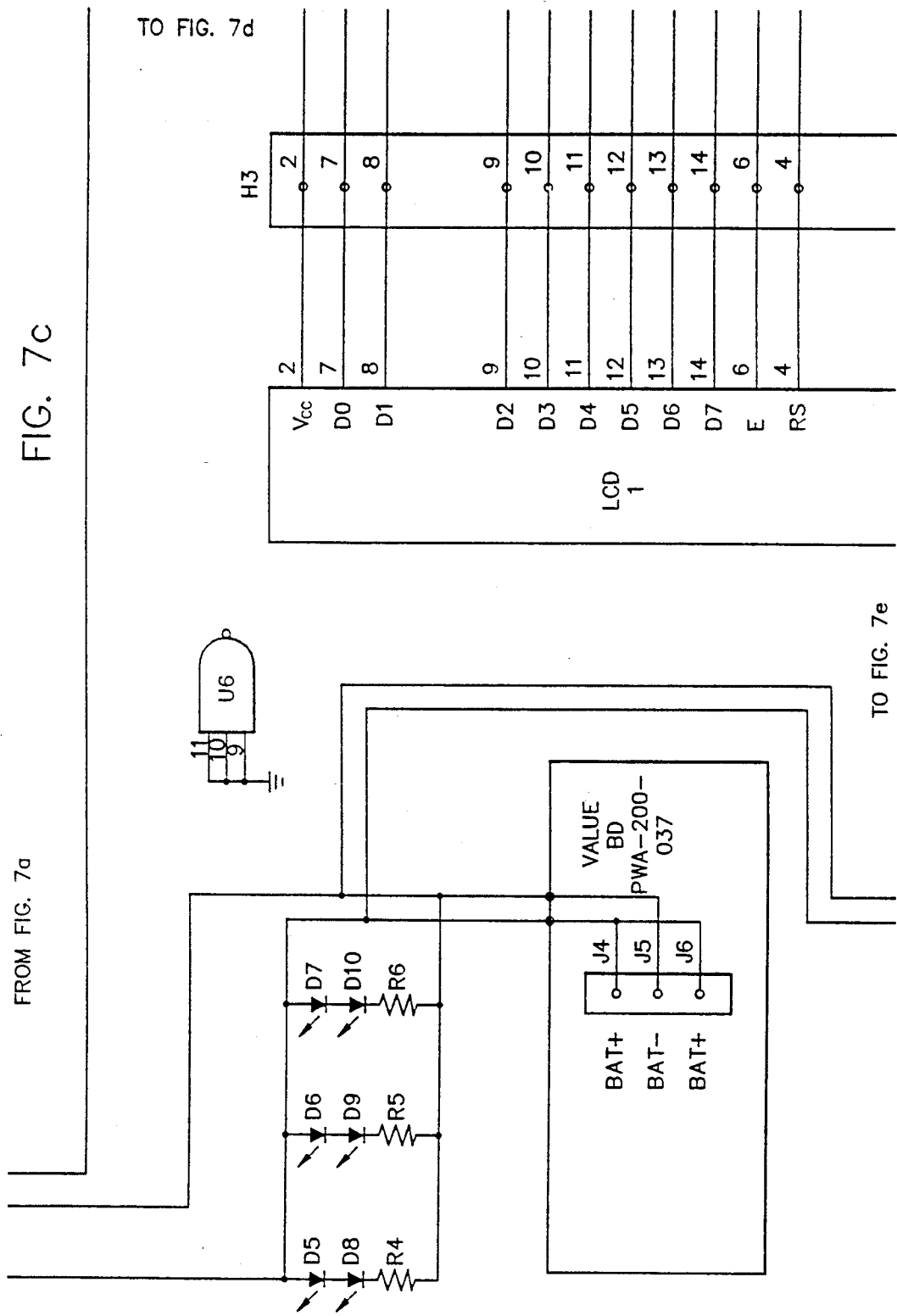

Continuing in FIG. 7a, connections to the ASIC U1 that is used for power management and control include VDD 2. VDD 2 is the main +5 vdc power for the irrigation controller 1 and other components (such as CONTROL VALVES 29a–29h or MOISTURE SENSING UNITS 27a–27h both shown in FIG. 2) to which it is attached in order to form an irrigation system. Signals BA and DX provide local control to the switching regulator and constant current source. The abbreviation NSL stands for system low voltage, NSVL stands for system very low voltage, NSH1 stands for the first shunt from the upper SUPERCAP, NSH2 stands for the second shunt from the lower SUPERCAP, and NBP produces a battery present control signal. The output PULSE is a real time clock interrupt of 30 microseconds duration occurring each ½ millisecond.

The logical control function of the irrigation controller 1 is substantially implemented by digital ASIC U2, shown extending across each of FIGS. 7b, 7d, 7f, and 7h. The main switch control inputs S1–S6 to ASIC U2, used for operator programming of the irrigation controller 1, are from corresponding switches S1–S6 shown in FIG. 7a. The switches S1–S6 respectively implement the stop, unused, unused, help, no, and ok switch control inputs to ASIC U2. These switches S1–S6 are called the MANUALLY OPERABLE KEYS 22–25 in FIG. 2.

Figure 7D:
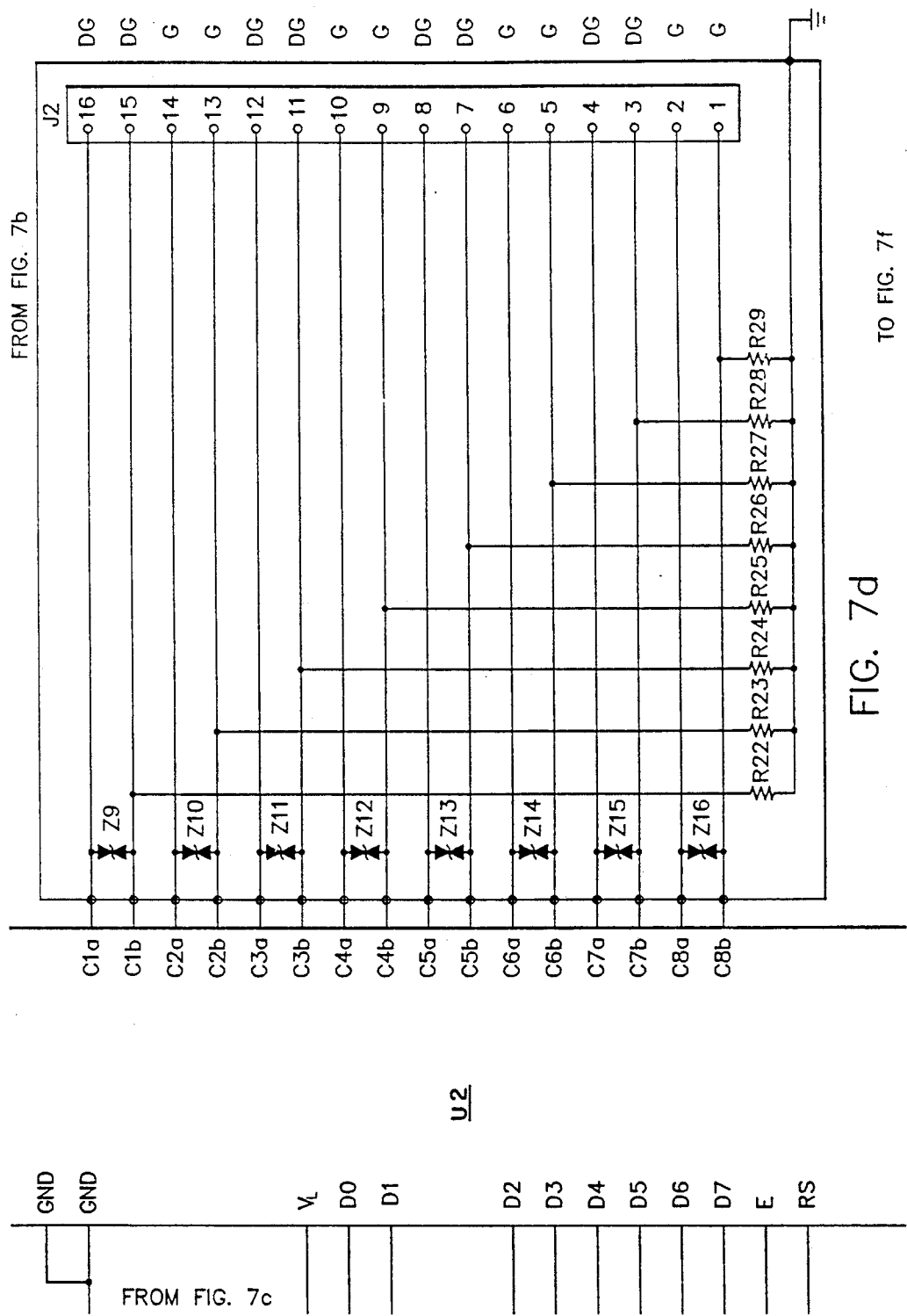
Figure 7E:
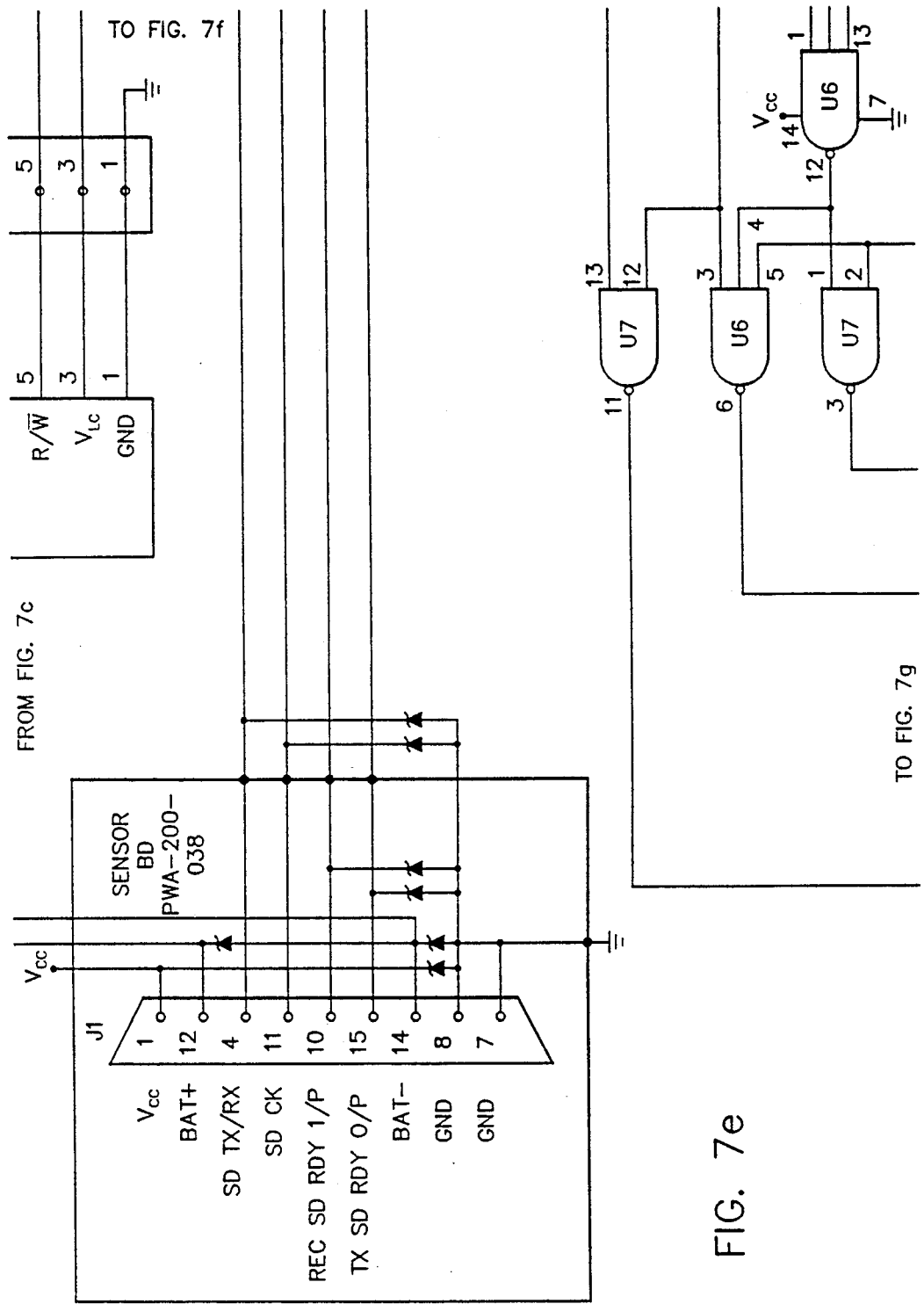

Referring to FIGS. 7b and 7d, up to eight soil moisture sensors that are connectable to terminal block J3 produce signals that are received into corresponding eight analog to digital converter channels, AD CH1 through AD CH8, of ASIC U2.

In a similar manner one side of each coil driver of up to eight valves that are hooked to the eight valve channels on terminal block J2 is internally connected within ASIC U2 as a signal input to one of the remaining eight analog to digital converter channels. Thus, ASC U2 offers a total of 16 A/D channels, of which eight are internal and eight are external. The irrigation valve control, or drive, signals developed by ASIC U2 are brought to terminal block J2. This terminal block J2 is brought out to plugjack 13 shown in FIGS. 1 and 2.

Figure 7H:
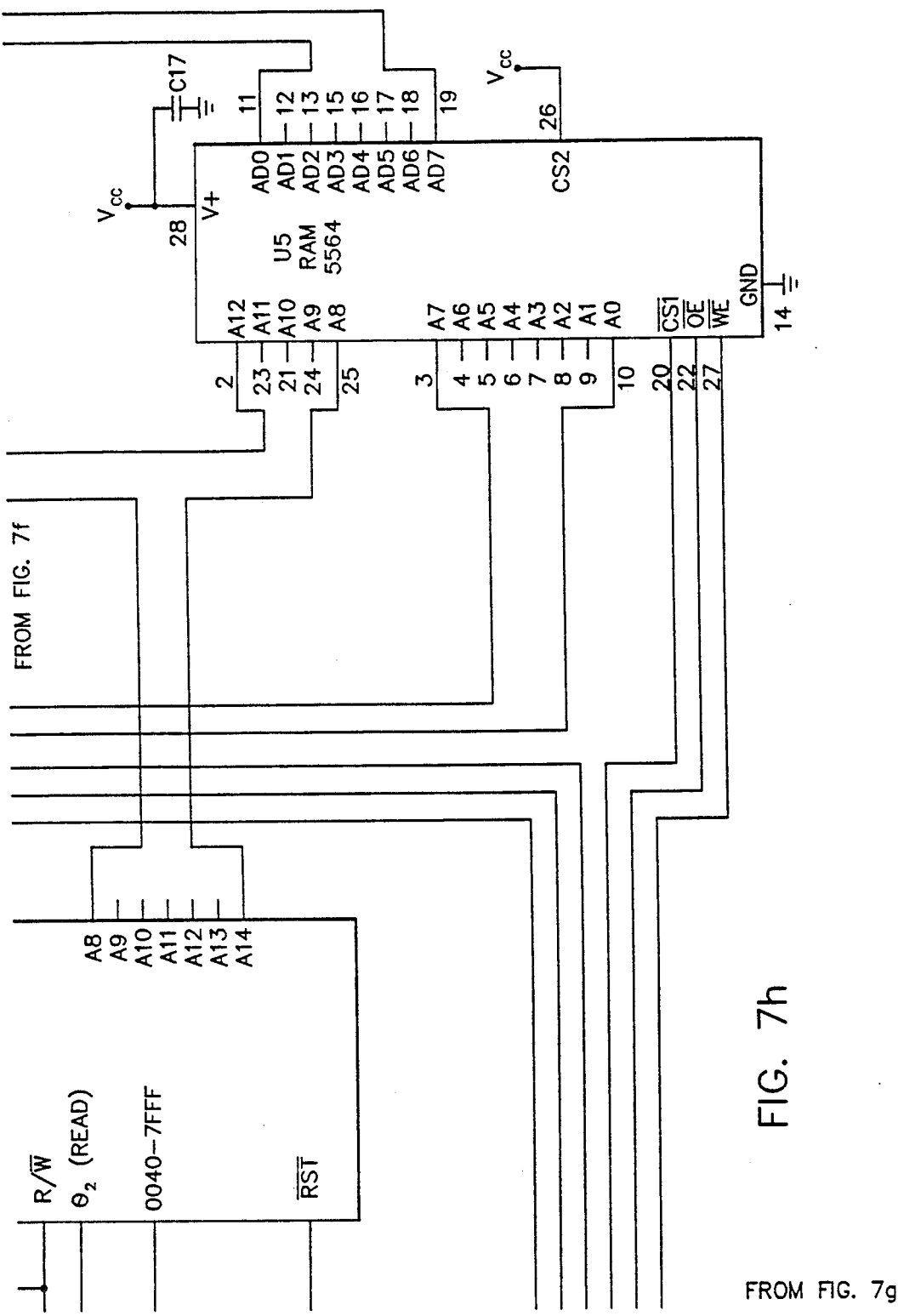

Referencing FIGS. 7f and 7h the ASIC U2 operates on firmware instructions, and on parameters, that are stored within both read only memory ROM U4 and in random access memory RAM U5. The ASIC U2 addresses both such memories through ADDRESS DECODER U7. The irrigation controller 1 is generally versatilely programmable, as well as parameterizable. Thus, many firmware instructions that ASIC U2 executes are present in RAM U5 and are loaded therein in accordance with user requirements. Other firmware instructions reside in ROM U4.

Referencing FIG. 7g, the irrigation controller 1 in accordance with the present invention connects to still another programmable memory other than RAM U5 (shown in FIG. 7h). This is Electrically Erasable (EE) 1024 bit serial memory U9. This EE memory is particularly distinguished in that it will retain its informational contents in the total absence of power (unlike RAM U5). Yet it is alterable in its contents, unlike non-volatile ROM U4. The 1024 bit serial memory U9 permits the field programming of secret codes, vital set up information, and other information that is desirably user specified (unlike the factory-programmed informational contents of ROM U4), wherein this information will desirably not be lost during any interruption of power to the controller.

The complete firmware program, which is resident in memories U4, U5 and U9 and which is executed by the microprocessor contained in ASIC U2, is attached to this specification as Appendix A.

Circuits U6 (save for one unused spare gate shown in FIG. 7c), U7, and U8 form a control interface of a standard type from ASIC U2 to the 1024 bit serial EE memory U9. In the address bus between the ASIC U2 and the control interface circuit U8, address line AD0 powers up, address line AD1 selects, and address line AD2 clocks serial data present on line AD3 into, 1024 bit memory U9. The single, serial, data output bit D0 of 1024 bit memory U9 is amplified in non-inverting element U10 and communicated to ASIC U2 as bit ADO upon its address bus.

The function of the circuits of irrigation controller 1, substantially contained in ASIC U1 and U2, to manage irrigation control will become increasingly clear upon the detailed discussion of such ASIC U1s and U2 in respective following sections 4 and 5, and by reference to the complete firmware program attached to the present specification as Appendix A.

4.0 Functional Description of the U1 ASIC Device

The block diagram of FIG. 4 shows the overall architecture of the first, U1, Application Specific Integrated Circuit (ASIC) used within the preferred embodiment of the irrigation controller in accordance with the present invention. The detail function of ASIC U1 is essentially unimportant for the purposes of the present invention, and is included within this specification only for purposes of completeness. The photovoltaic module (PVM, shown in FIG. 7a), SUPERCAPS C1 and C2 (shown in FIG. 7a) and ASIC U1 (shown in FIGS. 2 and 7) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic module or battery. Power is stored by charging very large supercapacitors ("SUPERCAPS") to 10.8 volts. The stored energy is then used for operation during dark periods. Because the energy stored in the SUPERCAPS = ½ $CV_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within +/−1.75%.

Second, it provides a 5 volt +/−2.5%, 0-65 Ma output voltage to power other electronics.

Third, it provides status signals indicating the condition of the power supply.

Fourth, it provides a 2 Khz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 kΩ/ resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n− regions as separate CMOS substrates. This allows the CMOS circuitry to operate from several supplies, any one of which could be at the highest potential at different times.

The logic generally runs from VSS1 (OV) to VDD2 (0–5 V), level shifting where required. Analog references run from VSS1 to VDD1 (0–11 V). Switching regulator components run from VSS2 (−0.7 to +5.5 V) to VBAT (0 to 15 V). The upper shunt transistor is connected to a voltage which can range from 0 to VDD1 +0.7 V.

4.1 VREF1 Voltage Reference

The VREF1 circuit X4 is a voltage reference for monitoring supercaps, system low, and system very low. The circuit requires no op-amps, reducing offset error. NMOS transistors at collectors of non bandgap transistors are used to eliminate early voltage effects. The circuit has a buffered output which multiplies the bandgap voltage and is trimmed to 1.50 volts. This trimming is with on-chip metal fuses. The trim range is approximately 1.5 +/−0.1 volts with minimum steps of 3 mV. An extra +/−1 LSB is provided in case original trim is incorrect. The circuit temperature coefficient is 60 ppm/°C. typical, 150 ppm/°C. worst case.

4.2 IBIAS & XTAL BIAS Bias Current Generator

The IBIAS & XTAL BIAS circuit X1 generates 20 Na bias currents for other cells, and 100 nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately +/−28% over all parameters.

4.3 XTAL OSC & HIGH ORDER DIVIDERS

The XTAL & 2 Khz DIVIDERS circuit X2 generates a clock for capacitor switch sequencing. It uses a low current oscillator (CASC1 from TCJ) running from the second Vth supply voltage called VLOW. Internal trim capacitors are added to the crystal pins and are metal mask trimmable. Dividers to 2 Khz run from VLOW, then are level shifted to VSS1, VDD2 (0 to 5 V). This avoids level shifting at 32 Khz, conserving current.

Circuit input PULSE receives a 2 Khz 30 microsecond pulse used for on and off chip timing. Circuit input NSTROBE receives a 2 Khz, 15 us negative pulse occurring 60 us after PULSE and is used for on chip timing. The level shifters use approx. 30 Na each at 2 Khz.

4.4 SAMPLING SWITCH DECODE

The SS DECODE circuit X3 is clocked by input PULSE. A one-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms.

Input NCMP_CLK is the comparator clock. Input NCMP_ON powers down the comparator during unused periods.

4.5 SAMPLING CAP ARRAY & SWITCHES

The CAP ARRAY & SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSS1 & VDD1. All other switches may be tied to VSS1, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 Mv of hysteresis is added to the SL and SVL tests by switching between two slightly different capacitor values.

Figure 9A:
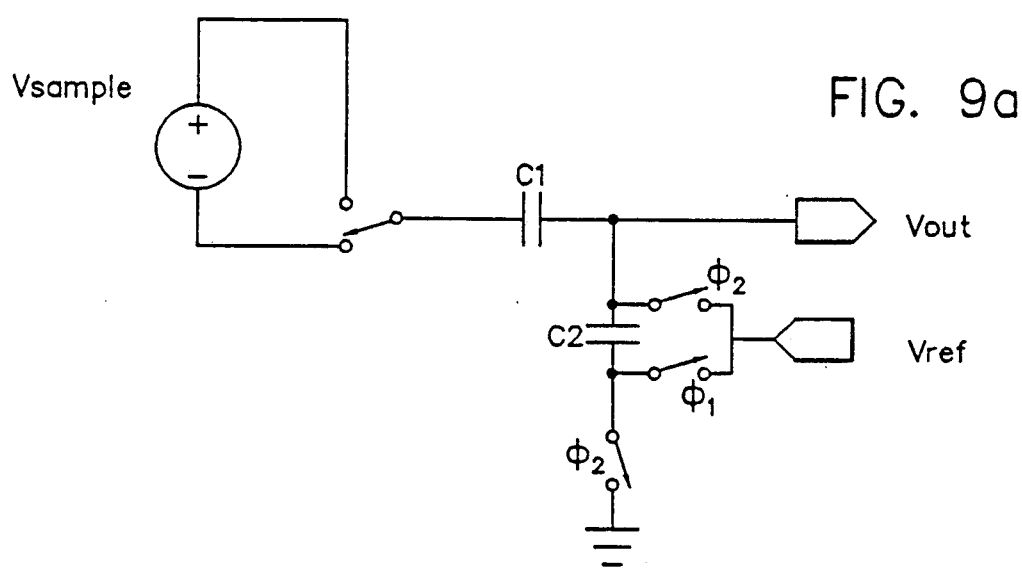
FIG. 9a is a simplified electrical schematic diagram of the sampling capacitor array and switches used in ASIC U1.

A simplified electrical schematic of the CAP ARRAY & SWITCHES circuit X5 illustrating its function is shown in FIG. 9a. In operation, $V_{OUT} = V_{REF}$ if $V_{SAMPLE} \cdot C1 = V_{REF} \cdot C2$.

4.6 SAMPLING COMPARATOR

The SCOMP circuit X7 compares output from the capacitor array to the reference voltage. It is inherently offset compensated. It's response time is less than 25 us.

Figure 9B:
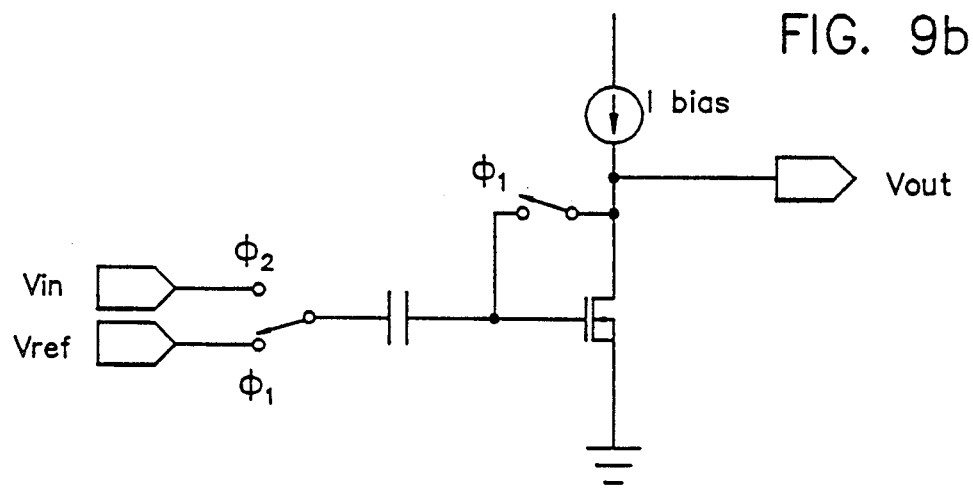
FIG. 9b is a simplified electrical schematic diagram of a sampling comparator used in ASIC U1.

A simplified electrical schematic of the SCOMP circuit X7 illustrating its function is shown in FIG. 9b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

4.7 COMPARATOR DATA LATCHES

The COMP DL circuit X11 stores the output of the comparator in the latch corresponding to the voltage being tested. It is clocked by input NSTROBE.

4.8 WAIT TIMERS

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7Ω internal resistance in the SUPERCAPS.

The SUPERCAPS are sampled every 7.8 ms, and under the above conditions would alternate charging-/discharging at a 50% duty cycle. A typical charge current of 20 Ma would average 10 Ma, while a typical load current is 12 Ma continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

4.9 SHUNT TRANSISTORS

The SHUNT TRANSISTORS X10 shunt up to 70 Ma away from the SUPERCAP when the maximum voltage is exceeded. The SHUNT TRANSISTORS X10 have a resistance of approximately 3.5 Ω.

4.10 SWITCHING REGULATOR

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

Figure 9C:
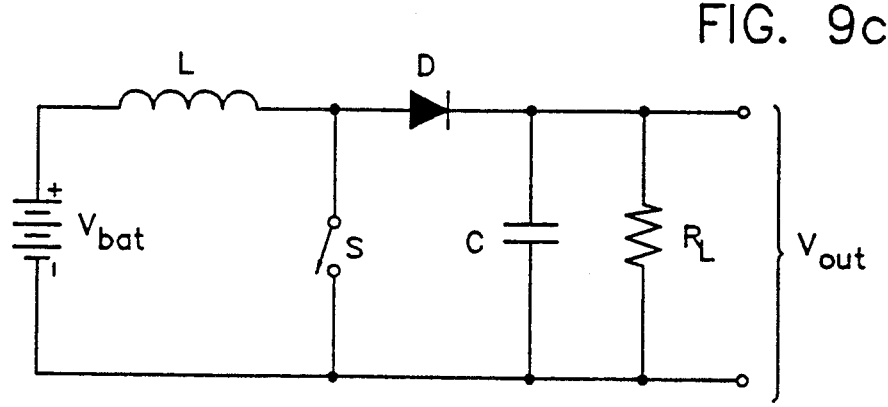
FIG. 9c is a simplified electrical schematic diagram of a step-up DC-to-DC Converter used in the switching regulator of ASIC U1.

A simplified electrical schematic of a step-up DC-to-DC Converter circuit used in SWITCHING REGULATOR circuit X9 and illustrating its function is shown in FIG. 9c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK} = V_{BAT}/L \times T_{ON}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC voltage will be produced at the output.

4.10.1 SWITCHING REGULATOR BIAS

The internal bias of SWITCHING REGULATOR circuit X9 is used only for biasing switching regulator components. The bias is provided by a Standard 5 uA bias cell type A54020. Its absolute value is not critical.

4.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

4.10.3 RC OSC

The SWITCHING REGULATOR circuit X9 has an internal clock for switching the regulator at approx. 25 Khz. The clock is divided from 50 Khz to give a 50% duty cycle. It employs a standard cell reference type A55010 that is modified for CrSi. An approximate 150 kΩ external resistor is required.

4.10.4 SWITCHING REGULATOR COMPARATOR

The SWITCHING REGULATOR circuit X9 has a comparator that uses positive feedback for an improved response time of 3.5 us maximum.

4.11 VREG

The 5 V REGULATOR circuit X6 provides a 5 volt +/−2.5% regulated output for external electronics as well as VDD2 for internal logic. An external NPN is used to avoid thermal effects on the IC.

4.12 LOW VOLTAGE RESET

The LOW RESET circuit X8 resets the entire U1 ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

4.13 Preferred Technology for the U1 ASIC

The U1 ASIC is suitably implemented in BIPOLAR-CMOS technology available from several semiconductor foundries. It is typically implemented in the BI-CMOS process of Micro-Rel Division of Medtronic, Inc., 2343 W. 10th Place, Tempe, Ariz. 85281.

5.0 FUNCTIONAL DESCRIPTION OF THE U2 ASIC DEVICE

Figure 10A:
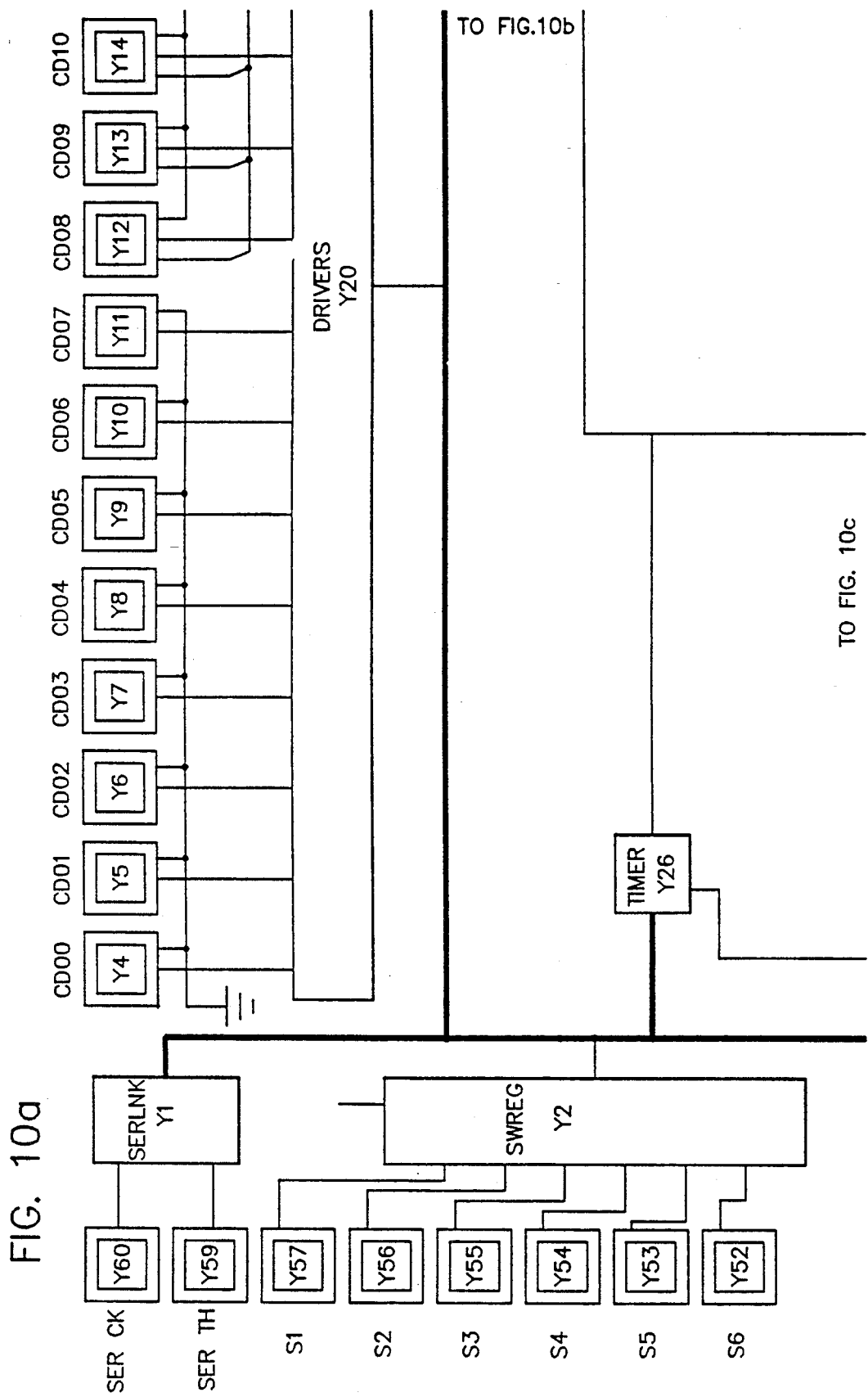
FIG. 10, consisting of FIG. 10a through FIG. 10d, is a block diagram of a second, U2, Application Specific Integrated Circuit (ASIC) used in the preferred embodiment of an irrigation controller in accordance with the present invention.
Figure 10C:
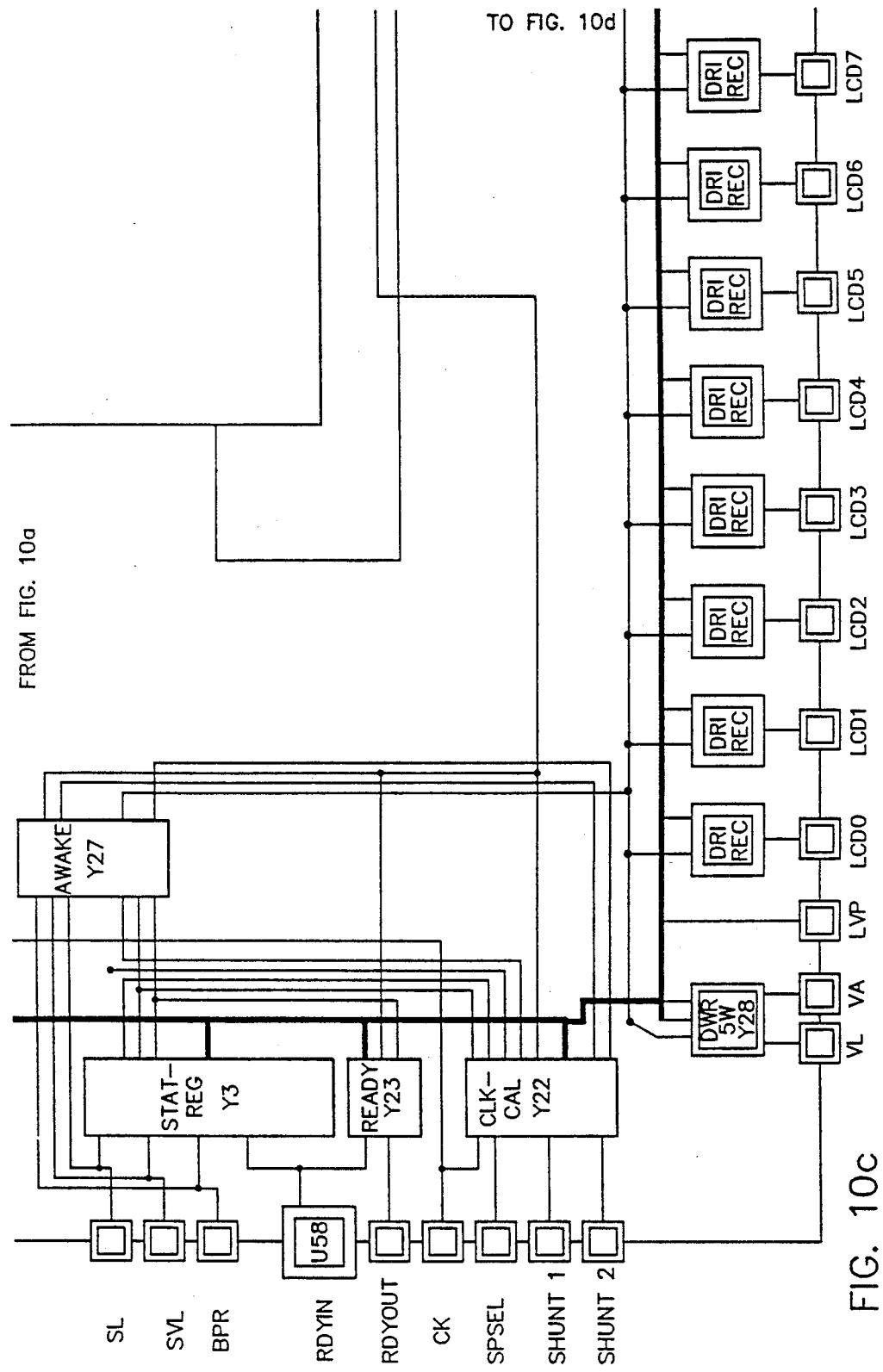
Figure 10D:
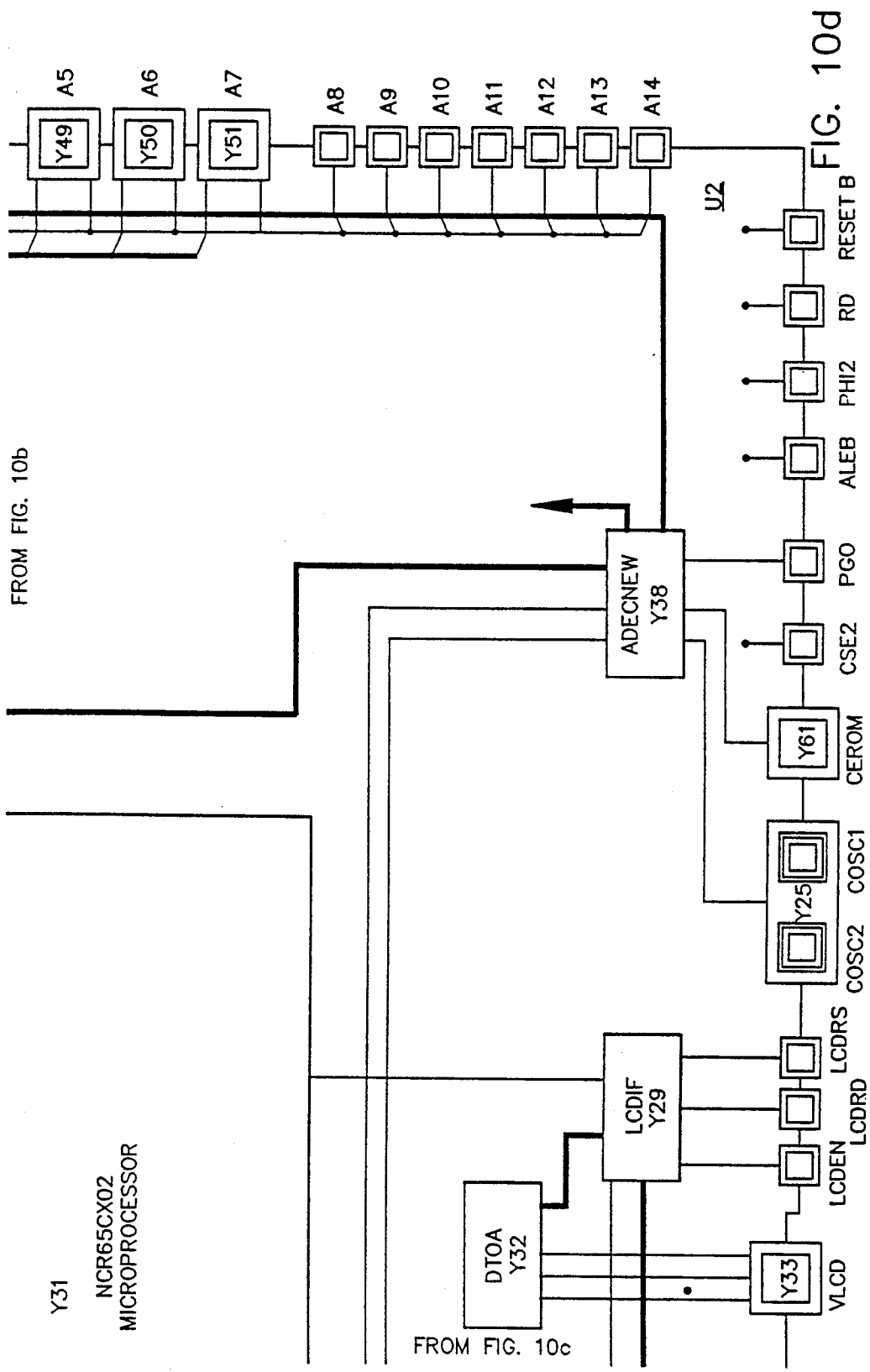

The block diagram of FIG. 10, consisting of FIG. 10a through FIG. 10d, shows the overall architecture of the second, U2, Application Specific Integrated Circuit (ASIC) used within the preferred embodiment of the irrigation controller in accordance with the present invention.

The U2 ASIC device is concerned with calculation, command, and control. It is primarily digital in operation, and may be considered to be a specialized microprocessor with substantial analog as well as digital I/O capabilities. The diagram of the U2 ASIC device shows the detailed interconnection of the various functional blocks.

5.1 U2 ASIC Device Architecture

5.1.1 Microprocessor

The central microprocessor Y31 of the U2 ASIC device is a NCR 65CX02 macrocell. It employs an 8-bit datapath structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 Khz and a 2.2 microsecond cycle time.

The microprocessor Y31 executes the instruction repertoire of commercially available microprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, Calif. 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

The firmware instructions executed by microprocessor Y31 occupy memory addresses in accordance with the following memory map table:

| | |
|---|---|
| 00-3F | I/O Parts |
| 40-7FFF | RAM Memory U5 (shown in FIG. 7h) |

-continued

| | | |
|---|---|---|
| 8000-FFFF | | ROM Memory U4 (shown in FIG. 7f) |

The operand fields of the firmware instructions are interpretable in accordance with the following memory map table:

| | | |
|---|---|---|
| 00 | O | Microprocessor power off |
| 01 | O | RTC counter clear |
| 02 | O | A/D power, 1=on, 0=off |
| 03 | O | A/D interface, 1=enable, 0=disable |
| 04 | O | LCD power, 1=on, 0=off |
| 05 | O | LCD interface, 1=enable, 0=disable |
| 06 | O | Valve select byte |
| | | bits 0-2 - valve #, + side |
| | | bits 3-5 - valve #, − side |
| | | bit 6 - polarity, 0=normal, 1=reversed |
| 07 | O | Valve enable, 1=on, 0=off |
| 08 | O | TIMER hi byte latch |
| 09 | O | TIMER lo byte latch |
| 0A | O | TIMER control, 1=on, 0=off |
| 0B | O | RTC, 1=10 seconds, 0=1 minute |
| 0C | O | Serial clock |
| 0D | O | TIMER load |
| 0E | O | Write serial data out |
| 0F | O | Serial output ready |
| 10 | I | RTC counter hi byte |
| 11 | I | RTC counter lo byte |
| 12 | I | Status register 1 |
| | | bit 0 - 0=external battery present |
| | | bit 1 - 1=watchdog timeout |
| | | bit 2 - 0=system power low |
| | | bit 3 - 0=system power very low |
| | | bit 4 - 0=RTC pulse |
| | | bit 5 - 1=battery low or caps charging |
| | | bit 6 - 1=serial data link present |
| | | bit 7 - 0=serial data link ready |
| 13 | I | Status register 2 |
| | | bit 0 - Switch 1. 1=pressed STOP |
| | | bit 1 - Switch 2 |
| | | bit 2 - Switch 3 |
| | | bit 3 - Switch 4 HELP |
| | | bit 4 - Switch 5 NO |
| | | bit 5 - Switch 6 OK |
| | | bit 6 - |
| | | bit 7 - 0=A/D end of conversion |
| 14 | I | Read serial data in |
| 15 | I | Read A/D converter |
| 16 | I | Load serial shift register |
| 17 | I | Clear input ready latch |
| 18 | I | LCD busy flag & address counter (RS=0) |
| | | bit 7 - 1=busy |
| | O | LCD instruction register (RS=0) |
| 19 | I | LCD read data (RS=1) |
| | O | LCD write data (RS=1) |
| 1A | O | LCD contrast select (0-7) |
| 1B | O | Clear watchdog timer |
| 1C | O | Clock RTC counter |
| 1D | I/O | EEPROM |
| 1E | O | Coil test drivers |
| 1F | O | Sensor test drivers |
| 20 | O | Start A/D channel 0, sensor 1 |
| 21 | O | Start A/D channel 1, sensor 2 |
| 22 | O | Start A/D channel 2, sensor 3 |
| 23 | O | Start A/D channel 3, sensor 4 |
| 24 | O | Start A/D channel 4, sensor 5 |
| 25 | O | Start A/D channel 5, sensor 6 |
| 26 | O | Start A/D channel 6, sensor 7 |
| 27 | O | Start A/D channel 7, sensor 8 |
| 28 | O | Start A/D channel 8, valve 1 |
| 29 | O | Start A/D channel 9, valve 2 |
| 2A | O | Start A/D channel 10, valve 3 |
| 2B | O | Start A/D channel 11, valve 4 |
| 2C | O | Start A/D channel 12, valve 5 |
| 2D | O | Start A/D channel 13, valve 6 |
| 2E | O | Start A/D channel 14, valve 7 |
| 2F | O | Start A/D channel 15, valve 8 |
| 30-3F | | |
| 40-FF | | Zero page variables, pointers, and tables |

-continued

| | |
|---|---|
| 100-1FF | Stack |
| 200-3FF | Program variables |
| 8000 | ROM start |
| FFFA-FFFB | NMI vector |
| FFFC-FFFD | RESET vector |
| FFFE-FFFF | IRQ vector |

5.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

5.1.3 Timer

The timer Y26 consists of two 8-bit latches on the data bus and a 16-bit down counter which is clocked at 2 Khz. Loading of the counter and latches is under the control of the processor. When the counter reaches zero, a processor interrupt is generated.

5.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

a. Resolution/Accuracy—8 bits±one-half LSB for $VIN = 1(Vd)$
  8 bits±one LSB for $VIN = \frac{1}{2} (Vd)$
b. Conversion Time—$8/f_{osc} \times n$ where n=8 or 9 depending upon whether the conversion is full scale or half scale.
c. Operating Current—3 Ma maximum
d. Analog Reference—Digital Supply Voltage (Vd)
e. Analog Inputs (Vin)—Each input voltage is ratiometric with the digital supply voltage (Vd) where:
  Vin for full scale=$\frac{1}{2}$(Vd) for A/D channels 1 through 8
  Vin for full scale=1(Vd) for A/D channels 9 through 16

5.1.5 Clock/Calendar

The clock/calendar Y22 provides several timing functions. It generates a 2 second timing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

5.1.6 Switch Register

The switch register Y2 acts as an interface between six external configuration switches and the data bus. An additional input is the end-of-conversion signal from the analog-to-digital converter.

5.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

5.1.8 Serial Data Link

The serial data link Y1 provides high speed synchronous two-way communication between the device and a remote data transceiver. Data is loaded or retrieved via the data bus under control of the processor. Transmission of serial data is also directly controlled by the processor.

5.1.9 Ready

These circuits Y23 provide handshaking between the processor and an external device (such as a serial data link) through the status register and data bus.

5.1.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

5.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

5.1.12 LCD Interface

The LCD interface Y29 consists of a latch on the data bus and the control circuitry needed to operate an external liquid crystal display and the DAC. The LCD interface can be configured to function as the 6502 Data I/O port. The interface is configured in this way only during a special test mode. Under processor control, a flip flop is set which alters the internal logic paths so that the LCD bus will be configured as a 6502 Data I/O port. This special test feature allows the 6502 to be tested independently of the peripheral logic.

5.1.13 DAC

The four bit digital-to-analog converter Y32 provides a voltage, as specified by the contents of the data bus, through the LCD interface for contrast control of the external liquid crystal display.

The performance specification of the DAC are as follows:

a. Resolution: 4 bits
b. Accuracy: $\pm \frac{1}{2}$ LSB for all voltage steps
c. Vout = $n(0.147)$ where $0 \leq n \leq 15$
d. Io (min) = 500 Ua sink for Vout = OV ± 50 Mv
e. Vo (max) = ±50 Mv for Io = 500 Ua for the DAC setting D3 = D2 = D1 = D0 = 0

5.1.14 Address Decoding

The address decoder circuit Y38 uniquely maps all internal functions into page zero of the processor's memory space. The decoder produces timing and control signals for these internal circuits as well as for reading and writing of external memory.

5.1.15 Power Switching

The power switch circuit Y28 controls the power for the external ROM and display as well as the internal analog functions in order to conserve power and to permit the irrigation controller to enter a "sleep" mode.

5.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

5.2 U2 ASIC Input/Output Description

5.2.1 CD0–CD15 - Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8–CD15 also function as analog inputs to the ADC. These pins have the additional capability of sinking a regulated current for testing and programming purposes.

5.2.2 ADC0–ADC15 Analog Inputs to the ADC

These pins provide information from the coils and sensors whose integrity the processor must evaluate. ADC8–ADC15 are shared with the 8 valve lines CD8–CD15. ADC0–ADC7 are shared with the 8 sensor lines. All these 166 lines have the capability of sinking a regulated current for testing purposes.

5.2.3 SL—System Low

An active low input indicates that the condition of the power supply is such that further operation will soon be impossible. The processor, upon receiving this signal, will immediately turn off all valves in anticipation of approaching shutdown.

5.2.4 SVL—System Very Low

An active low signal indicates that the condition of the power supply is such that further operation is impossible. Upon receiving this signal the processor will immediately go into hibernation. After approximately 100 milliseconds, a hardware system reset will occur independently of the processor.

5.2.5 SH0, SH1—Supercap Shunt Signals

If either of these signals persists in the high state for longer than 64 seconds, a Battery Low status will be generated.

5.2.6 BPR—Battery Present

An active low signal indicates that a battery is connected to the power supply so that the processor may run continuously.

5.2.7 S1-S6—Switch Inputs

Active high inputs with internal pulldowns go directly to the switch register.

5.2.8 A0-A14—Address Outputs

The external RAM and ROM are addressed by these pins. A0-A7 in conjunction with ALE also functions as D0-D7.

5.2.9 D0-D7—Bidirectional Data Bus

The external RAM and ROM use these lines for transferring data to and from the device. The lower address bits are multiplexed with the data on these lines in conjunction with the ALE signal.

5.2.10 ALE—Address Latch Enable

When this signal is high, data transfers may take place on the D0-D7 pins. When this signal is low, these same pins are used as A0-A7 outputs.

5.2.11 RDYIN—Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

5.2.12 RDYOUT—Ready Output

This signal passes the contents of data bus bit zero out of the device under control of the processor to provide handshaking protocol to a distant serial data link.

5.2.13 CEROM—ROM Chip Enable

This signal is used to enable the outputs of the external ROM onto the D0-D7 pins.

5.2.14 LCD0-LCD7—Liquid Crystal Data

These bidirectional signals transfer data to and from the external liquid crystal display. They are provided with internal pulldowns.

5.2.15 LCDEN—LCD Enable

This output signal enables the external liquid crystal display. This output signal can be made to exhibit high impedance with an internal pulldown.

5.2.16 LCDRS—LCD Register Select

This output signal informs the external LCD module that either data or command appears on the data inputs. This output signal can be made high impedance with an internal pulldown.

5.2.17 LCDRD—LCD Read

This output signal controls the direction of data flow to or from the external liquid crystal display. This output signal can be made to exhibit high impedance with an internal pulldown.

5.2.18 VLCD—Analog Output From the DAC to the External Liquid Crystal Display This analog output signal is used to control the display contrast.

5.2.19 VL—Switched Power to the External Liquid Crystal Display

When this signal is switched on it provides current from the device power input VDD. When it is switched off, it sinks current into the device power return VSS.

5.2.20 VA—Switched Power to the External Sensors

When this signal is switched on, it provides current from the device power input VDD. When it is switched off, it sinks current into the device power return VSS.

5.2.21 VP—Switched Power to the External ROM

When this signal is switched on, it provides current from the device power input VDD. When it is switched off, it sinks current into the device power return VSS.

5.2.22 Serial Clock—Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

5.2.23 Serial Data—Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

5.2.24 C01, C02—Capacitor Connections

Provides a connection for a capacitor whose value determines the frequency of the Main Oscillator.

5.2.25 READ (WRITENOT)—R/W Signal From the Processor

Indicates whether a memory read or memory write cycle is in progress.

5.2.26 PH12—Processor Clock

This signal is high during the active portion of the processor's operation. When low, the processor is precharging its internal busses. This signal must logically combine with Read and the appropriate address decode to create the control signals to apply to external memory.

5.2.27 CSE2—EEPROM Chip Select

This signal is used in conjunction with READ and PH12 for external EEPROM operations.

5.2.28 RSTB—Processor Reset

This active-low signal indicates that the processor is shut down and may be used to initialize external circuitry to the correct state for processor startup.

5.2.29 PAGE0—Page Zero

This pin goes high when the address bus is in address area 0040H through 7FFFH inclusive.

5.2.30 VDD

This is the device positive supply.

5.2.31 VSS

This is the device negative supply.

5.2.32 CK—Real-Time Clock Input for Clock Calendar Timer

The frequency is nominally 2 Khz with a 30 us high-going pulse.

5.2.33 SPSEL

When SPSEL=1, the chip requires a 32 Khz time base on the CK input. When SPSEL=0, the chip requires a 2 Khz time base on the CK input.

5.3 ASIC U2 Power Supply Requirements

| Parameter | Symbol | Min | Max | Units |
|---|---|---|---|---|
| Power supply All circuitry active | VDD A | 4.5 | 5.5 | V |
| Power Supply | VDD B | 2.00 | 5.5 | V |

Real time clock, interrupt, and battery low detection circuitry operative. All other circuits are at a static, defined logic level (therefore, not being clocked).

---

Active Supply Current        Ia    6.0    Ma
VDD = 5.5v, 2 Khz Real time clock running, main oscillator running, processor, ADC, LCD interface logic running (only), DAC running, coil drivers in high-impedance state, external interface circuitry to -continued EEPROM, ROM and RAM is active, however, the active current of the EEPROM, ROM and RAM is not included.
Quiescent Supply Current     Iq     1.5     Ua
VDD = 5.5v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq.

5.4 ASIC U2 Signal Pin Requirements

Unless otherwise stated, the following characteristics apply over the applicable operating power supply range as specified above. All pins are protected against electrostatic discharge.

| Parameter | Symbol | Min | Max | Unit |
|---|---|---|---|---|
| Capacitance of Inputs | Ci | | 10 | pF |
| Capacitance of Outputs | Co | | 10 | Pf |
| Capacitance of Tristate | Ct | | 10 | Pf |
| Input Leakage Current | Iil | −1 | +1 | Ua |
| Tristate Leakage Current | Itl | −1 | +1 | Ua |
| Passive Pulldown Current (@ Vih = VDD) | Ipd | −1 | −30 | Ua |
| Active Pulldown Current (@ Vi = 2.5v) | Irpd | −4 | −12 | Ma |
| VA, VL, VP | | | | |
| Output High Voltage | Voh | VDD−0.3 | VDD+0.3 | V |
| Output Low Voltage | Vol | −0.3 | +0.4 | V |
| Output High Current (@ Voh = VDD−0.3V) | Ioh | −6.0 | | Ma |
| Output Low Current | Iol | 6.0 | | Ma |
| VLCD | | | | |
| Output Voltage Range | Volcd | 0.0 | 2.2 | V |
| Output Current (@ Vol = 0.05V) | Ioled | +0.5 | | Ma |
| Coil Driver Pins | | | | |
| Input Voltage Range | See ADC8 - ADC15 below | | | |
| Output Pair Drop (@ I = 45mA, Vdd = 4.5v) | Vdr | 0.0 | 1.0 | V |
| ADC0 - ADC15 | | | | |
| Input resistance | Rin | 10 Meg | | Ohm |
| Input Voltage Range | Vina | −0.0 | VDD | V |
| C01, C02 | | | | |
| Output High Voltage | Voh | 0.5 | VDD+0.3 | V |
| Output Low Voltage | Vol | −0.3 | 0.4 | V |
| Output High Current (@ Voh = 2.5V) | Ioh | −4.0 | −12.0 | Ma |
| Output Low Current (@ Vol = 0.4V) | Iol | 4.0 | | Ma |
| All Other Pins | | | | |
| Input High Voltage | Vih | 2.0 | VDD+0.3 | V |
| Input Low Voltage | Vil | −0.3 | 0.8 | V |
| Output High Voltage | Voh | VDD−0.5 | VDD+0.3 | V |
| Output Low Voltage | Vol | −0.3 | +0.4 | V |
| Output High Current (@ Voh - VDD−0.5V) | Ioh | −2.0 | | Ma |
| Output Low Current (@ Vol = 4.0V) | Iol | 4.0 | | Ma |

5.5 ASIC U2 Mechanical Characteristics

5.5.1 Package Requirements

The device is packaged in an 84-pin plastic leaded chip carrier. The package life exceeds 20 years.

5.5.2 Environmental Requirements

The limits below represent the environmental limits to which the device will ordinarily be subjected.

| Rating | Value | Unit |
|---|---|---|
| Storage Temperature | −40 to +85 | deg C. |
| Operating Temperature | −10 to +70 | deg C. |
| Lead Temperature (4 min soldering) | 250 | deg C. |
| Humidity | 85/85 | deg C./percents |

5.6 Preferred Technology for Implementation of the U2 ASIC

The preferred embodiment of ASIC U2 is preferably implemented in the CMOS technology of NCR Corporation, Dayton, Ohio. This technology, and the design rules and standard cells therein, is discussed in the "NCR ASIC Data Book" for January 1987. The equivalent technologies of other manufacturers will be realized to be equally suitable. It will be understood that the irrigation system of FIG. 2 could also be implemented using standard integrated circuit and microprocessor components in combination with a control program corresponding to that of attachment A. Such a system could be used alternately to implement the present method.

6.0 The Preferred Embodiment of the Multiprogrammer Unit

Figure 12A:
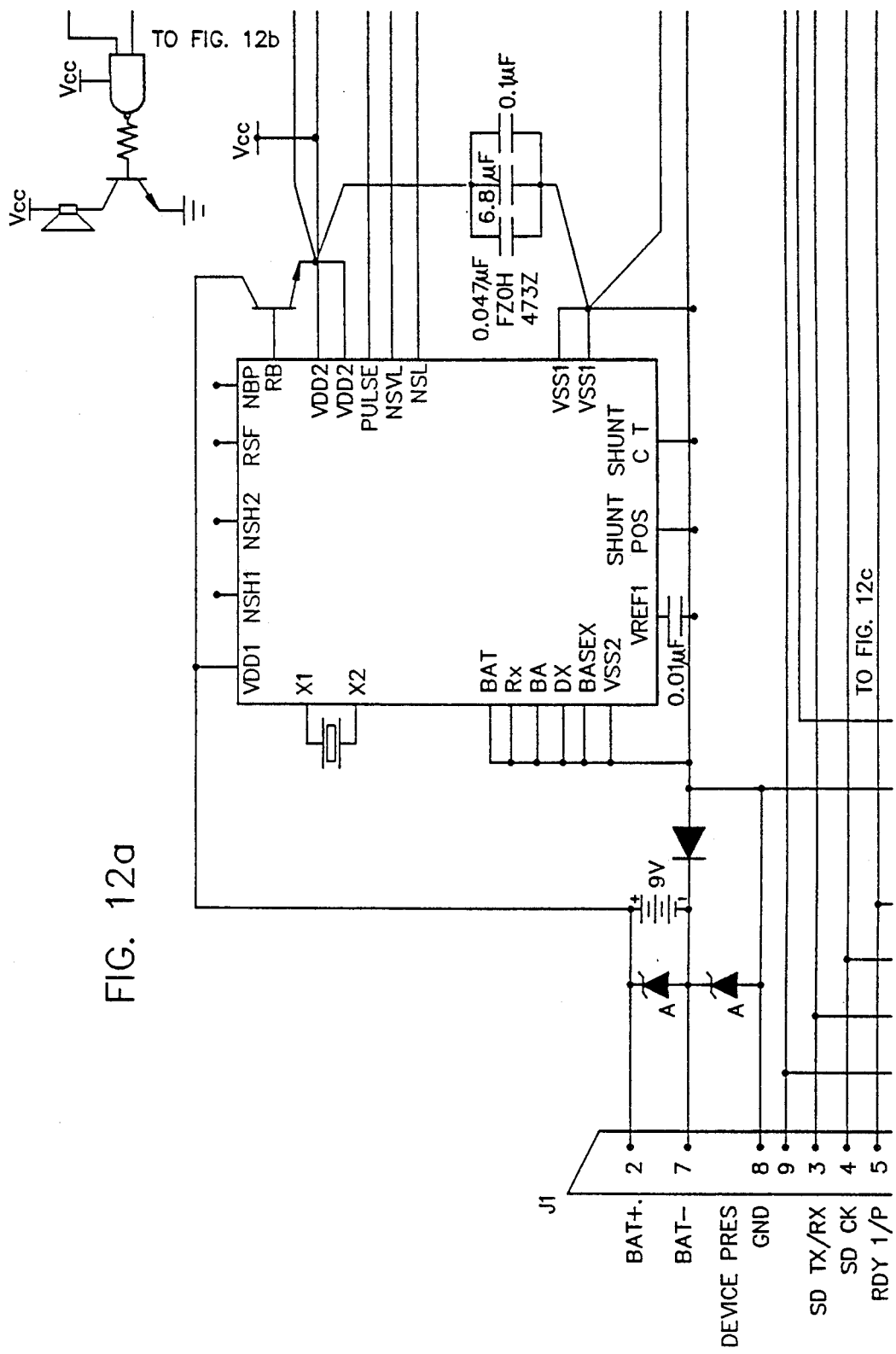
Figure 12C:
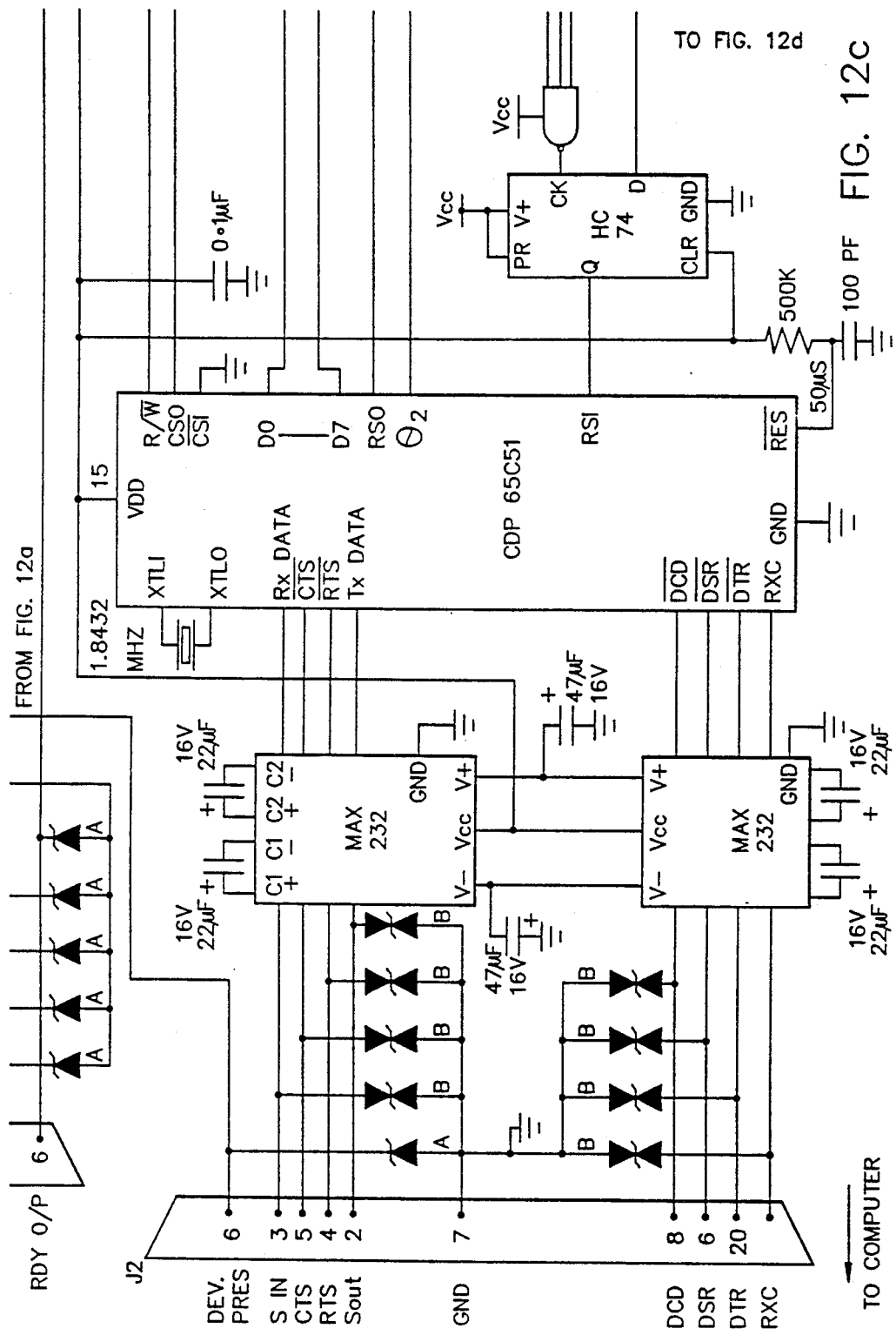
Figure 12D:
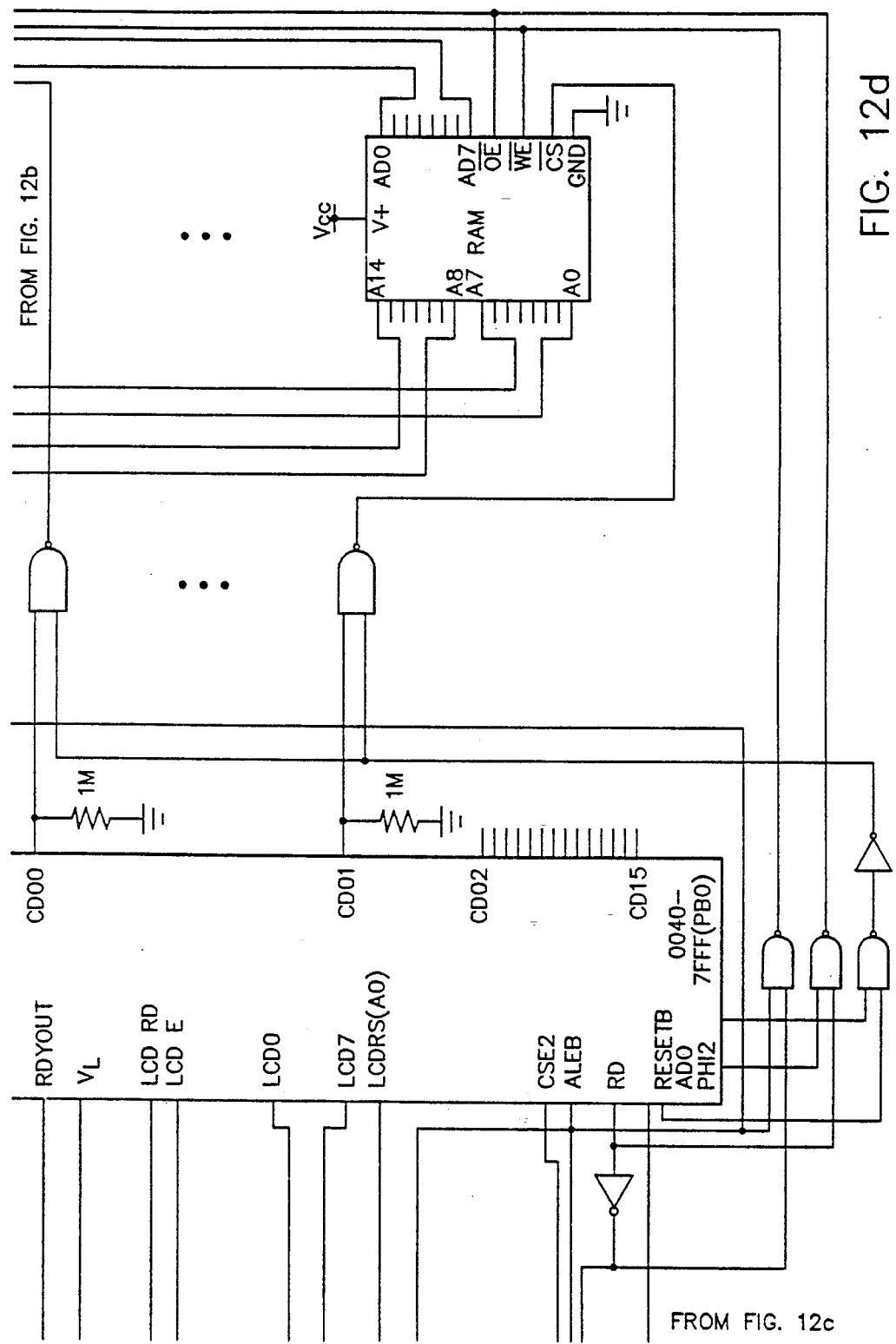

A block diagram of the preferred embodiment of the Multiprogrammer usable in the distributed multiple irrigation controller control management system of the present invention is shown in FIG. 11. A schematic diagram of the same Multiprogrammer unit is shown in FIGS. 12, consisting of FIGS. 12a through 12d.

Figure 8:
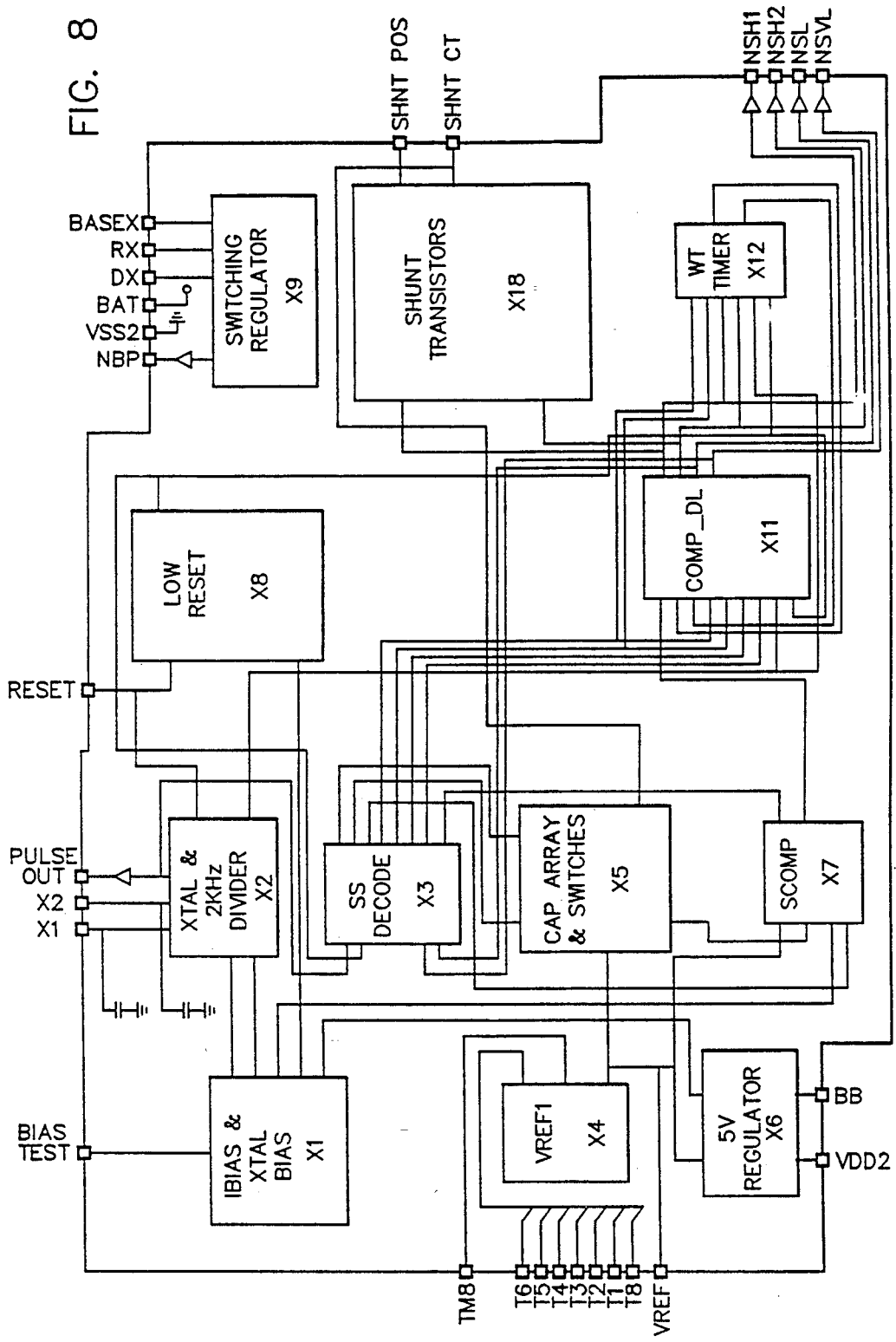
FIG. 8 is a block diagram of a first, U1, Application Specific Integrated Circuit (ASIC) used in the preferred embodiment of an irrigation controller in accordance with the present invention.

As is visible from both figures, the Multiprogrammer unit 30 (previously seen in FIG. 3) is based on both the ANALOG ASIC U1 and the DIGITAL ASIC U2 previously seen within the irrigation controller of FIG. 7, and respectively individually illustrated in FIGS. 8 and 10. The ANALOG ASIC U1 connects to a BATTERY 70 which may be, but need not be, configured the same as the POWERKEY TM pluggable battery energy source. The ANALOG ASIC U1 operates to provide 5 volt dc regulated power to remaining components of the Multiprogrammer unit 30 from the power provided by the BATTERY 70. The BATTERY 70 connects through jack J1 terminals 2 and 7 to provide power to the irrigation controller when the multiprogrammer unit 30 is plugged thereto. The DIGITAL ASIC U2, containing the microprocessor type 6502, operates on a stored firmware program contained with ROM 71. This program causes the DIGITAL ASIC U2 to communicate through standard universal serial interface UART 72 type 65C51 across an interface I/F type RS232 73. This serial interface connects to a like serial interface port of a computer, particularly the personal computer PC 32 shown in FIG. 3.

The communication path through the RS232 I/F 73 permits the DIGITAL ASIC U2 to receive information that is subsequently stored within RAM 74. The RAM 74 is nominally 512K by 8 bits in size, and is of type 622S6. At this size it is capable of holding 64 complete programs as are uploaded to those IRRIGATION CONTROLLERs 1 (shown in FIG. 3) to which the Multiprogrammer unit 30 at times connects.

The detailed block diagram shown in FIG. 12 shows the particular wired interconnection of the functional elements block diagrammed in FIG. 11, and more particularly shows the interface between the Multiprogrammer unit 30 and the irrigation controller 1.

7.0 Variations and Adaptations of the Invention

Although the present invention has been taught in the context of electrical circuits that are fairly sophisticated for employing both a predominantly analog ASIC (ASIC U1) and a predominantly digital ASIC (ASIC U2), it should be understood that the functionality of the preferred embodiment of an irrigation controller in accordance with the present invention is readily realizable by diverse alternative designs. In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed, and the control of irrigation valves, are, in the preferred embodiment of the invention, powered and sequenced to states of activity in a highly unique manner. Nonetheless, it will be recognized that alternative powering and sequencing of these circuits, particularly as consume higher power and/or operate at higher or continuous duty cycles, are readily realizable by a practitioner of the electrical design arts. Accordingly, the present invention should be considered in terms of the functions that it performs, and not solely in terms of any particular embodiment for realizing these functions.

In accordance with these and other aspects and attributes of the present invention, the invention should be determined by the scope of the following claims, only, and not solely in accordance with those particular embodiments within which the invention has been taught.

APPENDIX A

IRRIGATION CONTROLLER FIRMWARE
PROGRAM LISTING

```
2500 A.D. 6502 Macro Assembler  -  Version 4.01b
---------------------------------------------------

Input  Filename : leit.asm
              Output Filename : leit.obj

1                              TITLE    'Controller Firmware, Version 2.09'
2
3                         ;    by Dennis Kaiser
4                         ;    SOLATROL, Inc.
5                         ;    San Diego, CA,  1 Sep 88
6
7                         ;    Code for the 65C02 processor
8                         ;    Clock speed 455 KHz, cycle time 2.2 microseconds
9
10   0000                      CHIP        65C02
11                              MACLIST     OFF
```

```
12                   ASCLIST      OFF
13   0000            INCLUDE      EQUATES.ASM
14           ;----------------------------------
15           ;    MEMORY MAP
16           ;----------------------------------
17
18           ;00-3F       I/O
19           ;40-7FFF     RAM
20           ;8000-FFFF   ROM
21
22           ;00          0 Microprocessor power off
23           ;01          0 RTC counter clear
24           ;02          0 A/D power, 1=on, 0=off
25           ;03          0 A/D interface, 1=enable, 0=disable
26           ;04          0 LCD power, 1=on, 0=off
27           ;05          0 LCD interface, 1=enable, 0=disable
28           ;06          0 Valve select byte
29           ;                     bits 0-2 - valve #, + side
30           ;                     bits 3-5 - valve #, - side
31           ;                     bit 6 - polarity, 0=normal, 1=reversed
32           ;07          0 Valve enable, 1=on, 0=off
33           ;08          0 TIMER hi byte latch
34           ;09          0 TIMER lo byte latch
35           ;0A          0 TIMER control, 1=on, 0=off
36           ;0B          0 RTC, 1=10 seconds, 0=1 minute
37           ;0C          0 Serial clock
38           ;0D          0 TIMER load
39           ;0E          0 Write serial data out
40           ;0F          0 Serial output ready
41           ;10          I RTC counter hi byte
42           ;11          I RTC counter lo byte
43           ;12          I Status register 1
44           ;                     bit 0 - 0=external battery present
45           ;                     bit 1 - 1=watchdog timeout
46           ;                     bit 2 - 0=system power low
47           ;                     bit 3 - 0=system power very low
48           ;                     bit 4 - 0=RTC pulse
49           ;                     bit 5 - 1=battery low or caps charging
50           ;                     bit 6 - 1=serial data link present
51           ;                     bit 7 - 0=serial data link ready
52           ;13          I Status register 2
53           ;                     bit 0 - Switch 1, 1=pressed STOP
54           ;                     bit 1 - Switch 2
55           ;                     bit 2 - Switch 3
56           ;                     bit 3 - Switch 4 HELP
57           ;                     bit 4 - Switch 5 NO
58           ;                     bit 5 - Switch 6 OK
59           ;                     bit 6 -
60           ;                     bit 7 - 0=A/D end of conversion
61           ;14          I Read serial data in
62           ;15          I Read A/D converter
63           ;16          I Load serial shift register
64           ;17          I Clear input ready latch
65           ;18          I LCD busy flag & address counter (RS=0)
66           ;                     bit 7 - 1=busy
67           ;            0 LCD instruction register (RS=0)
68           ;19          I LCD read data (RS=1)
```

```
69                  ;              0  LCD write data (RS=1)
70                  ;1A            0  LCD contrast select (0-7)
71                  ;1B            0  Clear watchdog timer
72                  ;1C            0  Clock RTC counter
73                  ;1D            IO EEPROM
74                  ;1E            0  Coil test drivers
75                  ;1F            0  Sensor test drivers
76                  ;20            0  Start A/D channel 0, sensor 1
77                  ;21            0  Start A/D channel 1, sensor 2
78                  ;22            0  Start A/D channel 2, sensor 3
79                  ;23            0  Start A/D channel 3, sensor 4
80                  ;24            0  Start A/D channel 4, sensor 5
81                  ;25            0  Start A/D channel 5, sensor 6
82                  ;26            0  Start A/D channel 6, sensor 7
83                  ;27            0  Start A/D channel 7, sensor 8
84                  ;28            0  Start A/D channel 8, valve 1
85                  ;29            0  Start A/D channel 9, valve 2
86                  ;2A            0  Start A/D channel 10, valve 3
87                  ;2B            0  Start A/D channel 11, valve 4
88                  ;2C            0  Start A/D channel 12, valve 5
89                  ;2D            0  Start A/D channel 13, valve 6
90                  ;2E            0  Start A/D channel 14, valve 7
91                  ;2F            0  Start A/D channel 15, valve 8
92                  ;30-3F
93                  ;40-FF         Zero page variables, pointers, and tables
94                  ;100-1FF       Stack
95                  ;200-3FF       Program variables
96                  ;8000          ROM start
97                  ;FFFA-FFFB     NMI vector
98                  ;FFFC-FFFD     RESET vector
99                  ;FFFE-FFFF     IRQ vector
100
101
102                 ;------------------------------------
103                 ;    VARIABLES, ZERO PAGE
104                 ;------------------------------------
105
106                 ;RAM LOCATIONS
107  0000                           PAGE0
108  0040                           ORG    $40
109  0040           CKSUM           DS     1    ;checksum value
110  0041           LSB             DS     1    ;general purpose register
111  0042           MSB             DS     1    ;general purpose register
112  0043           MSGPTR          DS     2    ;16 bit message pointer
113  0045           ADCHANNEL       DS     1    ;A/D channel number
114  0046           TIMCTR          DS     1    ;down counter for TIMER int
115  0047           TIMCTR2         DS     1    ;another one
116  0048           CURSOR          DS     1    ;LCD cursor address
117  0049           VALVE           DS     1    ;valve number
118  004A           SENSOR          DS     1    ;sensor number
119  004B           E2WR            DS     1    ;byte to send to EEPROM
120  004C           E2MASK          DS     1    ;byte to EEPROM interface
121  004D           E2ADDR          DS     1    ;address in EEPROM (0-3FH)
122  004E           MULTIPLIER      DS     1    ;math variables
123  004F           MULTIPLICAND    DS     1
124  0050           PRODUCT         DS     2
125  0052           DIVIDEND        DS     2
```

```
126  0054           DIVISOR       DS    2
127  0056           QUOTIENT      DS    2
128  0058           MODE          DS    2    ;present menu selection
129  005A           MENUPTR       DS    2    ;menu info ptr
130
131  005C           KEYREG        DS    1    ;the present key
132  005D           KEYPRESS      DS    1    ;a good key
133  005E           KEYMASK       DS    1    ;keyboard enable mask
134  005F           REPCTR        DS    1    ;repeat counter
135  0060           REPEAT_MASK   DS    1    ;which keys to repeat
136  0061           IBFR          DS    10   ;input buffer
137  006B           INTCTR        DS    1    ;counts INTs for scrolling or blinking
138  006C           BLINK         DS    1    ;tells INT to blink or scroll
139  006D           FLAGS         DS    1    ;bit 0 - 1=power key in
140                                          ;bit 1 - 1=serial data link
141                                          ;bit 2 - 1=SL
142                                          ;bit 3 - 1=help in progress
143                                          ;bit 4 -
144                                          ;bit 5 -
145                                          ;bit 6 - 1=cursor on
146                                          ;bit 7 - toggle for blinking "?"
147  006E           REPEAT_RATE   DS    1    ;rep rate for repeat key
148  006F           DIGIT         DS    3    ;3 digits ASCII to display
149  0072           HELPNUM       DS    1    ;index into scrolling msgs
150  0073           CTR           DS    2    ;16 bit counter
151  0075           SRCPTR        DS    2    ;source pointer
152  0077           DESTPTR       DS    2    ;destination pointer
153  0079           ERROR         DS    1    ;passing errors from subroutines
154  007A           STARTCTR      DS    1    ;the current start
155  007B           STARTPTR      DS    2    ;pointer to start times in object pgm
156  007D           VCTR          DS    18   ;duration down counters
157  008F           TR            DS    18   ;time remaining for watering
158  00A1           SECCTR        DS    2    ;counts seconds
159  00A3           HPTR          DS    18   ;history pointers for valve starts
160  00B5           HREAD         DS    2    ;read pointer in history
161  00B7           HWRITE        DS    2    ;write pointer in history
162  00B9           HDATE         DS    2    ;date of last history entry
163  00BB           SOURCE        DS    1    ;the setup in use
164  00BC           R1            DS    1    ;local use registers
165  00BD           R2            DS    1
166  00BE           R3            DS    1
167  00BF           R4            DS    1
168  00C0           TARGET        DS    9    ;target soil moistures
169  00C9           DEFAULT       DS    6    ;storage for defaults
170  00CF           OFFSET        DS    4    ;next available start time
171  00D3           SECRET        DS    1    ;secret code type
172  00D4           CONTRAST      DS    1    ;LCD contrast
173  00D5           SCREENS       DS    1    ;how many screens to display
174  00D6           SCREEN        DS    1    ;the current screen displayed
175  00D7           SUB           DS    1    ;which sub source in use
176  00D8           ALTCLK        DS    2    ;clock for semi-auto to use
177  00DA           EMCLK         DS    2    ;clock for emulation to use
178  00DC           WATERCLK      DS    2    ;actual clock in use
179  00DE           POSITION      DS    1    ;valve/sensor connector location
180  00DF           ADDATA        DS    2    ;AD reading
181  00E1           R5            DS    1
182  00E2           INTCMD        DS    1    ;command for interrupt (send NO keys)
183  00E3           CMDCTR        DS    1    ;repeat counter for auto NO key
```

```
184  00E4              STTS        DS    1     ;status byte at reset
185  00E5              R6          DS    1
186
187                    ;-----------------------------------
188                    ;    VARIABLES, NON ZERO-PAGE
189                    ;-----------------------------------
190
191  0000                          DATA
192  0200                          ORG   $0200
193  0200              CKDATA      DS    16    ;checksum data
194  0210              AD          DS    16    ;16 bytes of AD readings
195  0220              TIMEON      DS    18    ;how long valve was on
196  0232              S           DS    2     ;start time for valve
197  0234              E           DS    2     ;end time for valve
198  0236              WT          DS    2     ;watering time for valve
199  0238              NXTTIME     DS    18    ;next watering time while generating
200  024A              BASETYPE    DS    9     ;0=base watering, 2=soak
201  0253              SNUM        DS    1     ;number of syringes (end-start / how often)
202  0254              NSPLIT      DS    9     ;# of starts generated for each valve
203  025D              SL          DS    1     ;1=System Low flag
204  025E              IDBFR       DS    9     ;bfr to edit valve/sensor IDs
205  0267              CHKFLAG     DS    1     ;flag to generator
206  0268              VSYR        DS    9     ;number of syringes displayed
207  0271              NSYR        DS    1     ;total number of syringes
208  0272              REVIEW      DS    1     ;new, review, or modify schedules
209  0273              SEL1        DS    1     ;temp storage in select routines
210  0274              SEL2        DS    1
211  0275              CHARGING    DS    1     ;contrast for charging msg
212
213                    ;-----------------------------------
214                    ;    SYSTEM BLOCK
215                    ;-----------------------------------
216
217  0276              SYSTEM_BLOCK:
218
219  0276              HOUR        DS    1     ;real time clock
220  0277              MINUTE      DS    1
221  0278              DOW         DS    1
222  0279              MONTH       DS    1
223  027A              DAY         DS    1
224  027B              YEAR        DS    1
225  027C              DIM         DS    1     ;number of days in the month
226  027D              VS          DS    9     ;valve status
227                                            ;bit 7 - 0=no ID
228                                            ;bit 6 - 0=disabled
229                                            ;bit 5 - 1=master valve
230                                            ;bit 4 - 0=off, 1=on
231                                            ;bit 3-0 - station type
232  0286              SS          DS    9     ;sensor status
233  028F              DRY_LEVEL   DS    9
234  0298              SOAK_LEVEL  DS    9
235  02A1              RAIN        DS    1     ;rain sensor, 0=disabled
236  02A2              CODES       DS    1     ;0=secret codes disabled
237  02A3              CODE1       DS    4     ;4 ASCII bytes
238  02A7              CODE2       DS    4
239  02AB              CODE3       DS    4
240  02AF              CID         DS    6     ;controller ID
```

```
241  02B5              FAILSAFE    DS    4     ;hour, minute, duration(2) for backup pgm
242  02B9              VALVEID     DS    9     ;valve position and polarity
243  02C2              SENSORID    DS    9     ;same deal for sensors
244  02CB              TERRAIN     DS    9     ;terrain
245  02D4              SPRINKLER   DS    9     ;sprinkler type
246  02DD                          DS    9     ;spares
247  02E6                          DS    20    ;spares
248                                             ;end of SYSTEM SETTINGS
249                    ;           -----------
250                    ;   total         132
251
252                    ;----------------------------------
253                    ;     RUN BLOCK
254                    ;----------------------------------
255
256  02FA              RUN_BLOCK:
257
258  02FA              SETUPS      DS    3     ;which setups to run
259  02FD              RAIN_DELAY  DS    1     ;# of days to wait before run
260  02FE              GLOBAL      DS    1     ;% of watering
261  02FF              BUDGET      DS    9     ;individual budgeting
262  0308                          DS    18    ;spares
263  031A              DAYNUM      DS    4     ;day to generate
264                                             ;byte 0-1=day # or wk #, byte 2=specific days
265  031E              WCLK        DS    1     ;which clk to use
266                                             ;0=RTC, 1=Altclk, 2=Emclk
267                                             ;end of RUN SETTINGS
268  031F              RUNNING     DS    1     ;condition of RUN
269                                             ;0 = no watering
270                                             ;1 = ready to run when key out
271                                             ;2 = start or resume watering
272                                             ;3 = running
273                                             ;4 = waiting for midnite
274                                             ;5 = halted by menu, can resume
275                                             ;6 = halted by SL, must start new
276                    ;           -----------
277                    ;   total         38
278
279                    ;----------------------------------
280                    ;     SOURCE STORAGE
281                    ;----------------------------------
282
283  0900                          ORG   $0900
284  0900              SRC1        DS    172   ;Mini set up
285  09AC              SRC2        DS    172   ;Auto-split set up
286  0A58              SRC3        DS    172   ;Ration set up
287  0B04              SRC4        DS    172   ;ISC set up
288  0BB0              SRC5        DS    172   ;One time set up
289  0C5C              SRC6        DS    172   ;Special set up
290  0D08              SRC7        DS    4     ;Failsafe setup
291  0D0C              SRC8        DS    1024  ;ISC starts
292  110C              SRC9        DS    1024  ;Special starts
293                    ;           -----------
294                    ;   total         3084
295
296                    ;----------------------------------
297                    ;     OBJECT STORAGE
298                    ;----------------------------------
```

```
299
300                                                     ;this is the source currently in use
301  1540                        ORG     $1540
302  1540         OBJBASE:
303  1540         SOURCE_TYPE    DS      1       ;source type
304  1541         CYCLE_TYPE     DS      1       ;0=so many, 1=specific, 2=odd, 3=even
305  1542         MAXON          DS      9       ;maximum on time
306  154B         MINOFF         DS      9       ;minimum off time for splits
307  1554         XFROM          DS      2       ;excluded time, from-to
308  1556         XTO            DS      2
309  1558
310  1558         DUR1           DS      18      ;base durations
311  156A         CYCLE1         DS      18      ;base cycles
312  157C         BASE_START     DS      2       ;time of first start
313
314  157E         DUR2           DS      18      ;syringe durations
315  1590         CYCLE2         DS      18      ;cycles (daily if syringe)
316  15A2         ACTIVE_MONTH   DS      13      ;months to syringe
317  15AF         SYRINGE_START  DS      2       ;time to start syringing
318  15B1         SYRINGE_END    DS      2       ;time to end syringes
319  15B3         SOFTEN         DS      2       ;how often to syringe
320  15B5         DUR3           DS      18      ;soak durations
321  15C7         CYCLE3         DS      18      ;soak cycles
322  15D9                        DS      19      ;spares
323              ;                       ----------
324              ;    total              172
325
326  15EC         NSTARTS        DS      1       ;number of starts
327  15ED         GENTIME        DS      2       ;time to generate a new schedule
328  15EF         DONETIME       DS      2       ;end of watering for the day
329  15F1         STARTS         DS      1024    ;128 starts @ 8 bytes each
330                                              ;END OF OBJECT STORAGE
331              ;------------------------------------
332              ;    OTHER RAM STORAGE
333              ;------------------------------------
334
335  1A00                        ORG     $1A00
336  1A00         BFR            DS      512     ;serial interface bfr
337  1C00         HISTORY        DS      1016    ;127 history entries @ 8 bytes each
338  1FF8         HEND           DS      8       ;end of history buffer
339
340              ;------------------------------------
341              ;    CONSTANTS
342              ;------------------------------------
343
344              ;I/O ADDRESSES
345  00E6                        PAGE0
346        0000   POWER_OFF      EQU     0       ;processor power off
347        0001   RTC_CLR        EQU     1       ;clear RTC counter
348        0002   AD_POWER       EQU     2       ;A/D power
349        0003   AD_ENABLE      EQU     3       ;A/D enable
350        0004   LCD_POWER      EQU     4       ;LCD power
351        0005   LCD_ENABLE     EQU     5       ;LCD enable
352        0006   VALVE_SETUP    EQU     6       ;valve select
353        0007   VALVE_ENABLE   EQU     7       ;valve enable
354        0008   TIMER_MSB      EQU     8       ;TIMER hi byte
355        0009   TIMER_LSB      EQU     9       ;TIMER lo byte
```

```
356    000A        TIMER         EQU    $0A          ;TIMER on/off
357    000B        RTC           EQU    $0B          ;Real time clock
358    000C        SERIAL_CLK    EQU    $0C          ;Serial interface clock
359    000D        TIMER_LOAD    EQU    $0D          ;load TIMER msb,lsb into TIMER
360    000E        SERIAL_OUT    EQU    $0E          ;output serial data
361    000F        SO_RDY        EQU    $0F          ;serial output ready
362    0010        RTC_MSB       EQU    $10          ;RTC counter hi byte
363    0011        RTC_LSB       EQU    $11          ;RTC counter lo byte
364    0012        STATUS1       EQU    $12          ;1st status byte
365    0013        STATUS2       EQU    $13          ;2nd status byte
366    0014        SERIAL_IN     EQU    $14          ;serail data in
367    0015        AD_DATA       EQU    $15          ;read A/D data
368    0016        SO_LOAD       EQU    $16          ;load serial shift register
369    0017        SI_CLR        EQU    $17          ;clear serial in ready
370    0018        LCD_STATUS    EQU    $18          ;LCD register 0
371    0018        LCD_CMD       EQU    $18
372    0019        LCD_DATA      EQU    $19          ;LCD register 1
373    001A        LCD_CONTRAST  EQU    $1A          ;LCD contrast
374    001B        WATCHDOG      EQU    $1B          ;Watchdog timer
375    001C        RTC_TEST      EQU    $1C          ;RTC counter clock
376    001D        E2            EQU    $1D          ;EEPROM
377    001E        WCVALVES      EQU    $1E          ;Wire check drivers for valves
378    001F        WCSENSORS     EQU    $1F          ;Wire check drivers for sensors
379    0020        ADBASE        EQU    $20          ;A/D base address
380
381
382                ;OTHER CONSTANTS
383
384    0040        NEG           EQU    01000000B
385    0000        POS           EQU    0
386    0040        SI_PRESENT    EQU    01000000B    ;serial device plugged in
387    0002        E2CS          EQU    2            ;bit for EEPROM chip select
388    0001        E2SK          EQU    1            ;bit for EEPROM serial clock
389    0080        E2READ_CMD    EQU    10000000B    ;EEPROM read command
390    0040        E2WRITE_CMD   EQU    01000000B    ;EEPROM write command
391    00C0        E2ERASE_CMD   EQU    11000000B    ;EEPROM erase command
392    0030        E2EWEN_CMD    EQU    00110000B    ;EEPROM erase/write enable cmd
393    0019        PERSEC        EQU    25           ;how many INTs per second
394    000A        SLOW_REPEAT   EQU    10           ;how many INT routines to repeat key
395    0006        BLINK_RATE    EQU    6            ;to blink
396    0007        SRATE1        EQU    7            ;scrolling blank time
397    003E        SRATE2        EQU    62           ;scroll msg time
398    0078        SRATE3        EQU    120          ;last msg time
399    0064        SRATE4        EQU    100          ;self test msg time
400    0003        FAST_REPEAT   EQU    3            ;fast time set up repeat
401    0020        OKKEY         EQU    00100000B    ;switch 6
402    0010        NOKEY         EQU    00010000B    ;switch 5
403    0008        HELPKEY       EQU    00001000B    ;switch 4
404    0001        STOPKEY       EQU    00000001B    ;switch 1
405    0040        LINE2         EQU    $40          ;cursor addr for display line 2
406    0030        ASCMASK       EQU    00110000B    ;change 0-9 to ASCII
407    0080        VID           EQU    10000000B    ;valve ID bit in VS
408    0040        VEN           EQU    01000000B    ;enable bit in VS
409    0032        ADWAIT        EQU    50           ;ms to wait before read (coil test)
410
411    0000        RREVIEW       EQU    0            ;review byte in schedule setup
412    0001        RMODIFY       EQU    1
```

```
413      0002          RNEW         EQU     2
414
415      2000                       DATA              ;16 bit constants
416
417                    ;--------------------------------
418                    ;    MACROS
419                    ;--------------------------------
420
421            DBLW:   MACRO   A0                      ;multiply word by 2
422                    CLC
423                    ROL     A0
424                    ROL     A0+1
425                    ENDM
426
427            DBL:    MACRO   A0                      ;multiply byte by 2
428                    CLC
429                    ROL     A0
430                    ENDM
431
432            DBLX:   MACRO                           ;multiply index by 2
433                    PHA
434                    CLC
435                    TXA
436                    ROL     A
437                    TAX
438                    PLA
439                    ENDM
440
441            RTC10:  MACRO                           ;set up RTC for 10 seconds
442                    LDA     #1
443                    STA     RTC
444                    ENDM
445
446            RTC60:  MACRO                           ;set up RTC for 60 seconds
447                    LDA     #0
448                    STA     RTC
449                    ENDM
450
451            RTC_PULSE: MACRO                        ;check for RTC timeout
452                    LDA     STATUS1
453                    AND     #00010000B
454                    ENDM
455
456            SET:    MACRO   A0                      ;store a 1 to memory
457                    LDA     #1
458                    STA     A0
459                    ENDM
460
461            MESSAGE: MACRO A0                       ;display msg
462                    LDX     #A0
463                    JSR     DISPLAY_MSG
464                    ENDM
465
466            CURSOR_OFF:  MACRO                      ;display on, no cursor or blink
467                    LDX     #5
468                    JSR     CMD
469                    ENDM
```

```
470
471            CURSOR_ON:  MACRO              ;display on, show cursor
472                   LDX     #3
473                   JSR     CMD
474                   ENDM
475
476            SET_CURSOR: MACRO   A0         ;move cursor to address
477                   LDA     #A0
478                   JSR     LCD_ADDR
479                   ENDM
480
481            BACKUP: MACRO   A0             ;backup cursor
482                   LDA     #A0
483                   JSR     DEC_LCD_ADDR
484                   ENDM
485
486            SKIP:   MACRO   A0             ;move cursor ahead
487                   LDA     #A0
488                   JSR     INC_LCD_ADDR
489                   ENDM
490
491            BLT:    MACRO   A0             ;branch if A<M
492                   BCC     A0
493                   ENDM
494
495            BGE:    MACRO   A0             ;branch if A>=M
496                   BCS     A0
497                   ENDM
498
499            ADD16:  MACRO   A0,A1,A2       ;A2=A0+A1, 16 bits
500                   CLC
501                   LDA     A0
502                   ADC     A1
503                   STA     A2
504                   LDA     A0+1
505                   ADC     A1+1
506                   STA     A2+1
507                   ENDM
508
509            INC16:  MACRO   A0             ;increment a 16 bit number
510                   CLC
511                   LDA     A0
512                   ADC     #1
513                   STA     A0
514                   LDA     A0+1
515                   ADC     #0
516                   STA     A0+1
517                   ENDM
518
519            MOV16:  MACRO   A0,A1          ;move 16 bits from A0 to A1
520                   LDA     A0
521                   STA     A1
522                   LDA     A0+1
523                   STA     A1+1
524                   ENDM
525
526            LDW:    MACRO   A0,A1          ;load 16 bits of immediate data
527                   LDA     #<A1
```

```
528            STA     A0
529            LDA     #>A1
530            STA     A0+1
531            ENDM
532
533   SLOW:    MACRO   A0              ;repeat a key slowly
534            LDA     #SLOW_REPEAT
535            STA     REPEAT_RATE
536            LDA     #A0
537            STA     REPEAT_MASK
538            ENDM
539
540   FAST:    MACRO   A0              ;repeat a key quickly
541            LDA     #FAST_REPEAT
542            STA     REPEAT_RATE
543            LDA     #A0
544            STA     REPEAT_MASK
545            ENDM
546
547   HELP:    MACRO   A0              ;do scrolling message
548            LDA     #A0             ;and ask for repeat
549            STA     HELPNUM
550            JSR     HELP_MSG
551            ENDM
552
553   SCROLL:  MACRO   A0              ;do scrolling message
554            LDA     #A0
555            STA     HELPNUM
556            JSR     SCROLL_MSG
557            ENDM
558
559   SELECT:  MACRO   A0,A1           ;set up for get number
560            STA     IBFR            ;selection in A
561            LDA     #A0
562            STA     IBFR+1
563            LDA     #A1
564            STA     IBFR+2
565            JSR     GETNUM
566            ENDM
567
568   SELECT_MUL: MACRO A0,A1,A2       ;select msg, medium speed, underline
569            STA     IBFR
570            LDA     #A0
571            STA     IBFR+1
572            LDA     #A1
573            STA     IBFR+2
574            LDA     #A2
575            STA     IBFR+3
576            JSR     GETMUL
577            ENDM
578
579   SELECT_SOK: MACRO A0,A1,A2       ;select msg, slow speed, OK char
580            STA     IBFR
581            LDA     #A0
582            STA     IBFR+1
583            LDA     #A1
584            STA     IBFR+2
585            LDA     #A2
```

```
586                     STA     IBFR+3
587                     JSR     GETSOK
588                     ENDM
589
590     SELECT_MOK: MACRO A0,A1,A2      ;select msg, medium speed, OK char
591                     STA     IBFR
592                     LDA     #A0
593                     STA     IBFR+1
594                     LDA     #A1
595                     STA     IBFR+2
596                     LDA     #A2
597                     STA     IBFR+3
598                     JSR     GETMOK
599                     ENDM
600
601     UL:     MACRO                   ;turn on blinking underline
602                     SET     BLINK
603                     STZ     INTCTR
604                     ENDM
605
606     QM:     MACRO                   ;turn on blinking question mark
607                     LDA     #2
608                     STA     BLINK
609                     STZ     INTCTR
610                     ENDM
611
612     OK:     MACRO                   ;turn on blinking OK char
613                     LDA     #5
614                     STA     BLINK
615                     STZ     INTCTR
616                     ENDM
617
618     NOBLINK: MACRO                  ;kill all blinking
619                     STZ     BLINK
620                     STZ     INTCTR
621                     ENDM
622
623     SHR16:  MACRO   A0              ;shift 16 bits right (divide by 2)
624                     CLC
625                     ROR     A0+1
626                     ROR     A0
627                     ENDM
628
629     ANSLOW: MACRO                   ;auto NO key on slow
630                     LDA     #1
631                     STA     INTCMD
632                     ENDM
633
634     ANMED:  MACRO                   ;auto NO key on medium
635                     LDA     #2
636                     STA     INTCMD
637                     ENDM
638
639     ANFAST: MACRO                   ;auto NO key on fast
640                     LDA     #3
641                     STA     INTCMD
642                     ENDM
```

```
643
644                     ANOFF:  MACRO                   ;auto NO key off
645                             STZ     INTCMD
646                             ENDM
647
648
649
650
651
652   2000              INCLUDE  CYCLE.ASM
653                     ;----------------------------------
654                     ;       START OF CODE
655                     ;----------------------------------
656   0000                      CODE
657   8000                      ORG     $8000
658
659                     ;----------------------------------
660                     ;       POWER ON
661                     ;----------------------------------
662
663   8000  A2 FF       RESET:  LDX     #$FF            ;init stack pointer
664   8002  9A                  TXS
665   8003  78                  SEI
666   8004  64 6D               STZ     FLAGS
667   8006  A5 12               LDA     STATUS1         ;save status
668   8008  85 E4               STA     STTS
669   800A  29 08               AND     #00001000B      ;if SVL, then forget everything
670   800C  D0 03               BNE     RS0
671   800E  4C CB 81            JMP     DEATH
672   8011  85 18       RS0:    STA     WATCHDOG        ;clear the dog
673   8013  20 CB A2            JSR     CALCSUM         ;if RAM OK, then not first time on
674   8016  C5 40               CMP     CKSUM
675   8018  D0 03               BNE     RAMNG
676   801A  4C A0 80            JMP     RAMOK
677
678   801D  A5 E4       RAMNG:  LDA     STTS            ;RAM no good, must be first time on
679   801F  29 01               AND     #00000001B      ;can't do anything until
680   8021  F0 03               BEQ     RS2
681   8023  4C CB 81            JMP     DEATH
682   8026  A5 E4       RS2:    LDA     STTS            ;Battery is present!
683   8028  29 20               AND     #00100000B      ;now wait until BATT LOW gone
684   802A  F0 03               BEQ     INITIALIZE
685                                                     ;(future flash message here)
686   802C  4C CB 81            JMP     DEATH
687
688                     INITIALIZE:                     ;fully charged, let's go
689                                                     ;(ignore EEPROM for now)
690
691                                                     ;cold start
692   802F  A2 0F               LDX     #15             ;store checksum data bytes
693   8031  64 40               STZ     CKSUM
694   8033  18                  CLC
695   8034  8A          NIT1:   TXA
696   8035  9D 00 02            STA     CKDATA,X
697   8038  65 40               ADC     CKSUM
698   803A  85 40               STA     CKSUM
699   803C  CA                  DEX
700   803D  D0 F5               BNE     NIT1
```

```
701
702   803F  A2 00              LDX   #0              ;init system block
703   8041  BD 8D F7   NIT2:   LDA   SSTBL,X         ;from default table
704   8044  9D 76 02           STA   HOUR,X
705   8047  E8                 INX
706   8048  E0 67              CPX   #103
707   804A  D0 F5              BNE   NIT2
708   804C  A2 00              LDX   #0              ;init run block
709   804E  BD F4 F7   NIT7:   LDA   RUNTBL,X        ;from default table
710   8051  9D FA 02           STA   SETUPS,X
711   8054  E8                 INX
712   8055  E0 0E              CPX   #14
713   8057  D0 F5              BNE   NIT7
714   8059  9C 1F 03           STZ   RUNNING
715   805C  9C 5D 02           STZ   SL              ;clear SL flag
716   805F             RTC60
720   8063  85 01              STA   RTC_CLR         ;clear RTC counter
721   8065  64 A1              STZ   SECCTR
722   8067  64 A2              STZ   SECCTR+1        ;seconds counter
723   8069  64 E2              STZ   INTCMD
724   806B  A9 09              LDA   #$09            ;clear out source RAM area ($0900-$153F)
725   806D  85 78              STA   DESTPTR+1
726   806F  64 77              STZ   DESTPTR
727   8071  A0 00              LDY   #0
728   8073  A9 00      NIT4:   LDA   #0
729   8075  91 77      NIT5:   STA   (DESTPTR),Y
730   8077  C8                 INY
731   8078  D0 FB              BNE   NIT5
732   807A  E6 78              INC   DESTPTR+1
733   807C  A5 78              LDA   DESTPTR+1
734   807E  C9 15              CMP   #$15
735   8080  D0 F1              BNE   NIT4
736   8082  91 77      NIT6:   STA   (DESTPTR),Y
737   8084  C8                 INY
738   8085  C0 28              CPY   #40
739   8087  D0 F9              BNE   NIT6
740
741   8089                     LDW   HWRITE,HISTORY  ;init history pointer
747   8091  A9 00      NIT3:   LDA   #0              ;clear all entries
748   8093  92 B7              STA   (HWRITE)
749   8095  20 12 AA           JSR   INC_HWRITE
750   8098  90 F7              BCC   NIT3
751   809A  20 71 AA           JSR   HOPEND          ;store the default date
752   809D  4C AD 83           JMP   PROGIN
753
754
755                   RAMOK:                         ;wakeup, not the first time on
756   80A0  64 E2              STZ   INTCMD
757   80A2  20 D6 A4           JSR   READ_RTC        ;if more than 1 RTC, then SVL happened
758   80A5  A5 42              LDA   MSB
759   80A7  D0 0D              BNE   RS21
760   80A9  A5 41              LDA   LSB
761   80AB  C9 02              CMP   #2
762   80AD                     BGE   RS21
765   80AF  F0 2F              BEQ   RS22            ;no minutes passed
766   80B1  20 EF A4           JSR   UPDATE_CLOCK    ;else inc clock by 1 min.
767   80B4  80 2A              BRA   RS22
768
```

```
769  80B6  A9 01       RS21:  LDA   #$01            ;tell history about SVL
770  80B8  20 CE AA           JSR   HOPENF
771  80BB  20 F9 A4           JSR   CLR_RTC
772  80BE  A5 42       RS23:  LDA   MSB             ;while RTC>60,
773  80C0  D0 08              BNE   RS24
774  80C2  A5 41              LDA   LSB
775  80C4  F0 1A              BEQ   RS22
776  80C6  C9 3C              CMP   #60
777  80C8                     BLT   RS25
780  80CA  A9 3C       RS24:  LDA   #60             ;update clock in <=60 min. chunks
781  80CC  85 61       RS25:  STA   IBFR
782  80CE  20 00 A5           JSR   BUMP_CLOCK
783  80D1  38                 SEC
784  80D2  A5 41              LDA   LSB
785  80D4  E5 61              SBC   IBFR
786  80D6  85 41              STA   LSB
787  80D8  A5 42              LDA   MSB
788  80DA  E9 00              SBC   #0
789  80DC  85 42              STA   MSB
790  80DE  80 DE              BRA   RS23
791
792  80E0  A5 E4       RS22:  LDA   STTS
793  80E2  29 04              AND   #%00000100      ;if SL,
794  80E4  D0 1F              BNE   RS18
795  80E6  AD 5D 02           LDA   SL
796  80E9  D0 17              BNE   RS16
797  80EB  20 CB AD           JSR   ISRUNNING       ;if running,
798  80EE  90 08              BCC   RS2A
799  80F0  20 34 83           JSR   HALT_RUN        ;then suspend watering
800  80F3  A9 06              LDA   #6
801  80F5  8D 1F 83           STA   RUNNING
802  80F8  A9 00       RS2A:  LDA   #$00
803  80FA  20 CE AA           JSR   HOPENF          ;tell history (only once)
804  80FD                     SET   SL
808  8102  4C CB 81    RS16:  JMP   DEATH
809
810  8105  AD 5D 02    RS18:  LDA   SL              ;no SL now
811  8108  F0 15              BEQ   RS17
812  810A  9C 5D 02           STZ   SL              ;but there was one, recover
813  810D  AD 1F 83           LDA   RUNNING         ;if running was halted,
814  8110  C9 06              CMP   #6
815  8112  D0 0B              BNE   RS17
816  8114  9C 1A 83           STZ   DAYNUM          ;then start over
817  8117  9C 1B 83           STZ   DAYNUM+1
818  811A  A9 02              LDA   #2
819  811C  8D 1F 83           STA   RUNNING
820
821  811F  A5 E4       RS17:  LDA   STTS
822  8121  29 40              AND   #SI_PRESENT
823  8123  D0 0A              BNE   RS15
824  8125  A5 E4              LDA   STTS            ;serial link present
825  8127  A5 E4              LDA   STTS
826  8129  29 80              AND   #%10000000B     ;if ready
827  812B  F0 00              BEQ   RS14
828                                                 ;serivce serial port
829  812D  A5 17       RS14:  LDA   SI_CLR          ;else clear it
830
```

```
831  812F  A5 E4        RS15:    LDA      STTS
832  8131  29 01                 AND      #00000001B
833  8133  D0 43                 BNE      RS11
834  8135  A5 E4                 LDA      STTS            ;battery is present
835  8137  29 20                 AND      #00100000B
836  8139  D0 03                 BNE      RS12
837  813B  4C AD 83              JMP      PROGIN          ;and fully charged
838                     RS12:                             ;batt is low
839  813E  EE 75 02              INC      CHARGING        ;change contrast
840  8141  AD 75 02              LDA      CHARGING
841  8144  C9 0B                 CMP      #11
842  8146                        BLT      RS1A
845  8148                        SET      CHARGING
849  814D  AD 75 02     RS1A:    LDA      CHARGING
850  8150  4A                    LSR      A
851  8151  B0 22                 BCS      RS1B
852  8153  20 32 A3              JSR      LCD_ON
853  8156  20 40 A3              JSR      DISPLAY_ON
854  8159  20 85 A3              JSR      DISPLAY_CLR
855  815C                        MESSAGE  8               ;& say so
859  8161  AD 75 02              LDA      CHARGING
860  8164  4A                    LSR      A
861  8165  AA                    TAX
862  8166  BD 86 F8              LDA      CONTRAST_TBL,X
863  8169  85 1A                 STA      LCD_CONTRAST
864  816B  A0 FA                 LDY      #250            ;give user time to see msg
865  816D  20 C8 A2              JSR      WAITMS
866  8170  A0 FA                 LDY      #250
867  8172  20 C8 A2              JSR      WAITMS
868  8175  4C 8A 81     RS1B:    JMP      SHUT_DOWN
869
870                     RS11:                             ;woke up by RTC
871  8178  4C CB 81     RS13:    JMP      DEATH           ;or watchdog
872
873                     ;----------------------------------
874                     ;    ORDERLY SHUT-DOWN
875                     ;----------------------------------
876
877                     BATT_LOW:                         ;battery is low
878  817B  20 39 A4              JSR      TIMER_OFF
879  817E  20 82 A3              JSR      DKCLR
880  8181                        MESSAGE  72              ;alert the user
884  8186  20 F3 85              JSR      SLFWAIT
885  8189  20 82 A3              JSR      DKCLR
886  818C  20 E5 9F              JSR      FLASH
887  818F                        MESSAGE  98
891  8194  20 F3 85              JSR      SLFWAIT
892  8197  A9 02                 LDA      #$02
893  8199  20 CE AA              JSR      HOPENF
894  819C  20 F3 85              JSR      SLFWAIT
895  819F  80 19                 BRA      SHUT_DOWN
896
897                     NO_BATT:                          ;battery removed
898  81A1  A9 03                 LDA      #$03            ;tell history
899  81A3  20 CE AA              JSR      HOPENF
900  81A6  AD 1F 83              LDA      RUNNING
901  81A9  C9 01                 CMP      #1              ;if ready to run
```

```
902  81AB  D0 0D                  BNE    SHUT_DOWN
903  81AD  20 39 A4                JSR    TIMER_OFF
904  81B0  A9 02                   LDA    #2                ;give it the go ahead
905  81B2  8D 1F 83                STA    RUNNING
906  81B5  A9 05                   LDA    #$05              ;tell history start watering
907  81B7  20 CE AA                JSR    HOPENF
908
909                    SHUT_DOWN:                            ;nite nite
910  81BA  20 39 A4                JSR    TIMER_OFF
911  81BD  20 7D A3                JSR    DISPLAY_OFF
912  81C0  20 23 A4                JSR    AD_OFF
913  81C3  20 CB AD                JSR    ISRUNNING         ;if not running,
914  81C6  B0 03                   BCS    DEATH
915  81C8  20 9D A4                JSR    ALL_VALVES_OFF    ;then kill valves
916  81CB  85 00         DEATH:    STA    0                 ;processor power off
917  81CD  80 FC                   BRA    DEATH             ;shouldn't get here
918
919                    ;--------------------------------
920                    ;     WATERING ROUTINE
921                    ;--------------------------------
922
923
924  81CF  20 CB AD      WATER:    JSR    ISRUNNING         ;Service starts in OBJECT
925  81D2  B0 03                   BCS    CY20              ;if watering,
926  81D4  4C AA 82                JMP    CY99
927
928                    ;Y0:       LDA    WCLK              ;which mode?
929                    ;          CMP    #1
930                    ;          BNE    CY20
931                    ;
932                    ;Y10:      INC16  ALTCLK            ;SEMI-AUTO MODE
933                    ;          MOV16  ALTCLK,WATERCLK
934                    ;
935                    ;          LDA    DAYNUM            ;if daynum=0
936                    ;          ORA    DAYNUM+1
937                    ;          BNE    CY15
938                    ;          JSR    INCDAYNUM         ;then start watering now
939                    ;          JSR    GENERATE
940                    ;          LDA    GENTIME
941                    ;          STA    WATERCLK
942                    ;          STA    ALTCLK
943                    ;          LDA    GENTIME+1
944                    ;          STA    WATERCLK+1
945                    ;          STA    ALTCLK+1
946                    ;
947                    ;Y15:      LDA    DONETIME          ;if watering done
948                    ;          CMP    WATERCLK
949                    ;          BNE    CY30
950                    ;          LDA    DONETIME+1
951                    ;          CMP    WATERCLK+1
952                    ;          BNE    CY30
953                    ;          STZ    WCLK              ;then change to auto mode
954                    ;          LDA    NSTARTS           ;wait for next base start
955                    ;          STA    STARTCTR
956                    ;
957                    CY20:                                ;AUTO MODE
```

```
958   81D7                         MOV16   HOUR,IBFR+4      ;use real time
964   81E1   20 83 A8              JSR     HM2MIN
965   81E4                         MOV16   OFFSET,WATERCLK
971   81EC   AD 1F 03              LDA     RUNNING
972   81EF   C9 02                 CMP     #2
973   81F1   D0 3E                 BNE     CY2A
974                                                         ;running=2
975   81F3   AD FD 02              LDA     RAIN_DELAY       ;dec rain delay if any
976   81F6   F0 11                 BEQ     CY2D
977   81F8   A5 DC                 LDA     WATERCLK         ;if midnight
978   81FA   05 DD                 ORA     WATERCLK+1
979   81FC   D0 08                 BNE     CY2E
980   81FE   CE FD 02              DEC     RAIN_DELAY
981   8201   AD FD 02              LDA     RAIN_DELAY
982   8204   F0 03                 BEQ     CY2D
983   8206   4C AA 82      CY2E:   JMP     CY99
984   8209   AD 1A 03      CY2D:   LDA     DAYNUM
985   820C   0D 1B 03              ORA     DAYNUM+1
986   820F   F0 0A                 BEQ     CY2B
987
988   8211   20 DE AD              JSR     GENERATE         ;resume previous run
989   8214   A9 03                 LDA     #3
990   8216   8D 1F 03              STA     RUNNING
991   8219   80 16                 BRA     CY2A
992
993   821B   20 50 83      CY2B:   JSR     INCDAYNUM        ;new run, day=1
994   821E   20 DE AD              JSR     GENERATE
995   8221   A5 7A                 LDA     STARTCTR         ;if 1st start passed,
996   8223   F0 07                 BEQ     CY2C
997   8225   A9 04                 LDA     #4               ;then wait till next midnight
998   8227   8D 1F 03              STA     RUNNING
999   822A   80 05                 BRA     CY2A
1000  822C   A9 03         CY2C:   LDA     #3               ;otherwise get going now
1001  822E   8D 1F 03              STA     RUNNING
1002
1003                       CY2A:                            ;running=3 or 4
1004  8231   A5 DC                 LDA     WATERCLK
1005  8233   05 DD                 ORA     WATERCLK+1
1006  8235   D0 0B                 BNE     CY29
1007                                                        ;it's midnight
1008  8237   20 50 83      CY25:   JSR     INCDAYNUM        ;it's a new day
1009  823A   20 DE AD              JSR     GENERATE
1010  823D   A9 03                 LDA     #3
1011  823F   8D 1F 03              STA     RUNNING
1012
1013                       CY29:                            ;service valves
1014  8242   AD 1F 03              LDA     RUNNING          ;if not waiting
1015  8245   C9 04                 CMP     #4
1016  8247   F0 61                 BEQ     CY99
1017
1018  8249                 CY30:   SET     VALVE            ;1st service active valves
1022  824D   A6 49         CY31:   LDX     VALVE
1023  824F   BD 7D 02              LDA     VS,X
1024  8252   29 10                 AND     #00010000B
1025  8254   F0 28                 BEQ     CY35             ;valve is not on, try next
1026  8256   A6 49                 LDX     VALVE            ;valve is on
1027  8258                         DBLX
```

```
1035  825E  FE 20 82           INC    TIMEON,X       ;inc time on
1036  8261  D0 03              BNE    CY32
1037  8263  FE 21 82           INC    TIMEON+1,X
1038  8266  38          CY32:  SEC                   ;dec time remaining
1039  8267  B5 8F              LDA    TR,X
1040  8269  E9 01              SBC    #1
1041  826B  95 8F              STA    TR,X
1042  826D  B5 90              LDA    TR+1,X
1043  826F  E9 00              SBC    #0
1044  8271  95 90              STA    TR+1,X
1045  8273  B5 8F              LDA    TR,X           ;if no time remaining, then done
1046  8275  15 90              ORA    TR+1,X
1047  8277  F0 02              BEQ    CY34
1048  8279  80 03              BRA    CY35           ;check for sensor limit here
1049  827B  20 12 83    CY34:  JSR    VALVEOFF       ;so turn this one off
1050  827E  E6 49       CY35:  INC    VALVE          ;check the next valve
1051  8280  A5 49              LDA    VALVE
1052  8282  C9 09              CMP    #9
1053  8284  D0 C7              BNE    CY31
1054
1055  8286  AD EC 15    CY40:  LDA    NSTARTS        ;2nd, service new starts
1056  8289  C5 7A              CMP    STARTCTR
1057  828B  F0 1D              BEQ    CY70           ;no more to do
1058
1059  828D  B2 7B       CY41:  LDA    (STARTPTR)     ;see if time to do next start
1060  828F  C5 DC              CMP    WATERCLK
1061  8291  D0 17              BNE    CY70
1062  8293  A0 01              LDY    #1
1063  8295  B1 7B              LDA    (STARTPTR),Y
1064  8297  C5 DD              CMP    WATERCLK+1
1065  8299  D0 0F              BNE    CY70           ;nope, nothing to do yet
1066                                                 ;time is now
1067                                                 ;check if sensors allow turn on
1068  829B  A0 02              LDY    #2             ;turn valve on
1069  829D  B1 7B              LDA    (STARTPTR),Y
1070  829F  85 49              STA    VALVE
1071  82A1  20 AB 82           JSR    VALVEON
1072  82A4  20 F7 A9    CY50:  JSR    NEXTSTART      ;go to the next start
1073  82A7  4C 86 82           JMP    CY40           ;see if that one is for now
1074
1075              CY70:                              ;3rd, service master valve(s)
1076
1077  82AA  60          CY99:  RTS
1078
1079              ;----------------------------------
1080              ;    VALVE MANAGEMENT
1081              ;----------------------------------
1082
1083              VALVEON:                           ;start up a valve start
1084  82AB  A6 49              LDX    VALVE          ;clear time on
1085  82AD                     DBLX
1093  82B3  9E 20 82           STZ    TIMEON,X
1094  82B6  9E 21 82           STZ    TIMEON+1,X
1095  82B9  A0 04              LDY    #4             ;set up duration
1096  82BB  B1 7B              LDA    (STARTPTR),Y
1097  82BD  95 8F              STA    TR,X
1098  82BF  C8                 INY
1099  82C0  B1 7B              LDA    (STARTPTR),Y
```

```
1100  82C2  95 90              STA    TR+1,X
1101
1102               HOPENV:                         ;open history for a valve start
1103  82C4  AD 7A 82            LDA    DAY         ;stamp date if needed
1104  82C7  C5 BA               CMP    HDATE+1
1105  82C9  D0 07               BNE    H04
1106  82CB  AD 79 82            LDA    MONTH
1107  82CE  C5 B9               CMP    HDATE
1108  82D0  F0 03               BEQ    H05
1109  82D2  20 71 AA    H04:    JSR    HOPEND
1110  82D5  A6 49       H05:    LDX    VALVE
1111  82D7                      DBLX
1119  82DD  A5 B7               LDA    HWRITE
1120  82DF  95 A3               STA    HPTR,X      ;save the addr
1121  82E1  A5 B8               LDA    HWRITE+1
1122  82E3  95 A4               STA    HPTR+1,X
1123  82E5  20 60 AA            JSR    GETHPTR     ;access the entry with HPTR
1124  82E8  A5 49               LDA    VALVE
1125  82EA  09 20               ORA    #00100000B
1126  82EC  92 A3               STA    (HPTR)      ;key= valve# open
1127  82EE  A0 01               LDY    #1
1128  82F0  AD 76 02            LDA    HOUR
1129  82F3  91 A3               STA    (HPTR),Y
1130  82F5  C8                  INY
1131  82F6  AD 77 02            LDA    MINUTE
1132  82F9  91 A3               STA    (HPTR),Y
1133  82FB  C8                  INY
1134  82FC  A9 80               LDA    #$80        ;soil moisture at start
1135  82FE  91 A3               STA    (HPTR),Y
1136  8300  C8                  INY
1137  8301  A9 00               LDA    #0          ;time on
1138  8303  91 A3               STA    (HPTR),Y
1139  8305  C8                  INY
1140  8306  91 A3               STA    (HPTR),Y
1141  8308  C8                  INY
1142  8309  91 A3               STA    (HPTR),Y    ;soil moisture at stop
1143  830B  20 12 AA            JSR    INC_HWRITE  ;move write ptr to next entry
1144                                               ;if sensors, get reading
1145                                               ;write it to history
1146  830E  20 59 A4            JSR    VON         ;then turn the selected valve on
1147  8311  60                  RTS
1148
1149               VALVEOFF:                       ;finish a valve start
1150  8312  20 8C A4            JSR    VOFF        ;turn the valve off
1151  8315  20 60 AA            JSR    GETHPTR
1152                                               ;if sensors, get reading
1153                                               ;write it to history
1154  8318  A6 49               LDX    VALVE       ;write actual watering time to history
1155  831A                      DBLX
1163  8320  A0 04               LDY    #4
1164  8322  BD 20 02            LDA    TIMEON,X
1165  8325  91 A3               STA    (HPTR),Y
1166  8327  C8                  INY
1167  8328  BD 21 02            LDA    TIMEON+1,X
1168  832B  91 A3               STA    (HPTR),Y
1169
1170  832D  B2 A3               LDA    (HPTR)      ;close history entry
```

```
1171  832F  29 DF                AND    #11011111B
1172  8331  92 A3                STA    (HPTR)
1173  8333  60                   RTS
1174
1175              HALT_RUN:              ;SL entry
1176  8334  20 39 A4     JSR    TIMER_OFF    ;no INT
1177  8337               SET    VALVE
1181  8338  A6 49   STR1: LDX    VALVE        ;turn off all valves with history
1182  833D  BD 7D 82     LDA    VS,X
1183  8340  29 10        AND    #00010000B
1184  8342  F0 03        BEQ    STR2
1185  8344  20 12 93     JSR    VALVEOFF
1186  8347  E6 49   STR2: INC    VALVE
1187  8349  A5 49        LDA    VALVE
1188  834B  C9 09        CMP    #9
1189  834D  D0 EC        BNE    STR1
1190  834F  60           RTS
1191
1192              INCDAYNUM:             ;move DAYNUM array to next day
1193  8350  AD 1A 03     LDA    DAYNUM       ;if 0, init aray
1194  8353  0D 1B 03     ORA    DAYNUM+1
1195  8356  F0 3E        BEQ    FIRSTDAY
1196  8358  AD 41 15     LDA    CYCLE_TYPE
1197  835B  D0 12        BNE    IDN1
1198  835D               INC16  DAYNUM       ;so many days
1207  836E  60           RTS
1208  836F  EE 1D 03 IDN1: INC    DAYNUM+3    ;specific days
1209  8372  AD 1D 03     LDA    DAYNUM+3
1210  8375  C9 08        CMP    #8
1211  8377  D0 16        BNE    IDN3
1212  8379               SET    DAYNUM+3     ;a new week
1216  837E               INC16  DAYNUM
1225  838F  AD 7B 82 IDN3: LDA    DOW        ;save today's day of week
1226  8392  8D 1C 03     STA    DAYNUM+2
1227  8395  60           RTS
1228
1229              FIRSTDAY:              ;init DAYNUM array
1230  8396  AD 41 15     LDA    CYCLE_TYPE
1231  8399  D0 06        BNE    FD1
1232  839B               SET    DAYNUM       ;so many days
1236  83A0  60           RTS
1237              FD1:                   ;specific days
1238  83A1               SET    DAYNUM+3     ;today becomes the first day of the week
1242  83A6               SET    DAYNUM       ;of the first week
1246  83AB  80 E2        BRA    IDN3
1247
1248
1249
1250
1251  83AD               INCLUDE PWRKEY.ASM
1252
1253              ;-------------------------------
1254              ;    POWER KEY INSTALLED
1255              ;-------------------------------
1256
1257  83AD  A5 6D  PRGIN: LDA    FLAGS        ;Power key is in, system charged
1258  83AF  09 01         ORA    #00000001B
```

```
1259  83B1  85 6D              STA   FLAGS
1260                                                ;init key manager
1261  83B3  A9 20              LDA   #00100000B     ;enable only OK key
1262  83B5  85 5E              STA   KEYMASK
1263  83B7  64 5C              STZ   KEYREG         ;no key in process
1264  83B9  20 92 A3           JSR   KEY_RESET      ;no blinking or repeats
1265
1266  83BC  64 D3       P60:   STZ   SECRET         ;no secret code entered yet
1267  83BE  20 28 A4           JSR   TIMERON        ;enable INT
1268  83C1  A9 04              LDA   #$04           ;tell history key is in
1269  83C3  20 CE AA           JSR   HOPENF
1270
1271  83C6  20 32 A3    PG1:   JSR   LCD_ON         ;fire LCD up
1272  83C9  20 40 A3           JSR   DISPLAY_ON
1273  83CC  20 85 A3           JSR   DISPLAY_CLR    ;select contrast
1274  83CF                           MESSAGE 8
1278  83D4  A9 01       PG4:   LDA   #1
1279  83D6  85 D4              STA   CONTRAST       ;start with default contrast
1280  83D8  A6 D4       PG2:   LDX   CONTRAST
1281  83DA  BD 86 F8           LDA   CONTRAST_TBL,X ;send contrast to LCD
1282  83DD  85 1A              STA   LCD_CONTRAST
1283  83DF                           SET_CURSOR LINE2+14
1287  83E4  A5 D4              LDA   CONTRAST
1288  83E6  20 9C A6           JSR   D2D
1289  83E9  A9 19              LDA   #PERSEC
1290  83EB  85 46              STA   TIMCTR         ;wait 1 sec. between contrasts
1291  83ED  20 06 AB    PG3:   JSR   GETKEY
1292  83F0  C9 20              CMP   #OKKEY
1293  83F2  F0 0E              BEQ   PG10           ;OK key
1294  83F4  A5 46              LDA   TIMCTR
1295  83F6  D0 F5              BNE   PG3
1296  83F8  E6 D4              INC   CONTRAST       ;timed out
1297  83FA  A5 D4              LDA   CONTRAST
1298  83FC  C9 06              CMP   #6
1299  83FE                     BGE   PG4
1302  8400  80 D6              BRA   PG2
1303
1304
1305                     ;----------------------------------
1306                     ;     DIRECTIONS
1307                     ;----------------------------------
1308
1309  8402  20 92 A3    PG10:  JSR   KEY_RESET      ;Want directions?
1310  8405  A9 39              LDA   #00111001B     ;enable all keys
1311  8407  85 5E              STA   KEYMASK
1312  8409  A9 0A              LDA   #10
1313  840B  85 72              STA   HELPNUM
1314  840D  20 22 AB           JSR   SCROLL_MSG
1315  8410  B0 29              BCS   SELFTEST       ;key pressed, abort
1316  8412                           SET_CURSOR 15
1320  8417                           ON
1325  841D  20 9F AB    PG12:  JSR   GETHKEY
1326  8420  C9 10              CMP   #NOKEY
1327  8422  F0 17              BEQ   SELFTEST
1328  8424  C9 20              CMP   #OKKEY
1329  8426  D0 F5              BNE   PG12
1330  8428  A9 0B              LDA   #11
1331  842A  85 72              STA   HELPNUM
```

```
1332  842C  20 74 AB    PG11:   JSR     HELP_MSG         ;show new msg at HELPNUM
1333                                                     ;returns when msg read
1334  842F  B0 D1               BCS     PG10             ;end directions if aborted
1335  8431  A5 72               LDA     HELPNUM          ;do next message
1336  8433  C9 17               CMP     #23              ;until last msg
1337  8435  F0 CB               BEQ     PG10
1338  8437  E6 72               INC     HELPNUM
1339  8439  80 F1               BRA     PG11
1340
1341
1342                        ;----------------------------------
1343                        ;       SELF TEST
1344                        ;----------------------------------
1345
1346                    SELFTEST:                         ;do system self test
1347  843B  20 82 A3            JSR     DKCLR
1348  843E                      MESSAGE 124
1352  8443                      SET_CURSOR LINE2+14
1356  8448                      QM
1361  844E  20 9F A8    SLF0:   JSR     GETHKEY
1362  8451  C9 10               CMP     #NOKEY
1363  8453  D0 03               BNE     SLF6
1364  8455  4C 29 86            JMP     SECRET_CODE      ;don't want test
1365  8458  C9 20       SLF6:   CMP     #OKKEY
1366  845A  F0 0D               BEQ     SLF
1367  845C  C9 08               CMP     #HELPKEY
1368  845E  D0 EE               BNE     SLF0
1369  8460                      HELP    24
1374  8467  80 D2               BRA     SELFTEST
1375
1376                                                     ;test valve wiring
1377                                                     ;IBFR=opens, IBFR+1=shorts,
1378                                                     ;IBFR+2=not assigned
1379  8469  20 82 A3    SLF:    JSR     DKCLR
1380  846C  20 39 A4            JSR     TIMER_OFF        ;disable INT
1381  846F                      MESSAGE 114
1385  8474  20 BE A4            JSR     AD_ON
1386  8477                      SET     WCVALVES         ;drivers on
1390  847B                      SET     VALVE            ;start at valve 1, A/D channel 8
1394                    SLF5:                            ;test valve if assigned
1395  847F  A6 49               LDX     VALVE            ;update assignment byte
1396  8481  BD 7D 02            LDA     VS,X
1397  8484  89 80               BIT     #VID
1398  8486  F0 05               BEQ     SLF10
1399  8488  18                  CLC                      ;assigned,
1400  8489  66 63               ROR     IBFR+2
1401  848B  80 09               BRA     SLF7             ;go test it
1402  848D  38          SLF10:  SEC                      ;not assigned,
1403  848E  66 63               ROR     IBFR+2
1404  8490  A9 C8               LDA     #200             ;pretend a good coil
1405  8492  85 41               STA     LSB
1406  8494  80 18               BRA     SLF8
1407
1408  8496  BD B9 02    SLF7:   LDA     VALVEID,X        ;use AD channel based on position
1409  8499  29 07               AND     #00000111B
1410  849B  09 08               ORA     #00001000B
1411  849D  85 45               STA     ADCHANNEL
1412  849F  BD B9 02            LDA     VALVEID,X
```

| | | | | | | |
|---|---|---|---|---|---|---|
| 1413 | 84A2 | 20 C7 A4 | | JSR | VHI | ;bring valve line high based on position |
| 1414 | 84A5 | A0 32 | | LDY | #ADWAIT | ;settle |
| 1415 | 84A7 | 20 C8 A2 | | JSR | WAITMS | |
| 1416 | 84AA | 20 3D A4 | | JSR | READ | ;let's see what's out there |
| 1417 | 84AD | 85 41 | | STA | LSB | |
| 1418 | 84AF | 64 07 | | STZ | VALVE_ENABLE | ;valve line dismissed |
| 1419 | 84B1 | A5 41 | SLF9: | LDA | LSB | |
| 1420 | 84B3 | C9 A8 | | CMP | #168 | ;if <=3.3 volts |
| 1421 | 84B5 | | | BGE | SLF1 | |
| 1424 | 84B7 | 38 | | SEC | | ;then line open |
| 1425 | 84B8 | 80 01 | | BRA | SLF2 | |
| 1426 | 84BA | 18 | SLF1: | CLC | | ;not open |
| 1427 | 84BB | 66 61 | SLF2: | ROR | IBFR | |
| 1428 | 84BD | A5 41 | | LDA | LSB | |
| 1429 | 84BF | C9 E6 | | CMP | #230 | ;if >4.5 volts |
| 1430 | 84C1 | | | BLT | SLF3 | |
| 1433 | 84C3 | 38 | | SEC | | ;then line shorted |
| 1434 | 84C4 | 80 01 | | BRA | SLF4 | |
| 1435 | 84C6 | 18 | SLF3: | CLC | | ;not shorted |
| 1436 | 84C7 | 66 62 | SLF4: | ROR | IBFR+1 | |
| 1437 | | | | | | ;otherwise coil is present |
| 1438 | 84C9 | E6 49 | | INC | VALVE | ;do all 8 valves |
| 1439 | 84CB | A5 49 | | LDA | VALVE | |
| 1440 | 84CD | C9 09 | | CMP | #9 | |
| 1441 | 84CF | D0 AE | | BNE | SLF5 | |
| 1442 | 84D1 | 64 1E | | STZ | WCVALVES | ;drivers off |
| 1443 | 84D3 | 20 23 A4 | | JSR | AD_OFF | |
| 1444 | 84D6 | 20 2B A4 | | JSR | TIMERON | ;enable INT |
| 1445 | | | | | | |
| 1446 | 84D9 | 20 F3 85 | | JSR | SLFWAIT | |
| 1447 | 84DC | 20 82 A3 | | JSR | DKCLR | |
| 1448 | 84DF | B2 5A | | LDA | (MENUPTR) | ;show current mode |
| 1449 | 84E1 | C9 02 | | CMP | #2 | |
| 1450 | 84E3 | D0 19 | | BNE | SLF22 | ;running |
| 1451 | 84E5 | 20 9F A1 | | JSR | DISP_SOURCE | |
| 1452 | 84E8 | | | BACKUP | 1 | |
| 1456 | 84ED | A9 20 | | LDA | #' ' | |
| 1457 | 84EF | 20 10 A3 | | JSR | DCHAR | |
| 1458 | 84F2 | | | SET_CURSOR LINE2 | | |
| 1462 | 84F7 | | | MESSAGE 70 | | |
| 1466 | 84FC | 80 05 | | BRA | SLF23 | |
| 1467 | 84FE | | SLF22: | MESSAGE 71 | | ;or idle |
| 1471 | 8503 | 20 F3 85 | SLF23: | JSR | SLFWAIT | |
| 1472 | | | | | | |
| 1473 | 8506 | A5 61 | SLF30: | LDA | IBFR | ;if no shorts or opens, |
| 1474 | 8508 | 05 62 | | ORA | IBFR+1 | |
| 1475 | 850A | D0 0E | | BNE | SLF35 | |
| 1476 | 850C | 20 82 A3 | | JSR | DKCLR | |
| 1477 | 850F | | | MESSAGE 106 | | ;then show good status |
| 1481 | 8514 | 20 F3 85 | | JSR | SLFWAIT | |
| 1482 | 8517 | 4C A4 85 | | JMP | SLF60 | |
| 1483 | | | | | | |
| 1484 | 851A | 20 39 A4 | SLF35: | JSR | TIMER_OFF | |
| 1485 | 851D | A5 61 | | LDA | IBFR | ;if any opens |
| 1486 | 851F | F0 3E | | BEQ | SLF40 | |
| 1487 | 8521 | 20 82 A3 | | JSR | DKCLR | |
| 1488 | 8524 | | | SET | VALVE | ;then show them |

```
1492  8528                              MESSAGE 107
1496  852D                              SET_CURSOR LINE2
1500  8532   A9 23                LDA     #'#'
1501  8534   20 10 A3             JSR     DCHAR
1502  8537   66 61        SLF36:  ROR     IBFR
1503  8539   90 0C                BCC     SLF37
1504  853B   A5 49                LDA     VALVE
1505  853D   09 30                ORA     #ASCMASK
1506  853F   20 10 A3             JSR     DCHAR
1507  8542   A9 2C                LDA     #','
1508  8544   20 10 A3             JSR     DCHAR
1509  8547   E6 49        SLF37:  INC     VALVE
1510  8549   A5 49                LDA     VALVE
1511  854B   C9 09                CMP     #9
1512  854D   D0 E8                BNE     SLF36
1513  854F                        BACKUP  1
1517  8554   A9 20                LDA     #' '
1518  8556   20 10 A3             JSR     DCHAR
1519  8559   20 28 A4             JSR     TIMERON
1520  855C   20 F3 85             JSR     SLFWAIT
1521
1522  855F   20 39 A4     SLF40:  JSR     TIMER_OFF
1523  8562   A5 62                LDA     IBFR+1          ;if any shorts
1524  8564   F0 3E                BEQ     SLF60
1525  8566   20 82 A3             JSR     DKCLR
1526  8569                        SET     VALVE           ;then show them
1530  856D                        MESSAGE 108
1534  8572                        SET_CURSOR LINE2
1538  8577   A9 23                LDA     #'#'
1539  8579   20 10 A3             JSR     DCHAR
1540  857C   66 62        SLF46:  ROR     IBFR+1
1541  857E   90 0C                BCC     SLF47
1542  8580   A5 49                LDA     VALVE
1543  8582   09 30                ORA     #ASCMASK
1544  8584   20 10 A3             JSR     DCHAR
1545  8587   A9 2C                LDA     #','
1546  8589   20 10 A3             JSR     DCHAR
1547  858C   E6 49        SLF47:  INC     VALVE
1548  858E   A5 49                LDA     VALVE
1549  8590   C9 09                CMP     #9
1550  8592   D0 E8                BNE     SLF46
1551  8594                        BACKUP  1
1555  8599   A9 20                LDA     #' '
1556  859B   20 10 A3             JSR     DCHAR
1557  859E   20 28 A4             JSR     TIMERON
1558  85A1   20 F3 85             JSR     SLFWAIT
1559
1560  85A4                SLF60:
1561  85A4   20 39 A4     SLF70:  JSR     TIMER_OFF
1562  85A7   20 82 A3             JSR     DKCLR           ;show system time and version
1563  85AA   A2 05                LDX     #5
1564  85AC   BD 76 82     SLF71:  LDA     HOUR,X          ;move current time to working area
1565  85AF   95 65                STA     IBFR+4,X
1566  85B1   CA                   DEX
1567  85B2   10 F8                BPL     SLF71
1568  85B4   20 BE A5             JSR     DISPTIME
1569  85B7                        SKIP    1
```

```
1573  85BC                              MESSAGE 110
1577  85C1                              SET_CURSOR LINE2
1581  85C6   20 7A A5                   JSR      DISPLAY_DOW
1582  85C9                              SKIP     2
1586  85CE   20 84 A5                   JSR      DISPLAY_DATE
1587  85D1   20 28 A4                   JSR      TIMERON
1588  85D4   20 F3 85                   JSR      SLFWAIT
1589
1590  85D7   20 82 A3                   JSR      DKCLR
1591  85DA                              MESSAGE 113              ;or repeat self test?
1595  85DF                              QM
1600  85E5   20 9F AB         SLF80:    JSR      GETHKEY
1601  85E8   C9 10                      CMP      #NOKEY
1602  85EA   F0 3D                      BEQ      SECRET_CODE
1603  85EC   C9 20                      CMP      #OKKEY
1604  85EE   D0 F5                      BNE      SLF80
1605  85F0   4C 69 84                   JMP      SLF
1606
1607                          SLFWAIT:                            ;wait the normal scroll time
1608  85F3   A9 64                      LDA      #SRATE4
1609  85F5   85 BD                      STA      R2
1610  85F7   A0 28            SLFW0:    LDY      #40
1611  85F9   20 C8 A2                   JSR      WAITMS
1612  85FC   20 9F AB                   JSR      GETHKEY
1613  85FF   C6 BD                      DEC      R2
1614  8601   D0 F4                      BNE      SLFW0
1615  8603   60                         RTS
1616
1617                          ISVALVE:                            ;test valve POSITION
1618                                                              ;in: AD and WCVALVES must be on
1619                                                              ;out: LSB have reading, carry set if valve
1620  8604   A5 DE                      LDA      POSITION
1621  8606   29 07                      AND      #00000111B
1622  8608   09 08                      ORA      #00001000B
1623  860A   85 45                      STA      ADCHANNEL
1624  860C   A5 DE                      LDA      POSITION
1625  860E   20 C7 A4                   JSR      VHI
1626  8611   A0 32                      LDY      #ADWAIT         ;settle
1627  8613   20 C8 A2                   JSR      WAITMS
1628  8616   78                         SEI
1629  8617   20 3D A4                   JSR      READ            ;let's see what's out there
1630  861A   64 07                      STZ      VALVE_ENABLE    ;valve line dismissed
1631  861C   58                         CLI
1632  861D   C9 A8                      CMP      #168            ;if <3.3 volts
1633  861F                              BLT      ISV2            ;then line open
1636  8621   C9 E6            ISV0:     CMP      #230            ;if >=4.5 volts
1637  8623                              BGE      ISV2            ;then line shorted
1640  8625   38               ISV1:     SEC                      ;otherwise valve is present
1641  8626   60                         RTS
1642  8627   18               ISV2:     CLC                      ;no valve
1643  8628   60                         RTS
1644
1645
1646                          ;----------------------------------
1647                          ;    SECRET CODE
1648                          ;----------------------------------
1649
```

```
1650                      SECRET_CODE:                    ;enter secret code
1651
1652  8629   20 CB AD                JSR     ISRUNNING     ;if running,
1653  862C   90 18                   BCC     FSTOP
1654  862E   20 82 A3    PROG10:     JSR     DKCLR
1655  8631                           MESSAGE 181           ;verify that user wants to STOP
1659  8636   20 06 AB    PROG11:     JSR     GETKEY
1660  8639   C9 08                   CMP     #HELPKEY
1661  863B   D0 F9                   BNE     PROG11
1662  863D                           HELP    24
1667  8644   80 E0                   BRA     PROG10
1668
1669
1670
1671
1672  8646                           INCLUDE MENU.ASM
1673                                 ;---------------------------
1674                                 ;   MAIN MENU SCREEN
1675                                 ;---------------------------
1676
1677                      FSTOP:                           ;exit from some mode or entry via key in
1678  8646   A2 FF                   LDX     #$FF          ;re-init stack
1679  8648   9A                      TXS
1680  8649   20 82 A3                JSR     DKCLR         ;restore display and keys
1681  864C   58                      CLI                   ;enable interrupts
1682  864D   64 07                   STZ     VALVE_ENABLE
1683  864F   20 23 A4                JSR     AD_OFF
1684  8652   20 9D A4                JSR     ALL_VALVES_OFF
1685  8655   90 0B                   BCC     FS2
1686  8657   20 82 A3                JSR     DKCLR         ;turn off valves
1687  865A                           MESSAGE 125
1691  865F   20 A7 AB                JSR     MSGWAIT
1692  8662   20 CB AD    FS2:        JSR     ISRUNNING     ;if cycling
1693  8665   90 1B                   BCC     MAIN_MENU
1694  8667   A9 06                   LDA     #$06          ;then tell history
1695  8669   20 CE AA                JSR     HOPENF
1696  866C   20 82 A3                JSR     DKCLR
1697  866F                           MESSAGE 69
1701  8674   20 34 83                JSR     HALT_RUN      ;and stop it
1702  8677   A9 05                   LDA     #5
1703  8679   8D 1F 83                STA     RUNNING
1704  867C   20 28 A4                JSR     TIMERON
1705  867F   20 A7 AB                JSR     MSGWAIT
1706
1707                      MAIN_MENU:                       ;jumping off place into modes
1708  8682   20 E0 98                JSR     ALL_ENABLE    ;enable all valves
1709  8685   20 28 A4                JSR     TIMERON
1710  8688   20 82 A3                JSR     DKCLR         ;welcome aboard
1711  868B                           MESSAGE 115
1715  8690   A9 39                   LDA     #00111001B    ;all keys enabled
1716  8692   85 5E                   STA     KEYMASK
1717  8694                           OK
1722  869A   20 06 AB    MS9:        JSR     GETKEY
1723  869D   C9 20                   CMP     #OKKEY
1724  869F   F0 0D                   BEQ     MS10
1725  86A1   C9 08                   CMP     #HELPKEY
1726  86A3   D0 F5                   BNE     MS9
```

```
1727  86A5                            HELP     13
1732  86AC    80 D4                   BRA      MAIN_MENU
1733  86AE                   MS10:    SET      MODE
1737  86B2    64 59                   STZ      MODE+1
1738  86B4    4C 8E AC                JMP      GETMENU
1739
1740                         ;--------------------------------
1741                         ;    MAIN MENU - IDLE
1742                         ;--------------------------------
1743
1744                         IDLE_MODE:                      ;do nothing mode
1745  86B7    20 82 A3                JSR      DKCLR
1746  86BA                            MESSAGE 4
1750  86BF    A9 3A                   LDA      #':'
1751  86C1    20 10 A3                JSR      DCHAR
1752  86C4                            SET_CURSOR LINE2
1756  86C9    A9 01                   LDA      #1
1757  86CB                            SELECT_SOK 1,2,104
1767  86DC    B0 19                   BCS      IM4
1768  86DE    C9 02                   CMP      #2
1769  86E0    D0 03                   BNE      IM1
1770  86E2    4C 46 86                JMP      FSTOP
1771
1772  86E5    20 82 A3       IM1:     JSR      DKCLR
1773  86E8                            MESSAGE 99              ;wait for power key gone
1777  86ED    9C 1F 03                STZ      RUNNING
1778  86F0    20 06 AB       IM0:     JSR      GETKEY          ;or STOP
1779  86F3    C9 08                   CMP      #HELPKEY
1780  86F5    D0 F9                   BNE      IM0
1781  86F7                   IM4:     HELP     21
1786  86FE    80 B7                   BRA      IDLE_MODE
1787
1788                         ;--------------------------------
1789                         ;    SET UP ALT SCHEDULES
1790                         ;--------------------------------
1791
1792
1793                         ;--------------------------------
1794                         ;    SET UP SYSTEM
1795                         ;--------------------------------
1796
1797                         SETUP_SYSTEM:                   ;select function
1798
1799                         ;--------------------------------
1800                         ;    set date & time
1801                         ;--------------------------------
1802
1803                         SET_TIME:                       ;set up time and day
1804  8700    78                      SEI
1805  8701    A2 05                   LDX      #5
1806  8703    BD 76 02       STI0:    LDA      HOUR,X          ;move current time to working area
1807  8706    95 65                   STA      IBFR+4,X
1808  8708    CA                      DEX
1809  8709    10 F8                   BPL      STI0
1810  870B    58                      CLI
1811  870C    20 82 A3       STI1:    JSR      DKCLR           ;show working time and date
1812  870F                            MESSAGE 89
```

```
1816  8714  20 BE A5              JSR     DISPTIME
1817  8717                        SET_CURSOR LINE2
1821  871C  20 7A A5              JSR     DISPLAY_DOW
1822  871F                        SKIP    2
1826  8724  20 84 A5              JSR     DISPLAY_DATE
1827  8727                        OK
1832  872D  20 06 AB     STI2:    JSR     GETKEY          ;wait for an answer
1833  8730  F0 FB                 BEQ     STI2
1834  8732  C9 20                 CMP     #OKKEY
1835  8734  F0 0D                 BEQ     STIOK           ;time good, exit
1836  8736  C9 10                 CMP     #NOKEY
1837  8738  F0 21                 BEQ     STI10           ;change time
1838  873A                        HELP    39
1843  8741  80 C9                 BRA     STI1
1844  8743  78           STIOK:   SEI
1845  8744  A2 05                 LDX     #5              ;OK key, keep time as displayed
1846  8746  B5 65        ST9:     LDA     IBFR+4,X
1847  8748  9D 76 02              STA     HOUR,X
1848  874B  CA                    DEX
1849  874C  10 F8                 BPL     ST9
1850  874E  AE 79 02              LDX     MONTH
1851  8751  BD 90 F7              LDA     DAYTBL,X
1852  8754  8D 7C 02              STA     DIM
1853  8757  58                    CLI
1854  8758  4C 8E AC              JMP     GETMENU
1855
1856  875B  20 82 A3     STI10:   JSR     DKCLR           ;change time
1857  875E                        MESSAGE 89
1861  8763                        SET_CURSOR 8            .;get time
1865  8768  20 7C A7              JSR     GETTIME
1866  876B  90 09                 BCC     STI12
1867  876D           STIH:        HELP    39
1872  8774  80 E5                 BRA     STI10
1873  8776           STI12:       SET_CURSOR LINE2        ;get day of week
1877  877B  A5 67                 LDA     IBFR+6
1878  877D                        SELECT_MUL 1,7,91
1888  878E  B0 DD                 BCS     STIH
1889  8790  85 67                 STA     IBFR+6
1890
1891  8792           STI30:       NOBLINK                 ;input the date
1895  8796                        SET_CURSOR LINE2+5
1899  879B  A5 68                 LDA     IBFR+7
1900  879D                        SELECT_MUL 1,12,77
1910  87AE  B0 BD                 BCS     STIH
1911  87B0  85 68        STI33:   STA     IBFR+7          ;keep selection
1912  87B2                        SET_CURSOR LINE2+9
1916  87B7                        NOBLINK
1920  87BB                        SET     IBFR+1          ;select day based on days in month
1924  87BF  A6 68                 LDX     IBFR+7
1925  87C1  BD 80 F7              LDA     DAYTBL,X
1926  87C4  85 63                 STA     IBFR+2
1927  87C6  A5 69                 LDA     IBFR+8
1928  87C8  85 61                 STA     IBFR             ;default=present day,
1929  87CA  DD 80 F7              CMP     DAYTBL,X         ;unless > present day,
1930  87CD  F0 06                 BEQ     STI35
1931  87CF                        BLT     STI35
1934  87D1                        SET     IBFR             ;then start at day=1
```

```
1938  87D5  20 F9 A8     STI35:  JSR     GETNUM
1939  87D8  90 03                BCC     STI36
1940  87DA  4C 6D 87             JMP     STIH
1941  87DD  85 69        STI36:  STA     IBFR+8          ;keep day
1942  87DF                       NOBLINK
1946  87E3                       SET_CURSOR LINE2+11
1950  87E8  A9 2C                LDA     #','
1951  87EA  20 10 A3             JSR     DCHAR
1952  87ED  A9 27                LDA     #$27
1953  87EF  20 10 A3             JSR     DCHAR
1954  87F2  A5 6A                LDA     IBFR+9
1955  87F4                       SELECT  0,99            ;select year
1963  8801  90 03                BCC     STI34
1964  8803  4C 6D 87             JMP     STIH
1965  8806  85 6A        STI34:  STA     IBFR+9          ;keep year
1966  8808  4C 0C 87             JMP     STI1            ;verify
1967
1968                             ;-------------------------------
1969                             ;       set site info
1970                             ;-------------------------------
1971
1972                     SET_SITE:                        ;set up site parameters
1973
1974
1975  880B  64 49                STZ     VALVE
1976  880D  20 A7 9E     S2SKIP: JSR     NXTVALVE
1977  8810  90 03                BCC     S2NEXT
1978  8812  4C F4 88             JMP     S2END
1979  8815                S2NEXT:
1980  8815  A6 49                LDX     VALVE           ;start with existing site info
1981  8817  BD CB 82             LDA     TERRAIN,X
1982  881A  85 CB                STA     DEFAULT+2
1983  881C  BD D4 82             LDA     SPRINKLER,X
1984  881F  85 CC                STA     DEFAULT+3
1985  8821  4C 94 88             JMP     S2CONFIRM
1986
1987                     S2ENTRY:                         ;enter new site info
1988  8824  20 82 A3             JSR     DKCLR
1989  8827  20 4E A1             JSR     DSTA
1990  882A  A9 3A                LDA     #':'
1991  882C  20 10 A3             JSR     DCHAR
1992  882F                       MESSAGE 213
1996  8834                       SET_CURSOR LINE2
2000  8839  A5 CB                LDA     DEFAULT+2
2001  883B                       SELECT_SOK 1,6,215      ;select terrain
2011  884C  90 09                BCC     SS26
2012  884E                       HELP    36
2017  8855  80 CD                BRA     S2ENTRY
2018  8857  A5 61        SS26:   LDA     IBFR
2019  8859  85 CB                STA     DEFAULT+2
2020  885B  20 82 A3             JSR     DKCLR
2021  885E  20 4E A1             JSR     DSTA
2022  8861  A9 3A                LDA     #':'
2023  8863  20 10 A3             JSR     DCHAR
2024  8866                       MESSAGE 213
2028  8868                       SET_CURSOR LINE2
2032  886B  A5 CC                LDA     DEFAULT+3
```

```
2033   8872                                SELECT_SOK  1,7,221      ;select sprinkler type
2043   88B3    90 09                       BCC         SS2H
2044   88B5                                HELP        36
2049   88BC    80 96                       BRA         S2ENTRY
2050   88BE    A5 61           SS2H:       LDA         IBFR
2051   88C0    85 CC                       STA         DEFAULT+3
2052   88C2    80 00                       BRA         S2CONFIRM
2053
2054                           S2CONFIRM:                           ;show default and confirm
2055   88C4    20 82 A3                    JSR         DKCLR
2056   88C7    20 E5 9F                    JSR         FLASH
2057   88CA    20 4E A1                    JSR         DSTA
2058   88CD    A9 3A                       LDA         #':'
2059   88CF    20 10 A3                    JSR         DCHAR
2060   88D2    A5 CB                       LDA         DEFAULT+2
2061   88D4    18                          CLC
2062   88D5    69 D6                       ADC         #214
2063   88D7    AA                          TAX
2064   88D8    20 D7 A2                    JSR         DISPLAY_MSG
2065   88DB                                BACKUP      1
2069   88B0    A9 2C                       LDA         #','
2070   88B2    20 10 A3                    JSR         DCHAR
2071   88B5                                SET_CURSOR  LINE2
2075   88BA    A5 CC                       LDA         DEFAULT+3
2076   88BC    18                          CLC
2077   88BD    69 DC                       ADC         #220
2078   88BF    AA                          TAX
2079   88C0    20 D7 A2                    JSR         DISPLAY_MSG
2080   88C3                                OK
2085   88C9    20 06 AB        S2C:        JSR         GETKEY
2086   88CC    C9 20                       CMP         #OKKEY
2087   88CE    F0 15                       BEQ         S2OK
2088   88D0    C9 10                       CMP         #NOKEY
2089   88D2    D0 03                       BNE         S2P
2090   88D4    4C 24 88                    JMP         S2ENTRY
2091   88D7    C9 08           S2P:        CMP         #HELPKEY
2092   88D9    D0 EE                       BNE         S2C
2093   88DB                                HELP        76
2098   88E2    4C 94 88                    JMP         S2CONFIRM
2099
2100   88E5    A6 49           S2OK:       LDX         VALVE        ;default is confirmed
2101   88E7    A5 CB                       LDA         DEFAULT+2
2102   88E9    9D CB 02                    STA         TERRAIN,X
2103   88EC    A5 CC                       LDA         DEFAULT+3
2104   88EE    9D D4 02                    STA         SPRINKLER,X
2105   88F1    4C 0D 88                    JMP         S2SKIP
2106
2107   88F4    4C BE AC        S2END:      JMP         GETMENU
2108
2109                           ;--------------------------------
2110                           ;       wire checking
2111                           ;--------------------------------
2112
2113   88F7                    WIRE_CHECK:
2114   88F7                    WIRE_CHECKV:
2115   88F7    20 82 A3                    JSR         DKCLR        ;part 1, fix all shorts
2116   88FA                                MESSAGE     152
2120   88FF    20 0E A4                    JSR         AD_ON
```

```
2121    8902              SET     WCVALVES    ;drivers on
2125    8906  64 61       STZ     IBFR        ;IBFR=which positions have valves
2126    8908              OK
2131    890E        LV38: SET_CURSOR 8
2135    8913  64 DE       STZ     POSITION    ;start at top position
2136    8915  64 BE       STZ     R3          ;no shorts yet
2137    8917  64 62       STZ     IBFR+1
2138
2139    8919  20 04 86 LV35: JSR  ISVALVE     ;check AD line
2140    891C  C9 A8       CMP     #168        ;if <=3.3 volts
2141    891E  B0 07       BCS     LV31
2142    8920  18          CLC                 ;then line open
2143    8921  66 62       ROR     IBFR+1
2144    8923  A9 6F       LDA     #'o'
2145    8925  80 14       BRA     LV33
2146    8927  C9 E6  LV31: CMP    #230        ;if >4.5 volts
2147    8929  90 0B       BCC     LV32
2148    892B              SET     R3          ;then line shorted
2152    892F  18          CLC
2153    8930  66 62       ROR     IBFR+1
2154    8932  A9 78       LDA     #'x'
2155    8934  80 05       BRA     LV33
2156    8936  38     LV32: SEC                ;otherwise coil is present
2157    8937  66 62       ROR     IBFR+1
2158    8939  A9 56       LDA     #'V'
2159    893B  20 10 A3 LV33: JSR  OCHAR
2160    893E  A0 64       LDY     #100        ;1/10 duty cycle to avoid power drain
2161    8940  20 C0 A2    JSR     WAITMS
2162    8943  20 06 AB LV36: JSR  GETKEY      ;check keyboard after each read
2163    8946  C9 20       CMP     #OKKEY
2164    8948  F0 1B       BEQ     LV40
2165    894A  C9 08       CMP     #HELPKEY
2166    894C  D0 09       BNE     LV37
2167    894E              HELP    109
2172    8955  80 A8       BRA     WIRE_CHECKV
2173    8957  E6 DE  LV37: INC    POSITION
2174    8959  A5 DE       LDA     POSITION
2175    895B  C9 08       CMP     #8          ;do all 8 valves
2176    895D  D0 BA       BNE     LV35
2177    895F  A5 62       LDA     IBFR+1
2178    8961  85 61       STA     IBFR
2179    8963  80 A9       BRA     LV38
2180
2181    8965  64 1E  LV40: STZ    WCVALVES    ;drivers off
2182    8967  20 23 A4    JSR     AD_OFF
2183    896A  4C 8E AC    JMP     GETMENU
2184
2185                 ;--------------------------------
2186                 ;       station set up
2187                 ;--------------------------------
2188
2189    896D        STATION_SETUP:
2190
2191                 VASSIGN:                  ;assign valve IDs
2192    896D  20 82 A3 LV50: JSR  DKCLR       ;view current ID?
2193    8970              MESSAGE 171
2197    8975              OK
```

| | | | | | | |
|---|---|---|---|---|---|---|
| 2202 | 897B | 20 06 AB | LV51: | JSR | GETKEY | |
| 2203 | 897E | C9 20 | | CMP | #OKKEY | |
| 2204 | 8980 | F0 11 | | BEQ | LV60 | |
| 2205 | 8982 | C9 10 | | CMP | #NOKEY | |
| 2206 | 8984 | F0 39 | | BEQ | LV70 | |
| 2207 | 8986 | C9 08 | | CMP | #HELPKEY | |
| 2208 | 8988 | D0 F1 | | BNE | LV51 | |
| 2209 | 898A | | | HELP | 110 | |
| 2214 | 8991 | 80 DA | | BRA | LV50 | |
| 2215 | | | | | | |
| 2216 | 8993 | 20 82 A3 | LV60: | JSR | DKCLR | ;show the current IDs |
| 2217 | 8996 | | | MESSAGE 173 | | |
| 2221 | 899B | 20 4B AC | | JSR | VID2BFR | |
| 2222 | 899E | 20 6A AC | | JSR | DISPID | |
| 2223 | 89A1 | | | OK | | |
| 2228 | 89A7 | 20 06 AB | LV61: | JSR | GETKEY | ;wait for key |
| 2229 | 89AA | C9 20 | | CMP | #OKKEY | |
| 2230 | 89AC | F0 11 | | BEQ | LV70 | |
| 2231 | 89AE | C9 10 | | CMP | #NOKEY | |
| 2232 | 89B0 | F0 0D | | BEQ | LV70 | |
| 2233 | 89B2 | C9 08 | | CMP | #HELPKEY | |
| 2234 | 89B4 | D0 F1 | | BNE | LV61 | |
| 2235 | 89B6 | | | HELP | 110 | |
| 2240 | 89BD | 80 D4 | | BRA | LV60 | |
| 2241 | | | | | | |
| 2242 | 89BF | 20 82 A3 | LV70: | JSR | DKCLR | ;enter new ID? |
| 2243 | 89C2 | | | MESSAGE 172 | | |
| 2247 | 89C7 | | | QM | | |
| 2252 | 89CD | 20 06 AB | LV71: | JSR | GETKEY | |
| 2253 | 89D0 | C9 20 | | CMP | #OKKEY | |
| 2254 | 89D2 | F0 14 | | BEQ | LV75 | |
| 2255 | 89D4 | C9 10 | | CMP | #NOKEY | |
| 2256 | 89D6 | D0 03 | | BNE | LV7B | |
| 2257 | 89D8 | 4C 8E AC | | JMP | GETMENU | |
| 2258 | 89DB | C9 08 | LV7B: | CMP | #HELPKEY | |
| 2259 | 89DD | D0 EE | | BNE | LV71 | |
| 2260 | 89DF | | | HELP | 111 | |
| 2265 | 89E6 | 80 D7 | | BRA | LV70 | |
| 2266 | | | | | | |
| 2267 | 89E8 | | LV75: | SET | VALVE | ;enter new ID |
| 2271 | 89EC | 20 85 AC | | JSR | CLR_IDBFR | |
| 2272 | | | | | | |
| 2273 | 89EF | 20 8E A4 | | JSR | AD_ON | |
| 2274 | 89F2 | | | SET | WCVALVES | ;drivers on |
| 2278 | 89F6 | 64 DE | | STZ | POSITION | ;find which positions have valves |
| 2279 | 89F8 | 64 66 | | STZ | IBFR+5 | |
| 2280 | 89FA | 20 04 B6 | LV80: | JSR | ISVALVE | |
| 2281 | 89FD | 66 66 | | ROR | IBFR+5 | ;set bit in IBFR+5 if valve present |
| 2282 | 89FF | E6 DE | | INC | POSITION | |
| 2283 | 8A01 | A5 DE | | LDA | POSITION | |
| 2284 | 8A03 | C9 08 | | CMP | #8 | |
| 2285 | 8A05 | D0 F3 | | BNE | LV80 | |
| 2286 | | | | | | |
| 2287 | 8A07 | 64 E1 | | STZ | R5 | ;R5 = how many stations present |
| 2288 | 8A09 | A5 66 | | LDA | IBFR+5 | |
| 2289 | 8A0B | A2 08 | | LDX | #8 | |
| 2290 | 8A0D | 6A | LV7J: | ROR | A | |
| 2291 | 8A0E | 90 02 | | BCC | LV7K | |

```
2292  8A10  E6 E1                INC    R5
2293  8A12  CA           LV7K:   DEX
2294  8A13  D0 F3                BNE    LV7J
2295
2296  8A15  A5 E1                LDA    R5
2297  8A17  D0 09                BNE    LV7C
2298  8A19                       HELP   34              ;no stations
2303  8A20  80 9D                BRA    LV70
2304  8A22  20 82 A3     LV7C:   JSR    DKCLR           ;ID all?
2305  8A25  A5 E1                LDA    R5
2306  8A27  09 30                ORA    #ASCMASK
2307  8A29  20 10 A3             JSR    DCHAR
2308  8A2C                       MESSAGE 27
2312  8A31  A5 E1                LDA    R5
2313  8A33  09 30                ORA    #ASCMASK
2314  8A35  20 10 A3             JSR    DCHAR
2315  8A38                       QM
2320  8A3E  20 86 AB     LV7D:   JSR    GETKEY
2321  8A41  C9 20                CMP    #OKKEY
2322  8A43  F0 3C                BEQ    LV7G
2323  8A45  C9 10                CMP    #NOKEY
2324  8A47  F0 0D                BEQ    LV76
2325  8A49  C9 08                CMP    #HELPKEY
2326  8A4B  D0 F1                BNE    LV7D
2327  8A4D                       HELP   112
2332  8A54  80 CC                BRA    LV7C
2333
2334  8A56  A5 E1        LV76:   LDA    R5              ;don't ID all
2335  8A58  C9 01                CMP    #1
2336  8A5A  D0 03                BNE    LV7L
2337  8A5C  4C BF 89             JMP    LV70
2338  8A5F  20 82 A3     LV7L:   JSR    DKCLR
2339  8A62                       MESSAGE 199            ;how many to ID then?
2343  8A67  A9 01                LDA    #1
2344  8A69  85 61                STA    IBFR
2345  8A6B  85 62                STA    IBFR+1
2346  8A6D  A5 E1                LDA    R5              ;must be <= valves present
2347  8A6F  85 63                STA    IBFR+2
2348  8A71  20 F9 A8             JSR    GETNUM
2349  8A74  90 09                BCC    LV7A
2350  8A76                       HELP   112
2355  8A7D  80 D7                BRA    LV76
2356  8A7F  85 E1        LV7A:   STA    R5              ;in R5
2357
2358  8A81  A5 66        LV76:   LDA    IBFR+5
2359  8A83  85 61                STA    IBFR
2360
2361  8A85  A5 61        LV81:   LDA    IBFR            ;IBFR=which positions have valves to ID
2362  8A87  F0 09                BEQ    LV8A            ;done when all positions are IDed
2363  8A89  A5 49                LDA    VALVE           ;or # of stations IDed
2364  8A8B  38                   SEC
2365  8A8C  E9 01                SBC    #1
2366  8A8E  C5 E1                CMP    R5
2367  8A90  D0 03                BNE    LV7H
2368  8A92  4C 0D 8B     LV8A:   JMP    LV90
2369  8A95  20 82 A3     LV7H:   JSR    DKCLR           ;show current status
2370  8A98                       MESSAGE 174
```

```
2374  8A9D                        SET_CURSOR LINE2+8
2378  8AA2  20 61 A1              JSR     DVALVE
2379  8AA5                        SET_CURSOR 8
2383  8AAA  20 6A AC              JSR     DISPID
2384  8AAD  A5 61        LV82:    LDA     IBFR            ;look for a valve open
2385  8AAF  85 62                 STA     IBFR+1
2386  8AB1  A9 08                 LDA     #8
2387  8AB3  85 45                 STA     ADCHANNEL
2388  8AB5  64 DE                 STZ     POSITION
2389  8AB7  66 62        LV83:    ROR     IBFR+1          ;if position has a valve,
2390  8AB9  90 46                 BCC     LVBB
2391  8ABB  64 BE                 STZ     R3
2392
2393  8ABD  A5 BE        LVLP:    LDA     R3
2394  8ABF  D0 0B                 BNE     LVL1
2395  8AC1  20 04 86              JSR     ISVALVE         ;1st look for open
2396  8AC4  B0 1F                 BCS     LV87            ;nope
2397  8AC6                        SET     R3              ;yes
2401  8ACA  80 19                 BRA     LV87
2402  8ACC  20 04 86     LVL1:    JSR     ISVALVE         ;then look for valve present again
2403  8ACF  90 14                 BCC     LV87
2404
2405  8AD1  A6 DE        LV86:    LDX     POSITION        ;valve returns
2406  8AD3  A5 49                 LDA     VALVE
2407  8AD5  9D 5E 02              STA     IDBFR,X         ;store it's position
2408  8AD8  A6 DE                 LDX     POSITION        ;remove bit from IBFR
2409  8ADA  A5 61                 LDA     IBFR
2410  8ADC  3D 76 F8              AND     BITOFF,X
2411  8ADF  85 61                 STA     IBFR
2412  8AE1  E6 49                 INC     VALVE           ;look for next valve
2413  8AE3  80 A0                 BRA     LV81            ;after updating display
2414
2415  8AE5  20 86 AB     LV87:    JSR     GETKEY          ;check for key pressed
2416  8AE8  C9 08                 CMP     #HELPKEY
2417  8AEA  D0 0A                 BNE     LV89
2418  8AEC                        HELP    113
2423  8AF3  4C 85 8A              JMP     LV81
2424  8AF6  A0 64        LV89:    LDY     #100            ;wait for power to recover
2425  8AF8  20 C0 A2              JSR     WAITMS
2426  8AFB  A5 BE                 LDA     R3
2427  8AFD  F0 02                 BEQ     LVBB            ;no open, try next position
2428  8AFF  80 BC                 BRA     LVLP            ;keep waiting for valve
2429
2430                     LVBB:                            ;next position
2431  8B01  E6 45                 INC     ADCHANNEL
2432  8B03  E6 DE                 INC     POSITION
2433  8B05  A5 DE                 LDA     POSITION
2434  8B07  C9 08                 CMP     #8
2435  8B09  D0 AC                 BNE     LV83
2436  8B0B  80 A0                 BRA     LV82
2437
2438  8B0D  64 1E        LV90:    STZ     WCVALVES        ;ID done
2439  8B0F  20 23 A4              JSR     AD_OFF
2440  8B12  20 82 A3              JSR     DKCLR
2441  8B15                        MESSAGE 175
2445  8B1A                        SET_CURSOR 8
2449  8B1F  20 6A AC              JSR     DISPID
2450  8B22                        SET_CURSOR LINE2+8
```

```
2454  8B27                              OK
2459  8B2D    20 06 AB    LV91:  JSR    GETKEY
2460  8B30    C9 10              CMP    #NOKEY       ;reject it and do over
2461  8B32    D0 03              BNE    LV93
2462  8B34    4C BF 89           JMP    LV70
2463  8B37    C9 20       LV93:  CMP    #OKKEY       ;or accept it
2464  8B39    F0 0D              BEQ    LV95
2465  8B3B    C9 08       LV92:  CMP    #HELPKEY
2466  8B3D    D0 EE              BNE    LV91
2467  8B3F                       HELP   114
2472  8B46    80 C5              BRA    LV90
2473
2474                       LV95:                     ;save new ID, enable all IDed valves
2475  8B48    20 16 AC           JSR    BFR2VID
2476  8B4B    4C 8E AC           JMP    GETMENU
2477
2478                       ;-----------------------------
2479                       ;    sensor set up
2480                       ;-----------------------------
2481
2482
2483                       ;-----------------------------
2484                       ;    secret codes
2485                       ;-----------------------------
2486
2487  8B4E               SET_CODES:
2488  8B4E    20 82 A3           JSR    DKCLR        ;temporary code to reset RAM
2489  8B51                       MESSAGE 170
2493  8B56    20 06 AB    SC01:  JSR    GETKEY       ;allow for STOP key
2494  8B59    A5 13              LDA    STATUS2
2495  8B5B    29 38              AND    #00111000B   ;look for HELP-NO-OK
2496  8B5D    C9 38              CMP    #00111000B
2497  8B5F    D0 F5              BNE    SC01
2498  8B61    A5 13       SC02:  LDA    STATUS2      ;wait for keys released
2499  8B63    D0 FC              BNE    SC02
2500  8B65    20 39 A4           JSR    TIMER_OFF
2501  8B68    20 7D A3           JSR    DISPLAY_OFF
2502  8B6B    64 40              STZ    CKSUM
2503  8B6D    4C 00 80           JMP    RESET
2504
2505
2506                       ;-----------------------------
2507                       ;    HISTORY
2508                       ;-----------------------------
2509
2510                       HIST:                     ;history display
2511                                                 ;KEY (1st byte):
2512                                                 ;00XXVVVV    Valve start
2513                                                 ;01MMMMMM    Menu start
2514                                                 ;11XMMMMM    Function start
2515                                                 ;10XXXXXX    Time & Date stamp
2516
2517  8B70    20 82 A3           JSR    DKCLR        ;welcome msg
2518  8B73                       MESSAGE 180
2522  8B78                       OK
2527  8B7E    20 06 AB    HIB:   JSR    GETKEY
2528  8B81    C9 20              CMP    #OKKEY
2529  8B83    F0 0D              BEQ    HIA
```

```
2530  8B85  C9 8B              CMP   #HELPKEY
2531  8B87  D0 F5              BNE   HI8
2532  8B89                     HELP  7
2537  8B90  80 DE              BRA   HIST
2538
2539  8B92              HIA:   MOV16 HWRITE,HREAD
2545  8B9A  20 3C AA    HI8:   JSR   INC_HREAD    ;find oldest entry
2546  8B9D  B2 B5              LDA   (HREAD)
2547  8B9F  F0 F9              BEQ   HI8
2548  8BA1  64 41              STZ   LSB
2549
2550  8BA3  20 82 A3    HI2:   JSR   DKCLR        ;show a new history screen
2551  8BA6  E6 41              INC   LSB
2552  8BA8  A5 41              LDA   LSB
2553  8BAA  20 35 A6           JSR   D3D
2554  8BAD  A9 29              LDA   #')'
2555  8BAF  20 10 A3           JSR   DCHAR
2556  8BB2  B2 B5              LDA   (HREAD)
2557  8BB4  29 C0              AND   #11000000B
2558  8BB6  F0 11              BEQ   DH1          ;valve entry
2559  8BB8  C9 C0              CMP   #11000000B
2560  8BBA  D0 03              BNE   HI1
2561  8BBC  4C 2A 8C           JMP   DH20         ;function entry
2562  8BBF  C9 80       HI1:   CMP   #10000000B
2563  8BC1  D0 03              BNE   HI3
2564  8BC3  4C 86 8C           JMP   DH30         ;date and time entry
2565  8BC6  4C CF 8C    HI3:   JMP   DH50         ;menu entry
2566
2567  8BC9  A9 56       DH1:   LDA   #'V'         ;valve entry
2568  8BCB  20 10 A3           JSR   DCHAR        ;show valve
2569  8BCE  B2 B5              LDA   (HREAD)
2570  8BD0  29 0F              AND   #00001111B
2571  8BD2  09 30              ORA   #ASCMASK
2572  8BD4  20 10 A3           JSR   DCHAR
2573  8BD7  A9 3A              LDA   #':'
2574  8BD9  20 10 A3           JSR   DCHAR
2575  8BDC                     SKIP  1
2579  8BE1  A0 01              LDY   #1           ;show time valve started
2580  8BE3  B1 B5              LDA   (HREAD),Y
2581  8BE5  85 65              STA   IBFR+4
2582  8BE7  C8                 INY
2583  8BE8  B1 B5              LDA   (HREAD),Y
2584  8BEA  85 66              STA   IBFR+5
2585  8BEC  20 BE A5           JSR   DISPTIME
2586  8BEF                     SET_CURSOR LINE2
2590  8BF4  A0 04              LDY   #4           ;show duration
2591  8BF6  B1 B5              LDA   (HREAD),Y
2592  8BF8  85 CF              STA   OFFSET
2593  8BFA  C8                 INY
2594  8BFB  B1 B5              LDA   (HREAD),Y
2595  8BFD  85 D0              STA   OFFSET+1
2596  8BFF  20 CF AB           JSR   MIN2HM
2597  8C02  20 F3 A5           JSR   DISPDURATION
2598  8C05                     OK
2603  8C0B  20 06 AB    DH14:  JSR   GETKEY
2604  8C0E  C9 20              CMP   #OKKEY
2605  8C10  D0 03              BNE   DH15
```

```
2606   8C12    4C 09 8D              JMP      DH90
2607   8C15    C9 18        DH15:    CMP      #NOKEY
2608   8C17    D0 03                 BNE      DH16
2609   8C19    4C 13 8D              JMP      DH99
2610   8C1C    C9 08        DH16:    CMP      #HELPKEY
2611   8C1E    D0 EB                 BNE      DH14
2612   8C20                          HELP     64
2617   8C27    4C A3 8B              JMP      HI2
2618
2619                        DH20:                              ;function entry
2620   8C2A    A0 01                 LDY      #1
2621   8C2C    B1 B5                 LDA      (HREAD),Y        ;hour
2622   8C2E    85 65                 STA      IBFR+4
2623   8C30    C8                    INY
2624   8C31    B1 B5                 LDA      (HREAD),Y        ;minute
2625   8C33    85 66                 STA      IBFR+5
2626   8C35    20 BE A5              JSR      DISPTIME
2627   8C38                          SET_CURSOR LINE2
2631   8C3D    B2 B5                 LDA      (HREAD)          ;mode
2632   8C3F    29 0F                 AND      #00001111B
2633   8C41    18                    CLC                       ;show function 0-F
2634   8C42    69 A3                 ADC      #163
2635   8C44    AA                    TAX
2636   8C45    20 D7 A2              JSR      DISPLAY_MSG
2637   8C48    B2 B5                 LDA      (HREAD)          ;show dead time if SVL
2638   8C4A    29 0F                 AND      #00001111B
2639   8C4C    C9 01                 CMP      #1
2640   8C4E    D0 11                 BNE      DH23
2641   8C50    A0 04                 LDY      #4
2642   8C52    B1 B5                 LDA      (HREAD),Y
2643   8C54    85 CF                 STA      OFFSET
2644   8C56    C8                    INY
2645   8C57    B1 B5                 LDA      (HREAD),Y
2646   8C59    85 D0                 STA      OFFSET+1
2647   8C5B    20 CF AB              JSR      MIN2HM
2648   8C5E    20 F3 A5              JSR      DISPDURATION
2649   8C61                DH23:     OK
2654   8C67    20 06 AB    DH24:     JSR      GETKEY
2655   8C6A    C9 20                 CMP      #OKKEY
2656   8C6C    D0 03                 BNE      DH25
2657   8C6E    4C 09 8D              JMP      DH90
2658   8C71    C9 18        DH25:    CMP      #NOKEY
2659   8C73    D0 03                 BNE      DH26
2660   8C75    4C 13 8D              JMP      DH99
2661   8C78    C9 08        DH26:    CMP      #HELPKEY
2662   8C7A    D0 EB                 BNE      DH24
2663   8C7C                          HELP     66
2668   8C83    4C A3 8B              JMP      HI2
2669
2670   8C86                DH30:     MESSAGE 100               ;time and date stamp
2674   8C8B                          SET_CURSOR LINE2
2678   8C90    A0 01                 LDY      #1
2679   8C92    B1 B5                 LDA      (HREAD),Y        ;day of week
2680   8C94    85 67                 STA      IBFR+6
2681   8C96    C8                    INY
2682   8C97    B1 B5                 LDA      (HREAD),Y        ;month
2683   8C99    85 68                 STA      IBFR+7
2684   8C9B    C8                    INY
```

```
2685   8C9C   B1 B5                  LDA      (HREAD),Y         ;day
2686   8C9E   85 69                  STA      IBFR+8
2687   8CA0   C8                     INY
2688   8CA1   B1 B5                  LDA      (HREAD),Y         ;year
2689   8CA3   85 6A                  STA      IBFR+9
2690   8CA5   20 7A A5               JSR      DISPLAY_DOW
2691   8CA8                          SKIP     2
2695   8CAD   20 84 A5               JSR      DISPLAY_DATE
2696   8CB0                          OK
2701   8CB6   20 06 AB       DH31:   JSR      GETKEY
2702   8CB9   C9 20                  CMP      #OKKEY
2703   8CBB   F0 4C                  BEQ      DH98
2704   8CBD   C9 10                  CMP      #NOKEY
2705   8CBF   F0 52                  BEQ      DH99
2706   8CC1   C9 08                  CMP      #HELPKEY
2707   8CC3   D0 F1                  BNE      DH31
2708   8CC5                          HELP     65
2713   8CCC   4C A3 8B               JMP      HI2
2714
2715                          DH50:                             ;menu entry
2716   8CCF   A0 01                  LDY      #1
2717   8CD1   B1 B5                  LDA      (HREAD),Y         ;hour
2718   8CD3   85 65                  STA      IBFR+4
2719   8CD5   C8                     INY
2720   8CD6   B1 B5                  LDA      (HREAD),Y         ;minute
2721   8CD8   85 66                  STA      IBFR+5
2722   8CDA   20 BE A5               JSR      DISPTIME
2723   8CDD                          SET_CURSOR LINE2
2727   8CE2   A0 04                  LDY      #4
2728   8CE4   B1 B5                  LDA      (HREAD),Y         ;show msg #
2729   8CE6   AA                     TAX
2730   8CE7   20 D7 A2               JSR      DISPLAY_MSG
2731   8CEA                          OK
2736   8CF0   20 06 AB       DH54:   JSR      GETKEY
2737   8CF3   C9 20                  CMP      #OKKEY
2738   8CF5   F0 12                  BEQ      DH98
2739   8CF7   C9 10                  CMP      #NOKEY
2740   8CF9   F0 1B                  BEQ      DH99
2741   8CFB   C9 08                  CMP      #HELPKEY
2742   8CFD   D0 F1                  BNE      DH54
2743   8CFF                          HELP     66
2748   8D06   4C A3 8B               JMP      HI2
2749
2750   8D09   20 3C AA       DH98:   JSR      INC_HREAD         ;OK key
2751   8D0C   B2 B5                  LDA      (HREAD)
2752   8D0E   F0 03                  BEQ      DH99              ;zero key means HWRITE has been reached
2753   8D10   4C A3 8B               JMP      HI2
2754
2755   8D13   20 82 A3       DH99:   JSR      DKCLR             ;end of history
2756   8D16                          MESSAGE  50
2760   8D1B   20 A7 AB               JSR      MSGWAIT
2761   8D1E   20 A7 AB               JSR      MSGWAIT
2762   8D21   4C 8E AC               JMP      GETMENU
2763
2764                          ;------------------------------
2765                          ;    SEMI-AUTO RUN
2766                          ;------------------------------
```

```
2767                         SEMI_MODE:
2768   8D24                     HELP    0
2769   8D24                     JMP     GETMENU
2774   8D2B  4C 8E AC         ; STZ     RAIN_DELAY
2775                          ; SET     WCLK
2776                          ; JMP     RM20
2777
2778
2779                         ;-----------------------------
2780                         ;   AUTOMATIC RUN
2781                         ;-----------------------------
2782
2783                         AUTO_MODE:                      ;start watering
2784   8D2E  9C 1E 03           STZ     WCLK
2785   8D31  9C FD 02           STZ     RAIN_DELAY
2786   8D34  20 82 A3           JSR     DKCLR               ;want to delay?
2787   8D37                     MESSAGE 130
2791   8D3C                     QM
2796   8D42  20 06 AB     RM0:  JSR     GETKEY
2797   8D45  C9 10              CMP     #NOKEY
2798   8D47  F0 3B              BEQ     RM20
2799   8D49  C9 20              CMP     #OKKEY
2800   8D4B  F0 0D              BEQ     RM1
2801   8D4D  C9 88              CMP     #HELPKEY
2802   8D4F  D0 F1              BNE     RM0
2803   8D51                     HELP    116
2808   8D58  80 D4              BRA     AUTO_MODE
2809   8D5A  20 82 A3     RM1:  JSR     DKCLR               ;yes, select delay
2810   8D5D                     MESSAGE 131
2814   8D62                     SET_CURSOR LINE2+4
2818   8D67  A9 01              LDA     #1
2819   8D69                     SELECT  1,14
2827   8D76  90 09              BCC     RM2
2828   8D78                     HELP    116
2833   8D7F  80 AD              BRA     AUTO_MODE
2834   8D81  8D FD 02     RM2:  STA     RAIN_DELAY
2835
2836   8D84  20 D4 8F     RM20: JSR     EDVALVE             ;any valves to disable?
2837
2838                         RM25:                           ;ask if continue previous run
2839                                                         ;(if object area unchanged)
2840                                                         ;save daynum
2841
2842                         RM30:                           ;select base set up
2843   8D87  20 82 A3           JSR     DKCLR
2844   8D8A  A0 01              LDY     #1
2845   8D8C  B1 5A              LDA     (MENUPTR),Y
2846   8D8E  C9 10              CMP     #$10
2847   8D90  D0 07              BNE     RM31
2848   8D92                     MESSAGE 17                  ;auto
2852   8D97  80 05              BRA     RM32
2853   8D99                RM31: MESSAGE 18                 ;semi-auto
2857   8D9E  A9 3A        RM32: LDA     #':'
2858   8DA0  20 10 A3           JSR     DCHAR
2859   8DA3                     SET_CURSOR LINE2
2863   8DA8  A9 01              LDA     #1
2864   8DAA                     SELECT_SOK 1,8,203
2874   8DBB  90 09              BCC     RM33
```

```
2875  8DBD                          HELP     118
2880  8DC4   80 C1                  BRA      RM30
2881  8DC6   C9 08         RM33:    CMP      #8
2882  8DC8   D0 03                  BNE      RM39
2883  8DCA   4C 46 86               JMP      FSTOP
2884  8DCD   85 BB         RM39:    STA      SOURCE
2885  8DCF   20 83 A1               JSR      ISSOURCE     ;error if empty setup
2886  8DD2   B0 09                  BCS      RM36
2887  8DD4                          HELP     71
2892  8DDB   80 AA                  BRA      RM30
2893  8DDD   20 F6 A6      RM36:    JSR      OBJCLEAR     ;move source to object area
2894  8DE0   20 07 A7               JSR      S20
2895  8DE3   A0 01                  LDY      #1           ;error if semi-auto and specific days
2896  8DE5   B1 5A                  LDA      (MENUPTR),Y
2897  8DE7   29 F0                  AND      #11110000B
2898  8DE9   C9 10                  CMP      #00010000B
2899  8DEB   F0 0F                  BEQ      RM40
2900  8DED   AD 41 15               LDA      CYCLE_TYPE
2901  8DF0   F0 0A                  BEQ      RM40
2902  8DF2                          HELP     108
2907  8DF9   4C 87 8D               JMP      RM30
2908
2909                       RM40:                           ;select add-on one-time
2910
2911                       RM50:                           ;select add-on special
2912
2913  8DFC   20 2E A8      RM60:    JSR      ENTER_GLOBAL ;enter budget
2914
2915  8DFF   20 DE AD      RM70:    JSR      GENERATE     ;check out selected setup at budget
2916  8E02   90 0C                  BCC      RM80
2917  8E04   18                     CLC
2918  8E05   A5 79                  LDA      ERROR        ;no good, show error
2919  8E07   69 49                  ADC      #73
2920  8E09   85 72                  STA      HELPNUM
2921  8E0B   20 74 AB               JSR      HELP_MSG
2922  8E0E   80 EC                  BRA      RM60
2923
2924  8E10                RM80:
2925  8E10   9C 1A 83              STZ      DAYNUM        ;do new watering
2926  8E13   9C 1B 83              STZ      DAYNUM+1
2927
2928  8E16   20 82 A3      RM90:    JSR      DKCLR        ;give programmer out msg
2929  8E19                          MESSAGE  116
2933  8E1E                          SET      RUNNING      ;we're ready to run
2937  8E23   20 06 A8      RM95:    JSR      GETKEY
2938  8E26   C9 08                  CMP      #HELPKEY
2939  8E28   D0 F9                  BNE      RM95         ;wait for programmer removed or STOP
2940  8E2A   A0 01                  LDY      #1
2941  8E2C   B2 5A                  LDA      (MENUPTR)
2942  8E2E   29 F0                  AND      #11110000B
2943  8E30   C9 10                  CMP      #00010000B
2944  8E32   F0 09                  BEQ      RM96
2945  8E34                          HELP     120          ;SEMI-AUTO mode
2950  8E3B   80 D9                  BRA      RM90
2951  8E3D                RM96:     HELP     119          ;AUTO mode
2956  8E44   80 D0                  BRA      RM90
2957
```

```
2958
2959
2960                    ;--------------------------------
2961                    ;      manual valves
2962                    ;--------------------------------
2963
2964  8E46                    MMV:    SET     VALVE           ;Manual Mode - Valves
2968  8E4A  20 82 A3                  JSR     DKCLR
2969  8E4D                            ANSLOW
2973  8E51  20 85 A3        MMV0:    JSR     DISPLAY_CLR
2974  8E54  20 85 8F                  JSR     DISPVS
2975  8E57                            SET_CURSOR LINE2       ;show second line
2979  8E5C  A6 49                     LDX     VALVE
2980  8E5E  BD 7D 02                  LDA     VS,X
2981  8E61  89 10                     BIT     #00010000B
2982  8E63  D0 07                     BNE     MM8
2983  8E65                            MESSAGE 201
2987  8E6A  80 05                     BRA     MM6
2988  8E6C                    MM8:    MESSAGE 200
2992  8E71                    MM6:    SET_CURSOR LINE2+7
2996  8E76  20 6A A1                  JSR     DV
2997  8E79                            SET_CURSOR LINE2+13
3001  8E7E                            OK
3006  8E84  20 06 AB        MM7:    JSR     GETKEY
3007  8E87  C9 20                     CMP     #OKKEY
3008  8E89  F0 11                     BEQ     MM10
3009  8E8B  C9 10                     CMP     #NOKEY
3010  8E8D  F0 23                     BEQ     MM20
3011  8E8F  C9 08                     CMP     #HELPKEY
3012  8E91  D0 F1                     BNE     MM7
3013  8E93                            HELP    63
3018  8E9A  80 AA                     BRA     MMV
3019  8E9C
3020  8E9C  A6 49           MM10:   LDX     VALVE           ;OK key, toggle ON/OFF
3021  8E9E  BD 7D 02                  LDA     VS,X
3022  8EA1  89 10                     BIT     #00010000B
3023  8EA3  F0 05                     BEQ     MM12
3024  8EA5  20 8C A4                  JSR     VOFF
3025  8EA8  80 08                     BRA     MM20
3026  8EAA  20 59 A4        MM12:   JSR     VON
3027  8EAD  64 E3                     STZ     CMDCTR          ;auto NO does initial delay again
3028  8EAF  4C 51 8E                  JMP     MMV0
3029
3030  8EB2  A5 49           MM20:   LDA     VALVE           ;do next valve?
3031  8EB4  85 E1                     STA     R5
3032  8EB6  20 A7 9E                  JSR     NXTVALVE
3033  8EB9  90 04                     BCC     MM22
3034  8EBB                            SET     VALVE           ;start over
3038  8EBF  20 85 A3        MM22:   JSR     DISPLAY_CLR
3039  8EC2  20 85 8F                  JSR     DISPVS
3040  8EC5                            SET_CURSOR LINE2
3044  8ECA                            MESSAGE 202
3048  8ECF                            BACKUP  2
3052  8ED4  20 6A A1                  JSR     DV
3053  8ED7                            OK
3058  8EDD  20 06 AB        MM21:   JSR     GETKEY
3059  8EE0  C9 20                     CMP     #OKKEY
3060  8EE2  D0 85                     BNE     MM24
```

```
3061  8EE4  64 E3              STZ    CMDCTR       ;yes, init auto NO
3062  8EE6  4C 51 8E            JMP    MMV0
3063  8EE9  C9 10        MM24:  CMP    #NOKEY
3064  8EEB  D0 0A               BNE    MM23
3065  8EED  A5 E1               LDA    R5
3066  8EEF  85 49               STA    VALVE        ;no, back to previous valve
3067  8EF1  20 98 AD            JSR    ISEXIT       ;see if want out
3068  8EF4  4C 51 8E            JMP    MMV0         ;no
3069  8EF7  C9 08        MM23:  CMP    #HELPKEY
3070  8EF9  D0 E2               BNE    MM21
3071  8EFB                      HELP   63
3076  8F02  4C 46 8E            JMP    MMV
3077
3078                     DISPVS:                    ;display valve status line
3079  8F05                      MESSAGE 61
3083  8F0A  A2 01               LDX    #1
3084  8F0C  BD 7D 02     MMV3:  LDA    VS,X
3085  8F0F  89 10               BIT    #00010000B
3086  8F11  F0 05               BEQ    MMV1
3087  8F13  8A                  TXA                 ;valve is on, show valve #
3088  8F14  09 30               ORA    #ASCMASK
3089  8F16  80 02               BRA    MMV2
3090  8F18  A9 2D        MMV1:  LDA    #'-'         ;valve off, show -
3091  8F1A  20 10 A3     MMV2:  JSR    DCHAR
3092  8F1D  E8                  INX
3093  8F1E  E0 09               CPX    #9           ;do all 8
3094  8F20  D0 EA               BNE    MMV3
3095  8F22  60                  RTS
3096
3097                     ;-----------------------------
3098                     ;      manual test sequence
3099                     ;-----------------------------
3100
3101  8F23  20 82 A3     MMT:   JSR    DKCLR        ;Test sequence for valves
3102  8F26                      MESSAGE 117
3106  8F2B                      SET_CURSOR LINE2
3110  8F30  A9 02               LDA    #2           ;get duration, default=2
3111  8F32                      SELECT 1,30
3119  8F3F  90 09               BCC    MMT1
3120  8F41                      HELP   27           ;no help yet
3125  8F48  80 D9               BRA    MMT
3126  8F4A               MMT1:  SET    VALVE        ;start with valve 1
3130  8F4E  20 82 A3     MMT2:  JSR    DKCLR
3131  8F51                      MESSAGE 118
3135  8F56  20 5C A1            JSR    DVALVEMSG    ;show valve # and status
3136  8F59                      SET_CURSOR LINE2
3140  8F5E  A6 49               LDX    VALVE
3141  8F60  BD 7D 02            LDA    VS,X
3142  8F63  89 80               BIT    #VID
3143  8F65  F0 02               BEQ    MMT3
3144  8F67  80 0C               BRA    MMT10
3145
3146  8F69  A2 77        MMT3:  LDX    #119         ;no ID
3147  8F6B  80 02               BRA    MMT6
3148  8F6D  A2 79        MMT5:  LDX    #121         ;master valve
3149  8F6F  20 D7 A2     MMT6:  JSR    DISPLAY_MSG
3150  8F72  4C C3 8F            JMP    MMTNEXT
3151
```

```
3152  8F75  20 59 A4    MMT10:   JSR      VON              ;a good valve, turn it on
3153  8F78  A5 61                LDA      IBFR             ;start countdown
3154  8F7A  85 42                STA      MSB
3155  8F7C  64 A1                STZ      SECCTR
3156  8F7E  64 41                STZ      LSB
3157  8F80                       MESSAGE  122              ;show that valve is on
3161  8F85             MMT11:   SET_CURSOR LINE2+4         ;show time remaining
3165  8F8A  A5 42                LDA      MSB
3166  8F8C  20 C2 A6             JSR      D2NS
3167  8F8F  A9 3A                LDA      #':'
3168  8F91  20 10 A3             JSR      DCHAR
3169  8F94  A5 41                LDA      LSB
3170  8F96  20 C2 A6             JSR      D2NS
3171  8F99  A5 A1    MMT12:       LDA      SECCTR           ;if new second, show it
3172  8F9B  C5 41                CMP      LSB
3173  8F9D  F0 10                BEQ      MMT15
3174  8F9F  85 41                STA      LSB
3175  8FA1  A5 41                LDA      LSB              ;if new minute, dec minute
3176  8FA3  10 E0                BPL      MMT11
3177  8FA5  C6 42                DEC      MSB
3178  8FA7  A9 3B                LDA      #59
3179  8FA9  85 41                STA      LSB
3180  8FAB  85 A1                STA      SECCTR
3181  8FAD  80 D6                BRA      MMT11
3182  8FAF  20 06 AB  MMT15:     JSR      GETKEY           ;wait until STOP key
3183  8FB2  A5 42                LDA      MSB              ;or no more time
3184  8FB4  05 41                ORA      LSB
3185  8FB6  D0 E1                BNE      MMT12
3186  8FB8  20 8C A4             JSR      VOFF             ;then valve off
3187  8FBB  20 C8 A3             JSR      CLR_LINE2
3188  8FBE                       MESSAGE  123
3192
3193  8FC3  20 A7 AB  MMTNEXT:   JSR      MSGWAIT          ;leave msg on a bit
3194  8FC6  E6 49                INC      VALVE
3195  8FC8  A5 49                LDA      VALVE
3196  8FCA  C9 09                CMP      #9
3197  8FCC  F0 03                BEQ      MMTX
3198  8FCE  4C 4E 8F             JMP      MMT2
3199  8FD1  4C 8E AC  MMTX:      JMP      GETMENU
3200
3201
3202                           ;---------------------------
3203                           ;       SUBROUTINES
3204                           ;---------------------------
3205
3206
3207                 EDVALVE:                               ;subroutine to enable/disable valves
3208  8FD4  20 82 A3             JSR      DKCLR
3209  8FD7                       MESSAGE  132
3213  8FDC                       ON
3218  8FE2  20 06 AB  EDV1:      JSR      GETKEY
3219  8FE5  C9 10                CMP      #NOKEY
3220  8FE7  D0 01                BNE      EDV2
3221  8FE9  60                   RTS
3222  8FEA  C9 20    EDV2:       CMP      #OKKEY
3223  8FEC  F0 0D                BEQ      EDV3
3224  8FEE  C9 08                CMP      #HELPKEY
3225  8FF0  D0 F0                BNE      EDV1
```

```
3226   8FF2                            HELP   50
3231   8FF9   80 D9                    BRA    EDVALVE
3232
3233   8FFB   A2 08            EDV3:   LDX    #8          ;move current valve status to bfr
3234   8FFD   BD 7D 82         SVA:    LDA    VS,X
3235   9000   9D 5E 82                 STA    IDBFR,X
3236   9003   CA                       DEX
3237   9004   D0 F7                    BNE    SVA
3238   9006   20 82 A3         SV0:    JSR    DKCLR       ;verify current status
3239   9009   20 A3 90                 JSR    DISPEV
3240   900C                            SET_CURSOR LINE2
3244   9011                            MESSAGE 128
3248   9016                            QM
3253   901C   20 06 AB         SV4:    JSR    GETKEY
3254   901F   C9 20                    CMP    #OKKEY
3255   9021   D0 0C                    BNE    SV5
3256   9023   A2 08                    LDX    #8          ;ok, save IDBFR to VS
3257   9025   BD 5E 82         SVB:    LDA    IDBFR,X
3258   9028   9D 7D 82                 STA    VS,X
3259   902B   CA                       DEX
3260   902C   D0 F7                    BNE    SVB
3261   902E   60                       RTS
3262   902F   C9 10            SV5:    CMP    #NOKEY
3263   9031   F0 0D                    BEQ    SV10        ;no, modify
3264   9033   C9 08                    CMP    #HELPKEY
3265   9035   D0 E5                    BNE    SV4
3266   9037                            HELP   59
3271   903E   80 DC                    BRA    SV4
3272   9040
3273   9040   20 C9 90         SV10:   JSR    ALL_DISABLE
3274   9043   64 49                    STZ    VALVE
3275   9045   20 82 A3                 JSR    DKCLR
3276   9048                            ANSLOW
3280   904C   80 4D                    BRA    SV20
3281   904E   20 85 A3         SV13:   JSR    DISPLAY_CLR ;use this station?
3282   9051   20 A3 90                 JSR    DISPEV
3283   9054                            SET_CURSOR LINE2
3287   9059                            MESSAGE 129
3291   905E   20 3D A1                 JSR    DSTA#
3292   9061   A9 3F                    LDA    #'?'
3293   9063   20 10 A3                 JSR    DCHAR
3294   9066                            OK
3299   906C   20 06 AB         SV11:   JSR    GETKEY
3300   906F   C9 10                    CMP    #NOKEY
3301   9071   F0 12                    BEQ    SV12
3302   9073   C9 20                    CMP    #OKKEY
3303   9075   F0 1A                    BEQ    SV15
3304   9077   C9 08                    CMP    #HELPKEY
3305   9079   D0 F1                    BNE    SV11
3306   907B                            HELP   60
3311   9082   4C D4 8F                 JMP    EDVALVE
3312   9085   A6 49            SV12:   LDX    VALVE       ;disable valve
3313   9087   BD 5E 82                 LDA    IDBFR,X
3314   908A   29 BF                    AND    #10111111B
3315   908C   9D 5E 82                 STA    IDBFR,X
3316   908F   80 0A                    BRA    SV20
3317   9091   A6 49            SV15:   LDX    VALVE       ;enable valve
3318   9093   BD 5E 82                 LDA    IDBFR,X
```

```
3319  9096  09 40                    ORA     #01000000B
3320  9098  9D 5E 02                 STA     IDBFR,X
3321  909B  20 A7 9E     SV20:  JSR     NXTVALVE        ;next valve
3322  909E  90 AE                    BCC     SV13
3323  90A0  4C 06 90                 JMP     SV0
3324
3325                    DISPEV:                         ;display enabled valves
3326  90A3                    MESSAGE 127
3330  90A8                    SET     LSB
3334  90AC  A6 41        SV1:   LDX     LSB
3335  90AE  BD 5E 02                 LDA     IDBFR,X
3336  90B1  89 40                    BIT     #VEN
3337  90B3  F0 06                    BEQ     SV2
3338  90B5  A5 41                    LDA     LSB
3339  90B7  09 30                    ORA     #ASCMASK
3340  90B9  80 02                    BRA     SV3
3341  90BB  A9 2D        SV2:   LDA     #'-'
3342  90BD  20 10 A3     SV3:   JSR     DCHAR
3343. 90C0  E6 41                    INC     LSB
3344  90C2  A5 41                    LDA     LSB
3345  90C4  C9 09                    CMP     #9
3346  90C6  D0 E4                    BNE     SV1
3347  90C8  60                       RTS
3348
3349                    ALL_DISABLE:                    ;disable valve bfr
3350  90C9                    SET     VALVE
3354  90CD  A6 49        ADI1:  LDX     VALVE
3355  90CF  BD 5E 02                 LDA     IDBFR,X
3356  90D2  29 BF                    AND     #10111111B
3357  90D4  9D 5E 02                 STA     IDBFR,X
3358  90D7  E6 49                    INC     VALVE
3359  90D9  A5 49                    LDA     VALVE
3360  90DB  C9 09                    CMP     #9
3361  90DD  D0 EE                    BNE     ADI1
3362  90DF  60                       RTS
3363
3364                    ALL_ENABLE:                     ;enable all valves
3365  90E0                    SET     VALVE
3369  90E4  A6 49        AEN1:  LDX     VALVE
3370  90E6  BD 7D 02                 LDA     VS,X
3371  90E9  09 40                    ORA     #01000000B
3372  90EB  9D 7D 02                 STA     VS,X
3373  90EE  E6 49                    INC     VALVE
3374  90F0  A5 49                    LDA     VALVE
3375  90F2  C9 09                    CMP     #9
3376  90F4  D0 EE                    BNE     AEN1
3377  90F6  60                       RTS
3378
3379                    ;------------------------------------------------
3380
3381
3382  90F7  20 82 A3     ID10:  JSR     DKCLR           ;show the current IDs
3383  90FA                    MESSAGE 173
3387  90FF  20 48 AC                 JSR     VID2BFR
3388  9102  20 6A AC                 JSR     DISPID
3389  9105  20 06 AB     ID11:  JSR     GETKEY          ;wait for key
3390  9108  C9 20                    CMP     #OKKEY
3391  910A  F0 11                    BEQ     ID12
```

```
3392  918C  C9 10              CMP     #NOKEY
3393  918E  F0 0D              BEQ     I012
3394  9110  C9 08              CMP     #HELPKEY
3395  9112  D0 F1              BNE     I011
3396  9114                     HELP    113
3401  911B  80 DA              BRA     I010
3402  911D  4C 46 96    I012:  JMP     FSTOP
3403
3404                           ;-----------------------------------------
3405
3406
3407
3408
3409  9120                     INCLUDE SCHED.ASM
3410                           ;--------------------------------
3411                           ;    SETUP SCHEDULES
3412                           ;--------------------------------
3413
3414                     SETUP_SCHEDULES:              ;set up programs
3415                                                   ;SOURCE 1=Mini
3416                                                   ;       2=Autosplit
3417                                                   ;       3=Ration
3418                                                   ;       4=ISC
3419                                                   ;       5=One Time
3420                                                   ;       6=Special
3421                                                   ;       7=Failsafe
3422
3423                     GETREVIEW:                    ;find out if new, modify or review
3424  9120  A0 01              LDY     #1
3425  9122  B1 5A              LDA     (MENUPTR),Y   ;get source from MENUPTR
3426  9124  29 0F              AND     #00001111B
3427  9126  85 BB              STA     SOURCE
3428  9128  A9 02              LDA     #RNEW
3429  912A  8D 72 82           STA     REVIEW        ;0=review, 1=modify, 2=new, 3=exit
3430  912D  20 F6 A6           JSR     OBJCLEAR      ;clear object area
3431  9130  20 B3 A1           JSR     ISSOURCE      ;if source exits,
3432  9133  90 36              BCC     GETR4
3433  9135  20 07 A7           JSR     S20           ;move saved source to object area
3434  9138  20 82 A3    GETR2: JSR     DKCLR         ;get review type
3435  913B  20 9F A1           JSR     DISP_SOURCE
3436  913E                     SET_CURSOR LINE2
3440  9143  A9 00              LDA     #0
3441  9145                     SELECT_SOK 0,3,135
3451  9156  90 09       GETR3: BCC     GETR1
3452  9158                     HELP    83
3457  915F  80 D7              BRA     GETR2
3458  9161  C9 03       GETR1: CMP     #3
3459  9163  D0 03              BNE     GETR5
3460  9165  4C 46 86           JMP     FSTOP
3461  9168  8D 72 82    GETR5: STA     REVIEW
3462  916B  60          GETR4: RTS
3463
3464  916C  A5 79       VSUERR: LDA    ERROR         ;error in valve set up
3465  916E  18                 CLC                   ;explain it
3466  916F  69 49              ADC     #73
3467  9171  85 72              STA     HELPNUM
3468  9173  20 74 AB           JSR     HELP_MSG
3469  9176  60                 RTS
3470
3471
```

```
3472                    ;--------------------------------
3473                    ;     ration schedule
3474                    ;--------------------------------
3475
3476
3477                    ;--------------------------------
3478                    ;     isc schedule
3479                    ;--------------------------------
3480
3481
3482                    ;--------------------------------
3483                    ;     mini schedule
3484                    ;--------------------------------
3485                    ;--------------------------------
3486                    ;     auto-split schedule
3487                    ;--------------------------------
3488
3489    9177            VM0:    SET     DAYNUM          ;init day # for review
3493    917C   9C 1B 83         STZ     DAYNUM+1
3494    917F   9C 1C 83         STZ     DAYNUM+2
3495
3496    9182   20 20 91 VM1:    JSR     GETREVIEW       ;new, review, or modify?
3497
3498    9185   AD 72 82         LDA     REVIEW
3499    9188   C9 02            CMP     #RNEW
3500    918A   F0 08            BEQ     VM20
3501    918C   20 0E 92         JSR     ISBASICR
3502    918F   B0 03            BCS     VM20
3503    9191   4C B3 91         JMP     VM25
3504
3505    9194   20 45 94 VM20:   JSR     BLOCK1          ;enter durations
3506
3507    9197   A5 BB            LDA     SOURCE          ;enter split criteria
3508    9199   C9 02            CMP     #2              ;if auto-split
3509    919B   D0 03            BNE     VM22
3510    919D   20 18 95         JSR     BLOCK2          ;get split info
3511
3512    91A0   AD 72 82 VM22:   LDA     REVIEW          ;if new, then get cycle type
3513    91A3   C9 02            CMP     #RNEW
3514    91A5   D0 03            BNE     VM21
3515    91A7   20 76 9E         JSR     ENTER_CYCLE_TYPE
3516
3517    91AA   20 78 96 VM21:   JSR     BLOCK3          ;enter base cycles
3518    91AD   20 84 98         JSR     BLOCK4          ;enter excluded time
3519    91B0   20 DE 99         JSR     BLOCK5          ;enter starting time
3520
3521    91B3   A5 BB   VM25:    LDA     SOURCE
3522    91B5   C9 02            CMP     #2              ;if auto-split
3523    91B7   D0 15            BNE     VM90
3524    91B9   AD 72 82         LDA     REVIEW
3525    91BC   C9 02            CMP     #RNEW
3526    91BE   F0 08            BEQ     VM30
3527    91C0   20 47 92         JSR     ISSOAKR
3528    91C3   B0 03            BCS     VM30
3529    91C5   4C CE 91         JMP     VM90
3530
3531    91C8   20 6C 9A VM30:   JSR     BLOCK10         ;enter soak durations
3532    91CB   20 7C 96         JSR     BLOCK11         ;enter soak cycles
3533
```

```
3534   91CE  AD 72 82    VM90:    LDA     REVIEW          ;if new or modified,
3535   91D1  C9 00                CMP     #RREVIEW
3536   91D3  F0 2C                BEQ     VM100
3537   91D5  20 13 B3             JSR     CHECK           ;check for errors
3538   91D8  90 06                BCC     VM91
3539   91DA  20 6C 91             JSR     VSUERR          ;show error
3540   91DD  4C 01 92             JMP     VM100
3541                     VM91:                            ;else store away good setup
3542   91E0  20 82 A3             JSR     DKCLR
3543   91E3  20 9F A1             JSR     DISP_SOURCE
3544   91E6                       SET_CURSOR LINE2
3548   91EB                       MESSAGE 179
3552   91F0  20 A7 AB             JSR     MSGWAIT
3553   91F3  20 A7 AB             JSR     MSGWAIT
3554   91F6  A5 BB                LDA     SOURCE
3555   91F8  8D 40 15             STA     OBJBASE
3556   91FB  20 31 A7             JSR     O2S
3557   91FE  4C 82 91             JMP     VM1
3558
3559   9201  AD 72 82    VM100:   LDA     REVIEW          ;if review
3560   9204  C9 00                CMP     #RREVIEW
3561   9206  D0 03                BNE     VM199
3562   9208  20 7C 92             JSR     DAILY           ;review daily schedule
3563   920B  4C 82 91    VM199:   JMP     VM1
3564
3565
3566                     ;--------------------------------
3567                     ;      review routines
3568                     ;--------------------------------
3569
3570                     ISBASICR:                        ;Review or Modify basic setup?
3571   920E  20 82 A3             JSR     DKCLR           ;return carry set if yes
3572   9211  AD 72 82             LDA     REVIEW
3573   9214  18                   CLC
3574   9215  69 9C                ADC     #156
3575   9217  AA                   TAX
3576   9218  20 D7 A2             JSR     DISPLAY_MSG
3577   921B                       SET_CURSOR LINE2
3581   9220                       MESSAGE 158
3585   9225                       QM
3590   922B  20 86 AB    RE10:    JSR     GETKEY
3591   922E  C9 20                CMP     #OKKEY
3592   9230  F0 13                BEQ     REYES
3593   9232  C9 10                CMP     #NOKEY
3594   9234  F0 0D                BEQ     RENO
3595   9236  C9 08                CMP     #HELPKEY
3596   9238  D0 F1                BNE     RE10
3597   923A                       HELP    84
3602   9241  80 CB                BRA     ISBASICR
3603   9243  18          RENO:    CLC
3604   9244  60                   RTS
3605   9245  38          REYES:   SEC
3606   9246  60                   RTS
3607
3608                     ISSOAKR:                         ;Review or Modify soak setup?
3609   9247  20 82 A3             JSR     DKCLR           ;return carry set if yes
3610   924A  AD 72 82             LDA     REVIEW
3611   924D  18                   CLC
```

```
3612   924E   69 9C              ADC     #156
3613   9250   AA                 TAX
3614   9251   20 D7 A2           JSR     DISPLAY_MSG
3615   9254                      SET_CURSOR LINE2
3619   9259                      MESSAGE 160
3623   925E                      QM
3628   9264   20 86 AB    RSK8:  JSR     GETKEY
3629   9267   C9 20              CMP     #OKKEY
3630   9269   F0 DA              BEQ     REYES
3631   926B   C9 10              CMP     #NOKEY
3632   926D   F0 D4              BEQ     RENO
3633   926F   C9 08              CMP     #HELPKEY
3634   9271   D0 F1              BNE     RSK8
3635   9273                      HELP    76
3640   927A   80 CB              BRA     ISSOAKR
3641
3642                     DAILY:                              ;review daily schedule
3643   927C   20 82 A3           JSR     DKCLR
3644   927F                      MESSAGE 154
3648   9284                      QM
3653   928A   20 86 AB    RE21:  JSR     GETKEY
3654   928D   C9 20              CMP     #OKKEY
3655   928F   F0 14              BEQ     RE20
3656   9291   C9 10              CMP     #NOKEY
3657   9293   D0 03              BNE     RE22
3658   9295   4C 44 94           JMP     RE199
3659   9298   C9 08       RE22:  CMP     #HELPKEY
3660   929A   D0 EE              BNE     RE21
3661   929C                      HELP    90
3666   92A3   80 D7              BRA     DAILY
3667
3668   92A5   20 2E A8    RE20:  JSR     ENTER_GLOBAL         ;enter budget settings
3669                     RE90:                                ;enter day to review
3670   92A8   20 82 A3           JSR     DKCLR
3671   92AB   64 49              STZ     VALVE
3672   92AD                      MESSAGE 142
3676   92B2   AD 41 15           LDA     CYCLE_TYPE
3677   92B5   D0 26              BNE     RE91
3678   92B7   AD 1A 03           LDA     DAYNUM               ;enter so many days
3679   92BA                      SELECT  1,99
3687   92C7   90 09              BCC     RE92
3688   92C9                      HELP    94
3693   92D0   80 D6              BRA     RE90
3694   92D2   8D 1A 03    RE92:  STA     DAYNUM
3695   92D5   9C 1B 03           STZ     DAYNUM+1
3696   92D8   9C 1C 03           STZ     DAYNUM+2
3697   92DB   80 64              BRA     RE120
3698   92DD               RE91:  BACKUP  1                    ;enter specific day
3702   92E2   AD 1C 03           LDA     DAYNUM+2
3703   92E5                      SELECT_MOK 1,7,91
3713   92F6   90 09              BCC     RE93
3714   92F8                      HELP    92
3719   92FF   80 A7              BRA     RE90
3720   9301   8D 1C 03    RE93:  STA     DAYNUM+2
3721
3722   9304   20 82 A3           JSR     DKCLR                ;enter which week
3723   9307                      MESSAGE 143
3727   930C                      SET_CURSOR 11
```

```
3731  9311  A5 61                LDA     IBFR
3732  9313  18                   CLC
3733  9314  69 5A                ADC     #90
3734  9316  AA                   TAX
3735  9317  20 D7 A2             JSR     DISPLAY_MSG
3736  931A                       SET_CURSOR LINE2+11
3740  931F  AD 1A 83             LDA     DAYNUM
3741  9322                       SELECT  1,10
3749  932F  90 0A                BCC     RE94
3750  9331                       HELP    93
3755  9338  4C A8 92             JMP     RE98
3756  933B  8D 1A 83    RE94:    STA     DAYNUM
3757  933E  9C 1B 83             STZ     DAYNUM+1
3758
3759                   RE120:                            ;generate schedule
3760  9341  64 49                STZ     VALVE
3761  9343  20 DE AD             JSR     GENERATE
3762  9346  90 0D                BCC     RE30
3763  9348  A5 79                LDA     ERROR            ;error in valve set up
3764  934A  18                   CLC                     ;explain it
3765  934B  69 49                ADC     #73
3766  934D  85 72                STA     HELPNUM
3767  934F  20 74 AB             JSR     HELP_MSG
3768  9352  4C 44 94             JMP     RE199
3769
3770  9355  20 82 A3   RE30:     JSR     DKCLR            ;press OK msg
3771  9358  64 49                STZ     VALVE
3772  935A                       MESSAGE 153
3776  935F                       OK
3781  9365  20 86 AB   RE31:     JSR     GETKEY
3782  9368  C9 20                CMP     #OKKEY
3783  936A  F0 14                BEQ     RE122
3784  936C  C9 10                CMP     #NOKEY
3785  936E  D0 03                BNE     RE33
3786  9370  4C C9 93             JMP     RE100
3787  9373  C9 08      RE33:     CMP     #HELPKEY
3788  9375  D0 EE                BNE     RE31
3789  9377                       HELP    107
3794  937E  80 D5                BRA     RE30
3795
3796  9380  AD EC 15   RE122:    LDA     NSTARTS          ;show ending time
3797  9383  D0 0A                BNE     RE125            ;if any starts to show
3798  9385                       HELP    69
3803  938C  4C 44 94             JMP     RE199
3804  938F  20 82 A3   RE125:    JSR     DKCLR
3805  9392                       MESSAGE 182
3809  9397                       MOV16   DONETIME,OFFSET
3815  93A1  20 CF AB             JSR     MIN2HM
3816  93A4  20 BE A5             JSR     DISPTIME
3817  93A7                       OK
3822  93AD  20 86 AB   RE123:    JSR     GETKEY
3823  93B0  C9 20                CMP     #OKKEY
3824  93B2  F0 15                BEQ     RE100
3825  93B4  C9 10                CMP     #NOKEY
3826  93B6  D0 03                BNE     RE124
3827  93B8  4C 44 94             JMP     RE199
3828  93BB  C9 08      RE124:    CMP     #HELPKEY
3829  93BD  D0 EE                BNE     RE123
3830  93BF                       HELP    107
```

```
3835   93C6  4C 41 93             JMP     RE120
3836
3837                    RE100:                            ;review starts
3838   93C9  20 82 A3   RE102:    JSR     OKCLR           ;press OK msg
3839   93CC  64 49                STZ     VALVE
3840   93CE                       MESSAGE 161
3844   93D3                       OK
3849   93D9  20 06 AB   RE101:    JSR     GETKEY
3850   93DC  C9 20                CMP     #OKKEY
3851   93DE  F0 14                BEQ     RE110
3852   93E0  C9 10                CMP     #NOKEY
3853   93E2  D0 03                BNE     RE103
3854   93E4  4C 44 94             JMP     RE199
3855   93E7  C9 08      RE103:    CMP     #HELPKEY
3856   93E9  D0 EE                BNE     RE101
3857   93EB                       HELP    95
3862   93F2  80 D5                BRA     RE102
3863
3864                    RE110:                            ;show the starts
3865   93F4  20 07 AA             JSR     FIRSTSTART      ;init STARTPTR
3866   93F7  AD EC 15             LDA     NSTARTS
3867   93FA  D0 0A                BNE     RE112
3868   93FC                       HELP    69
3873   9403  4C 44 94             JMP     RE199
3874   9406  85 73      RE112:    STA     CTR
3875   9408  A2 08                LDX     #8
3876   940A  74 7D      RE113:    STZ     VCTR,X          ;clear valve counters
3877   940C  9E 68 02             STZ     VSYR,X
3878   940F  CA                   DEX                     ;(# of starts for each valve)
3879   9410  D0 F8                BNE     RE113
3880   9412  A5 73      RE111:    LDA     CTR
3881   9414  D0 03                BNE     RE117
3882   9416  4C 44 94             JMP     RE199
3883   9419  20 4F 9F   RE117:    JSR     SHOW_START
3884   941C                       OK
3889   9422  20 06 AB   RE114:    JSR     GETKEY
3890   9425  C9 20                CMP     #OKKEY
3891   9427  F0 14                BEQ     RE115
3892   9429  C9 10                CMP     #NOKEY
3893   942B  D0 03                BNE     RE116
3894   942D  4C 44 94             JMP     RE199
3895   9430  C9 08      RE116:    CMP     #HELPKEY
3896   9432  D0 EE                BNE     RE114
3897   9434                       HELP    95
3902   943B  80 8C                BRA     RE102
3903   943D  20 F7 A9   RE115:    JSR     NEXTSTART
3904   9440  C6 73                DEC     CTR
3905   9442  80 CE                BRA     RE111
3906
3907   9444  60         RE199:    RTS
3908
3909                    ;--------------------------------
3910                    ;     schedule entry blocks
3911                    ;--------------------------------
3912
3913                    BLOCK1:                           ;enter 100% durations for all valves
3914   9445  64 49                STZ     VALVE
3915   9447  20 A7 9E   B1SKIP:   JSR     NXTVALVE
```

```
3916  944A  90 03              BCC      B1NEXT
3917  944C  4C 17 95           JMP      B1END
3918  944F  AD 72 02   B1NEXT: LDA      REVIEW
3919  9452  C9 02              CMP      #RNEW
3920  9454  D0 06              BNE      B1E
3921  9456  64 C9              STZ      DEFAULT        ;new input
3922  9458  64 CA              STZ      DEFAULT+1
3923  945A  80 14              BRA      B1ENTRY
3924  945C  A6 49      B1E:    LDX      VALVE          ;modify or review input
3925  945E                     DBLX
3933  9464  BD 58 15           LDA      DUR1,X
3934  9467  85 C9              STA      DEFAULT
3935  9469  BD 59 15           LDA      DUR1+1,X
3936  946C  85 CA              STA      DEFAULT+1
3937  946E  80 31              BRA      B1CONFIRM
3938
3939                   B1ENTRY:                        ;enter a new duration
3940  9470  20 82 A3           JSR      DKCLR
3941  9473  20 3D A1           JSR      DSTA#
3942  9476                     MESSAGE  37
3946  947B                     MOV16    DEFAULT,OFFSET
3952  9483  20 CF AB           JSR      MIN2HM
3953  9486  20 45 A8           JSR      GETDURATION    ;get it in hours, minutes format
3954  9489  B0 0D              BCS      B1F
3955  948B  20 B3 AB           JSR      HM2MIN
3956  948E                     MOV16    OFFSET,DEFAULT
3962  9496  80 09              BRA      B1CONFIRM
3963  9498             B1F:    HELP     54
3968  949F  80 CF              BRA      B1ENTRY
3969
3970                   B1CONFIRM:                      ;show default and confirm
3971  94A1  20 82 A3           JSR      DKCLR
3972  94A4  A5 C9              LDA      DEFAULT
3973  94A6  05 CA              ORA      DEFAULT+1
3974  94A8  F0 18              BEQ      B1A
3975  94AA  20 3D A1           JSR      DSTA#
3976  94AD                     MESSAGE  37
3980  94B2                     MOV16    DEFAULT,OFFSET
3986  94BA  20 CF AB           JSR      MIN2HM
3987  94BD  20 F3 A5           JSR      DISPDURATION
3988  94C0  80 0D              BRA      B1B
3989  94C2             B1A     MESSAGE  147            ;no watering
3993  94C7                     SET_CURSOR LINE2
3997  94CC  20 55 A1           JSR      DSTATION#
3998  94CF  20 E4 A1   B1B:    JSR      CONFIRM_BLINK
3999  94D2  20 86 AB   B1C:    JSR      GETKEY
4000  94D5  C9 20              CMP      #OKKEY
4001  94D7  F0 16              BEQ      B1OK
4002  94D9  C9 10              CMP      #NOKEY
4003  94DB  D0 09              BNE      B1I
4004  94DD  AD 72 02           LDA      REVIEW         ;no key ends review
4005  94E0  C9 00              CMP      #RREVIEW
4006  94E2  D0 8C              BNE      B1ENTRY
4007  94E4  80 31              BRA      B1END
4008  94E6  C9 08      B1I:    CMP      #HELPKEY
4009  94E8  D0 E8              BNE      B1C
4010  94EA  20 CD A1           JSR      CONFIRM_HELP
4011  94ED  80 B2              BRA      B1CONFIRM
```

```
4012
4013   94EF   A6 49          B1OK:    LDX      VALVE         ;default is confirmed
4014   94F1                            DBLX
4022   94F7   A5 C9                    LDA      DEFAULT
4023   94F9   9D 58 15                 STA      DUR1,X
4024   94FC   A5 CA                    LDA      DEFAULT+1
4025   94FE   9D 59 15                 STA      DUR1+1,X
4026   9501   20 A7 9E                 JSR      NXTVALVE
4027   9504   90 02                    BCC      B1D
4028   9506   80 0F                    BRA      B1END         ;next valve if any
4029   9508   AD 72 02       B1D:     LDA      REVIEW        ;if new,
4030   950B   C9 02                    CMP      #RNEW
4031   950D   D0 05                    BNE      B1Z
4032   950F   20 72 A1                 JSR      ISCOPY        ;copy to next valve?
4033   9512   B0 8D                    BCS      B1CONFIRM     ;yes
4034   9514   4C 4F 94       B1Z:     JMP      B1NEXT        ;no
4035
4036   9517   60             B1END:   RTS
4037
4038                                    ;--------------------------------
4039
4040                          BLOCK2:                         ;enter split criteria
4041   9518   AD 72 02                 LDA      REVIEW
4042   951B   C9 02                    CMP      #RNEW
4043   951D   D0 26                    BNE      BK2C
4044   951F   20 82 A3                 JSR      DKCLR         ;press OK to split
4045   9522                            MESSAGE  214
4049   9527                            OK
4054   952D   20 06 A8       BK2A:    JSR      GETKEY
4055   9530   C9 20                    CMP      #OKKEY
4056   9532   F0 11                    BEQ      BK2C
4057   9534   C9 10                    CMP      #NOKEY
4058   9536   F0 04                    BEQ      BK2B
4059   9538   C9 0B                    CMP      #HELPKEY
4060   953A   D0 F1                    BNE      BK2A
4061   953C                  BK2B:    HELP     61
4066   9543   80 D3                    BRA      BLOCK2
4067
4068
4069   9545   64 49          BK2C:    STZ      VALVE         ;entry of MAXON/MINOFF
4070   9547   20 A7 9E       B2SKIP:  JSR      NXTVALVE
4071   954A   90 03                    BCC      B2NEXT
4072   954C   4C 77 96                 JMP      B2END
4073
4074   954F   A6 49          B2NEXT:  LDX      VALVE         ;skip valves with 0 duration
4075   9551                            DBLX
4083   9557   BD 58 15                 LDA      DUR1,X
4084   955A   1D 59 15                 ORA      DUR1+1,X
4085   955D   F0 E8                    BEQ      B2SKIP
4086   955F   AD 72 02                 LDA      REVIEW
4087   9562   C9 02                    CMP      #RNEW
4088   9564   D0 20                    BNE      B2E
4089
4090                                ;  JSR      USESPLIT      ;split this station?
4091                                ;  BCC      B2NO
4092   9566   20 4A A2                 JSR      SHOW_SITE     ;new input, show site info
4093   9569   A6 49                    LDX      VALVE
4094   956B   BD CB 02                 LDA      TERRAIN,X
```

```
4095  956E  85 CB              STA    DEFAULT+2      ;terrain
4096  9570  BD D4 02            LDA    SPRINKLER,X
4097  9573  85 CC              STA    DEFAULT+3      ;sprinkler type
4098  9575  20 F9 A1            JSR    GETONOFF       ;get ON/OFF from tables
4099  9578  20 82 A3            JSR    DKCLR
4100  957B                      MESSAGE 22B
4104  9580  20 A7 AB            JSR    MSGWAIT
4105  9583  4C FB 95            JMP    B2CONFIRM
4106
4107  9586  A6 49        B2E:   LDX    VALVE          ;modify or review input
4108  9588  BD 42 15            LDA    MAXON,X
4109  958B  85 C9              STA    DEFAULT
4110  958D  BD 4B 15            LDA    MINOFF,X
4111  9590  85 CA              STA    DEFAULT+1
4112  9592  4C FB 95            JMP    B2CONFIRM
4113
4114               B2ENTRY:                          ;enter new splits
4115               ;       JSR    USESPLIT           ;use splits for this valve?
4116               ;       BCS    B2YES
4117               ;B2NO:  STZ    DEFAULT            ;no splits for this station
4118               ;       STZ    DEFAULT+1
4119               ;       JMP    B2CONFIRM
4120
4121  9595  20 82 A3     B2YES: JSR    DKCLR         ;User entry of ON/OFF
4122  9598  20 4E A1            JSR    DSTA
4123  959B                      MESSAGE 2B
4127  95A0  64 D7              STZ    SUB
4128  95A2  20 BA 9E            JSR    SHOW_DUR
4129  95A5                      SET_CURSOR LINE2
4133  95AA                      MESSAGE 31
4137  95AF                      SET_CURSOR LINE2+8
4141  95B4  A5 CA              LDA    DEFAULT+1
4142  95B6  20 9C A6            JSR    D2D
4143  95B9                      SET_CURSOR LINE2+1
4147  95BE  A5 C9              LDA    DEFAULT        ;select MAXON
4148  95C0                      SELECT 1,60
4156  95CD  90 09              BCC    B2S
4157  95CF                      HELP   77
4162  95D6  80 BD              BRA    B2YES
4163  95D8  85 C9        B2S:   STA    DEFAULT
4164
4165               B2O:                              ;select MINOFF
4166  95DA                      SET_CURSOR LINE2+8
4170  95DF  A5 CA              LDA    DEFAULT+1
4171  95E1                      SELECT 1,60
4179  95EE  90 09              BCC    B2R
4180  95F0                      HELP   78
4185  95F7  80 9C              BRA    B2YES
4186  95F9  85 CA        B2R:   STA    DEFAULT+1
4187
4188               B2CONFIRM:                        ;show default and confirm
4189  95FB  20 82 A3            JSR    DKCLR
4190  95FE  A5 C9              LDA    DEFAULT
4191               ;       BEQ    B2A
4192  9600  A6 49              LDX    VALVE
4193  9602  9D 42 15            STA    MAXON,X
4194  9605  64 D7              STZ    SUB
4195  9607  20 68 A0            JSR    HOWMANY
```

```
4196                        ;           BEQ     B2A
4197  960A  20 4E A1                    JSR     DSTA
4198  960D  A9 3A                       LDA     #':'
4199  960F  20 10 A3                    JSR     DCHAR 4200  9612                              SKIP    1
4204  9617  A5 56                       LDA     QUOTIENT
4205  9619  20 85 A6                    JSR     D3D
4206  961C                              MESSAGE 25
4210  9621                              SET_CURSOR LINE2
4214  9626                              MESSAGE 31
4218  962B                              SET_CURSOR LINE2+1
4222  9630  A5 C9                       LDA     DEFAULT
4223  9632  20 9C A6                    JSR     D2D
4224  9635                              SET_CURSOR LINE2+8
4228  963A  A5 CA                       LDA     DEFAULT+1
4229  963C  20 9C A6                    JSR     D2D
4230  963F                              SET_CURSOR LINE2+15
4234  9644  80 00                       BRA     B2B
4235                        ;B2A:       JSR     DSTA         ;no MAXON = no splits
4236                        ;           MESSAGE 155
4237  9646  20 E4 A1        B2B:        JSR     CONFIRM_BLINK
4238  9649  20 06 AB        B2C:        JSR     GETKEY
4239  964C  C9 20                       CMP     #OKKEY
4240  964E  F0 18                       BEQ     B2OK
4241  9650  C9 10                       CMP     #NOKEY
4242  9652  D0 0A                       BNE     B2P
4243  9654  AD 72 02                    LDA     REVIEW       ;no key ends review
4244  9657  C9 00                       CMP     #RREVIEW
4245  9659  F0 1C                       BEQ     B2END
4246  965B  4C 95 95                    JMP     B2ENTRY
4247  965E  C9 08          B2P:         CMP     #HELPKEY
4248  9660  D0 E7                       BNE     B2C
4249  9662  20 CD A1                    JSR     CONFIRM_HELP
4250  9665  4C FB 95                    JMP     B2CONFIRM
4251
4252  9668  A6 49          B2OK:        LDX     VALVE        ;default is confirmed
4253  966A  A5 C9                       LDA     DEFAULT
4254  966C  9D 42 15                    STA     MAXON,X
4255  966F  A5 CA                       LDA     DEFAULT+1
4256  9671  9D 4B 15                    STA     MINOFF,X
4257  9674  4C 47 95                    JMP     B2SKIP
4258
4259  9677  60             B2END:       RTS
4260
4261                       ;USESPLIT:
4262                       ;            JSR     DKCLR        ;use splits for this valve?
4263                       ;            JSR     DSTA
4264                       ;            MESSAGE 30
4265                       ;            SET_CURSOR LINE2+7
4266                       ;            STZ     SUB
4267                       ;            JSR     SHOW_DUR
4268                       ;            SET_CURSOR 15
4269                       ;            QM
4270                       ;B2K:        JSR     GETKEY
4271                       ;            CMP     #OKKEY
4272                       ;            BEQ     B2M
4273                       ;            CMP     #NOKEY
4274                       ;            BEQ     B2L
```

```
4275                    ;           CMP     #HELPKEY
4276                    ;           BNE     B2K
4277                    ;           HELP    61
4278                    ;           BRA     USESPLIT
4279                    ;B2M:       SEC                     ;return carry set to use split
4280                    ;           RTS
4281                    ;B2L:       CLC                     ;carry clear to skip split
4282                    ;           RTS
4283                    ;
4284
4285                    ;-------------------------------
4286
4287                    BLOCK3:                             ;enter base cycles
4288    9678  64 D7                 STZ     SUB
4289    967A  80 04                 BRA     B311
4290
4291                    BLOCK11:                            ;enter soak cycles
4292    967C  A9 02                 LDA     #2
4293    967E  85 D7                 STA     SUB
4294
4295    9680  64 49     B311:       STZ     VALVE
4296    9682  64 E5                 STZ     R6              ;1st station flag
4297    9684  20 A7 9E  B3SKIP:     JSR     NXTVALVE
4298    9687  90 03                 BCC     B3NEXT
4299    9689  4C 83 98              JMP     B3END
4300    968C  A6 49     B3NEXT:     LDX     VALVE           ;skip valves with 0 duration
4301    968E                        DBLX
4309    9694  A5 D7                 LDA     SUB
4310    9696  F0 08                 BEQ     B11A
4311    9698  BD 85 15              LDA     DUR3,X
4312    969B  1D B6 15              ORA     DUR3+1,X
4313    969E  80 06                 BRA     B11B
4314    96A0  BD 58 15  B11A:       LDA     DUR1,X
4315    96A3  1D 59 15              ORA     DUR1+1,X
4316    96A6  F0 DC     B11B:       BEQ     B3SKIP
4317    96A8  AD 72 02              LDA     REVIEW
4318    96AB  C9 02                 CMP     #RNEW
4319    96AD  D0 1C                 BNE     B3E
4320
4321    96AF  A5 E5                 LDA     R6              ;new input
4322    96B1  D0 06                 BNE     B3AA            ;if not 1st valve,
4323    96B3                        SET     R6
4327    96B7  80 09                 BRA     B3BB
4328    96B9  20 72 A1  B3AA:       JSR     ISCOPY          ;see if want to copy
4329    96BC  90 03                 BCC     B3BB
4330    96BE  4C 14 98              JMP     B3CONFIRM
4331
4332    96C1  A9 01     B3BB:       LDA     #1              ;day or wk cycle
4333    96C3  85 C9                 STA     DEFAULT
4334    96C5  A9 7F                 LDA     #01111111B      ;specific days
4335    96C7  85 CA                 STA     DEFAULT+1
4336    96C9  80 26                 BRA     B3ENTRY
4337    96CB  A6 49     B3E:        LDX     VALVE           ;modify or review input
4338    96CD                        DBLX
4346    96D3  A5 D7                 LDA     SUB
4347    96D5  F0 0D                 BEQ     B3CC
4348    96D7  BD C7 15              LDA     CYCLE3,X
4349    96DA  85 C9                 STA     DEFAULT
```

```
4350  96DC  BD C8 15              LDA      CYCLE3+1,X
4351  96DF  85 CA                 STA      DEFAULT+1
4352  96E1  4C 14 98              JMP      B3CONFIRM
4353  96E4  BD 6A 15      B3CC:   LDA      CYCLE1,X
4354  96E7  85 C9                 STA      DEFAULT
4355  96E9  BD 6B 15              LDA      CYCLE1+1,X
4356  96EC  85 CA                 STA      DEFAULT+1
4357  96EE  4C 14 98              JMP      B3CONFIRM
4358
4359                      B3ENTRY:                         ;enter new cycle
4360  96F1  AD 41 15              LDA      CYCLE_TYPE
4361  96F4  D0 4D                 BNE      B3T
4362  96F6  20 82 A3              JSR      DKCLR           ;show duration
4363  96F9  20 4E A1              JSR      DSTA
4364  96FC  A5 07                 LDA      SUB
4365  96FE  F0 07                 BEQ      B11F
4366  9700                        MESSAGE  186
4370  9705  80 05                 BRA      B116
4371  9707          B11F:         MESSAGE  28
4375  970C  20 BA 9E      B116:   JSR      SHOW_DUR
4376  970F                        SET_CURSOR LINE2
4380  9714                        MOV16    DEFAULT,IBFR
4386  971C  20 8F A6              JSR      DISPCYCLE       ;enter so many days
4387  971F                        SET_CURSOR LINE2+6
4391  9724  A5 C9                 LDA      DEFAULT
4392  9726                        SELECT   1,90
4400  9733  90 09                 BCC      B3U
4401  9735                        HELP     55
4406  973C  80 B3                 BRA      B3ENTRY
4407  973E  85 C9         B3U:    STA      DEFAULT
4408  9740  4C 14 98              JMP      B3CONFIRM
4409
4410  9743          B3T:          SET      IBFR+6          ;enter specific days
4414  9747  64 CA                 STZ      DEFAULT+1
4415  9749                        SET      DEFAULT
4419  974D  20 82 A3              JSR      DKCLR
4420  9750                        ANMED
4424  9754  20 85 A3      B3V:    JSR      DISPLAY_CLR
4425  9757  20 4E A1              JSR      DSTA
4426  975A                        MESSAGE  29
4430  975F  A9 3A                 LDA      #':'
4431  9761  20 10 A3              JSR      DCHAR
4432  9764                        SKIP     1
4436  9769  A5 CA                 LDA      DEFAULT+1       ;show days selected so far on line1
4437  976B  85 62                 STA      IBFR+1
4438  976D  A9 08                 LDA      #8
4439  976F  38                    SEC
4440  9770  E5 67                 SBC      IBFR+6
4441  9772  AA                    TAX
4442  9773  18            B3A:    CLC
4443  9774  26 62                 ROL      IBFR+1
4444  9776  CA                    DEX
4445  9777  D0 FA                 BNE      B3A
4446  9779  20 69 A6              JSR      DSP
4447  977C                        SET_CURSOR LINE2
4451  9781                        MESSAGE  26
4455                                                       ;show day of week in IBFR+6
```

```
4456  9786  20 7A A5           JSR   DISPLAY_DOW
4457  9789                     SKIP  1
4461  978E  A9 3F              LDA   #'?'
4462  9790  20 10 A3           JSR   DCHAR
4463  9793                     OK
4468  9799  20 86 AB    B3F:   JSR   GETKEY
4469  979C  C9 20              CMP   #OKKEY
4470  979E  F0 15              BEQ   B3G
4471  97A0  C9 18              CMP   #NOKEY
4472  97A2  F0 0E              BEQ   B3W
4473  97A4  C9 88              CMP   #HELPKEY
4474  97A6  D0 F1              BNE   B3F
4475  97A8                     HELP  72
4480  97AF  4C F1 96           JMP   B3ENTRY
4481  97B2  18          B3W:   CLC
4482  97B3  80 01              BRA   B3J
4483  97B5  38          B3G:   SEC                ;bit set if watering day
4484  97B6  26 CA       B3J:   ROL   DEFAULT+1
4485  97B8  E6 67              INC   IBFR+6
4486  97BA  A5 67              LDA   IBFR+6       ;do all 7 days
4487  97BC  C9 08              CMP   #8
4488  97BE  D0 94              BNE   B3V
4489  97C0                     ANDFF
4492  97C2  A2 01              LDX   #1
4493  97C4  BD 58 F8    B3X:   LDA   CBTBL,X      ;if not one specific day,
4494  97C7  C5 CA              CMP   DEFAULT+1
4495  97C9  F0 08              BEQ   B3Y
4496  97CB  E8                 INX
4497  97CC  E0 08              CPX   #8
4498  97CE  D0 F4              BNE   B3X
4499  97D0  4C 14 98           JMP   B3CONFIRM    ;then leave it a weekly cycle
4500
4501  97D3  86 67       B3Y:   STX   IBFR+6       ;else select # of weeks
4502  97D5  20 C8 A3           JSR   CLR_LINE2
4503  97D8  20 7A A5           JSR   DISPLAY_DOW
4504  97DB                     SKIP  1
4508  97E0                     MESSAGE 38
4512  97E5                     SET_CURSOR LINE2+11
4516  97EA                     MESSAGE 35
4520  97EF                     SET_CURSOR LINE2+10
4524  97F4  A5 C9              LDA   DEFAULT
4525  97F6                     SELECT 1,9
4533  9803  90 3A              BCC   B3Z
4534  9805                     HELP  72
4539  980C  4C F1 96           JMP   B3ENTRY
4540  980F  85 C9       B3Z:   STA   DEFAULT
4541  9811  4C 14 98           JMP   B3CONFIRM
4542
4543              B3CONFIRM:                      ;show default and confirm
4544  9814  20 82 A3           JSR   DKCLR        ;show duration
4545  9817  20 4E A1           JSR   DSTA
4546  981A  A5 D7              LDA   SUB
4547  981C  F0 07              BEQ   B11J
4548  981E                     MESSAGE 186
4552  9823  80 05              BRA   B11K
4553  9825         B11J:       MESSAGE 28
4557  982A  20 BA 9E   B11K:   JSR   SHOW_DUR
4558  982D                     SET_CURSOR LINE2
4562  9832                     MOV16 DEFAULT,IBFR
```

```
4568  983A  20 0F A6            JSR   DISPCYCLE
4569  983D  20 E4 A1    B3B:    JSR   CONFIRM_BLINK
4570  9840  20 06 AB    B3C:    JSR   GETKEY
4571  9843  C9 20               CMP   #OKKEY
4572  9845  F0 17               BEQ   B3OK
4573  9847  C9 10               CMP   #NOKEY
4574  9849  D0 0A               BNE   B3P
4575  984B  AD 72 82            LDA   REVIEW          ;no key ends review
4576  984E  C9 00               CMP   #RREVIEW
4577  9850  F0 31               BEQ   B3END
4578  9852  4C F1 96            JMP   B3ENTRY
4579  9855  C9 08       B3P:    CMP   #HELPKEY
4580  9857  D0 E7               BNE   B3C
4581  9859  20 CD A1            JSR   CONFIRM_HELP
4582  985C  80 B6               BRA   B3CONFIRM
4583
4584  985E  A6 49       B3OK:   LDX   VALVE           ;default is confirmed
4585  9860                      DBLX
4593  9866  A5 D7               LDA   SUB
4594  9868  F0 0C               BEQ   B11C
4595  986A  A5 C9               LDA   DEFAULT
4596  986C  9D C7 15            STA   CYCLE3,X
4597  986F  A5 CA               LDA   DEFAULT+1
4598  9871  9D C8 15            STA   CYCLE3+1,X
4599  9874  80 0A               BRA   B11D
4600  9876  A5 C9       B11C:   LDA   DEFAULT
4601  9878  9D 6A 15            STA   CYCLE1,X
4602  987B  A5 CA               LDA   DEFAULT+1
4603  987D  9D 6B 15            STA   CYCLE1+1,X
4604  9880  4C 34 96    B11D:   JMP   B3SKIP
4605
4606  9883  60          B3END:  RTS
4607
4608                            ;--------------------------------
4609
4610                    BLOCK4:                        ;enter excluded time
4611  9884  AD 72 82            LDA   REVIEW
4612  9887  C9 02               CMP   #RNEW
4613  9889  D0 0A               BNE   B4E
4614  988B  64 C9               STZ   DEFAULT         ;new input
4615  988D  64 CA               STZ   DEFAULT+1
4616  988F  64 CB               STZ   DEFAULT+2
4617  9891  64 CC               STZ   DEFAULT+3
4618  9893  80 17               BRA   B4ENTRY
4619                    B4E:                           ;modify or review input
4620  9895                      MOV16 XFROM,DEFAULT
4626  989F                      MOV16 XTO,DEFAULT+2
4632  98A9  4C 62 99            JMP   B4CONFIRM
4633
4634                    B4ENTRY:                       ;enter excluded time
4635  98AC  20 82 A3            JSR   OKCLR           ;want excluded time?
4636  98AF                      MESSAGE 49
4640  98B4                      OM
4645  98BA  20 06 AB    B4K:    JSR   GETKEY
4646  98BD  C9 20               CMP   #OKKEY
4647  98BF  F0 1C               BEQ   B4L
4648  98C1  C9 10               CMP   #NOKEY
```

```
4649  98C3  D0 8B                BNE      B4M
4650  98C5  64 C9                STZ      DEFAULT        ;no excluded time
4651  98C7  64 CA                STZ      DEFAULT+1
4652  98C9  64 CB                STZ      DEFAULT+2
4653  98CB  64 CC                STZ      DEFAULT+3
4654  98CD  4C C2 99             JMP      B4OK
4655  98D0  C9 88         B4M:   CMP      #HELPKEY
4656  98D2  D0 E6                BNE      B4K
4657  98D4                       HELP     80
4662  98DB  80 CF                BRA      B4ENTRY
4663
4664  98DD  20 82 A3      B4L:   JSR      DKCLR          ;yes, enter FROM time
4665  98E0                       MESSAGE  48
4669  98E5                       SET_CURSOR LINE2
4673  98EA                       MOV16    DEFAULT,OFFSET
4679  98F2  20 CF AB             JSR      MIN2HM
4680  98F5  20 7C A7             JSR      GETTIME
4681  98F8  90 0A                BCC      B4N
4682  98FA                       HELP     81
4687  9901  4C AC 98             JMP      B4ENTRY
4688  9904  20 B3 AB      B4N:   JSR      HM2MIN         ;save entered time
4689  9907                       MOV16    OFFSET,DEFAULT
4695  990F                       SET_CURSOR LINE2+7
4699  9914  A9 2D                LDA      #'-'
4700  9916  20 10 A3             JSR      DCHAR
4701                                                     ;enter TO time
4702  9919                       MOV16    DEFAULT,DEFAULT+2
4708  9921                       MOV16    DEFAULT+2,OFFSET
4714  9929  20 CF AB             JSR      MIN2HM
4715  992C  20 7C A7             JSR      GETTIME
4716  992F  90 0A                BCC      B4O
4717  9931                       HELP     82
4722  9938  4C AC 98             JMP      B4ENTRY
4723  993B  20 B3 AB      B4O:   JSR      HM2MIN         ;save entered time
4724  993E                       MOV16    OFFSET,DEFAULT+2
4730  9946  A5 CA                LDA      DEFAULT+1      ;if FROM>=UNTIL then error
4731  9948  C5 CC                CMP      DEFAULT+3
4732  994A  F0 04                BEQ      B4P
4733  994C                       BLT      B4CONFIRM
4736  994E  80 0B                BRA      B4Q
4737  9950  A5 C9         B4P:   LDA      DEFAULT
4738  9952  C5 CB                CMP      DEFAULT+2
4739  9954  F0 02                BEQ      B4Q
4740  9956                       BLT      B4CONFIRM
4743  9958          B4Q:         HELP     68
4748  995F  4C AC 98             JMP      B4ENTRY
4749
4750                B4CONFIRM:                           ;show default and confirm
4751  9962  20 82 A3             JSR      DKCLR
4752  9965                       MESSAGE  48
4756  996A                       SET_CURSOR LINE2
4760  996F  A5 C9                LDA      DEFAULT        ;no watering time if all 0
4761  9971  05 CA                ORA      DEFAULT+1
4762  9973  05 CB                ORA      DEFAULT+2
4763  9975  05 CC                ORA      DEFAULT+3
4764  9977  F0 23                BEQ      B4G
4765  9979                       MOV16    DEFAULT,OFFSET
```

```
4771  9981  20 CF AB              JSR      MIN2HM
4772  9984  20 BE A5              JSR      DISPTIME
4773  9987  A9 2D                 LDA      #'-'
4774  9989  20 10 A3              JSR      DCHAR
4775  998C                        MOV16    DEFAULT+2,OFFSET
4781  9994  20 CF AB              JSR      MIN2HM
4782  9997  20 BE A5              JSR      DISPTIME
4783  999A  80 05                 BRA      B4F
4784  999C               B4G:     MESSAGE 162
4788  99A1  20 E4 A1     B4F:     JSR      CONFIRM_BLINK
4789  99A4  20 06 AB     B4C:     JSR      GETKEY
4790  99A7  C9 20                 CMP      #OKKEY
4791  99A9  F0 17                 BEQ      B4OK
4792  99AB  C9 10                 CMP      #NOKEY
4793  99AD  D0 0A                 BNE      B4X
4794  99AF  AD 72 82              LDA      REVIEW        ;no key ends review
4795  99B2  C9 00                 CMP      #RREVIEW
4796  99B4  F0 27                 BEQ      B4END
4797  99B6  4C AC 98              JMP      B4ENTRY
4798  99B9  C9 08        B4X:     CMP      #HELPKEY
4799  99BB  D0 E7                 BNE      B4C
4800  99BD  20 CD A1              JSR      CONFIRM_HELP
4801  99C0  80 A0                 BRA      B4CONFIRM
4802
4803  99C2  AD 72 82     B4OK:    LDA      REVIEW        ;default is confirmed
4804  99C5  C9 00                 CMP      #RREVIEW      ;next one if review
4805  99C7  F0 14                 BEQ      B4END
4806  99C9                        MOV16    DEFAULT,XFROM
4812  99D3                        MOV16    DEFAULT+2,XTO
4818  99DD  60           B4END:   RTS
4819
4820                             ;--------------------------------
4821
4822                    BLOCK5:                          ;enter start time
4823  99DE  AD 72 82              LDA      REVIEW
4824  99E1  C9 02                 CMP      #RNEW
4825  99E3  D0 06                 BNE      B5E
4826  99E5  64 C9                 STZ      DEFAULT       ;new input
4827  99E7  64 CA                 STZ      DEFAULT+1
4828  99E9  80 0C                 BRA      B5ENTRY
4829                    B5E:                             ;modify or review input
4830  99EB                        MOV16    BASE_START,DEFAULT
4836  99F5  80 2D                 BRA      B5CONFIRM
4837
4838                    B5ENTRY:                         ;enter a new start time
4839  99F7  20 92 A3              JSR      DKCLR
4840  99FA                        MESSAGE 36
4844  99FF                        MOV16    DEFAULT,OFFSET
4850  9A07  20 CF AB              JSR      MIN2HM
4851  9A0A  20 7C A7              JSR      GETTIME
4852  9A0D  90 0A                 BCC      B5K
4853  9A0F                        HELP     53
4858  9A16  4C F7 99              JMP      B5ENTRY
4859  9A19  20 83 A8     B5K:     JSR      HM2MIN        ;save entered time
4860  9A1C                        MOV16    OFFSET,DEFAULT
4866
4867                    B5CONFIRM:                       ;show default and confirm
```

```
4868  9A24  20 82 A3            JSR      DKCLR
4869  9A27                      MESSAGE  36
4873  9A2C                      MOV16    DEFAULT,OFFSET
4879  9A34  20 CF AB            JSR      MIN2HM
4880  9A37  20 BE A5            JSR      DISPTIME
4881  9A3A  20 E4 A1            JSR      CONFIRM_BLINK
4882  9A3D  20 06 AB    B5C:    JSR      GETKEY
4883  9A40  C9 20               CMP      #OKKEY
4884  9A42  F0 16               BEQ      B5OK
4885  9A44  C9 10               CMP      #NOKEY
4886  9A46  D0 09               BNE      B5I
4887  9A48  AD 72 02            LDA      REVIEW          ;no key ends review
4888  9A4B  C9 00               CMP      #RREVIEW
4889  9A4D  F0 1C               BEQ      B5END
4890  9A4F  80 A6               BRA      B5ENTRY
4891  9A51  C9 08       B5I:    CMP      #HELPKEY
4892  9A53  D0 E8               BNE      B5C
4893  9A55  20 CD A1            JSR      CONFIRM_HELP
4894  9A58  80 CA               BRA      B5CONFIRM
4895
4896  9A5A  AD 72 02    B5OK:   LDA      REVIEW          ;default is confirmed
4897  9A5D  C9 00               CMP      #RREVIEW        ;next one if review
4898  9A5F  F0 0A               BEQ      B5END
4899  9A61                      MOV16    DEFAULT,BASE_START
4905
4906  9A6B  60          B5END:  RTS
4907
4908                          ;---------------------------------
4909
4910                            BLOCK10:                 ;soak criteria
4911  9A6C  AD 72 02            LDA      REVIEW
4912  9A6F  C9 02               CMP      #RNEW
4913  9A71  D0 31               BNE      BK10C
4914  9A73  20 82 A3            JSR      DKCLR           ;want soaks?
4915  9A76                      MESSAGE  141
4919  9A7B                      QM
4924  9A81  20 06 AB    BK10A:  JSR      GETKEY
4925  9A84  C9 20               CMP      #OKKEY
4926  9A86  F0 1C               BEQ      BK10C
4927  9A88  C9 10               CMP      #NOKEY
4928  9A8A  D0 0B               BNE      BK10B
4929  9A8C  A2 11               LDX      #17             ;clear soak durations
4930  9A8E  9E 85 15    B10AA:  STZ      DUR3,X
4931  9A91  CA                  DEX
4932  9A92  10 FA               BPL      B10AA
4933  9A94  4C 06 9C            JMP      B10END
4934  9A97  C9 08       BK10B:  CMP      #HELPKEY
4935  9A99  D0 E6               BNE      BK10A
4936  9A9B                      HELP     121
4941  9AA2  80 C8               BRA      BLOCK10
4942
4943
4944  9AA4  64 49       BK10C:  STZ      VALVE           ;entry of soak duration
4945  9AA6  20 A7 9E    B10SKIP: JSR     NXTVALVE
4946  9AA9  90 03               BCC      B10NEXT
4947  9AAB  4C 06 9C            JMP      B10END
4948  9AAE                      B10NEXT:
```

```
4949  9AAE  A6 49              LDX   VALVE          ;skip if no base dur
4950  9AB0              DBLX
4958  9AB6  BD 58 15           LDA   DUR1,X
4959  9AB9  1D 59 15           ORA   DUR1+1,X
4960  9ABC  F0 E8              BEQ   B10SKIP
4961  9ABE  AD 72 02           LDA   REVIEW
4962  9AC1  C9 02              CMP   #RNEW
4963  9AC3  D0 22              BNE   B10E
4964  9AC5  20 07 9C           JSR   USESOAK        ;new input
4965  9AC8  90 37              BCC   B10NO
4966  9ACA  20 82 A3           JSR   DKCLR
4967  9ACD              MESSAGE 229                 ;use site info to calculate
4971  9AD2  20 A7 AB           JSR   MSGWAIT
4972  9AD5  A6 49              LDX   VALVE
4973  9AD7  BD CB 02           LDA   TERRAIN,X
4974  9ADA  85 CB              STA   DEFAULT+2
4975  9ADC  BD D4 02           LDA   SPRINKLER,X
4976  9ADF  85 CC              STA   DEFAULT+3
4977  9AE1  20 20 A2           JSR   GETSOAKDUR
4978  9AE4  4C 51 9B           JMP   B10CONFIRM
4979  9AE7  A6 49    B10E:     LDX   VALVE          ;modify or review input
4980  9AE9              DBLX
4988  9AEF  BD B5 15           LDA   DUR3,X
4989  9AF2  85 C9              STA   DEFAULT
4990  9AF4  BD B6 15           LDA   DUR3+1,X
4991  9AF7  85 CA              STA   DEFAULT+1
4992  9AF9  4C 51 9B           JMP   B10CONFIRM
4993
4994              B10ENTRY:                          ;enter new soaks
4995  9AFC  20 07 9C           JSR   USESOAK        ;do soak?
4996  9AFF  B0 07              BCS   B10YES
4997  9B01  64 C9    B10NO:    STZ   DEFAULT        ;no soak for this station
4998  9B03  64 CA              STZ   DEFAULT+1
4999  9B05  4C 51 9B           JMP   B10CONFIRM
5000  9B08  20 82 A3 B10YES:   JSR   DKCLR
5001  9B0B  20 4E A1           JSR   DSTA
5002  9B0E              SKIP  1
5006  9B13              MESSAGE 28
5010  9B18  64 D7              STZ   SUB
5011  9B1A  20 BA 9E           JSR   SHOW_DUR
5012  9B1D              SET_CURSOR LINE2
5016  9B22              MESSAGE 103
5020  9B27  A9 02              LDA   #2
5021  9B29  85 D7              STA   SUB
5022  9B2B              MOV16 DEFAULT,OFFSET
5028  9B33  20 CF A8           JSR   MIN2HM
5029  9B36  20 3F AB           JSR   GETDURB
5030  9B39  B0 0D              BCS   B10S
5031  9B3B  20 B3 AB           JSR   HM2MIN
5032  9B3E              MOV16 OFFSET,DEFAULT
5038  9B46  80 09              BRA   B10CONFIRM
5039  9B48           B10S:     HELP  54
5044  9B4F  80 AB              BRA   B10ENTRY
5045
5046              B10CONFIRM:                       ;show default and confirm
5047  9B51  A5 C9              LDA   DEFAULT
5048  9B53  05 CA              ORA   DEFAULT+1
```

```
5049   9B55   F8 66                 BEQ    B10A
5050   9B57   20 82 A3              JSR    DKCLR
5051   9B5A   20 4E A1              JSR    DSTA
5052   9B5D                         MESSAGE 186
5056   9B62                         MOV16  DEFAULT,OFFSET
5062   9B6A   20 CF AB              JSR    MIN2HM
5063   9B6D   20 F3 A5              JSR    DISPDURATION
5064   9B70                         SET_CURSOR LINE2
5068   9B75   A6 49                 LDX    VALVE
5069   9B77   BD 42 15              LDA    MAXON,X
5070   9B7A   D0 07                 BNE    B10Z
5071   9B7C                         MESSAGE 230           ;no splits
5075   9B81   80 45                 BRA    B10B
5076   9B83          B10Z:          MESSAGE 184
5080   9B88                         SET_CURSOR LINE2+5
5084   9B8D   A9 02                 LDA    #2
5085   9B8F   85 D7                 STA    SUB
5086   9B91   A6 49                 LDX    VALVE
5087   9B93                         DBLX
5095   9B99   A5 C9                 LDA    DEFAULT
5096   9B9B   9D 85 15              STA    DUR3,X
5097   9B9E   A5 CA                 LDA    DEFAULT+1
5098   9BA0   9D B6 15              STA    DUR3+1,X
5099   9BA3   20 6B A8              JSR    HOWMANY
5100   9BA6   20 9C A6              JSR    D2D
5101   9BA9                         SKIP   1
5105   9BAE   A6 49                 LDX    VALVE
5106   9BB0   BD 42 15              LDA    MAXON,X
5107   9BB3   20 9C A6              JSR    D2D
5108   9BB6                         SET_CURSOR LINE2+15
5112   9BBB   80 0B                 BRA    B10B
5113   9BBD   20 82 A3   B10A:      JSR    DKCLR
5114   9BC0                         MESSAGE 185           ;no soak
5118   9BC5   20 55 A1              JSR    DSTATION#
5119   9BC8   20 E4 A1   B10B:      JSR    CONFIRM_BLINK
5120   9BCB   20 06 AB   B10C:      JSR    GETKEY
5121   9BCE   C9 20                 CMP    #OKKEY
5122   9BD0   F0 18                 BEQ    B10OK
5123   9BD2   C9 10                 CMP    #NOKEY
5124   9BD4   D0 0A                 BNE    B10P
5125   9BD6   AD 72 02              LDA    REVIEW         ;no key ends review
5126   9BD9   C9 00                 CMP    #RREVIEW
5127   9BDB   F0 29                 BEQ    B10END
5128   9BDD   4C FC 9A              JMP    B10ENTRY
5129   9BE0   C9 03      B10P:      CMP    #HELPKEY
5130   9BE2   D0 E7                 BNE    B10C
5131   9BE4   20 CD A1              JSR    CONFIRM_HELP
5132   9BE7   4C 51 9B              JMP    B10CONFIRM
5133
5134   9BEA   A6 49      B10OK:     LDX    VALVE          ;default is confirmed
5135   9BEC                         DBLX
5143   9BF2   A5 C9                 LDA    DEFAULT
5144   9BF4   9D 85 15              STA    DUR3,X
5145   9BF7   A5 CA                 LDA    DEFAULT+1
5146   9BF9   9D B6 15              STA    DUR3+1,X
5147   9BFC   20 A7 9E              JSR    NXTVALVE
5148   9BFF   90 02                 BCC    B10D
```

```
5149  9C01  80 03              BRA     B10END         ;next valve if any
5150                     B10D: ; LDA    REVIEW         ;if new,
5151                          ; CMP    #RNEW
5152                          ; BNE    B100
5153                          ; JSR    ISCOPY         ;copy to next valve?
5154                          ; BCC    B100
5155                          ; JMP    B10CONFIRM     ;yes
5156  9C03  4C AE 9A     B100: JMP    B10NEXT        ;no
5157
5158  9C06  60           B10END: RTS
5159
5160  9C07               USESOAK:
5161  9C07  20 82 A3           JSR     DKCLR          ;use soaks for this valve?
5162  9C0A  20 4E A1           JSR     DSTA
5163  9C0D                     MESSAGE 146
5167  9C12                     SET_CURSOR LINE2
5171  9C17  A9 28              LDA     #'('
5172  9C19  20 10 A3           JSR     DCHAR
5173  9C1C                     MESSAGE 28
5177  9C21  64 D7              STZ     SUB
5178  9C23  20 BA 9E           JSR     SHOW_DUR
5179  9C26  A9 29              LDA     #')'
5180  9C28  20 10 A3           JSR     DCHAR
5181  9C2B                     SET_CURSOR 14
5185  9C30                     QM
5190  9C36  20 06 AB     US01: JSR    GETKEY
5191  9C39  C9 20              CMP     #OKKEY
5192  9C3B  F0 11              BEQ     US02
5193  9C3D  C9 10              CMP     #NOKEY
5194  9C3F  F0 0F              BEQ     US03
5195  9C41  C9 08              CMP     #HELPKEY
5196  9C43  D0 F1              BNE     US01
5197  9C45                     HELP    61
5202  9C4C  80 B9              BRA     USESOAK
5203  9C4E  38           US02: SEC                    ;return carry set to use soak
5204  9C4F  60                 RTS
5205  9C50  18           US03: CLC                    ;carry clear for no soak
5206  9C51  60                 RTS
5207
5208                     ;--------------------------------
5209
5210  9C52               VA90:
5211                     VA60:                        ;WANT SYRINGES?
5212  9C52  20 82 A3           JSR     DKCLR
5213  9C55                     MESSAGE 65
5217  9C5A                     QM
5222  9C60  20 06 AB     VA61: JSR    GETKEY
5223  9C63  C9 20              CMP     #OKKEY
5224  9C65  F0 14              BEQ     VA62
5225  9C67  C9 10              CMP     #NOKEY
5226  9C69  D0 03              BNE     VA6A
5227  9C6B  4C 52 9C           JMP     VA90
5228  9C6E  C9 08        VA6A: CMP    #HELPKEY
5229  9C70  D0 EE              BNE     VA61
5230  9C72                     HELP    73
5235  9C79  80 D7              BRA     VA60
5236
```

```
5237   9C7B   4C 21 9D    VA62:   JMP      VA70           ;SKIP THIS FOR NOW
5238   9C7E   A9 01               LDA      #1             ;enter syringe active months
5239   9C80   A2 0C               LDX      #12            ;start off with all active
5240   9C82   9D A2 15    VA6B:   STA      ACTIVE_MONTH,X
5241   9C85   CA                  DEX
5242   9C86   D0 FA               BNE      VA6B
5243   9C88   20 C4 AB    VA65:   JSR      SHOW_MONTHS    ;show active months
5244   9C8B                       SKIP     1
5248   9C90                       ON                      ;then confirm
5253   9C96   20 06 AB    VA6F:   JSR      GETKEY
5254   9C99   C9 20               CMP      #OKKEY
5255   9C9B   D0 03               BNE      VA6G
5256   9C9D   4C 21 9D            JMP      VA70           ;ok
5257   9CA0   C9 10       VA6G:   CMP      #NOKEY
5258   9CA2   F0 0D               BEQ      VA63
5259   9CA4   C9 08               CMP      #HELPKEY
5260   9CA6   D0 EE               BNE      VA6F
5261   9CA8                       HELP     73
5266   9CAF   80 CA               BRA      VA62
5267   9CB1   64 49       VA63:   STZ      VALVE          ;no, enter new active months
5268   9CB3   20 82 A3            JSR      DKCLR
5269   9CB6                       MESSAGE  190
5273   9CBB                       SET_CURSOR LINE2
5277   9CC0   64 41               STZ      LSB
5278   9CC2   E6 41       VA64:   INC      LSB
5279   9CC4   A5 41               LDA      LSB
5280   9CC6   C9 0D               CMP      #13
5281   9CC8   F0 BE               BEQ      VA65
5282   9CCA                       SKIP     1
5286   9CCF   A6 41               LDX      LSB
5287   9CD1   A9 01               LDA      #1
5288   9CD3   9D A2 15            STA      ACTIVE_MONTH,X
5289   9CD6   20 92 A3    VA6H:   JSR      KEY_RESET      ;show current month
5290   9CD9   A6 41               LDX      LSB
5291   9CDB   BD A2 15            LDA      ACTIVE_MONTH,X
5292   9CDE   F0 05               BEQ      VA6I
5293   9CE0   BD 4B F8            LDA      MONTBL,X
5294   9CE3   80 02               BRA      VA6J
5295   9CE5   A9 2D       VA6I:   LDA      #'-'
5296   9CE7   20 10 A3    VA6J:   JSR      DCHAR
5297   9CEA                       BACKUP   1
5301   9CEF                       SLOW     NOKEY
5307   9CF7                       UL
5314   9CFD   20 06 AB    VA6K:   JSR      GETKEY         ;select on/off
5315   9D00   C9 20               CMP      #OKKEY
5316   9D02   F0 BE               BEQ      VA64           ;ok, do next month
5317   9D04   C9 10               CMP      #NOKEY
5318   9D06   F0 0D               BEQ      VA6L
5319   9D08   C9 0B               CMP      #HELPKEY
5320   9D0A   D0 F1               BNE      VA6K
5321   9D0C                       HELP     73
5326   9D13   80 9C               BRA      VA63
5327   9D15   A6 41       VA6L:   LDX      LSB            ;no, toggle month
5328   9D17   BD A2 15            LDA      ACTIVE_MONTH,X
5329   9D1A   49 01               EOR      #00000001B
5330   9D1C   9D A2 15            STA      ACTIVE_MONTH,X
5331   9D1F   80 B5               BRA      VA6H
```

```
5332
5333  9D21  64 49       VA78:   STZ     VALVE           ;enter syringe durations
5334  9D23  64 C9               STZ     DEFAULT
5335  9D25  20 A7 9E    VA7A:   JSR     NXTVALVE
5336  9D28  90 03               BCC     VA7B
5337  9D2A  4C 6F 9D            JMP     VA75
5338  9D2D  20 82 A3    VA7B:   JSR     DKCLR           ;show default duration and get new one
5339  9D30  20 E5 9F            JSR     FLASH
5340  9D33                      MESSAGE 191
5344  9D3B                      SET_CURSOR LINE2+11
5348  9D3D  A5 C9               LDA     DEFAULT
5349  9D3F                      SELECT  0,15
5357  9D4C  90 09               BCC     VA7C
5358  9D4E                      HELP    73              ;help requested
5363  9D55  80 D6               BRA     VA78
5364  9D57  A6 49       VA7C:   LDX     VALVE           ;store the entered value
5365  9D59                      DBLX
5373  9D5F  9E 7F 15            STZ     DUR2+1,X
5374  9D62  A5 61               LDA     IBFR
5375  9D64  9D 7E 15            STA     DUR2,X
5376  9D67  85 C9               STA     DEFAULT
5377  9D69  D0 BA               BNE     VA7A            ;if 0 entered,
5378                     ;      JSR     ENTER_SKIP2     ;then verify to skip valve
5379  9D6B  90 BB               BCC     VA7A
5380  9D6D  80 8E               BRA     VA7B
5381
5382  9D6F  20 82 A3    VA75:   JSR     DKCLR           ;enter syringe from-to
5383  9D72  64 49               STZ     VALVE
5384  9D74                      MESSAGE 193
5388  9D79  64 65               STZ     IBFR+4          ;from
5389  9D7B  64 66               STZ     IBFR+5
5390  9D7D                      SET_CURSOR LINE2
5394  9D82  20 7C A7            JSR     GETTIME
5395  9D85  90 0A               BCC     VA7D
5396  9D87                      HELP    73
5401  9D8E  4C 6F 9D            JMP     VA75
5402  9D91  20 B3 AB    VA7D:   JSR     HM2MIN          ;save entered time
5403  9D94                      MOV16   OFFSET,SYRINGE_START
5409  9D9E                      SET_CURSOR LINE2+9     ;to
5413  9DA3  20 7C A7            JSR     GETTIME
5414  9DA6  90 0A               BCC     VA7E
5415  9DA8                      HELP    73
5420  9DAF  4C 6F 9D            JMP     VA75
5421  9DB2  20 B3 AB    VA7E:   JSR     HM2MIN          ;save entered time
5422  9DB5                      MOV16   OFFSET,SYRINGE_END
5428
5429  9DBF  AD B0 15            LDA     SYRINGE_START+1 ;if FROM>TO then error
5430  9DC2  CD B2 15            CMP     SYRINGE_END+1
5431  9DC5  F0 04               BEQ     VA7F
5432  9DC7                      BLT     VA80
5435  9DC9  80 0A               BRA     VA7G
5436  9DCB  AD AF 15    VA7F:   LDA     SYRINGE_START
5437  9DCE  CD B1 15            CMP     SYRINGE_END
5438  9DD1                      BLT     VA80
5441  9DD3  F0 0A               BEQ     VA7H
5442  9DD5                VA7G: HELP    68
5447  9DDC  4C 6F 9D            JMP     VA75
```

```
5448  9DDF  9C B4 15   VA7H:   STZ     SOFTEN+1        ;FROM=TO, do one syringe,
5449  9DE2             SET     SOFTEN                  ;don't ask for interval
5453  9DE7  80 6A      BRA     VA85
5454
5455  9DE9  20 82 A3   VA88:   JSR     DKCLR           ;get how often to syringe
5456  9DEC  64 49              STZ     VALVE
5457  9DEE                     MESSAGE 139
5461  9DF3  64 CF              STZ     OFFSET
5462  9DF5  64 D0              STZ     OFFSET+1
5463  9DF7  20 CF AB           JSR     MIN2HM
5464  9DFA  20 45 AB           JSR     GETDURATION
5465  9DFD  90 02              BCC     VA81
5466  9DFF  80 0D              BRA     VA82
5467  9E01  20 83 AB   VA81:   JSR     HM2MIN
5468  9E04                     MOV16   OFFSET,SOFTEN
5474
5475  9E0E  64 41      VA82:   STZ     LSB             ;check input
5476  9E10  64 42              STZ     MSB
5477  9E12                     SET     VALVE
5481  9E16  A6 49      VA8A:   LDX     VALVE           ;if SOFTEN
5482  9E18                     DBLX
5490  9E1E  18                 CLC
5491  9E1F  A5 41              LDA     LSB
5492  9E21  7D 7E 15           ADC     DUR2,X
5493  9E24  85 41              STA     LSB
5494  9E26  A5 42              LDA     MSB
5495  9E28  7D 7F 15           ADC     DUR2+1,X
5496  9E2B  85 42              STA     MSB
5497  9E2D  E6 49              INC     VALVE
5498  9E2F  A5 49              LDA     VALVE
5499  9E31  C9 09              CMP     #9
5500  9E33  D0 E1              BNE     VA8A
5501  9E35  AD B4 15           LDA     SOFTEN+1        ;< sum of syringe durations,
5502  9E38  C5 42              CMP     MSB
5503  9E3A                     BLT     VA8C
5506  9E3C  F0 02              BEQ     VA8B
5507  9E3E  80 13              BRA     VA85
5508  9E40  AD B3 15   VA8B:   LDA     SOFTEN
5509  9E43  C5 41              CMP     LSB
5510  9E45                     BLT     VA8C
5513  9E47  80 0A              BRA     VA85
5514  9E49             VA8C:   HELP    73              ;then error
5519  9E50  4C 21 9D           JMP     VA70
5520
5521  9E53  20 F1 A0   VA85:   JSR     SHOW_SYRCYC     ;confirm number of syringes
5522  9E56                     OM
5527  9E5C  20 06 AB   VA8D:   JSR     GETKEY
5528  9E5F  C9 20              CMP     #OKKEY
5529                     ;     BEQ     VA90
5530  9E61  C9 10              CMP     #NOKEY
5531  9E63  D0 03              BNE     VA8E
5532  9E65  4C 6F 9D           JMP     VA75
5533  9E68  C9 08      VA8E:   CMP     #HELPKEY
5534  9E6A  D0 F0              BNE     VA8D
5535  9E6C                     HELP    73
5540  9E73  4C 6F 9D           JMP     VA75
5541
```

```
5542
5543                         ;--------------------------------
5544                         ;       schedule entry subs
5545                         ;--------------------------------
5546
5547
5548              ENTER_CYCLE_TYPE:                  ;input specific or so many days
5549  9E76  20 82 A3          JSR     DKCLR
5550  9E79                    MESSAGE 51
5554  9E7E                    SET_CURSOR LINE2
5558  9E83  A9 00             LDA     #0
5559  9E85                    SELECT_SOK 0,1,52     ;select type
5569  9E96  90 09             BCC     EC0
5570  9E98                    HELP    56
5575  9E9F  80 D5             BRA     ENTER_CYCLE_TYPE
5576  9EA1  A5 61     EC0:    LDA     IBFR
5577  9EA3  8D 41 15          STA     CYCLE_TYPE
5578  9EA6  60                RTS
5579
5580              NXTVALVE:                          ;out: the next valid valve in VALVE
5581                                                 ;     carry set if no more valves
5582  9EA7  E6 49             INC     VALVE
5583  9EA9  A6 49             LDX     VALVE
5584  9EAB  E0 09             CPX     #9
5585  9EAD  F0 09             BEQ     NV1
5586  9EAF  BD 7D 02          LDA     VS,X
5587  9EB2  29 80             AND     #VID              ;valve must have ID
5588  9EB4  F0 F1             BEQ     NXTVALVE
5589  9EB6  18                CLC
5590  9EB7  60                RTS
5591  9EB8  38        NV1:    SEC
5592  9EB9  60                RTS
5593
5594              SHOW_DUR:                          ;show the duration for VALVE
5595                                                 ;in: VALVE, SUB
5596  9EBA  A5 D7             LDA     SUB             ;which duration to show?
5597  9EBC  F0 06             BEQ     SHD1
5598  9EBE  C9 01             CMP     #1
5599  9EC0  F0 16             BEQ     SHD2
5600  9EC2  80 28             BRA     SHD3
5601  9EC4  A6 49     SHD1:   LDX     VALVE           ;show DUR1
5602  9EC6                    DBLX
5610  9ECC  BD 58 15          LDA     DUR1,X
5611  9ECF  85 CF             STA     OFFSET
5612  9ED1  BD 59 15          LDA     DUR1+1,X
5613  9ED4  85 D0             STA     OFFSET+1
5614  9ED6  80 28             BRA     SHD4
5615  9ED8  A6 49     SHD2:   LDX     VALVE           ;show DUR2
5616  9EDA                    DBLX
5624  9EE0  BD 7E 15          LDA     DUR2,X
5625  9EE3  85 CF             STA     OFFSET
5626  9EE5  BD 7F 15          LDA     DUR2+1,X
5627  9EE8  85 D0             STA     OFFSET+1
5628  9EEA  80 14             BRA     SHD4
5629  9EEC  A6 49     SHD3:   LDX     VALVE           ;show DUR3
5630  9EEE                    DBLX
5638  9EF4  BD 85 15          LDA     DUR3,X
```

```
5639  9EF7  85 CF                    STA   OFFSET
5640  9EF9  BD B6 15                 LDA   DUR3+1,X
5641  9EFC  85 D8                    STA   OFFSET+1
5642  9EFE  80 00                    BRA   SHD4
5643  9F00  20 CF AB       SHD4:     JSR   MIN2HM
5644  9F03  20 F3 A5                 JSR   DISPDURATION
5645  9F06  60                       RTS
5646
5647                      SHOW_CYCLE:              ;show the cycle for valve
5648                                               ;in: VALVE,SUB
5649  9F07  A5 D7                    LDA   SUB     ;which cycle to show?
5650  9F09  F0 06                    BEQ   SHC1
5651  9F0B  C9 01                    CMP   #1
5652  9F0D  F0 16                    BEQ   SHC2
5653  9F0F  80 28                    BRA   SHC3
5654  9F11  A6 49          SHC1:     LDX   VALVE   ;show CYCLE1
5655  9F13                           DBLX
5663  9F19  BD 6A 15                 LDA   CYCLE1,X
5664  9F1C  85 61                    STA   IBFR
5665  9F1E  BD 6B 15                 LDA   CYCLE1+1,X
5666  9F21  85 62                    STA   IBFR+1
5667  9F23  80 26                    BRA   SHC4
5668  9F25  A6 49          SHC2:     LDX   VALVE   ;show CYCLE2
5669  9F27                           DBLX
5677  9F2D  BD 90 15                 LDA   CYCLE2,X
5678  9F30  85 61                    STA   IBFR
5679  9F32  BD 91 15                 LDA   CYCLE2+1,X
5680  9F35  85 62                    STA   IBFR+1
5681  9F37  80 12                    BRA   SHC4
5682  9F39  A6 49          SHC3:     LDX   VALVE   ;show CYCLE3
5683  9F3B                           DBLX
5691  9F41  BD C7 15                 LDA   CYCLE3,X
5692  9F44  85 61                    STA   IBFR
5693  9F46  BD C8 15                 LDA   CYCLE3+1,X
5694  9F49  85 62                    STA   IBFR+1
5695  9F4B  20 0F A6       SHC4:     JSR   DISPCYCLE
5696  9F4E  60                       RTS
5697
5698                      SHOW_START:              ;show the duration, cycle, and time
5699                                               ;in: NSPLIT(), out: VCTR() incremented
5700  9F4F  20 82 A3                 JSR   DKCLR
5701  9F52  20 E5 9F                 JSR   FLASH
5702  9F55  A0 02                    LDY   #2
5703  9F57  B1 7B                    LDA   (STARTPTR),Y
5704  9F59  85 49                    STA   VALVE
5705  9F5B  20 4E A1                 JSR   DSTA
5706  9F5E  A0 03                    LDY   #3      ;show type
5707  9F60  B1 7B                    LDA   (STARTPTR),Y
5708  9F62  29 70                    AND   #01110000B
5709  9F64  6A                       ROR   A
5710  9F65  6A                       ROR   A
5711  9F66  6A                       ROR   A
5712  9F67  6A                       ROR   A
5713  9F68  85 41                    STA   LSB
5714  9F6A  18                       CLC
5715  9F6B  69 94                    ADC   #148
5716  9F6D  AA                       TAX
```

```
5717  9F6E  20 D7 A2              JSR     DISPLAY_MSG
5718  9F71  A6 49                 LDX     VALVE
5719  9F73  A5 41                 LDA     LSB
5720  9F75  C9 01                 CMP     #1
5721  9F77  D0 08                 BNE     SST5
5722  9F79  FE 68 82              INC     VSYR,X
5723  9F7C  BD 68 82              LDA     VSYR,X
5724  9F7F  80 04                 BRA     SST4
5725  9F81  F6 7D         SST5:   INC     VCTR,X
5726  9F83  B5 7D                 LDA     VCTR,X
5727  9F85  C9 64         SST4:   CMP     #100
5728  9F87                        BLT     SST0
5731  9F89  20 85 A6              JSR     D3D
5732  9F8C  80 03                 BRA     SST1
5733  9F8E  20 9C A6      SST0:   JSR     D2D
5734  9F91                SST1:   SET_CURSOR 11
5738  9F96  A9 6F                 LDA     #'o'
5739  9F98  20 10 A3              JSR     DCHAR
5740  9F9B  A9 66                 LDA     #'f'
5741  9F9D  20 10 A3              JSR     DCHAR
5742  9FA0  A6 49                 LDX     VALVE
5743  9FA2  A5 41                 LDA     LSB
5744  9FA4  C9 01                 CMP     #1
5745  9FA6  D0 05                 BNE     SST3
5746  9FA8  AD 71 82              LDA     NSYR
5747  9FAB  80 03                 BRA     SST2
5748  9FAD  BD 54 82      SST3:   LDA     NSPLIT,X
5749  9FB0  20 85 A6      SST2:   JSR     D3D
5750  9FB3                        SET_CURSOR LINE2
5754  9FB8  A0 04                 LDY     #4
5755  9FBA  B1 7B                 LDA     (STARTPTR),Y
5756  9FBC  85 CF                 STA     OFFSET
5757  9FBE  C8                    INY
5758  9FBF  B1 7B                 LDA     (STARTPTR),Y
5759  9FC1  85 D0                 STA     OFFSET+1
5760  9FC3  20 CF AB              JSR     MIN2HM
5761  9FC6  20 F3 A5              JSR     DISPDURATION
5762  9FC9                        SET_CURSOR LINE2+7
5766  9FCE  A9 40                 LDA     #'@'
5767  9FD0  20 10 A3              JSR     DCHAR
5768  9FD3  A0 0B                 LDY     #0
5769  9FD5  B1 7B                 LDA     (STARTPTR),Y
5770  9FD7  85 CF                 STA     OFFSET
5771  9FD9  C8                    INY
5772  9FDA  B1 7B                 LDA     (STARTPTR),Y
5773  9FDC  85 D0                 STA     OFFSET+1
5774  9FDE  20 CF AB              JSR     MIN2HM
5775  9FE1  20 BE A5              JSR     DISPTIME
5776  9FE4  60                    RTS
5777
5778  9FE5  A0 32         FLASH:  LDY     #50           ;flash the screen
5779  9FE7  20 C8 A2              JSR     WAITMS
5780  9FEA  60                    RTS
5781
5782                      BUILD_START:                  ;generate a start at STARTPTR
5783                                                    ;from S,WT,VALVE,SOURCE,SUB
5784  9FEB  AD EC 15              LDA     NSTARTS       ;return carry set if no more room
```

```
5785  9FEE  C9 80           CMP     #128
5786  9FF0          BLT     BS1
5789  9FF2  38              SEC
5790  9FF3  60              RTS
5791  9FF4  A0 00    BS1:   LDY     #0              ;build a start
5792  9FF6  AD 32 82        LDA     S               ;start time
5793  9FF9  91 7B           STA     (STARTPTR),Y
5794  9FFB  C8              INY
5795  9FFC  AD 33 82        LDA     S+1
5796  9FFF  91 7B           STA     (STARTPTR),Y
5797  A001  C8              INY
5798  A002  A5 49           LDA     VALVE           ;valve
5799  A004  91 7B           STA     (STARTPTR),Y
5800  A006  C8              INY
5801  A007  A5 D7           LDA     SUB             ;type byte
5802  A009  18              CLC                     ;xsssSSSS, s=SUB, S=SOURCE
5803  A00A  2A              ROL     A
5804  A00B  2A              ROL     A
5805  A00C  2A              ROL     A
5806  A00D  2A              ROL     A
5807  A00E  05 88           ORA     SOURCE
5808  A010  91 7B           STA     (STARTPTR),Y
5809  A012  C8              INY
5810  A013  AD 36 82        LDA     WT              ;duration
5811  A016  91 7B           STA     (STARTPTR),Y
5812  A018  C8              INY
5813  A019  AD 37 82        LDA     WT+1
5814  A01C  91 7B           STA     (STARTPTR),Y
5815  A01E  C8              INY
5816  A01F  A9 00           LDA     #0              ;spares
5817  A021  91 7B           STA     (STARTPTR),Y
5818  A023  C8              INY
5819  A024  91 7B           STA     (STARTPTR),Y
5820  A026  EE EC 15        INC     NSTARTS         ;one more start saved
5821  A029  20 F7 A9        JSR     NEXTSTART       ;move STARTPTR
5822  A02C  18              CLC
5823  A02D  60              RTS
5824
5825
5826
5827                        ENTER_GLOBAL:           ;enter global budget
5828  A02E  20 82 A3        JSR     OKCLR
5829  A031  64 49           STZ     VALVE
5830  A033                  MESSAGE 58
5834  A03B                  SET_CURSOR LINE2+9
5838  A03D  AD FE 82        LDA     GLOBAL
5839  A040  85 61           STA     IBFR
5840  A042  A9 0A           LDA     #10
5841  A044  85 62           STA     IBFR+1
5842  A046  A9 C8           LDA     #200
5843  A048  85 63           STA     IBFR+2
5844  A04A  20 F3 A8        JSR     GETNUM10
5845  A04D  90 1B           BCC     EGL1
5846  A04F  B2 5A           LDA     (MENUPTR)
5847  A051  C9 01           CMP     #1
5848  A053  F0 09           BEQ     EGL2
5849  A055                  HELP    58
```

```
5854  A05C  80 D8              BRA      ENTER_GLOBAL
5855  A05E         EGL2:       HELP     91
5860  A065  80 C7              BRA      ENTER_GLOBAL
5861  A067  8D FE 02  EGL1:    STA      GLOBAL
5862  A06A  60                 RTS
5863
5864                HOWMANY:                            ;how many splits
5865                                                    ;in: VALVE, SUB, MAXON
5866                                                    ;out: QUOTIENT, A=DUR/MAXON
5867  A06B  A6 49              LDX      VALVE
5868  A06D  BD 42 15           LDA      MAXON,X
5869  A070  85 54              STA      DIVISOR
5870  A072  A5 D7              LDA      SUB
5871  A074  F0 12              BEQ      HOW0
5872  A076              DBLX                            ;soak duration
5880  A07C  BD 85 15           LDA      DUR3,X
5881  A07F  85 52              STA      DIVIDEND
5882  A081  BD 86 15           LDA      DUR3+1,X
5883  A084  85 53              STA      DIVIDEND+1
5884  A086  80 10              BRA      HOW2
5885  A088         HOW0:       DBLX                    ;base duration
5893  A08E  BD 58 15           LDA      DUR1,X
5894  A091  85 52              STA      DIVIDEND
5895  A093  BD 59 15           LDA      DUR1+1,X
5896  A096  85 53              STA      DIVIDEND+1
5897  A098  20 67 B3  HOW2:    JSR      DIVIDE
5898  A09B  AA                 TAX
5899  A09C  F0 02              BEQ      HOW1
5900  A09E  E6 56              INC      QUOTIENT
5901  A0A0  A5 56     HOW1:    LDA      QUOTIENT
5902  A0A2  60                 RTS
5903
5904                CALCNSYR:                           ;out: QUOTIENT=
5905  A0A3  38                 SEC                     ;SYRINGE_END - SYRINGE_START / SOFTEN
5906  A0A4  AD B1 15           LDA      SYRINGE_END
5907  A0A7  ED AF 15           SBC      SYRINGE_START
5908  A0AA  85 52              STA      DIVIDEND
5909  A0AC  AD B2 15           LDA      SYRINGE_END+1
5910  A0AF  ED B0 15           SBC      SYRINGE_START+1
5911  A0B2  85 53              STA      DIVIDEND+1
5912  A0B4              MOV16    SOFTEN,DIVISOR
5918  A0BE  20 7E B3           JSR      DIV16
5919  A0C1  E6 56              INC      QUOTIENT
5920  A0C3  60                 RTS
5921
5922                SHOW_MONTHS:                        ;display active months
5923  A0C4  64 49              STZ      VALVE
5924  A0C6  20 82 A3           JSR      DKCLR
5925  A0C9              MESSAGE  190
5929  A0CE              SET_CURSOR LINE2+1
5933  A0D3              SET      LSB
5937  A0D7  A6 41     SMOC:    LDX      LSB
5938  A0D9  BD A2 15           LDA      ACTIVE_MONTH,X
5939  A0DC  F0 05              BEQ      SMOD
5940  A0DE  BD 4B F8           LDA      MONTBL,X
5941  A0E1  80 02              BRA      SMOE
5942  A0E3  A9 2D     SMOD:    LDA      #'-'
```

```
5943  A0E5  20 10 A3      SM0E:       JSR       DCHAR
5944  A0E8  E6 41                     INC       LSB
5945  A0EA  A5 41                     LDA       LSB
5946  A0EC  C9 0D                     CMP       #13
5947  A0EE  D0 E7                     BNE       SM0C
5948  A0F0  60                        RTS
5949
5950                      SHOW_SYRCYC:                        ;show number of syringes and interval
5951  A0F1  20 A3 A0                  JSR       CALCNSYR
5952  A0F4  20 82 A3                  JSR       DKCLR
5953  A0F7  64 49                     STZ       VALVE
5954  A0F9                            MESSAGE   140
5958  A0FE                            SET_CURSOR 3
5962  A103  A5 56                     LDA       QUOTIENT
5963  A105  20 9C A6                  JSR       D2D
5964  A108  A5 56                     LDA       QUOTIENT
5965  A10A  C9 01                     CMP       #1
5966  A10C  D0 14                     BNE       SHSY1
5967  A10E  20 C8 A3                  JSR       CLR_LINE2
5968  A111                            MOV16     SYRINGE_START,OFFSET
5974  A11B  20 CF AB                  JSR       MIN2HM
5975  A11E  20 BE A5                  JSR       DISPTIME
5976  A121  60                        RTS
5977  A122                SHSY1:      SET_CURSOR LINE2
5981  A127                            MOV16     SOFTEN,OFFSET
5987  A131  20 CF AB                  JSR       MIN2HM
5988  A134  20 F3 A5                  JSR       DDUR
5989  A137                            SET_CURSOR LINE2+15
5993  A13C  60                        RTS
5994
5995  A13D                DSTA#:      MESSAGE   73            ;display Sta #n
5999  A142                            SKIP      1
6003  A147  A9 23                     LDA       #'#'
6004  A149  20 10 A3                  JSR       DCHAR
6005  A14C  80 1C                     BRA       DV
6006
6007  A14E                DSTA:       MESSAGE   73            ;display Stan
6011  A153  80 15                     BRA       DV
6012
6013  A155                DSTATION#:  MESSAGE   32            ;display Station #n
6017  A15A  80 0E                     BRA       DV
6018
6019                      DVALVEMSG:                          ;display "Valve #n"
6020  A15C                            MESSAGE   126           ;in: VALVE
6024
6025  A161  20 6A A1      DVALVE:     JSR       DV            ;display valve# and space
6026  A164  A9 20                     LDA       #' '
6027  A166  20 10 A3                  JSR       DCHAR
6028  A169  60                        RTS
6029
6030  A16A  A5 49         DV:         LDA       VALVE         ;display valve #
6031  A16C  09 30                     ORA       #ASCMASK
6032  A16E  20 10 A3                  JSR       DCHAR
6033  A171  60                        RTS
6034
6035                      ISCOPY:                             ;show copy screen,
6036                                                          ;return carry set if copy requested
```

```
6037  A172  20 82 A3              JSR     DKCLR
6038  A175                        MESSAGE 34
6042  A17A  20 55 A1              JSR     DSTATION#
6043  A17D                        OM
6048  A183  20 06 AB    ISCO1:    JSR     GETKEY
6049  A186  C9 20                 CMP     #OKKEY
6050  A188  F0 11                 BEQ     ISCO2
6051  A18A  C9 10                 CMP     #NOKEY
6052  A18C  F0 0F                 BEQ     ISCO3
6053  A18E  C9 08                 CMP     #HELPKEY
6054  A190  D0 F1                 BNE     ISCO1
6055  A192                        HELP    8
6060  A199  80 D7                 BRA     ISCOPY
6061  A19B  38          ISCO2:    SEC
6062  A19C  60                    RTS
6063  A19D  18          ISCO3:    CLC
6064  A19E  60                    RTS
6065
6066                    DISP_SOURCE:                ;show the source
6067  A19F  A5 BB                 LDA     SOURCE
6068  A1A1  18                    CLC
6069  A1A2  69 CA                 ADC     #202
6070  A1A4  AA                    TAX
6071  A1A5  20 D7 A2              JSR     DISPLAY_MSG
6072  A1A8                        BACKUP  1
6076  A1AD  A9 3A                 LDA     #':'
6077  A1AF  20 10 A3              JSR     DCHAR
6078  A1B2  60                    RTS
6079
6080                    ISSOURCE:                   ;return carry set if source exists
6081  A1B3  A6 BB                 LDX     SOURCE
6082  A1B5                        DBLX
6090  A1B8  BD 02 F8              LDA     SOURCEADDR,X
6091  A1BE  85 75                 STA     SRCPTR
6092  A1C0  BD 03 F8              LDA     SOURCEADDR+1,X
6093  A1C3  85 76                 STA     SRCPTR+1
6094  A1C5  B2 75                 LDA     (SRCPTR)
6095  A1C7  F0 02                 BEQ     ISS0
6096  A1C9  38                    SEC
6097  A1CA  60                    RTS
6098  A1CB  18          ISS0:     CLC
6099  A1CC  60                    RTS
6100
6101                    CONFIRM_HELP:               ;help screen for all confirm screens
6102  A1CD  AD 72 82              LDA     REVIEW
6103  A1D0  C9 08                 CMP     #RREVIEW
6104  A1D2  D0 08                 BNE     CHE1
6105  A1D4                        HELP    7
6110  A1DB  60                    RTS
6111  A1DC              CHE1:     HELP    6
6116  A1E3  60                    RTS
6117
6118                    CONFIRM_BLINK:              ;use ? for modify, OK for review
6119  A1E4  AD 72 82              LDA     REVIEW
6120  A1E7  C9 01                 CMP     #RMODIFY
6121  A1E9  D0 07                 BNE     CHE2
6122  A1EB                        OM
```

```
6127  A1F1  60                    RTS
6128  A1F2         CHE2:    OK
6133  A1F8  60                    RTS
6134
6135         GETONOFF:                              ;retrieve MAXON/MINOFF from tables
6136                                                ;DEFAULT+2=terrain, +3=sprinkler type
6137                                                ;out: DEFAULT= MAXON, +1= MINOFF
6138  A1F9  A6 CB           LDX    DEFAULT+2       ;find MINOFF
6139  A1FB  CA              DEX
6140  A1FC  BD 8C F8        LDA    MINOFFTBL,X     ;index = terrain-1
6141  A1FF  85 CA           STA    DEFAULT+1
6142  A201  A6 CC           LDX    DEFAULT+3       ;find MAXON
6143  A203  CA              DEX
6144  A204  86 BC           STX    R1
6145  A206  8A              TXA
6146  A207  18              CLC                    ;index = 6*(sprinkler type-1) + (terrain-1)
6147  A208  65 BC           ADC    R1
6148  A20A  65 BC           ADC    R1
6149  A20C  65 BC           ADC    R1
6150  A20E  65 BC           ADC    R1
6151  A210  65 BC           ADC    R1
6152  A212  A6 CB           LDX    DEFAULT+2
6153  A214  CA              DEX
6154  A215  86 BC           STX    R1
6155  A217  65 BC           ADC    R1
6156  A219  AA              TAX
6157  A21A  BD 92 F8        LDA    MAXONTBL,X
6158  A21D  85 C9           STA    DEFAULT
6159  A21F  60              RTS
6160
6161         GETSOAKDUR:                            ;retrieve Soak duration from table
6162                                                ;in: DEFAULT+2=terrain, +3=sprinkler type
6163                                                ;out: DEFAULT,+1= Soak dur
6164  A220  A6 CC           LDX    DEFAULT+3
6165  A222  CA              DEX
6166  A223  86 BC           STX    R1
6167  A225  8A              TXA
6168  A226  18              CLC                    ;index = 6*(sprinkler type-1) + (terrain-1)
6169  A227  65 BC           ADC    R1
6170  A229  65 BC           ADC    R1
6171  A22B  65 BC           ADC    R1
6172  A22D  65 BC           ADC    R1
6173  A22F  65 BC           ADC    R1
6174  A231  A6 CB           LDX    DEFAULT+2
6175  A233  CA              DEX
6176  A234  86 BC           STX    R1
6177  A236  65 BC           ADC    R1
6178  A238  AA              TAX
6179  A239                  DBLX                   ;double it to get words
6187  A23F  BD BC F8        LDA    SOAKDURTBL,X
6188  A242  85 C9           STA    DEFAULT
6189  A244  BD BD F8        LDA    SOAKDURTBL+1,X
6190  A247  85 CA           STA    DEFAULT+1
6191  A249  60              RTS
6192
6193         SHOW_SITE:                             ;show current site info
6194                                                ;in: VALVE
```

```
6195  A24A  20 82 A3           JSR     DKCLR
6196  A24D  20 4E A1           JSR     DSTA
6197  A250                     MESSAGE 109        ;want to see it?
6201  A255                     QM
6206  A25B  20 06 AB    SSI4:  JSR     GETKEY
6207  A25E  C9 20              CMP     #OKKEY
6208  A260  F0 0C              BEQ     SSI0
6209  A262  C9 10              CMP     #NOKEY
6210  A264  D0 01              BNE     SSI5
6211  A266  60                 RTS
6212  A267  C9 08       SSI5:  CMP     #HELPKEY
6213  A269  D0 F0              BNE     SSI4
6214  A26B  4C B5 A2           JMP     SSI2
6215
6216  A26E  20 82 A3    SSI0:  JSR     DKCLR       ;show site info
6217  A271  20 4E A1           JSR     DSTA
6218  A274  A9 3A              LDA     #':'
6219  A276  20 10 A3           JSR     DCHAR
6220  A279  A6 49              LDX     VALVE
6221  A27B  BD CB 02           LDA     TERRAIN,X
6222  A27E  18                 CLC
6223  A27F  69 D6              ADC     #214
6224  A281  AA                 TAX
6225  A282  20 07 A2           JSR     DISPLAY_MSG
6226  A285                     BACKUP  1
6230  A28A  A9 2C              LDA     #','
6231  A28C  20 10 A3           JSR     DCHAR
6232  A28F                     SET_CURSOR LINE2
6236  A294  A6 49              LDX     VALVE
6237  A296  BD D4 02           LDA     SPRINKLER,X
6238  A299  18                 CLC
6239  A29A  69 DC              ADC     #220
6240  A29C  AA                 TAX
6241  A29D  20 07 A2           JSR     DISPLAY_MSG
6242  A2A0                     OK
6247  A2A6  20 06 AB    SSI1:  JSR     GETKEY
6248  A2A9  C9 20              CMP     #OKKEY
6249  A2AB  F0 12              BEQ     SSI3
6250  A2AD  C9 10              CMP     #NOKEY
6251  A2AF  F0 04              BEQ     SSI2
6252  A2B1  C9 08              CMP     #HELPKEY
6253  A2B3  D0 F1              BNE     SSI1
6254  A2B5              SSI2:  HELP    76
6259  A2BC  4C 4F 9F           JMP     SHOW_START
6260  A2BF  60          SSI3:  RTS
6261
6262
6263
6264
6265
6266  A2C0                     INCLUDE SUBS.ASM
6267                           ;--------------------------------
6268                           ;      SUBROUTINES
6269                           ;--------------------------------
6270
6271  A2C0  DA          WAITMS: PHX                ;wait 1 ms. * Y
6272  A2C1  A2 5A       WA0:    LDX     #90
```

```
6273  A2C3  CA              WA1:      DEX
6274  A2C4  D0 FD                     BNE     WA1
6275  A2C6  88                        DEY
6276  A2C7  D0 F8                     BNE     WA0
6277  A2C9  FA                        PLX
6278  A2CA  60                        RTS
6279
6280                        CALCSUM:                          ;read checksum data into A
6281  A2CB  A2 0F                     LDX     #15
6282  A2CD  18                        CLC
6283  A2CE  A9 00                     LDA     #0
6284  A2D0  7D 00 02        CS1:      ADC     CKDATA,X
6285  A2D3  CA                        DEX
6286  A2D4  D0 FA                     BNE     CS1
6287  A2D6  60                        RTS
6288
6289                        DISPLAY_MSG:                      ;display message
6290                                                          ;in: X=index of msg, CURSOR
6291                                                          ;out: Y=length of msg, MSGPTR=next msg
6292  A2D7                            DBLX                    ;get MSGPTR
6300  A2DD  90 0C                     BCC     DMSG1
6301  A2DF  BD E1 F4                  LDA     MSGTBL1,X       ;use bank 1
6302  A2E2  85 43                     STA     MSGPTR
6303  A2E4  BD E2 F4                  LDA     MSGTBL1+1,X
6304  A2E7  85 44                     STA     MSGPTR+1
6305  A2E9  80 0A                     BRA     DMSG
6306  A2EB  BD E1 F3        DMSG1:    LDA     MSGTBL,X        ;use bank 0
6307  A2EE  85 43                     STA     MSGPTR
6308  A2F0  BD E2 F3                  LDA     MSGTBL+1,X
6309  A2F3  85 44                     STA     MSGPTR+1
6310  A2F5  A0 00           DMSG:     LDY     #0              ;show msg at MSGPTR
6311  A2F7  B1 43                     LDA     (MSGPTR),Y      ;get length of msg
6312  A2F9  AA                        TAX
6313  A2FA  C8              M1:       INY
6314  A2FB  B1 43                     LDA     (MSGPTR),Y      ;get byte
6315  A2FD  20 10 A3                  JSR     DCHAR           ;display it
6316  A300  CA                        DEX                     ;until done
6317  A301  D0 F7                     BNE     M1
6318  A303  98                        TYA                     ;point MSGPTR to next msg
6319  A304  38                        SEC
6320  A305  65 43                     ADC     MSGPTR
6321  A307  85 43                     STA     MSGPTR
6322  A309  A5 44                     LDA     MSGPTR+1
6323  A30B  69 00                     ADC     #0
6324  A30D  85 44                     STA     MSGPTR+1
6325  A30F  60                        RTS
6326
6327
6328  A310  5A              DCHAR:    PHY                     ;display character in A
6329  A311  DA                        PHX
6330  A312  A6 18           DC0:      LDX     LCD_STATUS      ;wait for LCD ready
6331  A314  30 FC                     BMI     DC0
6332  A316  85 19                     STA     LCD_DATA        ;give LCD the data
6333  A318  E6 48                     INC     CURSOR
6334  A31A  A5 48                     LDA     CURSOR
6335  A31C  C9 10                     CMP     #$10            ;if 2nd line,
6336  A31E  D0 05                     BNE     DC1
```

```
6337   A328                            SET_CURSOR LINE2        ;then move cursor there
6341   A325  FA        DC1:   PLX
6342   A326  7A               PLY
6343   A327  60               RTS
6344
6345
6346   A328  A4 18     CMD:   LDY    LCD_STATUS              ;send cmd, X=index
6347   A32A  30 FC            BMI    CMD                     ;wait for ready
6348   A32C  BD CD F3  CMDNR: LDA    LCDTBL,X                ;get cmd from table
6349   A32F  85 18            STA    LCD_CMD                 ;send cmd in A
6350   A331  60               RTS
6351
6352   A332            LCD_ON: SET   LCD_POWER
6356   A336  A0 32            LDY    #50                     ;power on, wait
6357   A338  20 C0 A2         JSR    WAITMS
6358   A33B            SET    LCD_ENABLE                     ;enable interface
6362   A33F  60               RTS
6363
6364                  DISPLAY_ON:                             ;initialize LCD
6365   A340  A2 09            LDX    #9                      ;function set, wait
6366   A342  20 2C A3         JSR    CMDNR
6367   A345  A0 0A            LDY    #10
6368   A347  20 C0 A2         JSR    WAITMS
6369   A34A  A2 09            LDX    #9                      ;function set, wait
6370   A34C  20 2C A3         JSR    CMDNR
6371   A34F  A0 0A            LDY    #10
6372   A351  20 C0 A2         JSR    WAITMS
6373   A354  A2 05            LDX    #5                      ;display on, no cursor
6374   A356  20 28 A3         JSR    CMD
6375   A359  A2 02            LDX    #2                      ;entry mode set
6376   A35B  20 28 A3         JSR    CMD
6377   A35E  A2 01            LDX    #1                      ;cursor home
6378   A360  20 28 A3         JSR    CMD
6379   A363  64 48            STZ    CURSOR
6380
6381   A365  A2 0B            LDX    #11                     ;make the custom char
6382   A367  20 28 A3         JSR    CMD
6383   A36A  A2 00            LDX    #0
6384   A36C  BD D9 F3  DCN1:  LDA    CUSTOMTBL,X
6385   A36F  20 10 A3         JSR    DCHAR
6386   A372  E8               INX
6387   A373  E0 08            CPX    #8
6388   A375  D0 F5            BNE    DCN1
6389   A377            SET_CURSOR 0
6393   A37C  60               RTS
6394
6395                  DISPLAY_OFF:                            ;turn LCD off
6396   A37D  64 04            STZ    LCD_POWER
6397   A37F  64 05            STZ    LCD_ENABLE
6398   A381  60               RTS
6399
6400   A382  20 92 A3  DKCLR: JSR    KEY_RESET               ;clear display and keys
6401
6402                  DISPLAY_CLR:                            ;clear display, cursor at 0
6403   A385  A2 00            LDX    #0
6404   A387  20 28 A3         JSR    CMD
6405   A38A  64 48            STZ    CURSOR
```

```
6406   A38C   A2 00            LDX     #0              ;cmd twice, bug in LCD
6407   A38E   20 28 A3         JSR     CMD
6408   A391   60               RTS
6409
6410   A392           KEY_RESET:
6411   A392   64 6C            STZ     BLINK
6412   A394   64 5D            STZ     KEYPRESS
6413   A396   64 6B            STZ     INTCTR
6414   A398   64 6B            STZ     REPEAT_MASK
6415   A39A   64 E2            STZ     INTCMD
6416   A39C   64 E3            STZ     CMDCTR
6417   A39E   60               RTS
6418
6419           INC_LCD_ADDR:                           ;move LCD addr ahead A chars
6420   A39F   18               CLC
6421   A3A0   65 48            ADC     CURSOR
6422   A3A2   C9 10            CMP     #$10            ;if past line 1,
6423   A3A4                    BLT     LCD_ADDR
6426   A3A6   29 0F            AND     #00001111B      ;then make it line 2
6427   A3A8   09 40            ORA     #01000000B
6428   A3AA   80 10            BRA     LCD_ADDR
6429
6430           DEC_LCD_ADDR:                           ;move LCD addr back A chars
6431   A3AC   A8               TAY
6432   A3AD   A5 48            LDA     CURSOR
6433   A3AF   84 48            STY     CURSOR
6434   A3B1   38               SEC
6435   A3B2   E5 48            SBC     CURSOR
6436   A3B4   C9 40            CMP     #$40            ;if before line 2,
6437   A3B6                    BGE     LCD_ADDR
6440   A3B8   29 0F            AND     #00001111B      ;than make it line 1
6441   A3BA   80 00            BRA     LCD_ADDR
6442
6443           LCD_ADDR:                               ;set cursor address in A
6444   A3BC   A4 19            LDY     LCD_STATUS
6445   A3BE   30 FC            BMI     LCD_ADDR
6446   A3C0   85 48            STA     CURSOR
6447   A3C2   0D D7 F3         ORA     ADDR_CMD
6448   A3C5   85 18            STA     LCD_CMD
6449   A3C7   60               RTS
6450
6451           CLR_LINE2:                              ;clear the second line of the display
6452   A3C8                    SET_CURSOR LINE2
6456   A3CD   A2 10            LDX     #16
6457   A3CF   20 C2 AD         JSR     SPACES
6458   A3D2                    SET_CURSOR LINE2
6462   A3D7   60               RTS
6463
6464           DISPLAY_WORD:                           ;display MSB,LSB in hex
6465   A3D8   A5 42            LDA     MSB
6466   A3DA   6A               ROR     A
6467   A3DB   6A               ROR     A
6468   A3DC   6A               ROR     A
6469   A3DD   6A               ROR     A
6470   A3DE   20 01 A4         JSR     AASC
6471   A3E1   20 10 A3         JSR     DCHAR           ;hi nibble of MSB
6472   A3E4   A5 42            LDA     MSB
```

```
6473  A3E6  20 01 A4              JSR       AASC
6474  A3E9  20 10 A3              JSR       DCHAR       ;lo nibble of MSB
6475
6476                    DISPLAY_BYTE:                   ;display LSB in hex
6477  A3EC  A5 41                 LDA       LSB
6478  A3EE  6A                    ROR       A
6479  A3EF  6A                    ROR       A
6480  A3F0  6A                    ROR       A
6481  A3F1  6A                    ROR       A
6482  A3F2  20 01 A4              JSR       AASC
6483  A3F5  20 10 A3              JSR       DCHAR       ;hi nibble of LSB
6484  A3F8  A5 41                 LDA       LSB
6485  A3FA  20 01 A4              JSR       AASC
6486  A3FD  20 10 A3              JSR       DCHAR       ;lo nibble of LSB
6487  A400  60                    RTS
6488
6489
6490  A401  29 0F        AASC:    AND       #00001111B  ;convert low 4 bits of A to ASCII char
6491  A403  C9 0A                 CMP       #10         ;if A>=10 then add 7
6492  A405  90 03                 BCC       LS5
6493  A407  18                    CLC
6494  A408  69 07                 ADC       #7
6495  A40A  18           LS5:     CLC                   ;add 30H to make ASCII
6496  A40B  69 30                 ADC       #30H
6497  A40D  60                    RTS
6498
6499
6500  A40E         AD_ON:   SET       AD_POWER    ;turn A/D on
6504  A412  A0 1E                 LDY       #30
6505  A414  20 C0 A2              JSR       WAITMS
6506  A417                        SET       AD_ENABLE
6510  A41B  95 20                 STA       ADBASE,X    ;do dummy start to get EOC high
6511  A41D  A0 01                 LDY       #1
6512  A41F  20 C0 A2              JSR       WAITMS
6513  A422  60                    RTS
6514
6515  A423  64 02        AD_OFF:  STZ       AD_POWER    ;turn A/D off
6516  A425  64 03                 STZ       AD_ENABLE
6517  A427  60                    RTS
6518
6519  A428  78           TIMERON: SEI                   ;TIMER counts system clock/16
6520                                                    ;= .000035 sec per count
6521  A429  A9 0A                 LDA       #10         ;set TIMER for 40 ms. interrupt
6522  A42B  85 08                 STA       TIMER_MSB   ;.040/.000035=1143
6523  A42D  A9 72                 LDA       #114        ;so count 10 groups of 114
6524  A42F  85 09                 STA       TIMER_LSB
6525  A431  85 0D                 STA       TIMER_LOAD
6526  A433                        SET       TIMER
6530  A437  58                    CLI
6531  A438  60                    RTS
6532
6533                    TIMER_OFF:                      ;turn TIMER off
6534  A439  64 0A                 STZ       TIMER
6535  A43B  78                    SEI
6536  A43C  60                    RTS
6537
6538                    READ:                           ;Read A/D channel in ADCHANNEL (0-15)
```

```
6539                                                ;NO INTERRUPTS are allowed!
6540   A43D  A6 45              LDX   ADCHANNEL     ;set up AD mux and start convert
6541   A43F  95 20              STA   ADBASE,X
6542   A441  A0 64              LDY   #100          ;software timeout after 2ms.
6543   A443  88          REA1:  DEY
6544   A444  F0 11              BEQ   REA4
6545   A446  A5 13              LDA   STATUS2       ;Wait for EOC high
6546   A448  10 F9              BPL   REA1
6547   A44A  A0 64              LDY   #100
6548   A44C  88          REA3:  DEY
6549   A44D  F0 08              BEQ   REA4
6550   A44F  A5 13              LDA   STATUS2       ;Wait for EOC low
6551   A451  30 F9              BMI   REA3
6552   A453  A5 15              LDA   AD_DATA       ;read data
6553   A455  18                 CLC                 ;return carry clear if ok
6554   A456  60                 RTS
6555   A457  38          REA4:  SEC                 ;carry set if timeout
6556   A458  60                 RTS
6557
6558
6559                     VON:                       ;turn valve # VALVE on
6560                                                ;in: VALVE, VALVEID()
6561                                                ;out: VS bit0 = 1
6562   A459  A6 49              LDX   VALVE
6563   A45B  BD 7D 02           LDA   VS,X
6564   A45E  09 10              ORA   #00010000B
6565   A460  9D 7D 02           STA   VS,X
6566   A463  BD B9 02           LDA   VALVEID,X     ;VALVEID contains the proper
6567   A466  85 06       VO1:   STA   VALVE_SETUP   ;valve position (A-H) and polarity
6568   A468  A5 6D              LDA   FLAGS         ;if battery present,
6569   A46A  29 01              AND   #00000001B
6570   A46C  F0 0B              BEQ   VO5
6571   A46E                     SET   VALVE_ENABLE
6575   A472  A0 38              LDY   #56           ;then wait via software loop
6576   A474  20 CB A2           JSR   WAITMS
6577   A477  80 10              BRA   VO4
6578   A479  64 46       VO5:   STZ   TIMCTR        ;else wait via INT
6579   A47B                     SET   VALVE_ENABLE
6583   A47F  20 2B A4           JSR   TIMERON
6584   A482  A5 46       VO2:   LDA   TIMCTR        ;wait for 40 ms. (one INT)
6585   A484  F0 FC              BEQ   VO2
6586   A486  20 39 A4           JSR   TIMER_OFF
6587   A489  64 07       VO4:   STZ   VALVE_ENABLE
6588   A48B  60                 RTS
6589
6590                     VOFF:                      ;turn valve # VALVE off
6591                                                ;in: VALVE, VALVEID()
6592                                                ;out: VS bit 0=0
6593   A48C  A6 49              LDX   VALVE
6594   A48E  BD 7D 02           LDA   VS,X
6595   A491  29 EF              AND   #11101111B
6596   A493  9D 7D 02           STA   VS,X
6597   A496  BD B9 02           LDA   VALVEID,X
6598   A499  49 40              EOR   #01000000B    ;reverse the polarity
6599   A49B  80 C9              BRA   VO1
6600
6601                     ALL_VALVES_OFF:            ;turn all valves off that are on
```

```
6602                                                    ;carry set if any valves turned off
6603   A49D  9C 7D 82            STZ    VS
6604   A4A0  A9 08               LDA    #8
6605   A4A2  85 49               STA    VALVE
6606   A4A4  A6 49       AV0:    LDX    VALVE
6607   A4A6  BD 7D 82            LDA    VS,X
6608   A4A9  29 10               AND    #00010000B
6609   A4AB  F0 08               BEQ    AV1
6610   A4AD  20 8C A4            JSR    VOFF
6611   A4B0                      SET    VS
6615   A4B5  C6 49       AV1:    DEC    VALVE
6616   A4B7  D0 EB               BNE    AV0
6617   A4B9  AD 7D 82            LDA    VS
6618   A4BC  D0 02               BNE    AV2
6619   A4BE  18                  CLC
6620   A4BF  60                  RTS
6621   A4C0  38          AV2:    SEC
6622   A4C1  60                  RTS
6623
6624                   VALVE_HI:                        ;set VALVE +=hi, -=tristate
6625                                                    ;in: valve_1-8
6626   A4C2  A5 49               LDA    VALVE
6627   A4C4  38                  SEC
6628   A4C5  E9 01               SBC    #1
6629   A4C7  29 07       VHI:    AND    #00000111B     ;alt entry, position # in A
6630   A4C9  D0 02               BNE    VH0            ;- is set at position 0
6631   A4CB  09 38               ORA    #00111000B     ;if valve=0, then set - not position 0
6632   A4CD  09 00       VH0:    ORA    #POS
6633   A4CF  85 06               STA    VALVE_SETUP
6634   A4D1                      SET    VALVE_ENABLE
6638   A4D5  60                  RTS
6639
6640                   READ_RTC:                        ;read real time counter into MSB,LSB
6641   A4D6  A5 11               LDA    RTC_LSB        ;do it twice in case update in progress
6642   A4D8  85 41               STA    LSB
6643   A4DA  A5 11               LDA    RTC_LSB
6644   A4DC  C5 41               CMP    LSB
6645   A4DE  D0 F6               BNE    READ_RTC
6646   A4E0  A5 10       RR0:    LDA    RTC_MSB
6647   A4E2  85 42               STA    MSB
6648   A4E4  A5 10               LDA    RTC_MSB
6649   A4E6  C5 42               CMP    MSB
6650   A4E8  D0 EC               BNE    READ_RTC
6651   A4EA  A5 41               LDA    LSB            ;return Z flag if zero
6652   A4EC  05 42               ORA    MSB
6653   A4EE  60                  RTS
6654
6655                   UPDATE_CLOCK:                    ;increment clock
6656   A4EF  20 00 A5            JSR    BUMP_CLOCK     ;read and reset counter
6657   A4F2  20 F9 A4            JSR    CLR_RTC
6658   A4F5  20 CF 81            JSR    WATER          ;do watering task
6659   A4F8  60                  RTS
6660
6661                   CLR_RTC:                         ;reset RTC counter to 0
6662   A4F9  64 01               STZ    RTC_CLR
6663   A4FB  A5 11               LDA    RTC_LSB
6664   A4FD  A5 10               LDA    RTC_MSB
```

```
6665  A4FF  60                    RTS
6666
6667              BUMP_CLOCK:                    ;minutes in A  (<=60)
6668  A500  18                    CLC
6669  A501  6D 77 82              ADC      MINUTE
6670  A504  8D 77 82              STA      MINUTE
6671  A507  C9 3C                 CMP      #60
6672  A509                        BLT      UC4
6675  A50B  38                    SEC                            ;if >=60 minutes,
6676  A50C  AD 77 82              LDA      MINUTE
6677  A50F  E9 3C                 SBC      #60                   ;then subtract 60 minutes
6678  A511  8D 77 82              STA      MINUTE
6679  A514  EE 76 82    UC1:      INC      HOUR                  ;and add 1 hour
6680  A517  AD 76 82              LDA      HOUR
6681  A51A  C9 18                 CMP      #24
6682  A51C                        BLT      UC4
6685  A51E  9C 76 82              STZ      HOUR                  ;if midnight, then new day
6686  A521  EE 7A 82              INC      DAY
6687  A524  EE 7B 82              INC      DOW
6688  A527  AD 7B 82              LDA      DOW                   ;new day of the week
6689  A52A  C9 08                 CMP      #8
6690  A52C  D0 08                 BNE      UC2
6691  A52E                        SET      DOW
6695  A533  20 50 83              JSR      INCDAYNUM             ;new day number for watering
6696  A536  AD 7A 82    UC2:      LDA      DAY
6697  A539  CD 7C 82              CMP      DIM
6698  A53C  F0 3A                 BEQ      UC4
6699  A53E                        BLT      UC4
6702  A540                        SET      DAY                   ;new month, day=1
6706  A545  EE 79 82              INC      MONTH
6707  A548  AD 79 82              LDA      MONTH
6708  A54B  C9 0D                 CMP      #13
6709  A54D                        BLT      UC3
6712  A54F                        SET      MONTH                 ;new year, month=1
6716  A554  EE 7B 82              INC      YEAR
6717  A557  AD 7B 82              LDA      YEAR
6718  A55A  C9 64                 CMP      #100
6719  A55C  D0 03                 BNE      UC3
6720  A55E  9C 7B 82              STZ      YEAR
6721  A561  AE 79 82    UC3:      LDX      MONTH                 ;find # of days in month
6722  A564  BD 08 F7              LDA      DAYTBL,X
6723  A567  8D 7C 82              STA      DIM
6724  A56A  C9 02                 CMP      #2                    ;if FEB
6725  A56C  D0 0A                 BNE      UC4
6726  A56E  AD 7B 82              LDA      YEAR
6727  A571  29 03                 AND      #00000011B            ;and leap year
6728  A573  D0 03                 BNE      UC4
6729  A575  EE 7C 82              INC      DIM                   ;then add a day
6730  A578  38         UC4:       SEC
6731  A579  60                    RTS
6732
6733              DISPLAY_DOW:                   ;display day of the week in IBFR+6
6734  A57A  A5 67                 LDA      IBFR+6
6735  A57C  18                    CLC
6736  A57D  69 5A                 ADC      #30
6737  A57F  AA                    TAX
6738  A580  20 07 A2              JSR      DISPLAY_MSG
```

```
6739  A583  60              RTS
6740
6741              DISPLAY_DATE:         ;display month, day, yr in IBFR+7
6742  A584  20 A1 A5        JSR     DISPLAY_MONTH
6743  A587              SKIP    1
6747  A58C  A5 69           LDA     IBFR+8      ;day
6748  A58E  20 9C A6        JSR     D2D
6749  A591  A9 2C           LDA     #','
6750  A593  20 18 A3        JSR     DCHAR
6751  A596  A9 27           LDA     #$27
6752  A598  20 18 A3        JSR     DCHAR
6753  A59B  A5 6A           LDA     IBFR+9      ;year
6754  A59D  20 C2 A6        JSR     D2NS
6755  A5A0  60              RTS
6756
6757              DISPLAY_MONTH:        ;display the month in IBFR+7
6758  A5A1  A5 68           LDA     IBFR+7
6759  A5A3  18              CLC
6760  A5A4  69 4C           ADC     #76
6761  A5A6  AA              TAX
6762  A5A7  20 D7 A2        JSR     DISPLAY_MSG
6763  A5AA  60              RTS
6764
6765  A5AB  A5 D7   DSUB:   LDA     SUB         ;show msg for which valve setup
6766  A5AD  18              CLC
6767  A5AE  69 94           ADC     #148
6768  A5B0  AA              TAX
6769  A5B1  20 D7 A2        JSR     DISPLAY_MSG
6770  A5B4  60              RTS
6771
6772              DSTART:               ;display the start time at
6773  A5B5  B1 75           LDA     (SRCPTR),Y  ;(SRCPTR),Y
6774  A5B7  85 65           STA     IBFR+4
6775  A5B9  C8              INY
6776  A5BA  B1 75           LDA     (SRCPTR),Y
6777  A5BC  85 66           STA     IBFR+5      ;show it at CURSOR
6778
6779              DISPTIME:             ;display the hour and minute
6780                                    ;IBFR+4= hour, minute
6781  A5BE  A5 65           LDA     IBFR+4      ;show 12 if hour=0
6782  A5C0  F0 09           BEQ     DT3
6783  A5C2  C9 0D           CMP     #13
6784  A5C4              BLT     DT0
6787  A5C6  38              SEC                 ;if hour>12 then show hour-12
6788  A5C7  E9 0C           SBC     #12
6789  A5C9  80 02           BRA     DT0
6790  A5CB  A9 0C   DT3:    LDA     #12
6791  A5CD  20 9C A6 DT0:   JSR     D2D
6792  A5D0  A9 3A           LDA     #':'
6793  A5D2  20 18 A3        JSR     DCHAR
6794  A5D5  A5 66           LDA     IBFR+5      ;show minute
6795  A5D7  20 C2 A6        JSR     D2NS        ;without suppressing leading 0
6796  A5DA  A5 65           LDA     IBFR+4
6797  A5DC  C9 00           CMP     #0
6798  A5DE  F0 08           BEQ     DT1
6799  A5E0  C9 0C           CMP     #12         ;show am or pm
6800  A5E2              BLT     DT1
```

```
6803  A5E4  A9 70              LDA     #'p'
6804  A5E6  80 02              BRA     DT2
6805  A5E8  A9 61      DT1:    LDA     #'a'
6806  A5EA  20 10 A3   DT2:    JSR     DCHAR
6807  A5ED  A9 6D              LDA     #'m'
6808  A5EF  20 10 A3           JSR     DCHAR
6809  A5F2  60         DT10:   RTS
6810
6811  A5F3             DDUR:
6812                   DISPDURATION:             ;display the hour and minute 0h+00m
6813                                             ;IBFR+4= hour, minute
6814  A5F3  A5 65      DD1:    LDA     IBFR+4    ;show hour
6815  A5F5  09 30              ORA     #ASCMASK
6816  A5F7  20 10 A3           JSR     DCHAR
6817  A5FA  A9 68      DD0:    LDA     #'h'
6818  A5FC  20 10 A3           JSR     DCHAR
6819  A5FF  A9 2B      DD2:    LDA     #'+'
6820  A601  20 10 A3           JSR     DCHAR
6821  A604  A5 66              LDA     IBFR+5    ;show minute
6822  A606  20 9C A6           JSR     D2D       ;without suppressing leading 0
6823  A609  A9 6D              LDA     #'m'
6824  A60B  20 10 A3           JSR     DCHAR
6825  A60E  60         DD3:    RTS
6826
6827                   DISPCYCLE:                ;show cycle info @ CURSOR
6828                                             ;in: CYCLE_TYPE=0:
6829                                             ;    IBFR= 1-90 days, IBFR+1=1
6830                                             ;in: CYCLE_TYPE=1:
6831                                             ;    IBFR= cycle in weeks (1-9)
6832                                             ;    IBFR+1= the specific days (XMTWTFSS)
6833  A60F  AD 41 15           LDA     CYCLE_TYPE
6834  A612  D0 16              BNE     DMC5
6835  A614                     MESSAGE 38
6839  A619  A5 61              LDA     IBFR      ;XX days
6840  A61B  20 9C A6           JSR     D2D
6841  A61E                     MESSAGE 33
6845  A623                     SKIP    1
6849  A628  80 3E              BRA     DMC20
6850  A62A  A5 61      DMC5:   LDA     IBFR
6851  A62C  C9 01              CMP     #1
6852  A62E  F0 2B              BEQ     DMC10
6853  A630  A5 62      DMC0:   LDA     IBFR+1    ;cycle > 1 week
6854  A632  F0 19              BEQ     DMC2
6855  A634  18                 CLC
6856  A635  A2 01              LDX     #1
6857  A637  2A                 ROL     A
6858  A638  2A         DMC3:   ROL     A
6859  A639  B0 03              BCS     DMC1
6860  A63B  E8                 INX
6861  A63C  80 FA              BRA     DMC3
6862  A63E  86 67      DMC1:   STX     IBFR+6    ;show day of week
6863  A640  20 7A A5           JSR     DISPLAY_DOW
6864  A643                     SKIP    1
6869  A648                     MESSAGE 38
6872  A64D  A5 61      DMC2:   LDA     IBFR      ;show how many weeks
6873  A64F  09 30              ORA     #ASCMASK
6874  A651  20 10 A3           JSR     DCHAR
```

```
6875  A654                          MESSAGE 35
6879  A659  80 8D                   BRA     DMC20
6880  A65B             DMC10:       MESSAGE 38          ;weekly cycle
6884  A660  20 69 A6                JSR     DSP
6885  A663                          SKIP    1
6889  A668  60       DMC20:         RTS
6890
6891                  DSP:                              ;show specific days
6892                                                    ;in: cycle byte in IBFR+1
6893  A669  A5 62                   LDA     IBFR+1      ;XMTWTFSS
6894  A66B  85 41                   STA     LSB
6895  A66D  A2 00                   LDX     #0
6896  A66F  26 41                   ROL     LSB
6897  A671  26 41    DP11:          ROL     LSB
6898  A673  90 05                   BCC     DP12
6899  A675  BD 44 FB                LDA     SDTBL,X     ;day set, show first letter of day
6900  A678  80 02                   BRA     DP13
6901  A67A  A9 2D    DP12:          LDA     #'-'        ;day not set, show -
6902  A67C  20 10 A3 DP13:          JSR     DCHAR
6903  A67F  E8                      INX
6904  A680  E0 07                   CPX     #7
6905  A682  D0 ED                   BNE     DP11
6906  A684  60                      RTS
6907
6908
6909  A685  20 D8 A6 D3D:           JSR     BINDEC      ;display byte in A as 3 digits
6910  A688  A5 6F                   LDA     DIGIT
6911  A68A  C9 30                   CMP     #'0'
6912  A68C  D0 07                   BNE     D31
6913  A68E  A9 20                   LDA     #' '
6914  A690  20 10 A3                JSR     DCHAR
6915  A693  80 1C                   BRA     D20
6916  A695  A5 6F    D31:           LDA     DIGIT
6917  A697  20 10 A3                JSR     DCHAR
6918  A69A  80 29                   BRA     D2N1
6919
6920  A69C  20 D8 A6 D2D:           JSR     BINDEC      ;dispay byte in A is 2 digits, 99 max.
6921  A69F  A5 6F                   LDA     DIGIT
6922  A6A1  C9 30                   CMP     #'0'
6923  A6A3  F0 0C                   BEQ     D20
6924  A6A5  A9 39                   LDA     #'9'
6925  A6A7  20 10 A3                JSR     DCHAR
6926  A6AA  A9 39                   LDA     #'9'
6927  A6AC  20 10 A3                JSR     DCHAR
6928  A6AF  80 10                   BRA     D21
6929  A6B1  A5 70    D20:           LDA     DIGIT+1
6930  A6B3  C9 30                   CMP     #'0'
6931  A6B5  D0 02                   BNE     D22
6932  A6B7  A9 20                   LDA     #' '
6933  A6B9  20 10 A3 D22:           JSR     DCHAR
6934  A6BC  A5 71    D23:           LDA     DIGIT+2
6935  A6BE  20 10 A3                JSR     DCHAR
6936  A6C1  60       D21:           RTS
6937
6938  A6C2  20 D8 A6 D2NS:          JSR     BINDEC      ;display byte in A as 2 digits
6939  A6C5  A5 70    D2N1:          LDA     DIGIT+1     ;no leading 0 supression
6940  A6C7  20 10 A3                JSR     DCHAR
```

```
6941  A6CA  A5 71              LDA    DIGIT+2
6942  A6CC  20 18 A3           JSR    DCHAR
6943  A6CF  60                 RTS
6944
6945  A6D0  AA       BINDEC:   TAX              ;convert byte in A to 3 digits at DIGIT
6946  A6D1  A9 30              LDA    #'0'
6947  A6D3  85 6F              STA    DIGIT
6948  A6D5  85 70              STA    DIGIT+1
6949  A6D7  85 71              STA    DIGIT+2
6950  A6D9  8A       BD0:      TXA
6951  A6DA  38                 SEC
6952  A6DB  E9 64              SBC    #100
6953  A6DD  90 05              BCC    BD1
6954  A6DF  AA                 TAX              ;if >=100, then inc DIGIT
6955  A6E0  E6 6F              INC    DIGIT
6956  A6E2  80 F5              BRA    BD0
6957  A6E4  8A       BD1:      TXA
6958  A6E5  38                 SEC
6959  A6E6  E9 0A              SBC    #10
6960  A6E8  90 05              BCC    BD2
6961  A6EA  AA                 TAX              ;if >=10, then inc DIGIT+1
6962  A6EB  E6 70              INC    DIGIT+1
6963  A6ED  80 F5              BRA    BD1
6964  A6EF  8A       BD2:      TXA              ;<10, add to DIGIT+2
6965  A6F0  18                 CLC
6966  A6F1  65 71              ADC    DIGIT+2
6967  A6F3  85 71              STA    DIGIT+2
6968  A6F5  60                 RTS
6969
6970                 OBJCLEAR:                  ;clear the object area
6971  A6F6  A2 A8              LDX    #171      ;all 172 bytes
6972  A6F8  A9 00              LDA    #0
6973  A6FA  9D 40 15 OC1:      STA    OBJBASE,X
6974  A6FD  CA                 DEX
6975  A6FE  D0 FA              BNE    OC1
6976  A700  9C 40 15           STZ    OBJBASE
6977  A703  9C EC 15           STZ    NSTARTS
6978  A706  60                 RTS
6979
6980                 S20:                       ;move source code to object area
6981                                            ;in: SOURCE
6982  A707  A6 BB              LDX    SOURCE
6983  A709            DBLX
6991  A70F  BD 02 F8           LDA    SOURCEADDR,X  ;move valve settings from source
6992  A712  85 75              STA    SRCPTR
6993  A714  BD 03 F8           LDA    SOURCEADDR+1,X
6994  A717  85 76              STA    SRCPTR+1
6995  A719  BD 1A F8           LDA    OBJECTADDR,X  ;to object
6996  A71C  85 77              STA    DESTPTR
6997  A71E  BD 1B F8           LDA    OBJECTADDR+1,X
6998  A721  85 78              STA    DESTPTR+1
6999  A723  BD 2C F8           LDA    SOURCELEN,X
7000  A726  85 73              STA    CTR
7001  A728  BD 2D F8           LDA    SOURCELEN+1,X
7002  A72B  85 74              STA    CTR+1
7003  A72D  20 5B A7           JSR    BLOCK_MOVE
7004  A730  60                 RTS
```

```
7885
7886                       O2S:                          ;move object back to source
7887    A731   A6 88             LDX    SOURCE
7888    A733                     DBLX
7816    A739   BD 1A F8          LDA    OBJECTADDR,X     ;move valve settings from object
7817    A73C   85 75             STA    SRCPTR
7818    A73E   BD 1B F8          LDA    OBJECTADDR+1,X
7819    A741   85 76             STA    SRCPTR+1
7820    A743   BD 02 F8          LDA    SOURCEADDR,X     ;to source
7821    A746   85 77             STA    DESTPTR
7822    A748   BD 03 F8          LDA    SOURCEADDR+1,X
7823    A74B   85 78             STA    DESTPTR+1
7824    A74D   BD 2C F8          LDA    SOURCELEN,X
7825    A750   85 73             STA    CTR
7826    A752   BD 2D F8          LDA    SOURCELEN+1,X
7827    A755   85 74             STA    CTR+1
7828    A757   20 5B A7          JSR    BLOCK_MOVE
7829    A75A   60                RTS
7830
7831
7832                       BLOCK_MOVE:                   ;move CTR bytes from SRCPTR to DESTPTR
7833    A75B   A5 73             LDA    CTR              ;while CTR <>0,.
7834    A75D   05 74             ORA    CTR+1
7835    A75F   F0 1A             BEQ    BLDONE
7836    A761   B2 75             LDA    (SRCPTR)         ;move data
7837    A763   92 77             STA    (DESTPTR)
7838    A765   E6 75             INC    SRCPTR           ;inc source addr
7839    A767   D0 02             BNE    BL1
7840    A769   E6 76             INC    SRCPTR+1
7841    A76B   E6 77      BL1:   INC    DESTPTR          ;inc destination addr
7842    A76D   D0 02             BNE    BL2
7843    A76F   E6 78             INC    DESTPTR+1
7844    A771   A5 73      BL2:   LDA    CTR              ;dec 16 bit counter
7845    A773   D0 02             BNE    BL3
7846    A775   C6 74             DEC    CTR+1
7847    A777   C6 73      BL3:   DEC    CTR
7848    A779   80 E0             BRA    BLOCK_MOVE
7849    A77B   60         BLDONE: RTS
7850
7851
7852                       GETTIME:                      ;get time
7853                                                     ;in: CURSOR, time in IBFR+4
7854                                                     ;out: time in IBFR+4, carry set if HELP key
7855    A77C                     FAST   NOKEY
7861    A784              GT0:   NOBLINK                 ;get hour
7865    A788                     ANFAST
7869    A78C   A5 65             LDA    IBFR+4           ;show selected hour
7870    A78E   F0 09             BEQ    GT5
7871    A790   C9 0D             CMP    #13
7872    A792                     BLT    GT6
7875    A794   38                SEC
7876    A795   E9 0C             SBC    #12
7877    A797   80 02             BRA    GT6
7878    A799   A9 0C      GT5:   LDA    #12
7879    A79B   20 9C A6   GT6:   JSR    D2D
7880    A79E   A9 3A             LDA    #':'
7881    A7A0   20 10 A3          JSR    DCHAR
```

```
7082  A7A3  A5 65              LDA     IBFR+4
7083  A7A5  D0 07              BNE     GT1
7084  A7A7                     MESSAGE 144             ;midnite, hr=0
7088  A7AC  80 29              BRA     GT10
7089  A7AE  C9 0C       GT1:   CMP     #12
7090  A7B0  D0 07              BNE     GT2
7091  A7B2                     MESSAGE 145             ;noon, hr=12
7095  A7B7  80 1E              BRA     GT10
7096  A7B9  A9 20       GT2:   LDA     #' '
7097  A7BB  20 10 A3           JSR     DCHAR
7098  A7BE  A9 20              LDA     #' '
7099  A7C0  20 10 A3           JSR     DCHAR
7100  A7C3  A5 65              LDA     IBFR+4
7101  A7C5  C9 0C              CMP     #12
7102  A7C7                     BLT     GT3
7105  A7C9  A9 70              LDA     #'p'            ;pm, hr>12
7106  A7CB  80 02              BRA     GT4
7107  A7CD  A9 61       GT3:   LDA     #'a'            ;am, hr<12
7108  A7CF  20 10 A3    GT4:   JSR     DCHAR
7109  A7D2  A9 6D              LDA     #'m'
7110  A7D4  20 10 A3           JSR     DCHAR
7111  A7D7                GT10: BACKUP  7
7115  A7DC                     UL                      ;use underline
7122  A7E2  20 06 A8    GT22:  JSR     GETKEY          ;wait for an answer
7123  A7E5  C9 20              CMP     #OKKEY
7124  A7E7  F0 16              BEQ     GT25            ;ok
7125  A7E9  C9 10              CMP     #NOKEY
7126  A7EB  F0 06              BEQ     GT23            ;change
7127  A7ED  C9 08              CMP     #HELPKEY
7128  A7EF  F0 4A              BEQ     GTHELP
7129  A7F1  80 EF              BRA     GT22
7130  A7F3  E6 65       GT23:  INC     IBFR+4          ;next
7131  A7F5  A5 65              LDA     IBFR+4
7132  A7F7  C9 18              CMP     #24
7133  A7F9  D0 89              BNE     GT0
7134  A7FB  64 65              STZ     IBFR+4
7135  A7FD  80 85              BRA     GT0
7136  A7FF  20 BE A5    GT25:  JSR     DISPTIME        ;show selected hour in am/pm format
7137  A802                     BACKUP  4
7141
7142  A807        GT30:        NOBLINK                 ;get minute
7146  A809  A5 66              LDA     IBFR+5
7147  A80D  20 C2 A6           JSR     D2NS
7148  A810                     BACKUP  2
7152  A815                     UL                      ;use underline
7159  A81B  20 06 A8    GT32:  JSR     GETKEY          ;wait for an answer
7160  A81E  C9 20              CMP     #OKKEY
7161  A820  F0 16              BEQ     GTOK            ;minute ok
7162  A822  C9 10              CMP     #NOKEY
7163  A824  F0 06              BEQ     GT33            ;change minute
7164  A826  C9 08              CMP     #HELPKEY
7165  A828  F0 11              BEQ     GTHELP
7166  A82A  80 EF              BRA     GT32
7167  A82C  E6 66       GT33:  INC     IBFR+5          ;next minute
7168  A82E  A5 66              LDA     IBFR+5
7169  A830  C9 3C              CMP     #60
7170  A832  D0 D3              BNE     GT30
```

```
A834  64 66          STZ     IBFR+5
A836  80 CF          BRA     6T30
A838  18       6TOK: CLC
A839  80 01          BRA     6T3A
A83B  38       6THELP: SEC
A83C           6T3A: ANOFF
A83E  60             RTS

GETDUR8:                ;get duration, 8hr. max
A83F  A9 08          LDA     #8
A841  85 E1          STA     R5
A843  80 04          BRA     6U0

GETDURATION:            ;get duration in hr, min
                                      ;in: CURSOR, time in IBFR+4
                                      ;out: time in IBFR+4, carry set if HELP key
A845  A9 04          LDA     #4
A847  85 E1          STA     R5
A849          6U0:   FAST    NOKEY
A851          6U20:  NOBLINK          ;get hour
A855                 ANFAST
A859  A5 65          LDA     IBFR+4
A85B  09 30          ORA     #ASCMASK
A85D  20 10 A3       JSR     DCHAR
A860  A9 68          LDA     #'h'
A862  20 10 A3       JSR     DCHAR
A865  A9 2B          LDA     #'+'
A867  20 10 A3       JSR     DCHAR
A86A  A5 65          LDA     IBFR+4
A86C  C5 E1          CMP     R5       ;if 4hr, show 4:00
A86E  D0 07          BNE     6U10
A870  A9 00          LDA     #0
A872  20 C2 A6       JSR     D2NS
A875  80 05          BRA     6U11
A877  A5 66   6U10:  LDA     IBFR+5
A879  20 9C A6       JSR     D2D
A87C  A9 6D   6U11:  LDA     #'m'
A87E  20 10 A3       JSR     DCHAR
A881                 BACKUP  6
A886                 UL               ;use underline
A88C  20 06 A8 6U22: JSR     GETKEY   ;wait for an answer
A88F  C9 20          CMP     #OKKEY
A891  F0 19          BEQ     GU28     ;hour ok
A893  C9 10          CMP     #NOKEY
A895  F0 06          BEQ     GU23     ;change hour
A897  C9 08          CMP     #HELPKEY
A899  F0 54          BEQ     GUHELP
A89B  80 EF          BRA     6U22
A89D  E6 65   GU23:  INC     IBFR+4   ;next hour
A89F  A5 65          LDA     IBFR+4
A8A1  38             SEC
A8A2  E9 01          SBC     #1
A8A4  C5 E1          CMP     R5
A8A6  D0 A9          BNE     6U20
A8A8  64 65          STZ     IBFR+4
A8AA  80 A5          BRA     6U20
```

```
7250  A8AC  A5 65        6U28:   LDA     IBFR+4
7251  A8AE  C5 E1                CMP     R5
7252  A8B0  D0 04                BNE     6U29
7253  A8B2  64 66                STZ     IBFR+5
7254  A8B4  80 36                BRA     6UOK
7255  A8B6               6U29:   SKIP    3
7259  A8BB               6U30:   NOBLINK                 ;get minute
7263  A8BF  A5 66                LDA     IBFR+5
7264  A8C1  20 9C A6             JSR     D2D
7265  A8C4                       BACKUP  2
7269  A8C9                       UL                      ;use underline
7276  A8CF  20 06 AB     6U32:   JSR     GETKEY          ;wait for an answer
7277  A8D2  C9 20                CMP     #OKKEY
7278  A8D4  F0 16                BEQ     6UOK            ;minute ok
7279  A8D6  C9 10                CMP     #NOKEY
7280  A8D8  F0 06                BEQ     6U33            ;change minute
7281  A8DA  C9 08                CMP     #HELPKEY
7282  A8DC  F0 11                BEQ     6UHELP
7283  A8DE  80 EF                BRA     6U32
7284  A8E0  E6 66        6U33:   INC     IBFR+5          ;next minute
7285  A8E2  A5 66                LDA     IBFR+5
7286  A8E4  C9 3C                CMP     #60
7287  A8E6  D0 D3                BNE     6U30
7288  A8E8  64 66                STZ     IBFR+5
7289  A8EA  80 CF                BRA     6U30
7290  A8EC  18           6UOK:   CLC
7291  A8ED  80 01                BRA     6U3A
7292  A8EF  38           6UHELP: SEC
7293  A8F0               6U3A:   ANDFF
7296  A8F2  60                   RTS
7297
7298                     GETNUM10:                       ;increment by 10
7299  A8F3  A9 0A                LDA     #10
7300  A8F5  85 BF                STA     R4
7301  A8F7  80 04                BRA     6NUM
7302
7303
7304                     GETNUM:                         ;get a number from the user
7305                                                     ;in: IBFR=present number
7306                                                     ;    IBFR+1=lo limit
7307                                                     ;    IBFR+2=upper limit
7308                                                     ;    CURSOR
7309                                                     ;out: carry clear:
7310                                                     ;    IBFR,A = selected number
7311                                                     ;    carry set:
7312                                                     ;    HELP requested, IBFR=number
7313  A8F?                       SET     R4
7317  A8FD               6NUM:   FAST    NOKEY
7323  A905               6N0:    NOBLINK
7327  A909                       ANFAST
7331  A90D  A5 61                LDA     IBFR            ;if num>upper limit
7332  A90F  C5 63                CMP     IBFR+2
7333  A911                       BLT     6N1
7336  A913  F0 04                BEQ     6N1
7337  A915  A5 62                LDA     IBFR+1          ;then num=lo limit
7338  A917  85 61                STA     IBFR
7339  A919  A5 63        6N1:    LDA     IBFR+2          ;if num>=100
```

```
7340  A91B  C9 64              CMP     #100
7341  A91D           BLT     6N2
7344  A91F  A5 61              LDA     IBFR            ;then display 3 digits
7345  A921  20 85 A6           JSR     D3D
7346  A924                     BACKUP  3
7350  A929  80 1C              BRA     6N4
7351  A92B  C9 0A      6N2:    CMP     #10             ;if num>=10
7352  A92D                     BLT     6N3
7355  A92F  A5 61              LDA     IBFR            ;then display 2 digits
7356  A931  20 9C A6           JSR     D2D
7357  A934                     BACKUP  2
7361  A939  80 0C              BRA     6N4
7362  A93B  A5 61      6N3:    LDA     IBFR
7363  A93D  09 30              ORA     #ASCMASK        ;else display 1 digit
7364  A93F  20 10 A3           JSR     DCHAR
7365  A942                     BACKUP  1
7369  A947             6N4:    UL
7376  A94D  20 06 AB   6N5:    JSR     GETKEY          ;wait for key
7377  A950  C9 20              CMP     #OKKEY
7378  A952  F0 11              BEQ     6NOK
7379  A954  C9 08              CMP     #HELPKEY
7380  A956  F0 12              BEQ     6NHELP
7381  A958  C9 10              CMP     #NOKEY
7382  A95A  D0 F1              BNE     6N5
7383  A95C  A5 61              LDA     IBFR            ;NO key, inc num
7384  A95E  18                 CLC
7385  A95F  65 BF              ADC     R4
7386  A961  85 61              STA     IBFR
7387  A963  80 A0              BRA     6N0
7388  A965  A5 61      6NOK:   LDA     IBFR            ;OK, return num and carry clear
7389  A967  18                 CLC
7390  A968  80 01              BRA     6N6
7391  A96A  38         6NHELP: SEC                     ;HELP, return carry set
7392  A96B             6N6:    ANOFF
7395  A96D  60                 RTS
7396
7397                                   ;get a selection via messages with auto NO key
7398                                   ;in: IBFR=present selection
7399                                   ;    IBFR+1=lo limit
7400                                   ;    IBFR+2=upper limit
7401                                   ;    IBFR+3=msg number for lo limit
7402                                   ;    (all messages must be same length)
7403                                   ;    CURSOR
7404                                   ;out: carry clear:
7405                                   ;     IBFR,A = selected number
7406                                   ;    carry set:
7407                                   ;     HELP requested, IBFR=number
7408
7409  A96E  A9 01      GETMUL: LDA     #1              ;use medium speed and underline
7410  A970  8D 73 02           STA     SEL1
7411  A973  A9 02              LDA     #2
7412  A975  8D 74 02           STA     SEL2
7413  A978  80 18              BRA     6M
7414
7415  A97A  A9 05      GETSOK: LDA     #5              ;use slow speed and OK char
7416  A97C  8D 73 02           STA     SEL1
7417  A97F  A9 01              LDA     #1
```

```
7418  A981  8D 74 82              STA    SEL2
7419  A984  80 8C                 BRA    GM
7420
7421  A986  A9 05        GETMOK:  LDA    #5              ;use medium speed and OK char
7422  A988  8D 73 82              STA    SEL1
7423  A98B  A9 02                 LDA    #2
7424  A98D  8D 74 82              STA    SEL2
7425  A990  80 00                 BRA    GM
7426
7427  A992         GM:   SLOW    NOKEY
7433  A99A               NOBLINK                         ;turn off blinking char
7437  A99E  AD 74 82              LDA    SEL2            ;turn on auto NO key
7438  A9A1  85 E2                 STA    INTCMD
7439  A9A3  A5 48                 LDA    CURSOR          ;save starting cursor location
7440  A9A5  8D 74 82              STA    SEL2
7441  A9A8  A5 61        GM0:     LDA    IBFR            ;if num>upper limit
7442  A9AA  C5 63                 CMP    IBFR+2
7443  A9AC                        BLT    GM1
7446  A9AE  F0 04                 BEQ    GM1
7447  A9B0  A5 62                 LDA    IBFR+1          ;then num=lo limit
7448  A9B2  85 61                 STA    IBFR
7449  A9B4  A5 64        GM1:     LDA    IBFR+3          ;display msg for num
7450  A9B6  18                    CLC
7451  A9B7  65 61                 ADC    IBFR
7452  A9B9  38                    SEC
7453  A9BA  E5 62                 SBC    IBFR+1
7454  A9BC  AA                    TAX
7455  A9BD  20 D7 A2              JSR    DISPLAY_MSG
7456  A9C0  84 41                 STY    LSB             ;save message length
7457  A9C2  AD 74 82              LDA    SEL2            ;put cursor at beginning of msg
7458  A9C5  20 BC A3              JSR    LCD_ADDR
7459  A9C8  AD 73 82              LDA    SEL1            ;turn on blinking char
7460  A9CB  85 6C                 STA    BLINK
7461  A9CD  64 6B                 STZ    INTCTR
7462  A9CF  20 06 AB     GM5:     JSR    GETKEY          ;wait for key
7463  A9D2  C9 20                 CMP    #OKKEY
7464  A9D4  F0 17                 BEQ    GMOK
7465  A9D6  C9 08                 CMP    #HELPKEY
7466  A9D8  F0 18                 BEQ    GMHELP
7467  A9DA  C9 10                 CMP    #NOKEY
7468  A9DC  D0 F1                 BNE    GM5
7469  A9DE  E6 61                 INC    IBFR            ;NO key, inc num
7470  A9E0  A6 41                 LDX    LSB             ;erase message
7471  A9E2  20 C2 AD              JSR    SPACES
7472  A9E5  AD 74 82              LDA    SEL2
7473  A9E8  20 BC A3              JSR    LCD_ADDR
7474  A9EB  80 BB                 BRA    GM0
7475  A9ED  A5 61        GMOK:    LDA    IBFR            ;OK, return num and carry clear
7476  A9EF  18                    CLC
7477  A9F0  80 01                 BRA    GM6
7478  A9F2  38           GMHELP:  SEC                    ;HELP, return carry set
7479  A9F3  20 92 A3     GM6:     JSR    KEY_RESET       ;turn off auto keys
7480  A9F6  60                    RTS
7481
7482               NEXTSTART:                             ;move STARTPTR to next start time
7483  A9F7  18                    CLC
7484  A9F8  A5 7B                 LDA    STARTPTR
```

```
7485  A9FA  69 08              ADC    #8
7486  A9FC  85 7B              STA    STARTPTR
7487  A9FE  A5 7C              LDA    STARTPTR+1
7488  AA00  69 00              ADC    #0
7489  AA02  85 7C              STA    STARTPTR+1
7490  AA04  E6 7A              INC    STARTCTR
7491  AA06  60                 RTS
7492
7493              FIRSTSTART:                        ;set pointers to beginning of obj starts
7494  AA07                     LDW    STARTPTR,STARTS
7500  AA0F  64 7A              STZ    STARTCTR
7501  AA11  60                 RTS
7502
7503              INC_HWRITE:                        ;point to next entry in history
7504                                                 ;out: carry set if wraparound
7505  AA12  A5 B7              LDA    HWRITE          ;if pointer = end,
7506  AA14  C9 F8              CMP    #<HEND
7507  AA16  D0 11              BNE    IH2
7508  AA18  A5 B8              LDA    HWRITE+1
7509  AA1A  C9 1F              CMP    #>HEND
7510  AA1C  D0 0B              BNE    IH2
7511  AA1E                     LDW    HWRITE,HISTORY  ;then reset to beginning
7516  AA26  38                 SEC
7518  AA27  80 0E              BRA    IH3
7519  AA29  A5 B7     IH2:     LDA    HWRITE          ;else inc 16 bit pointer
7520  AA2B  18                 CLC
7521  AA2C  69 08              ADC    #8
7522  AA2E  85 B7              STA    HWRITE
7523  AA30  A5 B8              LDA    HWRITE+1
7524  AA32  69 00              ADC    #0
7525  AA34  85 B8              STA    HWRITE+1
7526  AA36  18                 CLC
7527  AA37  A9 00     IH3:     LDA    #0              ;mark entry as empty
7528  AA39  92 B7              STA    (HWRITE)
7529  AA3B  60                 RTS
7530
7531              INC_HREAD:                         ;point to next entry in history
7532  AA3C  A5 85              LDA    HREAD           ;if pointer = end,
7533  AA3E  C9 F8              CMP    #<HEND
7534  AA40  D0 10              BNE    IR2
7535  AA42  A5 86              LDA    HREAD+1
7536  AA44  C9 1F              CMP    #>HEND
7537  AA46  D0 0A              BNE    IR2
7538  AA48                     LDW    HREAD,HISTORY   ;then reset to beginning
7544  AA50  80 0D              BRA    IR3
7545  AA52  A5 85     IR2:     LDA    HREAD           ;else inc 16 bit pointer
7546  AA54  18                 CLC
7547  AA55  69 08              ADC    #8
7548  AA57  85 85              STA    HREAD
7549  AA59  A5 86              LDA    HREAD+1
7550  AA5B  69 00              ADC    #0
7551  AA5D  85 86              STA    HREAD+1
7552  AA5F  60        IR3:     RTS
7553
7554              GETHPTR:                           ;move history ptr for valve
7555  AA60  A6 49              LDX    VALVE           ;to HPTR
7556  AA62                     DBLX
```

```
7564  AA68  B5 A3              LDA   HPTR,X
7565  AA6A  85 A3              STA   HPTR
7566  AA6C  B5 A4              LDA   HPTR+1,X
7567  AA6E  85 A4              STA   HPTR+1
7568  AA70  60                 RTS
7569
7570
7571              HOPEND:                          ;open a history entry for date stamp
7572  AA71  A9 80              LDA   #$80         ;key
7573  AA73  92 B7              STA   (HWRITE)
7574  AA75  A0 01              LDY   #1
7575  AA77  AD 78 82           LDA   DOW          ;day of week
7576  AA7A  91 B7              STA   (HWRITE),Y
7577  AA7C  C8                 INY
7578  AA7D  AD 79 82           LDA   MONTH        ;month
7579  AA80  91 B7              STA   (HWRITE),Y
7580  AA82  85 B9              STA   HDATE
7581  AA84  C8                 INY
7582  AA85  AD 7A 82           LDA   DAY          ;day
7583  AA88  91 B7              STA   (HWRITE),Y
7584  AA8A  85 BA              STA   HDATE+1
7585  AA8C  C8                 INY
7586  AA8D  AD 7B 82           LDA   YEAR         ;year
7587  AA90  91 B7              STA   (HWRITE),Y
7588  AA92  20 12 AA           JSR   INC_HWRITE
7589  AA95  60                 RTS
7590
7591              HOPENM:                          ;open history for menu
7592  AA96  AD 7A 82           LDA   DAY          ;stamp date if needed
7593  AA99  C5 BA              CMP   HDATE+1
7594  AA9B  D0 07              BNE   HOP2
7595  AA9D  AD 79 82           LDA   MONTH
7596  AAA0  C5 B9              CMP   HDATE
7597  AAA2  F0 03              BEQ   HOP1
7598  AAA4  20 71 AA    HOP2:  JSR   HOPEND
7599  AAA7  B2 5A       HOP1:  LDA   (MENUPTR)
7600  AAA9  09 40              ORA   #01000000B   ;key=menu+MODE
7601  AAAB  92 B7              STA   (HWRITE)
7602  AAAD  A0 01              LDY   #1
7603  AAAF  AD 76 82           LDA   HOUR         ;hour
7604  AAB2  91 B7              STA   (HWRITE),Y
7605  AAB4  C8                 INY
7606  AAB5  AD 77 82           LDA   MINUTE       ;minute
7607  AAB8  91 B7              STA   (HWRITE),Y
7608  AABA  A0 01              LDY   #1
7609  AABC  B1 5A              LDA   (MENUPTR),Y  ;mode+1
7610  AABE  A0 03              LDY   #3
7611  AAC0  91 B7              STA   (HWRITE),Y
7612  AAC2  A0 03              LDY   #3
7613  AAC4  B1 5A              LDA   (MENUPTR),Y  ;msg #
7614  AAC6  A0 04              LDY   #4
7615  AAC8  91 B7              STA   (HWRITE),Y
7616  AACA  20 12 AA           JSR   INC_HWRITE
7617  AACD  60                 RTS
7618
7619              HOPENF:                          ;open history for function
7620                                               ;in: A=function #
```

```
7621  AACE  48              PHA
7622  AACF  AD 7A 02        LDA   DAY         ;stamp date if needed
7623  AAD2  C5 BA           CMP   HDATE+1
7624  AAD4  D0 07           BNE   H02
7625  AAD6  AD 79 02        LDA   MONTH
7626  AAD9  C5 B9           CMP   HDATE
7627  AADB  F0 03           BEQ   H01
7628  AADD  20 71 AA  H02:  JSR   HOPEND
7629  AAE0  68        H01:  PLA               ;all functions
7630  AAE1  48              PHA
7631  AAE2  09 C0           ORA   #11000000B  ;key=function
7632  AAE4  92 B7           STA   (HWRITE)
7633  AAE6  A0 01           LDY   #1
7634  AAE8  AD 76 02        LDA   HOUR        ;hour
7635  AAEB  91 B7           STA   (HWRITE),Y
7636  AAED  C8              INY
7637  AAEE  AD 77 02        LDA   MINUTE      ;minute
7638  AAF1  91 B7           STA   (HWRITE),Y
7639  AAF3  68              PLA
7640  AAF4  C9 01           CMP   #1          ;if SVL,
7641  AAF6  D0 0A           BNE   H03
7642  AAF8  A5 41           LDA   LSB         ;then store duration of SVL
7643  AAFA  C8              INY
7644  AAFB  91 B7           STA   (HWRITE),Y
7645  AAFD  A5 42           LDA   MSB
7646  AAFF  C8              INY
7647  AB00  91 B7           STA   (HWRITE),Y
7648  AB02  20 12 AA  H03:  JSR   INC_HWRITE
7649  AB05  60              RTS
7650
7651              GETKEY:                     ;look for a key pressed or programmer
7652                                          ;removed
7653                                          ;out: key in A
7654  AB06  A5 5D           LDA   KEYPRESS    ;look for key
7655  AB08  F0 17           BEQ   GTK2
7656  AB0A  C9 01           CMP   #STOPKEY    ;if STOP key
7657  AB0C  D0 03           BNE   GTK0
7658  AB0E  4C 46 86        JMP   FSTOP       ;then go to function select
7659  AB11  C9 80     GTK0: CMP   #10000000B  ;if power key removed
7660  AB13  D0 03           BNE   GTK1
7661  AB15  4C A1 81        JMP   NO_BATT     ;then do orderly shut down
7662  AB18  C9 81     GTK1: CMP   #10000001B  ;if low batt then deal with it
7663  AB1A  D0 03           BNE   GTK3
7664  AB1C  4C 7B 81        JMP   BATT_LOW
7665  AB1F  64 5D     GTK3: STZ   KEYPRESS    ;otherwise get ready for next key
7666  AB21  60        GTK2: RTS               ;return the key pressed in A
7667
7668              SCROLL_MSG:                 ;scroll group of screens
7669                                          ;in: HELPNUM=index into SCROLLTBL
7670                                          ;out: return when NO key
7671  AB22  A9 03           LDA   #3
7672  AB24  48        SLL10:PHA
7673  AB25  20 82 A3        JSR   DKCLR       ;blink a blank screen
7674  AB28  A0 C8           LDY   #200
7675  AB2A  20 C0 A2        JSR   WAITMS
7676  AB2D  A6 72           LDX   HELPNUM
7677  AB2F                  DBLX
```

```
7685  AB35  90 BC                      BCC     SLL11
7686  AB37  BD AD F6                   LDA     SCROLLTBL1,X
7687  AB3A  85 43                      STA     MSGPTR          ;MSGPTR points to msg
7688  AB3C  BD AE F6                   LDA     SCROLLTBL1+1,X
7689  AB3F  85 44                      STA     MSGPTR+1
7690  AB41  80 0A                      BRA     SLL12
7691  AB43  BD AF F5   SLL11:          LDA     SCROLLTBL,X
7692  AB46  85 43                      STA     MSGPTR          ;MSGPTR points to msg
7693  AB48  BD B0 F5                   LDA     SCROLLTBL+1,X
7694  AB4B  85 44                      STA     MSGPTR+1
7695  AB4D  A0 00      SLL12:          LDY     #0
7696  AB4F  B1 43                      LDA     (MSGPTR),Y      ;set up number of screens
7697  AB51  85 D5                      STA     SCREENS
7698  AB53  64 D6                      STZ     SCREEN          ;start at the first
7699  AB55  64 6B                      STZ     INTCTR
7700  AB57                              INC16   MSGPTR
7709  AB64  68                         PLA                     ;INT does it, BLINK=3 or 4
7710  AB65  85 6C                      STA     BLINK
7711  AB67  20 9F AB   SLL0:           JSR     GETHKEY         ;stop scrolling if any key or done
7712  AB6A  F0 02                      BEQ     SLL1
7713  AB6C  38                         SEC
7714  AB6D  60                         RTS                     ;set carry if NO key
7715  AB6E  A5 6C      SLL1:           LDA     BLINK
7716  AB70  D0 F5                      BNE     SLL0
7717  AB72  18                         CLC                     ;carry clear if done
7718  AB73  60                         RTS
7719
7720                  HELP_MSG:                                ;do a scrolling msg, ask for repeat
7721  AB74  A5 5E                      LDA     KEYMASK
7722  AB76  48                         PHA
7723  AB77  A9 39                      LDA     #00111001B      ;any key stops help message
7724  AB79  85 5E                      STA     KEYMASK
7725  AB7B  A9 04      SLL4:           LDA     #4
7726  AB7D  20 24 AB                   JSR     SLL10
7727  AB80  B0 18                      BCS     ENDX            ;scroll msg was aborted
7728  AB82                              OM
7733  AB88  20 9F AB   SLL5:           JSR     GETHKEY         ;repeat the message?
7734  AB8B  F0 FB                      BEQ     SLL5
7735  AB8D  C9 20                      CMP     #OKKEY
7736  AB8F  F0 EA                      BEQ     SLL4            ;OK, repeat msg
7737  AB91  C9 01                      CMP     #STOPKEY
7738  AB93  F0 05                      BEQ     ENDX
7739  AB95  68         ENDH:           PLA                     ;any other key ends help
7740  AB96  85 5E                      STA     KEYMASK
7741  AB98  18                         CLC
7742  AB99  60                         RTS
7743  AB9A  68         ENDX:           PLA                     ;aborted exit
7744  AB9B  85 5E                      STA     KEYMASK
7745  AB9D  38                         SEC
7746  AB9E  60                         RTS
7747                  GETHKEY:                                 ;out: key in A
7748  AB9F  A5 5D                      LDA     KEYPRESS        ;look for key
7749  ABA1  F0 03                      BEQ     GTH2            ;no key
7750  ABA3  4C 11 AB                   JMP     GTK0            ;check if batt low or removed
7751  ABA6  60         GTH2:           RTS                     ;return the key pressed in A
7752
7753  ABA7  A9 3E      MSGWAIT: LDA     #SRATE2                 ;wait while msg is being read
```

```
7754  ABA9   85 47              STA   TIMCTR2
7755  ABAB   20 86 AB    MSGW:  JSR   GETKEY        ;but allow STOP key
7756  ABAE   A5 47              LDA   TIMCTR2
7757  ABB0   D0 F9              BNE   MSGW
7758  ABB2   60                 RTS
7759
7760
7761                    HM2MIN:                      ;convert hr, min to 16 bit minutes
7762                                                 ;in: IBFR+4=hr, IBFR+5=min
7763                                                 ;out: OFFSET= minutes
7764  ABB3   A6 65              LDX   IBFR+4
7765  ABB5   64 D0              STZ   OFFSET+1
7766  ABB7   A5 66              LDA   IBFR+5
7767  ABB9   85 CF              STA   OFFSET        ;leftover minutes
7768  ABBB   8A          HM0:   TXA
7769  ABBC   F0 10              BEQ   HM1
7770  ABBE   CA                 DEX
7771  ABBF   A5 CF              LDA   OFFSET        ;add 60 to minutes
7772  ABC1   18                 CLC
7773  ABC2   69 3C              ADC   #60
7774  ABC4   85 CF              STA   OFFSET
7775  ABC6   A5 D0              LDA   OFFSET+1
7776  ABC8   69 00              ADC   #0
7777  ABCA   85 D0              STA   OFFSET+1
7778  ABCC   80 ED              BRA   HM0           ;until no more hours
7779  ABCE   60          HM1:   RTS
7780
7781                    MIN2HM:                      ;convert minutes to hr, min
7782                                                 ;in: OFFSET= 16 bit minutes
7783                                                 ;out: IBFR+4= hr, IBFR+5= min
7784  ABCF   64 65              STZ   IBFR+4
7785  ABD1   64 66              STZ   IBFR+5
7786  ABD3   A5 D0       HM2:   LDA   OFFSET+1
7787  ABD5   D0 06              BNE   HM3
7788  ABD7   A5 CF              LDA   OFFSET
7789  ABD9   C9 3C              CMP   #60
7790  ABDB                      BLT   HM4
7793  ABDD   A5 CF       HM3:   LDA   OFFSET        ;subtract 60 form total minutes
7794  ABDF   38                 SEC
7795  ABE0   E9 3C              SBC   #60
7796  ABE2   85 CF              STA   OFFSET
7797  ABE4   A5 D0              LDA   OFFSET+1
7798  ABE6   E9 00              SBC   #0
7799  ABE8   85 D0              STA   OFFSET+1
7800  ABEA   E6 65              INC   IBFR+4        ;and add 1 hr
7801  ABEC   80 E5              BRA   HM2
7802  ABEE   85 66       HM4:   STA   IBFR+5        ;remaining minutes
7803  ABF0   60                 RTS
7804
7805                    INC_DAYCTR:                  ;move dayctr to next day
7806  ABF1   AD 41 15           LDA   CYCLE_TYPE
7807  ABF4   D0 12              BNE   IDA1
7808  ABF6               IDA2:  INC16 DAYNUM
7817  AC07   60          IDA3:  RTS
7818  AC08   AD 1C 83    IDA1:  LDA   DAYNUM+2      ;specific days
7819  AC0B   18                 CLC
7820  AC0C   6A                 ROR   A             ;inc day
```

```
7821  ACØD  9Ø FB              BCC   IDA3
7822  ACØF  A9 4Ø              LDA   #Ø1ØØØØØØB      ;a new week
7823  AC11  8D 1C 83           STA   DAYNUM+2
7824  AC14  8Ø EØ              BRA   IDA2
7825
7826              BFR2VID:                           ;move ID bfr to valve ID
7827  AC16  A2 Ø8              LDX   #8
7828  AC18  9E B9 82   BFØ:    STZ   VALVEID,X       ;clear valve ID area
7829  AC1B  9E 7D 82           STZ   VS,X            ;and valve status
783Ø  AC1E  CA                 DEX
7831  AC1F  DØ F7              BNE   BFØ
7832  AC21  64 DE              STZ   POSITION        ;for each position,
7833  AC23  A6 DE     BF1:     LDX   POSITION
7834  AC25  BD 5E 82           LDA   IDBFR,X         ;get the valve #
7835  AC28  FØ 15              BEQ   BF2             ;if any
7836  AC2A  AA                 TAX
7837  AC2B  A5 DE              LDA   POSITION        ;store the position in valve ID
7838  AC2D  9D B9 82           STA   VALVEID,X
7839  AC3Ø  18                 CLC                   ;position duplicated in bits 3-5
784Ø  AC31  2A                 ROL   A
7841  AC32  2A                 ROL   A
7842  AC33  2A                 ROL   A
7843  AC34  1D B9 82           ORA   VALVEID,X
7844  AC37  9D B9 82           STA   VALVEID,X
7845  AC3A  A9 CØ              LDA   #11ØØØØØØB      ;valve status=IDed and enabled
7846  AC3C  9D 7D 82           STA   VS,X
7847  AC3F  E6 DE     BF2:     INC   POSITION        ;until no more left
7848  AC41  A5 DE              LDA   POSITION
7849  AC43  C9 Ø8              CMP   #8
785Ø  AC45  DØ DC              BNE   BF1
7851  AC47  6Ø                 RTS
7852
7853              VID2BFR:                           ;move existing valve IDs to bfr area
7854  AC48  2Ø 85 AC           JSR   CLR_IDBFR       ;clear bfr area
7855  AC4B              SET    VALVE
7859  AC4F  A6 49     IB1:     LDX   VALVE           ;for each valve,
786Ø  AC51  BD 7D 82           LDA   VS,X            ;if there is a valid ID
7861  AC54  1Ø Ø8              BPL   IB2
7862  AC56  BD B9 82           LDA   VALVEID,X       ;move position to bfr
7863  AC59  29 Ø7              AND   #ØØØØØ111B
7864  AC5B  AA                 TAX
7865  AC5C  A5 49              LDA   VALVE
7866  AC5E  9D 5E 82           STA   IDBFR,X
7867  AC61  E6 49     IB2:     INC   VALVE           ;until no more
7868  AC63  A5 49              LDA   VALVE
7869  AC65  C9 Ø9              CMP   #9
787Ø  AC67  DØ E6              BNE   IB1
7871  AC69  6Ø                 RTS
7872
7873              DISPID:                            ;display contents of ID bfr
7874  AC6A  64 DE              STZ   POSITION
7875  AC6C  A6 DE     DIDØ:    LDX   POSITION        ;in positional order (Ø-7)
7876  AC6E  BD 5E 82           LDA   IDBFR,X
7877  AC71  DØ Ø4              BNE   DID1
7878  AC73  A9 2D              LDA   #'-'            ;if no valve, show special char
7879  AC75  8Ø Ø2              BRA   DID2
788Ø  AC77  Ø9 3Ø     DID1:    ORA   #ASCMASK        ;else show valve #
```

```
7881  AC79  20 10 A3    DID2:       JSR     DCHAR
7882  AC7C  E6 DE                   INC     POSITION
7883  AC7E  A5 DE                   LDA     POSITION
7884  AC80  C9 08                   CMP     #8
7885  AC82  D0 E8                   BNE     DID0
7886  AC84  60                      RTS
7887
7888              CLR_IDBFR:                          ;store zeros in ID bfr
7889  AC85  A2 07                   LDX     #7
7890  AC87  9E 5E 02    CI0:        STZ     IDBFR,X   ;clear bfr area
7891  AC8A  CA                      DEX
7892  AC8B  10 FA                   BPL     CI0
7893  AC8D  60                      RTS
7894
7895              ;--------------------------------
7896              ;    MENUING ROUTINES
7897              ;--------------------------------
7898
7899              GETMENU:                            ;manage program branching
7900                                                  ;in: MODE, MODE+1
7901                                                  ;out: branch to selected entry
7902  AC8E  A2 FF                   LDX     #$FF
7903  AC90  9A                      TXS
7904  AC91  20 82 A3                JSR     DKCLR
7905  AC94                          SLOW    NOKEY
7911  AC9C                          NOBLINK
7915  ACA0                          ANSLOW            ;use autoscroll
7919  ACA4  20 40 AD    GME0:       JSR     FINDMENU  ;get MENUPTR = table entry
7920  ACA7  B0 3E                   BCS     GME3      ;didn't find it
7921  ACA9  20 29 AD    GME1:       JSR     SHOWMENU  ;display menu screen
7922  ACAC                          OK                ;blink OK char
7927  ACB2  20 06 AB    GME7:       JSR     GETKEY    ;see if key
7928  ACB5  C9 20                   CMP     #OKKEY
7929  ACB7  F0 0A                   BEQ     GMEOK
7930  ACB9  C9 0B                   CMP     #HELPKEY
7931  ACBB  F0 1A                   BEQ     GMEHELP
7932  ACBD  C9 10                   CMP     #NOKEY
7933  ACBF  F0 21                   BEQ     GME2
7934  ACC1  90 EF                   BRA     GME7
7935  ACC3  20 82 A3    GMEOK:      JSR     DKCLR     ;OK, jump to selected entry
7936  ACC6  20 96 AA                JSR     HOPENM    ;tell history
7937  ACC9  A0 05                   LDY     #5
7938  ACCB  B1 5A                   LDA     (MENUPTR),Y
7939  ACCD  85 75                   STA     SRCPTR
7940  ACCF  C8                      INY
7941  ACD0  B1 5A                   LDA     (MENUPTR),Y
7942  ACD2  85 76                   STA     SRCPTR+1
7943  ACD4  6C 75 00                JMP     (SRCPTR)
7944              GMEHELP:                            ;HELP, return carry set
7945  ACD7  A0 04                   LDY     #4
7946  ACD9  B1 5A                   LDA     (MENUPTR),Y
7947  ACDB  85 72                   STA     HELPNUM
7948  ACDD  20 74 AB                JSR     HELP_MSG
7949  ACE0  80 AC                   BRA     GETMENU
7950  ACE2  20 0F AD    GME2:       JSR     INCMENU   ;NO, goto next menu entry
7951  ACE5  80 80                   BRA     GME0
7952  ACE7  A5 59       GME3:       LDA     MODE+1    ;end of menu, reset to top
```

```
7953  ACE9  29 0F              AND     #00001111B      ;if low nibble not 0,
7954  ACEB  F0 0A              BEQ     GME5            ;(level 3 menu),
7955  ACED  A5 59              LDA     MODE+1          ;set low nibble to 1
7956  ACEF  29 F0              AND     #11110000B
7957  ACF1  09 01              ORA     #00000001B
7958  ACF3  85 59              STA     MODE+1
7959  ACF5  80 12              BRA     GME4
7960  ACF7  A5 59       GME5:  LDA     MODE+1          ;if hi nibble not 0,
7961  ACF9  29 F0              AND     #11110000B      ;(level 2 menu),
7962  ACFB  F0 06              BEQ     GME6
7963  ACFD  A9 10              LDA     #$10            ;reset hi nibble to 1
7964  ACFF  85 59              STA     MODE+1
7965  AD01  80 06              BRA     GME4
7966  AD03              GME6:  SET     MODE            ;if main menu (level 1),
7970  AD07  80 9B              BRA     GME0            ;reset to 1 and skip exit msg
7971  AD09  20 9B AD    GME4:  JSR     ISEXIT          ;exit menu?
7972  AD0C  4C 8E AC           JMP     GETMENU
7973
7974                    INCMENU:                       ;inc MODE, MODE+1
7975  AD0F  A5 59              LDA     MODE+1          ;if lo nibble not 0,
7976  AD11  29 0F              AND     #00001111B      ;(level 3 menu),
7977  AD13  F0 03              BEQ     IME0
7978  AD15  E6 59              INC     MODE+1          ;inc low nibble
7979  AD17  60                 RTS
7980  AD18  A5 59       IME0:  LDA     MODE+1          ;if hi nibble not 0,
7981  AD1A  29 F0              AND     #11110000B      ;(level 2 menu),
7982  AD1C  F0 08              BEQ     IME1
7983  AD1E  A5 59              LDA     MODE+1          ;inc hi nibble
7984  AD20  18                 CLC
7985  AD21  69 10              ADC     #16
7986  AD23  85 59              STA     MODE+1
7987  AD25  60                 RTS
7988  AD26  E6 58       IME1:  INC     MODE            ;else inc main menu
7989  AD28  60                 RTS
7990
7991                    SHOWMENU:                      ;show the screen defined by MENUPTR
7992  AD29  20 85 A3           JSR     DISPLAY_CLR
7993  AD2C  A0 02              LDY     #2
7994  AD2E  B1 5A              LDA     (MENUPTR),Y
7995  AD30  AA                 TAX
7996  AD31  20 D7 A2           JSR     DISPLAY_MSG
7997  AD34  A9 3A              LDA     #':'
7998  AD36  20 10 A3           JSR     DCHAR
7999  AD39              SET_CURSOR LINE2
8003  AD3E  A0 03              LDY     #3
8004  AD40  B1 5A              LDA     (MENUPTR),Y
8005  AD42  AA                 TAX
8006  AD43  20 D7 A2           JSR     DISPLAY_MSG
8007  AD46  A9 3F              LDA     #'?'
8008  AD48  20 10 A3           JSR     DCHAR
8009  AD4B  60                 RTS
8010
8011                    FINDMENU:                      ;in: MODE, MODE+1 out: MENUPTR
8012  AD4C  A9 AD              LDA     #<MENUTBL       ;start looking at top of table
8013  AD4E  85 5A              STA     MENUPTR
8014  AD50  A9 F6              LDA     #>MENUTBL
8015  AD52  85 5B              STA     MENUPTR+1
```

```
8016  AD54  B2 5A        FM1:       LDA    (MENUPTR)        ;if (MENUPTR)<>MODE then next
8017  AD56  C5 58                   CMP    MODE
8018  AD58  D0 0A                   BNE    FM2
8019  AD5A  A0 01                   LDY    #1               ;if MENUPTR+1<>MODE+1 then next
8020  AD5C  B1 5A                   LDA    (MENUPTR),Y
8021  AD5E  C5 59                   CMP    MODE+1
8022  AD60  D0 02                   BNE    FM2
8023  AD62  18                      CLC                     ;else found it
8024  AD63  60                      RTS
8025  AD64  A5 5A        FM2:       LDA    MENUPTR          ;next menu table entry
8026  AD66  18                      CLC
8027  AD67  69 07                   ADC    #7
8028  AD69  85 5A                   STA    MENUPTR
8029  AD6B  A5 5B                   LDA    MENUPTR+1
8030  AD6D  69 00                   ADC    #0
8031  AD6F  85 5B                   STA    MENUPTR+1
8032  AD71  B2 5A                   LDA    (MENUPTR)        ;if entry=$FF then end of table reached
8033  AD73  C9 FF                   CMP    #$FF
8034  AD75  D0 DD                   BNE    FM1
8035  AD77  38                      SEC
8036  AD78  60                      RTS
8037
8038                    NA:                                 ;menu selection not available
8039  AD79                          HELP   0
8044  AD80  4C 8E AC                JMP    GETMENU
8045
8046                    NEXTLEVEL:                          ;move menu to next level down
8047  AD83  A5 59                   LDA    MODE+1
8048  AD85  F0 0A                   BEQ    GME1A
8049  AD87  A5 59                   LDA    MODE+1           ;init level 3
8050  AD89  29 F8                   AND    #11111000B
8051  AD8B  09 01                   ORA    #00000001B
8052  AD8D  85 59                   STA    MODE+1
8053  AD8F  80 04                   BRA    GME1B
8054  AD91  A9 10        GME1A:     LDA    #$10             ;init level 2
8055  AD93  85 59                   STA    MODE+1
8056  AD95  4C 8E AC     GME1B:     JMP    GETMENU
8057
8058                    ISEXIT:                             ;go to main menu? on line 2
8059  AD98  20 C8 A3                JSR    CLR_LINE2
8860  AD9B                          MESSAGE 138
8864  ADA0                          OK
8869  ADA6  20 06 AB     GME11:     JSR    GETKEY
8870  ADA9  C9 20                   CMP    #OKKEY
8871  ADAB  D0 03                   BNE    GME12
8872  ADAD  4C 46 86                JMP    FSTOP            ;yes, goto main menu
8873  ADB0  C9 10        GME12:     CMP    #NOKEY
8874  ADB2  D0 01                   BNE    GME13
8875  ADB4  60                      RTS                     ;no, return
8876  ADB5  C9 86        GME13:     CMP    #HELPKEY
8877  ADB7  D0 ED                   BNE    GME11
8879  ADB9                          HELP   44
8883  ADC0  80 E4                   BRA    GME11
8884
8885  ADC2  A9 20        SPACES:    LDA    #' '             ;display X spaces
8886  ADC4  20 10 A3                JSR    DCHAR
8887  ADC7  CA                      DEX
```

```
8088   ADC8  D0 F8              BNE      SPACES
8089   ADCA  60                 RTS
8090
8091                 ISRUNNING:                    ;return carry set if schedule is running
8092   ADCB  AD 1F 83            LDA      RUNNING
8093   ADCE  C9 02               CMP      #2
8094   ADD0  F0 0A               BEQ      ISR0
8095   ADD2  C9 03               CMP      #3
8096   ADD4  F0 06               BEQ      ISR0
8097   ADD6  C9 04               CMP      #4
8098   ADD8  F0 02               BEQ      ISR0
8099   ADDA  18                  CLC
8100   ADDB  60                  RTS
8101   ADDC  38       ISR0:      SEC
8102   ADDD  60                  RTS
8103
8104
8105
8106
8107
8108
8109   ADDE                      INCLUDE    GEN.ASM
8110
8111                 ;----------------------------------
8112                 ;      PROGRAM GENERATOR
8113                 ;----------------------------------
8114
8115                 GENERATE:                     ;generate today's schedule
8116                                               ;in: DAYNUM is the day to compile,
8117                                               ;    setup is in object area
8118                                               ;    WCLK=0 if AUTO, 1 if SEMI-AUTO
8119                                               ;out: carry set and ERROR
8120                                               ;    NSPLITS()=# of base or soak cycles
8121                                               ;    GENTIME = starting time
8122                                               ;    DONETIME = ending time
8123                                               ;    NSTARTS = number of starts today
8124                                               ;    STARTPTR points to next start to do
8125                                               ;    STARTCTR=NSTARTS if all starts are past
8126   ADDE  9C 67 02             STZ      CHKFLAG
8127   ADE1  A2 08      GE2:      LDX      #8        ;alt entry for checking of setup
8128   ADE3  9E 54 02   GE3:      STZ      NSPLIT,X
8129   ADE6  CA                   DEX
8130   ADE7  D0 FA                BNE      GE3
8131   ADE9  9C 71 02             STZ      NSYR
8132   ADEC                       SET      VALVE
8136   ADF0  A6 49      GE10:     LDX      VALVE     ;work with base water
8137   ADF2  9E 4A 02             STZ      BASETYPE,X
8138   ADF5  BD 7D 02             LDA      VS,X      ;ignore disabled valves
8139   ADF8  29 C0                AND      #11000000B
8140   ADFA  C9 C0                CMP      #11000000B
8141   ADFC  D0 2E                BNE      GEN
8142                                                 ;DON'T FORGET TO IGNORE @ SOAK & SYRINGE
8143   ADFE  AD 41 15             LDA      CYCLE_TYPE ;first see who's scheduled to water today
8144   AE01  D0 7B                BNE      GE15
8145
8146   AE03  AD 1A 83   GE12:     LDA      DAYNUM    ;see if user cycle = current day or week
8147   AE06  85 52                STA      DIVIDEND
```

| | | | | | | |
|---|---|---|---|---|---|---|
| 8148 | AE08 | AD 1B 83 | | LDA | DAYNUM+1 | |
| 8149 | AE0B | 85 53 | | STA | DIVIDEND+1 | |
| 8150 | AE0D | C6 52 | | DEC | DIVIDEND | ;if DAYNUM=1, (first day or week) |
| 8151 | AE0F | A5 52 | | LDA | DIVIDEND | ;everything is scheduled |
| 8152 | AE11 | 85 53 | | ORA | DIVIDEND+1 | |
| 8153 | AE13 | F0 25 | | BEQ | 6EV | |
| 8154 | AE15 | A6 49 | | LDX | VALVE | |
| 8155 | AE17 | | | DBLX | | |
| 8163 | AE1D | BD 6A 15 | | LDA | CYCLE1,X | |
| 8164 | AE20 | 85 54 | | STA | DIVISOR | |
| 8165 | AE22 | C9 01 | | CMP | #1 | ;if user cycle=1, always water |
| 8166 | AE24 | F0 14 | | BEQ | 6EV | |
| 8167 | AE26 | 20 67 B3 | | JSR | DIVIDE | ;divide today by cycle |
| 8168 | AE29 | AA | | TAX | | ;if no remainder, then water today |
| 8169 | AE2A | F0 0E | | BEQ | 6EV | |
| 8170 | | | | | | |
| 8171 | AE2C | A6 49 | 6EN: | LDX | VALVE | ;else no water today for this valve |
| 8172 | AE2E | | | DBLX | | |
| 8180 | AE34 | 74 8F | | STZ | TR,X | |
| 8181 | AE36 | 74 90 | | STZ | TR+1,X | |
| 8182 | AE38 | 80 5C | | BRA | 6E20 | |
| 8183 | | | | | | |
| 8184 | AE3A | A6 49 | 6EV: | LDX | VALVE | ;water with entered duration |
| 8185 | AE3C | | | DBLX | | |
| 8193 | AE42 | BD 58 15 | | LDA | DUR1,X | |
| 8194 | AE45 | 95 8F | | STA | TR,X | |
| 8195 | AE47 | 85 4E | | STA | MULTIPLIER | |
| 8196 | AE49 | BD 59 15 | | LDA | DUR1+1,X | |
| 8197 | AE4C | 95 90 | | STA | TR+1,X | |
| 8198 | | | | | | ;modified by budget |
| 8199 | AE4E | AD 67 82 | | LDA | CHKFLAG | ;if not checking |
| 8200 | AE51 | D0 43 | | BNE | 6E20 | |
| 8201 | AE53 | AD FE 82 | | LDA | GLOBAL | ;TR = TR * GLOBAL /100 |
| 8202 | AE56 | 85 4F | | STA | MULTIPLICAND | |
| 8203 | AE58 | 20 4D B3 | | JSR | MULT | |
| 8204 | AE5B | | | MOV16 | PRODUCT,DIVIDEND | |
| 8210 | AE63 | 64 55 | | STZ | DIVISOR+1 | |
| 8211 | AE65 | A9 64 | | LDA | #100 | |
| 8212 | AE67 | 85 54 | | STA | DIVISOR | |
| 8213 | AE69 | 20 7E B3 | | JSR | DIV16 | |
| 8214 | AE6C | A6 49 | | LDX | VALVE | |
| 8215 | AE6E | | | DBLX | | |
| 8223 | AE74 | A5 56 | | LDA | QUOTIENT | |
| 8224 | AE76 | 95 8F | | STA | TR,X | |
| 8225 | AE78 | A5 57 | | LDA | QUOTIENT+1 | |
| 8226 | AE7A | 95 90 | | STA | TR+1,X | |
| 8227 | AE7C | 80 18 | | BRA | 6E20 | |
| 8228 | | | | | | |
| 8229 | AE7E | A6 49 | 6E15: | LDX | VALVE | ;specific days |
| 8230 | AE80 | | | DBLX | | |
| 8238 | AE86 | BD 6B 15 | | LDA | CYCLE1+1,X | ;see if day matches today |
| 8239 | AE89 | 2A | | ROL | A | |
| 8240 | AE8A | AE 1C 83 | | LDX | DAYNUM+2 | |
| 8241 | AE8D | 2A | 6E16: | ROL | A | |
| 8242 | AE8E | CA | | DEX | | |
| 8243 | AE8F | D0 FC | | BNE | 6E16 | |
| 8244 | AE91 | 90 99 | | BCC | 6EN | ;not today |

```
8245  AE93  4C 83 AE            JMP   6E12         ;now see if it's the right week
8246
8247  AE96  A6 49      6E20:    LDX   VALVE        ;SEE IF SOAK DAY
8248  AE98  BD 7D 82            LDA   VS,X
8249  AE9B  29 C0               AND   #11000000B
8250  AE9D  C9 C0               CMP   #11000000B
8251  AE9F  D0 6F               BNE   6E30         ;ignore if valve disabled
8252  AEA1                      DBLX
8260  AEA7  BD B5 15            LDA   DUR3,X       ;or if no soak duration
8261  AEAA  1D B6 15            ORA   DUR3+1,X
8262  AEAD  F0 61               BEQ   6E30
8263  AEAF  AD 41 15            LDA   CYCLE_TYPE
8264  AEB2  D0 44               BNE   6E25
8265  AEB4  AD 1A 03   6E22:    LDA   DAYNUM       ;see if user cycle = current day or week
8266  AEB7  85 52               STA   DIVIDEND
8267  AEB9  AD 1B 03            LDA   DAYNUM+1
8268  AEBC  85 53               STA   DIVIDEND+1
8269  AEBE  C6 52               DEC   DIVIDEND     ;if DAYNUM=1, (first day or week)
8270  AEC0  A5 52               LDA   DIVIDEND     ;everything is scheduled
8271  AEC2  05 53               ORA   DIVIDEND+1
8272  AEC4  F0 17               BEQ   6E5
8273  AEC6  A6 49               LDX   VALVE
8274  AEC8                      DBLX
8282  AECE  BD C7 15            LDA   CYCLE3,X
8283  AED1  85 54               STA   DIVISOR
8284  AED3  C9 01               CMP   #1           ;if user cycle=1, always soak
8285  AED5  F0 06               BEQ   6E5
8286  AED7  20 67 83            JSR   DIVIDE       ;divide today by cycle
8287  AEDA  AA                  TAX                ;if no remainder, then water today
8288  AEDB  D0 33               BNE   6E30
8289
8290  AEDD  A6 49      6E5:     LDX   VALVE        ;water with entered duration
8291  AEDF  A9 02               LDA   #2
8292  AEE1  9D 4A 82            STA   BASETYPE,X
8293  AEE4                      DBLX
8301  AEEA  BD B5 15            LDA   DUR3,X
8302  AEED  95 8F               STA   TR,X
8303  AEEF  85 4E               STA   MULTIPLIER
8304  AEF1  BD B6 15            LDA   DUR3+1,X
8305  AEF4  95 90               STA   TR+1,X
8306  AEF6  80 18               BRA   6E30
8307
8308  AEF8  A6 49      6E25:    LDX   VALVE        ;specific days
8309  AEFA                      DBLX
8317  AF00  BD C8 15            LDA   CYCLE3+1,X   ;see if day matches today
8318  AF03  2A                  ROL   A
8319  AF04  AE 1C 03            LDX   DAYNUM+2
8320  AF07  2A         6E26:    ROL   A
8321  AF08  CA                  DEX
8322  AF09  D0 FC               BNE   6E26
8323  AF0B  90 03               BCC   6E30         ;not today
8324  AF0D  4C B4 AE            JMP   6E22         ;now see if it's the right week
8325
8326  AF10  A6 49      6E30:    LDX   VALVE        ;if valve has time remaining today,
8327  AF12                      DBLX
8335  AF18  B5 8F               LDA   TR,X
8336  AF1A  15 90               ORA   TR+1,X
```

```
8337  AF1C  F0 0E            BEQ    6E32
8338  AF1E  AD 7C 15         LDA    BASE_START
8339  AF21  9D 38 82         STA    NXTTIME,X        ;then set to start ASAP
8340  AF24  AD 7D 15         LDA    BASE_START+1
8341  AF27  9D 39 82         STA    NXTTIME+1,X
8342  AF2A  80 12            BRA    6E35
8343  AF2C  A6 49    6E32:   LDX    VALVE            ;if no time entered
8344  AF2E                   DBLX                    ;don't water with valve
8352  AF34  A9 05            LDA    #$05
8353  AF36  9D 39 82         STA    NXTTIME+1,X
8354  AF39  A9 A0            LDA    #$A0
8355  AF3B  9D 38 82         STA    NXTTIME,X
8356  AF3E  E6 49    6E35:   INC    VALVE            ;do the next valve
8357  AF40  A5 49            LDA    VALVE
8358  AF42  C9 09            CMP    #9
8359  AF44  F0 03            BEQ    6E40
8360  AF46  4C F0 AD         JMP    6E10
8361
8362  AF49  9C EC 15  6E40:  STZ    NSTARTS          ;prepare to generate starts
8363  AF4C                   MOV16  BASE_START,E
8369  AF58  20 07 AA         JSR    FIRSTSTART       ;init start pointer
8370  AF5B                   SET    VALVE            ;init NXTTIME for syringe
8374  AF5F  A6 49    6E4B:   LDX    VALVE
8375  AF61                   DBLX
8383  AF67  BD 7E 15         LDA    DUR2,X
8384  AF6A  D0 12            BNE    6E4A
8385  AF6C  E6 49            INC    VALVE
8386  AF6E  A5 49            LDA    VALVE
8387  AF70  C9 09            CMP    #9
8388  AF72  D0 EB            BNE    6E4B
8389  AF74  A9 05            LDA    #$05             ;if no syringing, then SYRINGE_START=1440
8390  AF76  8D 90 15         STA    SYRINGE_START+1
8391  AF79  A9 A0            LDA    #$A0
8392  AF7B  8D AF 15         STA    SYRINGE_START
8393                                                 ;NXTTIME(0)=start of syringes
8394  AF7E            6E4A:  MOV16  SYRINGE_START,NXTTIME
8400
8401                  GENXT:                         ;OK, now we generate starts
8402  AF8A  A9 05            LDA    #$05             ;find next valve up
8403  AF8C  85 42            STA    MSB              ;it's the one with the lowest NXTTIME
8404  AF8E  A9 A0            LDA    #$A0
8405  AF90  85 41            STA    LSB              ;LSB holds lowest time so far
8406  AF92  A9 08            LDA    #8               ;if a tie, the lowest valve # wins
8407  AF94  85 BC            STA    R1
8408  AF96  85 49            STA    VALVE
8409  AF98  A6 BC    6E41:   LDX    R1               ;if NXTTIME <= lowest time,
8410  AF9A                   DBLX
8418  AFA0  BD 39 82         LDA    NXTTIME+1,X
8419  AFA3  C5 42            CMP    MSB
8420  AFA5                   BLT    6E44
8423  AFA7  F0 02            BEQ    6E42
8424  AFA9  80 21            BRA    6E45
8425  AFAB  BD 38 82  6E42:  LDA    NXTTIME,X
8426  AFAE  C5 41            CMP    LSB
8427  AFB0                   BLT    6E44
8430  AFB2  F0 02            BEQ    6E44
8431  AFB4  80 16            BRA    6E45
```

```
8432  AFB6  A5 BC        6E44:  LDA   R1          ;then save that valve
8433  AF88  85 49               STA   VALVE
8434  AFBA  A6 49               LDX   VALVE       ;and new lowest time
8435  AFBC               DBLX
8443  AFC2  BD 38 82            LDA   NXTTIME,X
8444  AFC5  85 41               STA   LSB
8445  AFC7  BD 39 82            LDA   NXTTIME+1,X
8446  AFCA  85 42               STA   MSB
8447  AFCC  C6 BC        6E45:  DEC   R1
8448  AFCE  D0 C8               BNE   6E41
8449
8450  AFD0  A6 49               LDX   VALVE       ;if time remaining is 0 for next valve,
8451  AFD2                      DBLX
8459  AFD8  B5 8F               LDA   TR,X
8460  AFDA  15 90               ORA   TR+1,X
8461  AFDC  D0 03               BNE   6E50
8462  AFDE  4C 77 B0            JMP   6E65        ;that means no more watering left
8463
8464  AFE1               6E50:  MOV16 E,S         ;start at end of last watering
8470  AFED  A6 49               LDX   VALVE
8471  AFEF               DBLX
8479  AFF5  AD 33 82            LDA   S+1         ;if start before MINOFF,
8480  AFF8  DD 39 82            CMP   NXTTIME+1,X
8481  AFFB                      BLT   6E52
8484  AFFD  F0 02               BEQ   6E51
8485  AFFF  80 1E               BRA   6E55
8486  B001  AD 32 82     6E51:  LDA   S
8487  B004  DD 38 82            CMP   NXTTIME,X
8488  B007                      BLT   6E52
8491  B009  80 14               BRA   6E55
8492  B00B  A6 49        6E52:  LDX   VALVE       ;then move start to there
8493  B00D                      DBLX
8501  B013  BD 38 82            LDA   NXTTIME,X
8502  B016  8D 32 82            STA   S
8503  B019  BD 39 82            LDA   NXTTIME+1,X
8504  B01C  8D 33 82            STA   S+1
8505
8506                     6E55:                    ;check if start is in syringe time
8507  B01F  AD 33 82            LDA   S+1
8508  B022  CD 39 82            CMP   NXTTIME+1   ;if start >= NXTTIME(0)
8509  B025  F0 05               BEQ   6E56
8510  B027                      BLT   6E60
8513  B029  4C 5E B2            JMP   GSC
8514  B02C  AD 32 82     6E56:  LDA   S
8515  B02F  CD 38 82            CMP   NXTTIME
8516  B032                      BLT   6E60
8519  B034  4C 5E B2            JMP   GSC         ;then generate syringe cycles
8520
8521  B037  AD 1E B3     6E60:  LDA   WCLK        ;check if start is in xtime
8522  B03A  C9 01               CMP   #1
8523  B03C  F0 50               BEQ   6E70
8524  B03E  AD 33 82            LDA   S+1
8525  B041  CD 55 15            CMP   XFROM+1     ;if start < XFROM
8526  B044                      BLT   6E70
8529  B046  F0 02               BEQ   6E61
8530  B048  80 08               BRA   6E62
8531  B04A  AD 32 82     6E61:  LDA   S
```

```
8532  B04D  CD 54 15           CMP    XFROM
8533  B050                     BLT    6E70
8536  B052  AD 33 02    6E62:  LDA    S+1              ;or if start >= XTO
8537  B055  CD 57 15           CMP    XTO+1
8538  B058                     BLT    6E64
8541  B05A  F0 02              BEQ    6E63
8542  B05C  80 30              BRA    6E70
8543  B05E  AD 32 02    6E63:  LDA    S
8544  B061  CD 56 15           CMP    XTO
8545  B064                     BLT    6E64
8548  B066  80 26              BRA    6E70             ;then do nothing
8549  B068              6E64:  MOV16  XTO,E            ;else move to end of xtime
8555  B074  4C 8A AF           JMP    6ENXT
8556
8557  B077  AD 39 02    6E65:  LDA    NXTTIME+1        ;base watering done
8558  B07A  C9 05              CMP    #$05             ;check if any more syringes
8559  B07C  F0 0D              BEQ    6E6A
8560  B07E  4C 5E B2           JMP    6SC              ;yes, generate syringe
8561  B081  AD 38 02           LDA    NXTTIME
8562  B084  C9 A0              CMP    #$A0
8563  B086  F0 03              BEQ    6E6A
8564  B088  4C 5E B2           JMP    6SC
8565  B08B  4C F4 B1    6E6A:  JMP    6E97             ;nope, all done
8566
8567  B08E  A6 49       6E70:  LDX    VALVE            ;calculate watering time
8568  B090                     DBLX
8576  B096  B5 8F              LDA    TR,X             ;use all of the time remaining
8577  B098  8D 36 02           STA    WT
8578  B09B  B5 90              LDA    TR+1,X
8579  B09D  8D 37 02           STA    WT+1
8580  B0A0  A6 49              LDX    VALVE
8581  B0A2  BD 42 15           LDA    MAXON,X          ;unless limited by MAXON
8582  B0A5  F0 1E              BEQ    6E75
8583  B0A7  85 BC              STA    R1               ;if WT>MAXON then WT=MAXON
8584  B0A9                     DBLX
8592  B0AF  AD 37 02           LDA    WT+1
8593  B0B2  D0 09              BNE    6E73
8594  B0B4  AD 36 02           LDA    WT
8595  B0B7  C5 BC              CMP    R1
8596  B0B9                     BLT    6E75
8599  B0BB  F0 08              BEQ    6E75
8600  B0BD  A5 BC       6E73:  LDA    R1
8601  B0BF  8D 36 02           STA    WT
8602  B0C2  9C 37 02           STZ    WT+1
8603  B0C5
8604  B0C5  64 BE       6E75:  STZ    R3               ;init watering interrupted flag
8605  B0C7                     ADD16  S,WT,E           ;end= start + watering time
8614                                                   ;check for watering into syringe cycle
8615  B0DA  AD 35 02           LDA    E+1              ;if end>NXTTIME(0)
8616  B0DD  CD 39 02           CMP    NXTTIME+1
8617  B0E0                     BLT    6E80
8620  B0E2  F0 02              BEQ    6E7B
8621  B0E4  80 0A              BRA    6E7A
8622  B0E6  AD 34 02    6E7B:  LDA    E
8623  B0E9  CD 38 02           CMP    NXTTIME
8624  B0EC                     BLT    6E80
8627  B0EE  F0 15              BEQ    6E90
```

```
8628  B0F8  38           6E7A:  SEC                   ;then stop watering at beginning
8629  B0F1  AD 38 82            LDA    NXTTIME        ;of syringe cycle
8630  B0F4  ED 32 82            SBC    S
8631  B0F7  8D 36 82            STA    WT
8632  B0FA  AD 39 82            LDA    NXTTIME+1
8633  B0FD  ED 33 82            SBC    S+1
8634  B100  8D 37 82            STA    WT+1
8635  B103  80 48               BRA    6E8A
8636
8637  B105  AD 1E 83     6E80:  LDA    WCLK           ;check for watering into xtime
8638  B108  C9 01               CMP    #1             ;skip check if semi-auto
8639  B10A  F0 2C               BEQ    6E83
8640  B10C  AD 33 82            LDA    S+1
8641  B10F  CD 57 15            CMP    XTO+1          ;if start >= XTO
8642  B112                      BLT    6E77
8645  B114  F0 02               BEQ    6E81
8646  B116  80 20               BRA    6E83
8647  B118  AD 32 82     6E81:  LDA    S
8648  B11B  CD 56 15            CMP    XTO
8649  B11E                      BGE    6E83
8652  B120  AD 35 82     6E77:  LDA    E+1            ;or if end<=XFROM
8653  B123  CD 55 15            CMP    XFROM+1
8654  B126                      BLT    6E83
8657  B128  F0 02               BEQ    6E82
8658  B12A  80 0E               BRA    6E84
8659  B12C  AD 34 82     6E82:  LDA    E
8660  B12F  CD 54 15            CMP    XFROM
8661  B132                      BLT    6E83
8664  B134  F0 02               BEQ    6E83
8665  B136  80 02               BRA    6E84
8666  B138  80 2A        6E83:  BRA    6E85           ;then leave end alone
8667
8668  B13A  38           6E84:  SEC                   ;else stop watering at beginning
8669  B13B  AD 54 15            LDA    XFROM          ;of Xtime
8670  B13E  ED 32 82            SBC    S
8671  B141  8D 36 82            STA    WT
8672  B144  AD 55 15            LDA    XFROM+1
8673  B147  ED 33 82            SBC    S+1
8674  B14A  8D 37 82            STA    WT+1
8675  B14D               6E8A:  ADD16  S,WT,E         ;calculate new end
8684  B160                      SET    R3             ;and set interrupted flag
8688
8689               6E85:                              ;we now have a good watering time
8690                                                  ;with flag set if interrupted
8691  B164  AD 35 82            LDA    E+1            ;error if past midnite
8692  B167  C9 05               CMP    #$05
8693  B169                      BLT    6E97
8696  B16B  F0 03               BEQ    6E86
8697  B16D  4C 0B B3            JMP    6ERR2
8698  B170  AD 34 82     6E86:  LDA    E
8699  B173  C9 A0               CMP    #$A0
8700  B175                      BLT    6E97
8703  B177  4C 0B B3            JMP    6ERR2
8704
8705  B17A  A6 49        6E87:  LDX    VALVE          ;modify time remaining
8706  B17C                      DBLX                  ;by subtracting watering time from it
8714  B182  38                  SEC
```

```
8715   B183   B5 9B              LDA     TR+1,X
8716   B185   ED 37 02           SBC     WT+1
8717   B188   95 9B              STA     TR+1,X
8718   B18A   B5 8F              LDA     TR,X
8719   B18C   ED 36 02           SBC     WT
8720   B18F   95 8F              STA     TR,X
8721   B191   A6 49              LDX     VALVE          ;then set up for next time
8722   B193                      DBLX
8730   B199   B5 8F              LDA     TR,X
8731   B19B   15 9B              ORA     TR+1,X
8732   B19D   D0 0C              BNE     6E90
8733   B19F   A9 05              LDA     #$05           ;no time left for this station,
8734   B1A1   9D 39 02           STA     NXTTIME+1,X    ;so no next time
8735   B1A4   A9 A0              LDA     #$A0
8736   B1A6   9D 38 02           STA     NXTTIME,X
8737   B1A9   80 32              BRA     6E95
8738
8739   B1AB   A5 BE       6E90:  LDA     R3             ;if watering interrupted,
8740   B1AD   F0 10              BEQ     6E91
8741   B1AF   A6 49              LDX     VALVE          ;then make it next one to start
8742   B1B1                      DBLX
8750   B1B7   9E 39 02           STZ     NXTTIME+1,X
8751   B1BA   9E 38 02           STZ     NXTTIME,X
8752   B1BD   80 1E              BRA     6E95
8753   B1BF   A6 49       6E91:  LDX     VALVE          ;elxe next time will be end + MINOFF
8754   B1C1   BD 4B 15           LDA     MINOFF,X
8755   B1C4   85 8D              STA     R2
8756   B1C6                      DBLX
8764   B1CC   18                 CLC
8765   B1CD   AD 34 02           LDA     E
8766   B1D0   65 8D              ADC     R2
8767   B1D2   9D 38 02           STA     NXTTIME,X
8768   B1D5   AD 35 02           LDA     E+1
8769   B1D8   69 00              ADC     #0
8770   B1DA   9D 39 02           STA     NXTTIME+1,X
8771
8772   B1DD   A6 49       6E95:  LDX     VALVE          ;send along base or soak
8773   B1DF   BD 4A 02           LDA     BASETYPE,X
8774   B1E2   85 D7              STA     SUB
8775   B1E4   20 E3 9F           JSR     BUILD_START    ;make a start @ STARTPTR
8776                                                    ;using S, WT, VALVE
8777   B1E7   90 03              BCC     6E96
8778   B1E9   4C 07 B3           JMP     6ERR1          ;too many starts
8779   B1EC   A6 49       6E96:  LDX     VALVE
8780   B1EE   FE 54 02           INC     NSPLIT,X
8781   B1F1   4C 8A AF           JMP     6ENXT          ;else do next start
8782
8783   B1F4   20 07 AA    6E97:  JSR     FIRSTSTART     ;good exit
8784   B1F7                      MOV16   E,DONETIME
8790   B203                      MOV16   BASE_START,6ENTIME
8796   B20F   AD B0 15           LDA     SYRINGE_START+1 ;GENTIME = lesser of base or syringe start
8797   B212   CD EE 15           CMP     GENTIME+1
8798   B215                      BLT     6E9A
8801   B217   F0 02              BEQ     6E9C
8802   B219   80 14              BRA     6E9B
8803   B21B   AD AF 15    6E9C:  LDA     SYRINGE_START
8804   B21E   CD ED 15           CMP     GENTIME
```

```
8805    B221                                BGE     6E9B
8808    B223                    6E9A:       MOV16   SYRINGE_START,6ENTIME
8814                            6E9B:                               ;point to next start
8815    B22F                                MOV16   HOUR,I8FR+4
8821    B239    20 B3 AB                    JSR     HM2MIN
8822    B23C    A5 7A           6EE0:       LDA     STARTCTR        ;see if any more starts
8823    B23E    CD EC 15                    CMP     NSTARTS
8824    B241    F0 17                       BEQ     6EE4            ;nope, we missed the whole day
8825    B243    A0 01                       LDY     #1              ;see if current time
8826    B245    B1 7B                       LDA     (STARTPTR),Y    ;is < start time
8827    B247    C5 D0                       CMP     OFFSET+1
8828    B249    F0 04                       BEQ     6EE1
8829    B24B                                BLT     6EE2
8832    B24D    80 0B                       BRA     6EE4
8833    B24F    B2 7B           6EE1:       LDA     (STARTPTR)
8834    B251    C5 CF                       CMP     OFFSET
8835    B253                                BGE     6EE4
8838    B255    20 F7 A9        6EE2:       JSR     NEXTSTART       ;start was < current time,
8839    B258    80 E2                       BRA     6EE0            ;look at next one
8840                            6EE4:                               ;done, STARTPTR points to next start to do
8841    B25A    64 79                       STZ     ERROR
8842    B25C    18                          CLC
8843    B25D    60                          RTS
8844
8845                            GSC:                                ;generate syringe cycles
8846    B25E    A9 01                       LDA     #1
8847    B260    85 D7                       STA     SUB
8848    B262    EE 71 02                    INC     NSYR
8849    B265                                MOV16   NXTTIME,E
8855    B271    64 49                       STZ     VALVE
8856    B273    20 A7 9E        GSC1:       JSR     NXTVALVE        ;for each valve
8857    B276    90 03                       BCC     GSC2
8858    B278    4C D1 B2                    JMP     GSC5
8859    B27B    A6 49           GSC2:       LDX     VALVE
8860    B27D                                DEX
8868    B283    BD 7E 15                    LDA     DUR2,X          ;if no duration, skip
8869    B286    1D 7F 15                    ORA     DUR2+1,X
8870    B289    F0 E8                       BEQ     GSC1
8871    B28B    BD 7E 15                    LDA     DUR2,X          ;else WT=duration
8872    B28E    8D 36 02                    STA     WT
8873    B291    BD 7F 15                    LDA     DUR2+1,X
8874    B294    8D 37 02                    STA     WT+1
8875    B297                                MOV16   E,S             ;start=end of last one
8881    B2A3                                ADD16   S,WT,E          ;end=start + WT, nothing can interfere
8890    B2B6    AD 35 02                    LDA     E+1             ;except going past midnite
8891    B2B9    C9 05                       CMP     #$05
8892    B2BB                                BLT     GSC3
8895    B2BD    F0 03                       BEQ     GSC4
8896    B2BF    4C 0B B3                    JMP     6ERR2
8897    B2C2    AD 34 02        GSC4:       LDA     E
8898    B2C5    C9 A0                       CMP     #$A0
8899    B2C7                                BLT     GSC3
8902    B2C9    4C 0B B3                    JMP     6ERR2
8903    B2CC    20 EB 9F        GSC3:       JSR     BUILD_START     ;make the start
8904    B2CF    80 A2                       BRA     GSC1            ;next valve
8905                            GSC5:                               ;find next syringe time
8906    B2D1                                ADD16   NXTTIME,SOFTEN,NXTTIME
```

```
8915  B2E4  AD 39 02           LDA    NXTTIME+1        ;if nxttime > end of syringes
8916  B2E7  CD B2 15           CMP    SYRINGE_END+1
8917  B2EA                     BLT    GSC9
8920  B2EC  F0 02              BEQ    GSC7
8921  B2EE  80 0A              BRA    GSC8
8922  B2F0  AD 38 02    GSC7:  LDA    NXTTIME
8923  B2F3  CD B1 15           CMP    SYRINGE_END
8924  B2F6                     BLT    GSC9
8927  B2F8  F0 0A              BEQ    GSC9
8928  B2FA  A9 05       GSC8:  LDA    #$05             ;then no more
8929  B2FC  8D 39 02           STA    NXTTIME+1
8930  B2FF  A9 A0              LDA    #$A0
8931  B301  8D 38 02           STA    NXTTIME
8932  B304  4C 0A AF    GSC9:  JMP    GENXT            ;go back to base watering
8933
8934                                                   ;generator errors
8935  B307  A9 01       GERR1: LDA    #1               ;1=too many starts
8936  B309  80 04              BRA    GERR
8937  B30B  A9 02       GERR2: LDA    #2               ;2=past midnite
8938  B30D  80 00              BRA    GERR
8939  B30F  85 79       GERR:  STA    ERROR
8940  B311  38                 SEC
8941  B312  60                 RTS
8942
8943                    CHECK:                          ;check setup for errors
8944  B313                     SET    CHKFLAG         ;ignore budget settings for check
8948  B318  AD 41 15           LDA    CYCLE_TYPE      ;if "so many" days,
8949  B31B  D0 0E              BNE    CHK1
8950  B31D                     SET    DAYNUM          ;just check 1st day
8954  B322  9C 1B 03           STZ    DAYNUM+1
8955  B325  9C 1C 03           STZ    DAYNUM+2
8956  B328  4C E1 AD           JMP    GE0
8957  B32B              CHK1:  SET    DAYNUM          ;if specific days
8961  B330  9C 1B 03           STZ    DAYNUM+1
8962  B333  9C 1C 03           STZ    DAYNUM+2
8963  B336  EE 1C 03    CHK2:  INC    DAYNUM+2        ;check the first week
8964  B339  AD 1C 03           LDA    DAYNUM+2
8965  B33C  C9 08              CMP    #8
8966  B33E  F0 0B              BEQ    CHK4
8967  B340  20 E1 AD           JSR    GE0
8968  B343  90 F1              BCC    CHK2
8969  B345  60                 RTS
8970  B346  18          CHK3:  CLC
8971  B347  66 73              ROR    CTR
8972  B349  80 EB              BRA    CHK2
8973  B34B  18          CHK4:  CLC
8974  B34C  60                 RTS
8975
8976
8977
8978                    ;-----------------------------------
8979                    ;     MATH ROUTINES
8980                    ;-----------------------------------
8981
8982                    MULT:                           ;MULTIPLIER (8) * MULTIPLICAND (8) =
8983                                                    ;PRODUCT (16 bits, LSB,MSB)
8984  B34D  A9 00              LDA    #0
```

```
8985  B34F  85 51           STA    PRODUCT+1
8986  B351  A2 08           LDX    #8
8987  B353  0A      MUL1:   ASL    A
8988  B354  26 51           ROL    PRODUCT+1
8989  B356  06 4E           ASL    MULTIPLIER
8990  B358  90 07           BCC    MUL2
8991  B35A  18              CLC
8992  B35B  65 4F           ADC    MULTIPLICAND
8993  B35D  90 02           BCC    MUL2
8994  B35F  E6 51           INC    PRODUCT+1
8995  B361  CA      MUL2:   DEX
8996  B362  D0 EF           BNE    MUL1
8997  B364  85 50           STA    PRODUCT
8998  B366  60              RTS
8999
9000                DIVIDE:                ;DIVIDEND (15) / DIVISOR (7) =
9001                                       ;QUOTIENT (8), with remainder in A
9002  B367  A2 08           LDX    #8
9003  B369  A5 52           LDA    DIVIDEND
9004  B36B  85 56           STA    QUOTIENT
9005  B36D  A5 53           LDA    DIVIDEND+1
9006  B36F  06 56   DIV1:   ASL    QUOTIENT
9007  B371  2A              ROL    A
9008  B372  C5 54           CMP    DIVISOR
9009  B374  90 04           BCC    DIV2
9010  B376  E5 54           SBC    DIVISOR
9011  B378  E6 56           INC    QUOTIENT
9012  B37A  CA      DIV2:   DEX
9013  B37B  D0 F2           BNE    DIV1
9014  B37D  60              RTS
9015
9016                DIV16:                 ;DIVIDEND(16) / DIVISOR(16) =
9017                                       ;QUOTIENT (16)
9018  B37E  A9 00           LDA    #0      ;clear partial dividend
9019  B380  85 41           STA    LSB
9020  B382  85 42           STA    MSB
9021  B384  A2 10           LDX    #16     ;dividend bit count=16
9022  B386  06 52   NXTBT:  ASL    DIVIDEND ;shift dividend (quotient) left
9023  B388  26 53           ROL    DIVIDEND+1
9024  B38A  26 41           ROL    LSB     ;shift partial dividend left
9025  B38C  26 42           ROL    MSB
9026  B38E  A5 41           LDA    LSB     ;subtract low bytes
9027  B390  38              SEC
9028  B391  E5 54           SBC    DIVISOR
9029  B393  A8              TAY            ;save low result in Y
9030  B394  A5 42           LDA    MSB     ;subtract hi bytes
9031  B396  E5 55           SBC    DIVISOR+1
9032  B398  90 06           BCC    CNTDN   ;divisor>dividend?
9033  B39A  E6 52           INC    DIVIDEND ;no, set bit in quotient
9034  B39C  85 42           STA    MSB     ; and enter subtraction result
9035  B39E  84 41           STY    LSB     ; into partial dividend
9036  B3A0  CA      CNTDN:  DEX            ;decrement bit count
9037  B3A1  D0 E3           BNE    NXTBT   ;loop until 16 bits are done
9038  B3A3                  MOV16  DIVIDEND,QUOTIENT
9044  B3AB  60              RTS
9045
9046
```

```
9047                    ;---------------------------------
9048                    ;        EEPROM SUPPORT
9049                    ;---------------------------------
9050
9051   B3AC  A5 4C      E2CSHI:   LDA   E2MASK            ;bring EEPROM chip select high
9052   B3AE  09 04                ORA   #00000100B
9053   B3B0  85 4C                STA   E2MASK
9054   B3B2  85 1D                STA   E2
9055   B3B4  60                   RTS
9056
9057   B3B5  A9 08      E2STANDBY: LDA  #00001000B        ;initialize EEPROM interface
9058   B3B7  85 4C                STA   E2MASK            ;VE high, CS low, DI low
9059   B3B9  85 1D                STA   E2
9060   B3BB  60                   RTS
9061
9062   B3BC  A5 4C      E2CLK:    LDA   E2MASK            ;bring EEPROM serial clock high
9063   B3BE  09 02                ORA   #00000010B
9064   B3C0  85 4C                STA   E2MASK
9065   B3C2  85 1D                STA   E2
9066   B3C4  A5 4C                LDA   E2MASK            ;then low
9067   B3C6  29 FD                AND   #11111101B
9068   B3C8  85 4C                STA   E2MASK
9069   B3CA  85 1D                STA   E2
9070   B3CC  60                   RTS
9071
9072   B3CD  A9 30      E2EWEN:   LDA   #E2EWEN_CMD       ;EEPROM erase/write enable
9073   B3CF  20 D3 B3             JSR   E2CMD             ;E2ADDR must be 0
9074   B3D2  60                   RTS
9075
9076   B3D3  85 4B      E2CMD:    STA   E2WR              ;send EEPROM command in A
9077   B3D5  20 B5 B3             JSR   E2STANDBY
9078   B3D8  20 AC B3             JSR   E2CSHI
9079   B3DB  A5 4C                LDA   E2MASK            ;send 0 start bit
9080   B3DD  29 FE                AND   #11111110B
9081   B3DF  85 4C                STA   E2MASK
9082   B3E1  20 BC B3             JSR   E2CLK
9083   B3E4  A5 4C                LDA   E2MASK            ;send 1 start bit
9084   B3E6  09 01                ORA   #00000001B
9085   B3E8  85 4C                STA   E2MASK
9086   B3EA  20 BC B3             JSR   E2CLK
9087   B3ED  A5 4D                LDA   E2ADDR
9088   B3EF  05 4B                ORA   E2WR
9089   B3F1  20 F5 B3             JSR   E2TX
9090   B3F4  60                   RTS
9091
9092   B3F5  85 4B      E2TX:     STA   E2WR              ;send byte in A to EEPROM
9093   B3F7  A2 08                LDX   #8                ;8 bits, no start
9094   B3F9  66 4C      E2T1:     ROR   E2MASK            ;prepare to get D0
9095   B3FB  26 4B                ROL   E2WR              ;MSB of data
9096   B3FD  26 4C                ROL   E2MASK            ;into D0 of E2MASK (DI of EEPROM)
9097   B3FF  A5 4C                LDA   E2MASK
9098   B401  85 1D                STA   E2                ;send the bit
9099   B403  20 BC B3             JSR   E2CLK
9100   B406  CA                   DEX
9101   B407  D0 F0                BNE   E2T1
9102   B409  60                   RTS
9103
```

```
9104                    E2READ:                     ;read word from EEPROM @ E2ADDR
9105                                                ;into MSB, LSB
9106                                                ;carry set if error
9107  B40A  A9 80               LDA    #E2READ_CMD
9108  B40C  20 D3 B3            JSR    E2CMD
9109  B40F  A5 1D               LDA    E2
9110  B411  30 14               BMI    E2RNG        ;D0 start bit should be 0
9111  B413  A2 10               LDX    #16          ;get in 16 data bits
9112  B415  20 BC B3    E2R1:   JSR    E2CLK
9113  B418  A5 1D               LDA    E2           ;bit is in D7
9114  B41A  2A                  ROL    A            ;bit is in carry
9115  B41B  26 41               ROL    LSB          ;now in target word
9116  B41D  26 42               ROL    MSB
9117  B41F  CA                  DEX
9118  B420  D0 F3               BNE    E2R1
9119  B422  20 B5 B3    E2ROK:  JSR    E2STANDBY    ;good exit
9120  B425  18                  CLC
9121  B426  60                  RTS
9122  B427  20 B5 B3    E2RNG:  JSR    E2STANDBY    ;didn't get start bit
9123  B42A  38                  SEC
9124  B42B  60                  RTS
9125
9126  B42C  A9 C0       E2ERASE: LDA   #E2ERASE_CMD ;erase EEPROM @ E2ADDR
9127  B42E  80 02               BRA    E2W2
9128
9129                    E2WRITE:                    ;write word to EEPROM @ E2ADDR
9130                                                ;from MSB, LSB
9131                                                ;carry set if error
9132  B430  A9 40               LDA    #E2WRITE_CMD
9133  B432  20 D3 B3    E2W2:   JSR    E2CMD
9134  B435  A5 42               LDA    MSB          ;send data
9135  B437  20 F5 B3            JSR    E2TX
9136  B43A  A5 41               LDA    LSB
9137  B43C  20 F5 B3            JSR    E2TX
9138  B43F  20 B5 B3            JSR    E2STANDBY
9139  B442  20 BC B3            JSR    E2CLK        ;start programming cycle
9140  B445  20 AC B3            JSR    E2CSHI
9141  B448  A9 14               LDA    #20
9142  B44A  85 BC               STA    R1           ;wait 20 ms. max
9143  B44C  A0 01       E2W1:   LDY    #1
9144  B44E  20 C0 A2            JSR    WAITMS
9145  B451  A5 1D               LDA    E2
9146  B453  30 09               BMI    E2WOK        ;for cycle to finish
9147  B455  C6 BC               DEC    R1
9148  B457  D0 F3               BNE    E2W1
9149  B459  20 B5 B3    E2WNG:  JSR    E2STANDBY    ;didn't get ready bit
9150  B45C  38                  SEC
9151  B45D  60                  RTS
9152  B45E  20 B5 B3    E2WOK:  JSR    E2STANDBY    ;good exit
9153  B461  18                  CLC
9154  B462  60                  RTS
9155
9156
9157                    ;----------------------------------
9158                    ;     INTERRUPT ROUTINE
9159                    ;----------------------------------
9160
```

```
9161                            ;INT reloads the TIMER to generate the next INT
9162
9163                            ;These are the tasks of the interrupt:
9164                            ;      Clear the watchdog
9165                            ;      Decrement a down counter
9166                            ;      Shut down in battery removed or battery low
9167                            ;      Return keys to the main program with debounce and repeat
9168                            ;      Blink the cursor
9169                            ;      Blink the question mark
9170                            ;      Scroll messages of more than two lines
9171                            ;      Update the clock
9172
9173                            ;The variable BLINK controls blinking and scrolling.
9174                            ;      0= no blink
9175                            ;      1= blink cursor @ CURSOR
9176                            ;      2= blink ? @ CURSOR
9177                            ;      3= scroll message
9178                            ;      4= repeat message after scroll
9179                            ;      5= blink special char in lower right corner
9180
9181   B463  48          INTR:  PHA                         ;interrupt service routine (TIMER)
9182   B464  DA                 PHX                         ;save registers
9183   B465  5A                 PHY
9184   B466  A5 41              LDA    LSB
9185   B468  48                 PHA
9186   B469  A5 42              LDA    MSB
9187   B46B  48                 PHA
9188
9189   B46C  85 1B              STA    WATCHDOG             ;clear watchdog timer
9190   B46E  C6 46              DEC    TIMCTR               ;decrement down counter
9191   B470  C6 47              DEC    TIMCTR2
9192   B472  C6 A2              DEC    SECCTR+1             ;decrement seconds counter
9193   B474  D0 0F              BNE    INT1
9194   B476  C6 A1              DEC    SECCTR
9195   B478  A9 19              LDA    #PERSEC
9196   B47A  85 A2              STA    SECCTR+1
9197   B47C  A5 6D              LDA    FLAGS                ;that's all if no power key
9198   B47E  29 01              AND    #00000001B
9199   B480  D0 03              BNE    INT1
9200   B482  4C 09 B6           JMP    INT70
9201
9202   B485  A5 12       INT1:  LDA    STATUS1              ;if power key now gone,
9203   B487  29 01              AND    #00000001B
9204   B489  F0 07              BEQ    INT2
9205   B48B  A9 80              LDA    #10000000B           ;then return it as a key pressed
9206   B48D  85 5D              STA    KEYPRESS
9207   B48F  4C 01 B6           JMP    INT60
9208   B492  A5 12       INT2:  LDA    STATUS1              ;or if battery low
9209   B494  29 20              AND    #00100000B
9210   B496  F0 07              BEQ    INT20
9211   B498  A9 81              LDA    #10000001B
9212   B49A  85 5D              STA    KEYPRESS
9213   B49C  4C 01 B6           JMP    INT60
9214
9215   B49F  A5 5C       INT20: LDA    KEYREG               ;manage keyboard
9216   B4A1  D0 1D              BNE    INT22
9217   B4A3  A5 13              LDA    STATUS2              ;no keys in progress
```

```
9218  B4A5  25 5E              AND   KEYMASK
9219  B4A7  F0 40              BEQ   INT25          ;no new ones either
9220  B4A9  A0 05              LDY   #5             ;one is here, debounce
9221  B4AB  20 C0 A2           JSR   WAITMS
9222  B4AE  A5 13              LDA   STATUS2
9223  B4B0  25 5E              AND   KEYMASK
9224  B4B2  F0 35              BEQ   INT25          ;bogus key
9225  B4B4  85 5D              STA   KEYPRESS       ;key still here, save it
9226  B4B6  85 5C              STA   KEYREG
9227  B4B8  A9 19              LDA   #PERSEC        ;start repeat counter after 1 sec.
9228  B4BA  85 5F              STA   REPCTR
9229  B4BC  64 E3              STZ   CMDCTR         ;reset auto-key
9230  B4BE  80 4D              BRA   INT30
9231
9232  B4C0  A5 13       INT22: LDA   STATUS2        ;working on a key already
9233  B4C2  25 5E              AND   KEYMASK
9234  B4C4  C5 5C              CMP   KEYREG
9235  B4C6  D0 12              BNE   INT23          ;key is gone, make sure
9236  B4C8  25 60       INT24: AND   REPEAT_MASK    ;key still here
9237  B4CA  F0 41              BEQ   INT30
9238  B4CC  C6 5F              DEC   REPCTR
9239  B4CE  D0 3D              BNE   INT30          ;don't repeat yet
9240  B4D0  A5 5C              LDA   KEYREG         ;repeat time up, send another key
9241  B4D2  85 5D              STA   KEYPRESS
9242  B4D4  A5 6E              LDA   REPEAT_RATE    ;and reload the counter
9243  B4D6  85 5F              STA   REPCTR
9244  B4D8  80 33              BRA   INT30
9245
9246  B4DA  A0 05       INT23: LDY   #5             ;key is going away
9247  B4DC  20 C0 A2           JSR   WAITMS         ;debounce
9248  B4DF  A5 13              LDA   STATUS2
9249  B4E1  25 5E              AND   KEYMASK
9250  B4E3  C5 5C              CMP   KEYREG
9251  B4E5  F0 E1              BEQ   INT24          ;it's still here
9252  B4E7  64 5C              STZ   KEYREG         ;it's really gone
9253
9254  B4E9  A5 E2       INT25: LDA   INTCMD         ;no keys in progress
9255  B4EB  D0 04              BNE   INT26          ;do auto-key
9256  B4ED  64 E3              STZ   CMDCTR
9257  B4EF  80 1C              BRA   INT30
9258  B4F1  A5 E3       INT26: LDA   CMDCTR         ;if new command,
9259  B4F3  D0 09              BNE   INT27
9260  B4F5  A6 E2              LDX   INTCMD
9261  B4F7  BD 7E F8           LDA   CMDRATE1,X
9262  B4FA  85 E3              STA   CMDCTR         ;wait before 1st key
9263  B4FC  80 0F              BRA   INT30
9264  B4FE  C6 E3       INT27: DEC   CMDCTR         ;old command, dec ctr
9265  B500  D0 0B              BNE   INT30
9266  B502  A6 E2              LDX   INTCMD         ;if =0, reload counter with rep rate,
9267  B504  BD 82 F8           LDA   CMDRATE2,X
9268  B507  85 E3              STA   CMDCTR
9269  B509  A9 10              LDA   #NOKEY         ;and send NO key
9270  B50B  85 5D              STA   KEYPRESS
9271
9272  B50D  A5 6C       INT30: LDA   BLINK          ;blink cursor
9273  B50F  C9 01              CMP   #1
9274  B511  F0 13              BEQ   INT31
```

```
9275   B513   A5 6D                LDA    FLAGS         ;no cursor mode, therefore
9276   B515   29 40                AND    #%01000000B   ;if cursor left on,
9277   B517   F0 40                BEQ    INT40         ;turn it off
9278   B519   A5 6D                LDA    FLAGS         ;no cursor mode, cursor off
9279   B51B   29 BF                AND    #%10111111B
9280   B51D   85 6D                STA    FLAGS
9281   B51F                        CURSOR_OFF
9285   B524   80 33                BRA    INT40
9286   B526   A5 5C         INT31: LDA    KEYREG        ;if keypress, then cursor on
9287   B528   D0 21                BNE    INT33
9288   B52A   A5 6B                LDA    INTCTR
9289   B52C   F0 05                BEQ    INT32
9290   B52E   C6 6B                DEC    INTCTR        ;blink counter running
9291   B530   4C 01 B6             JMP    INT60
9292   B533   A9 06         INT32: LDA    #BLINK_RATE   ;time up, reload
9293   B535   85 6B                STA    INTCTR
9294   B537   A5 6D                LDA    FLAGS
9295   B539   29 40                AND    #%01000000B
9296   B53B   F0 0E                BEQ    INT33
9297   B53D   A5 6D                LDA    FLAGS         ;cursor was on, turn off
9298   B53F   29 BF                AND    #%10111111B
9299   B541   85 6D                STA    FLAGS
9300   B543                        CURSOR_OFF
9304   B548   4C 01 B6             JMP    INT60
9305   B54B   A5 6D         INT33: LDA    FLAGS         ;cursor was off, turn on
9306   B54D   09 40                ORA    #%01000000B
9307   B54F   85 6D                STA    FLAGS
9308   B551                        CURSOR_ON
9312   B556   4C 01 B6             JMP    INT60
9313
9314   B559   A5 6C         INT40: LDA    BLINK         ;blink "?"
9315   B55B   C9 02                CMP    #2
9316   B55D   F0 0C                BEQ    INT45
9317   B55F   C9 05                CMP    #5            ;or OK char
9318   B561   F0 08                BEQ    INT45
9319   B563   A5 6D                LDA    FLAGS         ;if not, clear flag
9320   B565   29 7F                AND    #%01111111B
9321   B567   85 6D                STA    FLAGS
9322   B569   80 56                BRA    INT50
9323   B56B   A5 5C         INT45: LDA    KEYREG        ;? on if keypress
9324   B56D   F0 02                BEQ    INT46
9325   B56F   80 11                BRA    INT41
9326   B571   A5 6B         INT46: LDA    INTCTR        ;time to blink?
9327   B573   F0 05                BEQ    INT42
9328   B575   C6 6B                DEC    INTCTR        ;blink counter running
9329   B577   4C 01 B6             JMP    INT60
9330   B57A   A9 06         INT42: LDA    #BLINK_RATE   ;time up, reload
9331   B57C   85 6B                STA    INTCTR
9332   B57E   A5 6D                LDA    FLAGS
9333   B580   30 35                BMI    INT43
9334   B582   A5 6D         INT41: LDA    FLAGS         ;char was off, turn on
9335   B584   09 80                ORA    #%10000000B
9336   B586   85 6D                STA    FLAGS
9337   B588   A5 6C                LDA    BLINK
9338   B58A   C9 02                CMP    #2
9339   B58C   F0 04                BEQ    INT4A
9340   B58E   A9 00                LDA    #0            ;char=OK if blink=5
```

```
9341  B590  80 02                    BRA      INT44
9342  B592  A9 3F         INT4A: LDA          #'?'          ;char=? if blink=2
9343  B594  A6 6C         INT44: LDX          BLINK         ;display the char
9344  B596  E0 02                   CPX       #2
9345  B598  F0 13                   BEQ       INT4B
9346  B59A  A6 48                   LDX       CURSOR        ;if blink=5, display in corner
9347  B59C  DA                      PHX
9348  B59D  48                      PHA
9349  B59E                          SET_CURSOR LINE2+15
9353  B5A3  68                      PLA
9354  B5A4  20 10 A3                JSR       DCHAR
9355  B5A7  68                      PLA
9356  B5A8  20 BC A3                JSR       LCD_ADDR
9357  B5AB  80 54                   BRA       INT60
9358  B5AD  20 10 A3      INT4B: JSR         DCHAR         ;if blink=2, display at cursor
9359  B5B0                          BACKUP    1
9363  B5B5  80 4A                   BRA       INT60
9364  B5B7  A5 6D         INT43: LDA          FLAGS         ;char was on, turn off
9365  B5B9  29 7F                   AND       #01111111B
9366  B5BB  85 6D                   STA       FLAGS
9367  B5BD  A9 20                   LDA       #' '
9368  B5BF  80 D3                   BRA       INT44
9369
9370  B5C1  A5 6C         INT50: LDA          BLINK
9371  B5C3  C9 03                   CMP       #3
9372  B5C5  F0 04                   BEQ       INT55
9373  B5C7  C9 04                   CMP       #4
9374  B5C9  D0 36                   BNE       INT60
9375  B5CB  A5 6B         INT55: LDA          INTCTR        ;see if time to scroll
9376  B5CD  F0 04                   BEQ       INT51         ;no, keep counting
9377  B5CF  C6 6B                   DEC       INTCTR
9378  B5D1  80 2E                   BRA       INT60
9379  B5D3  A9 3E         INT51: LDA          #SRATE2       ;yes, reload counter
9380  B5D5  85 6B                   STA       INTCTR
9381  B5D7  E6 06                   INC       SCREEN        ;show next screen
9382  B5D9  20 85 A3                JSR       DISPLAY_CLR
9383  B5DC  20 F5 A2                JSR       OMSG
9384  B5DF  A5 6C                   LDA       BLINK
9385  B5E1  C9 03                   CMP       #3
9386  B5E3  F0 12                   BEQ       INT52
9387  B5E5  A5 06                   LDA       SCREEN        ;if blink=4
9388  B5E7  C5 05                   CMP       SCREENS
9389  B5E9                          BLT       INT60
9392  B5EB  F0 14                   BEQ       INT60
9393  B5ED  20 85 A3                JSR       DISPLAY_CLR   ;ask repeat msg after last screen
9394  B5F0                          MESSAGE   111
9398  B5F5  80 06                   BRA       INT53
9399
9400  B5F7  A5 06         INT52: LDA          SCREEN        ;if blink=3 and last screen then quit
9401  B5F9  C5 05                   CMP       SCREENS
9402  B5FB  D0 04                   BNE       INT60
9403
9404  B5FD          INT53: NOBLINK                          ;stop scrolling
9408
9409  B601  20 D6 A4      INT60: JSR          READ_RTC      ;update clock
9410  B604  F0 03                   BEQ       INT70
9411  B606  20 EF A4                JSR       UPDATE_CLOCK  ;when it needs it
```

```
9412
9413   B609  85 8D            INT78:    STA      TIMER_LOAD      ;restart TIMER
9414
9415   B60B  68                         PLA
9416   B60C  85 42                      STA      MSB
9417   B60E  68                         PLA
9418   B60F  85 41                      STA      LSB
9419   B611  7A                         PLY                      ;restore registers
9420   B612  FA                         PLX
9421   B613  68                         PLA
9422   B614  40                         RTI
9423
9424   B615  40            NMIINT:      RTI                      ;never happens
9425
9426
9427
9428
9429   B616                              INCLUDE     HELP.ASM
9430                                    ;-----------------------------------
9431                                    ;      SCROLLING MESSAGES
9432                                    ;-----------------------------------
9433   B616
9434   B616  01 1E 54 68 69   SCROLL0:  BYTE   1,30,'This feature is NOT AVAILABLE.'
9435   B636
9436   B636  02 1B 43 68 6F   SCROLL1:  BYTE   2,27,'Choose whether  to exit the'
9437   B653  19 4D 6F 64 65             BYTE      25,'Mode or do     it again.'
9438   B66D
9439   B66D  02 20 4E 6F 20   SCROLL2:  BYTE   2,32,'No watering  .  schedule set up.'
9440   B68F  16 44 6F 20 53             BYTE      22,'Do SET SCHEDULESfirst.'
9441   B6A6
9442   B6A6  02 19 54 6F 20   SCROLL3:  BYTE   2,25,'To start        watering,'
9443   B6C1  18 54 61 68 65             BYTE      24,'Take POWER KEY out now.'
9444   B6DA
9445   B6DA  02 19 54 68 69   SCROLL4:  BYTE   2,25,'This Set Up has an error.'
9446   B6F5  16 44 6F 20 53             BYTE      22,'Do SET SCHEDULESagain.'
9447   B70C
9448   B70C  02 1C 54 68 65   SCROLL5:  BYTE   2,28,'The SETUP type  you selected'
9449   B72A  1C 68 61 73 20             BYTE      28,'has not been    entered yet.'
9450   B747
9451                                   ; global message for new setup or modify CONFIRM screens
9452   B747
9453   B747  02 20 50 72 65   SCROLL6:  BYTE   2,32,'Press OK to     CONFIRM setting;'
9454   B769  1A 50 72 65 73             BYTE      26,'Press NO to     CHANGE it.'
9455   B784
9456                                   ; global message for HISTORY or SETTINGS review screens
9457   B784
9458   B784  02 20 50 72 65   SCROLL7:  BYTE   2,32,'Press OK to viewthe next screen,'
9459   B7A6  20 6F 72 20 4E             BYTE      32,'or NO to start  the review over.'
9460   B7C7
9461                                   ; global message for all COPY TO NEXT VALVE screens
9462   B7C7
9463   B7C7  03 20 50 72 65   SCROLL8:  BYTE   3,32,'Press OK to use the SAME setting'
9464   B7E9  1B 66 6F 72 20             BYTE      27,'for the next    station, or'
9465   B805  20 70 72 65 73             BYTE      32,'press NO to set a different one.'
9466   B826
9467   B826  03 18 57 65 6C   SCROLL9:  BYTE   3,24,'Welcome to the  SOLATROL'
9468   B840  1B 4C 45 49 54             BYTE      27,'LEIT(TM) 8000   Controller.'
```

```
9469  B85C  20 57 61 6E 74            BYTE    32,'Want Directions?(Press NO or OK)'
9470  B87D
9471                                  ; Directions (Scroll10-Scroll23)
9472  B87D
9473  B87D  04 18 53 4F 4C   SCROLL10: BYTE   4,24,'SOLATROL      welcomes'
9474  B897  1D 45 4E 56 49            BYTE    29,'ENVIRONMENTAL  INDUSTRIES to'
9475  B8B5  1B 74 68 65 20            BYTE    27,'the LEIT(TM)8000Controller.'
9476  B8D1  20 57 61 6E 74            BYTE    32,'Want Directions?(Press OK or NO)'
9477  B8F2
9478  B8F2  03 1F 54 68 69   SCROLL11: BYTE   3,31,'This Controller uses and stores'
9479  B913  1B 6C 69 67 68            BYTE    27,'light energy to run up to 8'
9480  B92F  20 53 4F 4C 41            BYTE    32,'SOLATROL      SUPERVALVES(TM).'
9481  B950
9482  B950  08 1F 57 68 65   SCROLL12: BYTE   8,31,'When the displayasks a question'
9483  B971  1E 6F 72 20 62            BYTE    30,'or blinks the  underline (_),'
9484  B990  20 79 6F 75 20            BYTE    32,'you press OK   to answer YES or'
9485  B9B1  1E 74 6F 20 61            BYTE    30,'to accept the  current number'
9486  B9D0  1F 6F 72 20 79            BYTE    31,'or you press NO to see the next'
9487  B9F0  17 63 68 6F 69            BYTE    23,'choice or      number.'
9488  BA08  1D 48 6F 6C 64            BYTE    29,'Holding down theNO key causes'
9489  BA26  1F 74 68 65 20            BYTE    31,'the numbers to  change rapidly.'
9490  BA46
9491  BA46  09 20 57 68 65   SCROLL13: BYTE   9,32,'When you need toenter numbers or'
9492  BA68  1E 73 65 6C 65            BYTE    30,'select options  from a list of'
9493  BA87  1A 63 68 6F 69            BYTE    26,'choices, the    Controller'
9494  BAA2  1D 61 75 74 6F            BYTE    29,'automatically   advances thru'
9495  BAC0  20 74 68 65 20            BYTE    32,'the choices or  numbers for you.'
9496  BAE1  1B 50 72 65 73            BYTE    27,'Press OK when   the correct'
9497  BAFD  1D 63 68 6F 69            BYTE    29,'choice or numberis displayed.'
9498  BB1B  20 48 6F 6C 64            BYTE    32,'Holding down theNO key makes the'
9499  BB3C  17 64 69 73 70            BYTE    23,'display change faster.'
9500  BB54
9501  BB54  06 1C 59 6F 75   SCROLL14: BYTE   6,28,'You can press   the HELP key'
9502  BB72  1A 74 6F 20 68            BYTE    26,'to have the     Controller'
9503  BB8D  1E 65 78 70 6C            BYTE    30,'explain the     question or to'
9504  BBAC  1C 67 65 74 20            BYTE    28,'get more        information.'
9505  BBC9  1F 54 68 65 20            BYTE    31,'The STOP key canbe used to exit'
9506  BBE9  20 66 72 6F 6D            BYTE    32,'from Help to theprevious screen.'
9507  BC0A
9508  BC0A  08 1F 54 68 65   SCROLL15: BYTE   8,31,'There are 4 mainoptions used in'
9509  BC2B  1B 73 65 74 74            BYTE    27,'setting up and  running the'
9510  BC47  1D 43 6F 6E 74            BYTE    29,'Controller.     These options'
9511  BC65  20 61 72 65 20            BYTE    32,'are chosen from a self-advancing'
9512  BC86  1B 6C 69 73 74            BYTE    27,'list by pressingthe OK key.'
9513  BCA2  1F 54 68 65 20            BYTE    31,'The STOP Key    always abandons'
9514  BCC2  20 74 68 65 20            BYTE    32,'the current     screen & returns'
9515  BCE3  1A 79 6F 75 20            BYTE    26,'you to the      beginning.'
9516  BCFE
9517  BCFE  08 1E 45 4E 54   SCROLL16: BYTE   8,30,'ENTER SETUP    lets you enter'
9518  BD1E  19 53 43 48 45            BYTE    25,'SCHEDULES or    ALTERNATE'
9519  BD38  18 53 43 48 45            BYTE    24,'SCHEDULES to    tell the'
9520  BD51  1A 43 6F 6E 74            BYTE    26,'Controller when and how to'
9521  BD6C  1B 72 75 6E 20            BYTE    27,'run each valve  or station.'
9522  BD88  1F 45 4E 54 45            BYTE    31,'ENTER SETUP alsolets you set up'
9523  BDAB  1D 74 68 65 20            BYTE    29,'the SYSTEM to   fit your site'
9524  BDC6  1C 61 6E 64 20            BYTE    28,'and specific    application.'
9525  BDE3
```

```
9526  BDE3  03 1C 52 55 4E    SCROLL17: BYTE  3,28,'RUN STATIONS   lets you run'
9527  BE01  1F 73 74 61 74              BYTE  31,'stations in 3    ways: AUTOMATIC'
9528  BE21  19 53 45 4D 49              BYTE  25,'SEMI-AUTOMATIC, & MANUAL.'
9529  BE3B
9530  BE3B  03 1E 41 55 54    SCROLL18: BYTE  3,30,'AUTOMATIC RUN isthe normal way'
9531  BE5B  1B 74 6F 20 74              BYTE  27,'to turn valves  on & off as'
9532  BE77  1E 73 63 68 65              BYTE  30,'scheduled in    Set SCHEDULES.'
9533  BE96
9534  BE96  04 1B 53 45 4D    SCROLL19: BYTE  4,27,'SEMI-AUTO RUN   lets you do'
9535  BEB3  1E 61 6E 20 69              BYTE  30,'an immediate OneTime Soak or a'
9536  BED2  1C 6E 6F 72 6D              BYTE  28,'normal watering cycle before'
9537  BEEF  1E 72 65 76 65              BYTE  30,'reverting to    AUTOMATIC RUN.'
9538  BF0E
9539  BF0E  05 1D 4D 41 4E    SCROLL20: BYTE  5,29,'MANUAL RUN      allows you to'
9540  BF2D  1E 6F 70 65 72              BYTE  30,'operate Valves  one at a time,'
9541  BF4C  1E 6F 72 20 69              BYTE  30,'or in a defined TEST SEQUENCE,'
9542  BF6B  1D 61 6E 64 20              BYTE  29,'and it lets you take Moisture'
9543  BF89  10 53 65 6E 73              BYTE  16,'Sensor readings.'
9544  BF9A
9545  BF9A  04 1F 4E 4F 20    SCROLL21: BYTE  4,31,'NO WATERING willoccur if you OK'
9546  BFBB  1E 53 54 41 59              BYTE  30,'STAY IDLE/OFF. The Controller'
9547  BFDA  1C 77 69 6C 6C              BYTE  28,'will keep all   your setups,'
9548  BFF7  1C 62 75 74 20              BYTE  28,'but none of themwill be run.'
9549  C014
9550  C014  04 1F 56 49 45    SCROLL22: BYTE  4,31,'VIEW INFO lets you see HISTORY'
9551  C035  1F 65 76 65 6E              BYTE  31,'events by date, see DIRECTIONS,'
9552  C055  1E 73 65 65 20              BYTE  30,'see RUN TOTALS, or do a system'
9553  C074  0A 53 45 4C 46              BYTE  10,'SELF TEST.'
9554  C07F
9555  C07F  06 1F 42 65 66    SCROLL23: BYTE  6,31,'Before you can  BEGIN WATERING,'
9556  C0A0  1D 79 6F 75 20              BYTE  29,'you need to     complete both'
9557  C0BE  1E 53 65 74 75              BYTE  30,'Setup SYSTEM &  Set SCHEDULES.'
9558  C0DD  1D 54 68 65 6E              BYTE  29,'Then choose     RUN STATIONS,'
9559  C0FB  1E 74 68 65 6E              BYTE  30,'then either     AUTOMATIC RUN,'
9560  C11A  1E 53 45 4D 49              BYTE  30,'SEMI-AUTO RUN,  or MANUAL RUN.'
9561  C139
9562                          ; message for Self Test question
9563  C139
9564  C139  03 1D 54 68 65    SCROLL24: BYTE  3,29,'The SELF TEST   automatically'
9565  C158  1D 74 65 73 74              BYTE  29,'tests the wiringand tells you'
9566  C176  1F 74 68 65 20              BYTE  31,'the time, date, & current mode.'
9567  C196
9568  C196  04 20 50 72 65    SCROLL25: BYTE  4,32,'Press STOP to   temporarily STOP'
9569  C1B8  18 52 55 4E 4E              BYTE  24,'RUNNING your    watering'
9570  C1D1  1A 73 63 68 65              BYTE  26,'schedule, or    REMOVE the'
9571  C1EC  1D 50 4F 57 45              BYTE  29,'POWER KEY to    keep running.'
9572  C20A
9573                          ; message for Secret Codes (only use if Secret Code set)
9574  C20A
9575  C20A  06 1F 54 6F 20    SCROLL26: BYTE  6,31,'To change the   settings of the'
9576  C22B  1B 43 6F 6E 74              BYTE  27,'Controller,     you need to'
9577  C247  1E 65 6E 74 65              BYTE  30,'enter your      USER CODE now.'
9578  C266  1D 49 66 20 79              BYTE  29,'If you remove   the POWER KEY'
9579  C284  1D 6E 6F 77 2C              BYTE  29,'now, all        settings will'
9580  C2A2  1A 72 65 6D 61              BYTE  26,'remain the same as before.'
9581  C2BD
9582  C2BD  02 1B 45 6E 74    SCROLL27: BYTE  2,27,'Enter how long  to run each'
```

```
9583   C2DA   1E 53 74 61 74              BYTE   30,'Station (from  1-30 minutes).'
9584
9585   C2F9                       SCROLL28:
9586   C2F9
9587   C2F9                       SCROLL29:
9588   C2F9
9589   C2F9   03 1E 45 4E 54      SCROLL30: BYTE  3,30,'ENTER SETUP modelets you enter'
9590   C319   19 53 43 48 45                BYTE  25,'SCHEDULES,     ALTERNATE'
9591   C333   20 53 43 48 45                BYTE  32,'SCHEDULES, or  SYSTEM SETTINGS.'
9592   C354
9593   C354   02 1E 53 65 74      SCROLL31: BYTE  2,30,'Set SCHEDULES   lets you enter'
9594   C374   20 76 61 72 69                BYTE  32,'various types ofwatering setups.'
9595   C395
9596   C395   03 1E 53 65 74      SCROLL32: BYTE  3,30,'Set ALT. SCHED. lets you enter'
9597   C3B5   1F 61 6C 74 65                BYTE  31,'alternate      versions of the'
9598   C3D5   20 76 61 72 69                BYTE  32,'various types ofwatering setups.'
9599   C3F6
9600   C3F6   03 1F 53 65 74      SCROLL33: BYTE  3,31,'Setup SYSTEM    lets you set up'
9601   C417   1D 74 68 65 20                BYTE  29,'the SYSTEM to  fit your site'
9602   C435   1C 61 6E 64 20                BYTE  28,'and specific   application.'
9603   C452
9604   C452   03 1F 54 68 65      SCROLL34: BYTE  3,31,'There are no   wired stations.'
9605   C473   1A 4F 6C 64 20                BYTE  26,'Old ID will be kept until'
9606   C48E   1A 77 69 72 65                BYTE  26,'wires are      connected.'
9607   C4A9
9608   C4A9   08 1F 43 68 6F      SCROLL35: BYTE  8,31,'Choose (OK)    "Use site info"'
9609   C4CA   1E 74 6F 20 61                BYTE  30,'to automaticallyenter the best'
9610   C4E9   1E 73 70 6C 69                BYTE  30,'split ON and OFFtimes based on'
9611   C508   20 74 62 65 20                BYTE  32,'the type of    soil, terrain, &'
9612   C529   1C 73 70 72 69                BYTE  28,'sprinklers for each station'
9613   C546   1B 6C 6F 63 61                BYTE  27,'location, or   choose (OK)'
9614   C562   1D 22 45 6E 74                BYTE  29,'"Enter directly"to enter your'
9615   C580   1F 6F 77 6E 20                BYTE  31,'own maximum ONs,& minimum OFFs.'
9616   C5A0
9617   C5A0   05 20 50 72 65      SCROLL36: BYTE  5,32,'Press OK when  the correct type'
9618   C5C2   1D 6F 66 20 74                BYTE  29,'of terrain and soil for this'
9619   C5E0   1B 73 74 61 74                BYTE  27,'station is     shown, then'
9620   C5FC   20 70 72 65 73                BYTE  32,'press OK when  the correct type'
9621   C61D   16 6F 66 20 73                BYTE  22,'of sprinkler is shown.'
9622   C634
9623   C634                       SCROLL37:
9624   C634
9625   C634   01 1D 54 68 69      SCROLL38: BYTE  1,29,'This HELP is   for Set Site.'
9626   C653
9627   C653   02 1F 53 65 74      SCROLL39: BYTE  2,31,'Set TIME/DATE  lets you see or'
9628   C674   1F 63 68 61 6E                BYTE  31,'change the time & date setting.'
9629   C694
9630   C694   03 1E 44 6F 20      SCROLL40: BYTE  3,30,'Do WIRE CHECK  lets you check'
9631   C6B4   1D 66 6F 72 20                BYTE  29,'for shorted or broken (open)'
9632   C6D2   16 76 61 6C 76                BYTE  22,'valve or sensor wires.'
9633   C6E9
9634   C6E9   03 1D 53 65 74      SCROLL41: BYTE  3,29,'Setup STATIONS lets you View'
9635   C708   1E 43 75 72 72                BYTE  30,'Current Station IDs (numbers),'
9636   C727   20 6F 72 20 45                BYTE  32,'or Enter New IDsto change ID #s.'
9637
9638                              ;add to Scroll41 when add "Assign Types" function:
9639   C748
```

```
9640                                    ;        BYTE    25,'It also lets you designate'
9641                                    ;        BYTE    31,'station uses.  Stations can be'
9642                                    ;        BYTE    30,'used for REGULAR valves, MASTER'
9643                                    ;        BYTE    32,'valves, or for a SPECIAL use like'
9644                                    ;        BYTE    16,'lights or pumps.'
9645    C748
9646    C748
9647    C748    07 1D 53 65 74  SCROLL42: BYTE    7,29,'Setup SENSORS   lets you View'
9648    C767    1E 43 75 72 72            BYTE    30,'Current Sensor IDs (numbers),'
9649    C786    20 6F 72 20 45            BYTE    32,'or Enter New IDs to change ID #s.'
9650    C7A7    1D 49 74 20 61            BYTE    29,'It also lets you assign sensor'
9651    C7C5    20 70 6F 73 69            BYTE    32,'positions to    different sensor'
9652    C7E6    1C 74 79 70 65            BYTE    28,'types, such as  Moisture, or'
9653    C803    0D 52 61 69 6E            BYTE    13,'Rain Sensors.'
9654    C811
9655    C811    02 1E 53 65 74  SCROLL43: BYTE    2,30,'Set USER CODES limits who may'
9656    C831    1F 68 61 76 65            BYTE    31,'have access to the Controller.'
9657    C851
9658    C851    02 20 50 72 65  SCROLL44: BYTE    2,32,'Press OK to EXIT this task and go'
9659    C873    1A 62 61 63 6B            BYTE    26,'back to the     beginning.'
9660    C88E
9661    C88E                    SCROLL45:
9662    C88E
9663    C88E                    SCROLL46:
9664    C88E
9665    C88E                    SCROLL47:
9666    C88E
9667    C88E    03 1F 41 20 4D  SCROLL48: BYTE    3,31,'A MASTER VALVE is a valve that'
9668    C8AF    1C 69 73 20 74            BYTE    28,'is turned on    whenever any'
9669    C8CC    13 6F 74 68 65            BYTE    19,'other valve is  on.'
9670    C8E0
9671    C8E0    02 20 54 68 65  SCROLL49: BYTE    2,32,'The Controller  is asking if the'
9672    C902    1C 73 65 74 74            BYTE    28,'settings shown  are correct.'
9673    C91F
9674    C91F    02 19 50 72 65  SCROLL50: BYTE    2,25,'Press OK to see or change'
9675    C93A    1B 77 68 69 63            BYTE    27,'which stations  are active.'
9676    C956
9677    C956                    SCROLL51:
9678    C956
9679    C956    02 1C 54 68 65  SCROLL52: BYTE    2,28,'The valve shown is presently'
9680    C974    19 73 65 74 20            BYTE    25,'set up to do NO WATERING.'
9681    C98E
9682    C98E    05 1F 45 6E 74  SCROLL53: BYTE    5,31,'Enter when to   START WATERING.'
9683    C9AF    1F 55 73 65 20            BYTE    31,'Use a Start Time early enough to'
9684    C9CF    1F 66 69 6E 69            BYTE    31,'finish before   midnight if you'
9685    C9EF    1D 61 72 65 20            BYTE    29,'are using long  100% Watering'
9686    CA0D    1F 44 75 72 61            BYTE    31,'Durations or    Excluded Times.'
9687    CA2D
9688    CA2D    07 1D 45 6E 74  SCROLL54: BYTE    7,29,'Enter the TOTAL watering time'
9689    CA4C    1D 70 65 72 20            BYTE    29,'per day for this valve. Enter'
9690    CA6A    1C 68 6F 75 72            BYTE    28,'hours (h), then minutes (m).'
9691    CA87    1D 4F 4B 20 30            BYTE    29,'OK 0h to enter  minutes only.'
9692    CAA5    20 45 6E 74 65            BYTE    32,'Entering a 100% Duration = 0h+0m'
9693    CAC6    1D 6C 65 74 73            BYTE    29,'lets you SKIP   watering with'
9694    CAE4    0B 74 68 69 73            BYTE    11,'this valve.'
9695    CAF0
9696    CAF0    02 1D 45 6E 74  SCROLL55: BYTE    2,29,'Enter HOW OFTEN to water from'
```

```
9697  C80F  20 31 20 39 30              BYTE   32,'1-90 days (every1 days = daily).'
9698  CB38       .
9699  CB38  04 1F 22 53 4F  SCROLL56:   BYTE   4,31,'"SO MANY" DAYS waters at fixed'
9700  CB51  1A 69 6E 74 65              BYTE   26,'intervals from 1-90 days.'
9701  CB6C  1E 22 53 50 45              BYTE   30,'"SPECIFIC DAYS" waters only on'
9702  CB8B  1A 63 65 72 74              BYTE   26,'certain days    each week.'
9703  CBA6
9704  CBA6            SCROLL57:
9705  CBA6
9706  CBA6  06 1C 54 68 65  SCROLL58:   BYTE   6,28,'The WATER BUDGETincreases or'
9707  CBC4  1E 64 65 63 72              BYTE   30,'decreases the    water applied.'
9708  CBE3  1E 41 20 76 61              BYTE   30,'A value of 100% waters exactly'
9709  CC02  17 61 63 63 6F              BYTE   23,'according to theSet Up.'
9710  CC1A  1F 54 68 65 20              BYTE   31,'The water budgetdoes not affect'
9711  CC3A  17 53 6F 61 6B              BYTE   23,'Soak & syringe  cycles.'
9712  CC52
9713  CC52  03 19 54 68 65  SCROLL59:   BYTE   3,25,'The display     shows the'
9714  CC6D  1B 63 75 72 72              BYTE   27,'currently activestation #s.'
9715  CC89  18 50 72 65 73              BYTE   24,'Press NO to makechanges.'
9716  CCA2
9717  CCA2  02 1C 50 72 65  SCROLL60:   BYTE   2,28,'Press OK for    each station'
9718  CCC0  1D 74 68 61 74              BYTE   29,'that you want touse (ENABLE).'
9719  CCDE
9720  CCDE  04 1E 53 50 4C  SCROLL61:   BYTE   4,30,'SPLITS let you  split the 100%'
9721  CCFE  1C 77 61 74 65              BYTE   28,'watering time   into shorter'
9722  CD1B  1D 4F 4E 20 74              BYTE   29,'ON times to     reduce runoff'
9723  CD39  0C 61 6E 64 20              BYTE   12,'and erosion.'
9724  CD46
9725  CD46  03 1C 43 68 6F  SCROLL62:   BYTE   3,28,'Choose whether  to turn this'
9726  CD64  1E 73 74 61 74              BYTE   30,'station OFF/ON, go to the NEXT'
9727  CD83  1B 73 74 61 74              BYTE   27,'station, or EXITManual Run.'
9728
9729  CD9F  06 1D 54 68 65  SCROLL63:   BYTE   6,29,'The top line    shows whether'
9730  CD8E  1E 73 74 61 74              BYTE   30,'stations are ON (number shown)'
9731  CDDD  1F 6F 72 20 4F              BYTE   31,'or OFF (-).     The bottom line'
9732  CDFD  1F 6C 65 74 73              BYTE   31,'lets you Turn ONor Turn OFF the'
9733  CE1D  1E 69 6E 64 69              BYTE   30,'indicated Sta #,go to the NEXT'
9734  CE3C  1B 73 74 61 74              BYTE   27,'station, or EXITmanual run.'
9735  CE58
9736  CE58  04 1A 54 68 69  SCROLL64:   BYTE   4,26,'This HISTORY    event is a'
9737  CE74  1D 76 61 6C 76              BYTE   29,'valve start. Thedisplay shows'
9738  CE92  1D 74 68 65 20              BYTE   29,'the valve #, thestart time, &'
9739  CE80  1E 74 68 65 20              BYTE   30,'the actual      watering time.'
9740  CECF
9741  CECF  04 1A 54 68 69  SCROLL65:   BYTE   4,26,'This HISTORY    event is a'
9742  CEE3  1A 74 69 6D 65              BYTE   26,'time and date   stamp. All'
9743  CF06  1F 65 76 65 6E              BYTE   31,'events displayedafter the stamp'
9744  CF26  14 6F 63 63 75              BYTE   20,'occurred on thatday.'
9745  CF3B
9746  CF3B  03 20 54 68 69  SCROLL66:   BYTE   3,32,'This HISTORY    event shows when'
9747  CF5D  20 6F 70 65 72              BYTE   32,'operating Modes or the Power Key'
9748  CF7E  0F 68 61 76 65              BYTE   15,'have been used.'
9749  CF8E
9750  CF8E  07 1F 53 65 65  SCROLL67:   BYTE   7,31,'See DIRECTIONS  shows operating'
9751  CFAF  1B 70 72 6F 63              BYTE   27,'procedures;     See HISTORY'
9752  CFCB  1B 73 68 6F 77              BYTE   27,'shows the last  128 events;'
9753  CFE7  1D 53 65 65 20              BYTE   29,'See RUN TOTALS  shows monthly'
```

```
9754   D005   1A 63 75 6D 75              BYTE    26,'cumulative run   times; and'
9755   D028   1F 44 6F 20 53              BYTE    31,'Do SELF TEST     shows the mode,'
9756   D048   20 74 69 6D 65              BYTE    32,'time & date,     & wiring status.'
9757   D061
9758   D061   02 1C 2A 45 52  SCROLL68:   BYTE    2,28,'*ERROR* The 2nd time MUST be'
9759   D07F   19 4C 41 54 45              BYTE    25,'LATER THAN the  1st time.'
9760   D099
9761   D099   02 1C 4E 4F 20  SCROLL69:   BYTE    2,28,'NO WATERING     will be done'
9762   D0B7   1C 6F 6E 20 74              BYTE    28,'on the selected day.'
9763   D0CC
9764   D0CC   04 1F 53 65 6C  SCROLL70:   BYTE    4,31,'Select a number of days to WAIT'
9765   D0ED   20 62 65 66 6F              BYTE    32,'before watering with this valve.'
9766   D10E   1C 53 65 6C 65              BYTE    28,'Select 0 to     water at the'
9767   D12B   1B 66 69 72 73              BYTE    27,'first allowable start time.'
9768   D147
9769   D147   03 1D 2A 45 52  SCROLL71:   BYTE    3,29,'*ERROR*         Set Up empty.'
9770   D166   20 55 73 65 20              BYTE    32,'Use ENTER SETUP to Set SCHEDULE,'
9771   D187   20 66 6F 72 20              BYTE    32,'for the Set Up  you want to run.'
9772   D1A8
9773   D1A8   05 1D 50 72 65  SCROLL72:   BYTE    5,29,'Press OK for    each week day'
9774   D1C7   1E 6F 6E 20 77              BYTE    30,'on which you    want to water.'
9775   D1E6   1C 49 66 20 6F              BYTE    28,'If only one day is selected,'
9776   D203   1C 63 68 6F 6F              BYTE    28,'choose every    1wk (7 days)'
9777   D220   1E 75 70 20 74              BYTE    30,'up to every     9wk (63 days).'
9778   D23F
9779   D23F   02 1E 48 45 4C  SCROLL73:   BYTE    2,30,'HELP message is not available.'
9780   D25F   1D 52 65 66 65              BYTE    29,'Refer to the    USERS MANUAL.'
9781   D27D
9782   D27D   04 20 2A 45 52  SCROLL74:   BYTE    4,32,'*ERROR*         Too many starts.'
9783   D29F   19 54 68 65 20              BYTE    25,'The maximum     number is'
9784   D2B9   1D 31 32 38 20              BYTE    29,'128 per day, or an average of'
9785   D2D7   0F 31 36 20 70              BYTE    15,'16 per station.'
9786   D2E7
9787   D2E7   05 1D 2A 45 52  SCROLL75:   BYTE    5,29,'*ERROR*         Sequence runs'
9788   D306   1E 70 61 73 74              BYTE    30,'past midnight!  Set an earlier'
9789   D325   1D 53 74 61 72              BYTE    29,'Start Time,     set a shorter'
9790   D343   1E 45 78 63 6C              BYTE    30,'Excluded Time,  or use a lower'
9791   D362   0D 57 61 74 65              BYTE    13,'Water Budget.'
9792
9793   D370                   SCROLL76:
9794
9795   D370   05 20 45 6E 74  SCROLL77:   BYTE    5,32,'Enter the split ON time for this'
9796   D392   1E 76 61 6C 76              BYTE    30,'valve. Shorter times give you'
9797   D3B1   17 6D 6F 72 65              BYTE    23,'more repeat     cycles.'
9798   D3C9   1C 54 68 65 20              BYTE    28,'The sum of all  the split ON'
9799   D3E6   1F 74 69 6D 65              BYTE    31,'times equals thetotal duration.'
9800
9801   D406   03 1E 53 65 74  SCROLL78:   BYTE    3,30,'Set the MINIMUM time the valve'
9802   D426   1F 69 73 20 4F              BYTE    31,'is OFF between  split ON times.'
9803   D446   1E 49 6E 20 6D              BYTE    30,'In most cases 30minutes is OK.'
9804   D465
9805   D465                   SCROLL79:
9806
9807   D465   04 1E 45 58 43  SCROLL80:   BYTE    4,30,'EXCLUDED PERIOD is a time when'
9808   D485   1B 4E 4F 20 57              BYTE    27,'NO WATERING willoccur. Any'
9809   D4A1   1E 75 6E 66 69              BYTE    30,'unfinished ON   cycles will be'
9810   D4C0   1C 66 69 6E 69              BYTE    28,'finished after  this period.'
```

```
9811  D4DD
9812  D4DD  82 1C 45 6E 74   SCROLLB1:  BYTE  2,28,'Enter the START time for the'
9813  D4FB  07 70 65 72 69              BYTE  7,'period.'
9814  D503
9815  D503  82 1C 45 6E 74   SCROLL82:  BYTE  2,28,'Enter the ENDINGtime for the'
9816  D521  07 70 65 72 69              BYTE  7,'period.'
9817  D529
9818  D529  05 1C 43 68 6F   SCROLL83:  BYTE  5,28,'Choose whether  you want to:'
9819  D547  1C 52 45 56 49              BYTE  28,'REVIEW SETUP     (view only),'
9820  D564  20 4D 4F 44 49              BYTE  32,'MODIFY SETUP     (change values),'
9821  D585  20 44 4F 20 4E              BYTE  32,'DO NEW SETUP     (start over), or'
9822  D5A6  09 45 58 49 54              BYTE  9,'EXIT NOW.'
9823  D5B0
9824  D5B0  03 1B 50 72 65   SCROLL84:  BYTE  3,27,'Press OK to see the entered'
9825  D5CD  1B 64 75 72 61              BYTE  27,'durations, splitcycles, and'
9826  D5E9  0E 77 61 74 65              BYTE  14,'watering days.'
9827  D5F8
9828  D5F8  05 1E 53 59 52   SCROLL85:  BYTE  5,30,'SYRINGES are    short watering'
9829  D618  20 63 79 63 6C              BYTE  32,'cycles at fixed intervals during'
9830  D639  20 61 20 66 69              BYTE  32,'a fixed period  every day during'
9831  D65A  20 61 63 74 69              BYTE  32,'active months.  Use syringes for'
9832  D67B  1F 66 72 6F 73              BYTE  31,'frost wipes, or summer cooling.'
9833  D69B
9834  D69B  02 1F 50 72 65   SCROLL86:  BYTE  2,31,'Press OK for    each month that'
9835  D6BC  1F 79 6F 75 20              BYTE  31,'you want to havedaily syringes.'
9836  D6DC
9837  D6DC  03 20 45 6E 74   SCROLL87:  BYTE  3,32,'Enter the       syringe duration'
9838  D6FE  1E 69 6E 20 6D              BYTE  30,'in minutes (m) per syringe ON'
9839  D71D  16 74 69 6D 65              BYTE  22,'time for this   valve.'
9840  D734
9841  D734  04 20 41 20 53   SCROLL88:  BYTE  4,32,'A SYRINGE       DURATION = 0h+0m'
9842  D756  1F 68 61 73 20              BYTE  31,'has been enteredfor this valve.'
9843  D776  1D 54 68 61 74              BYTE  29,'That tells the  Controller to'
9844  D794  1B 4E 4F 54 20              BYTE  27,'NOT syringe withthis valve.'
9845  D7B0
9846  D7B0  04 20 45 6E 74   SCROLL89:  BYTE  4,32,'Enter HOW OFTEN to syringe every'
9847  D7D2  1D 64 61 79 20              BYTE  29,'day during      active months'
9848  D7F0  1B 69 6E 20 68              BYTE  27,'in hours (h) andminutes (m)'
9849  D80C  19 62 65 74 77              BYTE  25,'between syringe ON times.'
9850  D826
9851  D826  06 1F 50 72 65   SCROLL90:  BYTE  6,31,'Press OK if you want to see the'
9852  D847  1F 45 4E 44 49              BYTE  31,'ENDING TIME for the day, and/or'
9853  D867  1E 74 68 65 20              BYTE  30,'the sequential  START TIMES by'
9854  D886  1E 76 61 6C 76              BYTE  30,'valve for each  regular, soak,'
9855  D8A5  1D 6F 72 20 73              BYTE  29,'or syringe ON   time (if any)'
9856  D8C3  17 66 6F 72 20              BYTE  23,'for this Valve Set Up.'
9857  D8DB
9858  D8DB  06 1E 4F 4B 20   SCROLL91:  BYTE  6,30,'OK a BUDGET from10-200% to use'
9859  D8FB  1F 66 6F 72 20              BYTE  31,'for viewing the daily schedule.'
9860  D91B  1E 41 20 62 75              BYTE  30,'A budget of 100%waters exactly'
9861  D93A  17 61 63 63 6F              BYTE  23,'according to theSet Up.'
9862  D952  1A 53 6F 61 6B              BYTE  26,'Soak and syringecycles are'
9863  D96D  1B 4E 4F 54 20              BYTE  27,'NOT affected by the budget.'
9864  D989
9865  D989  02 1C 59 6F 75   SCROLL92:  BYTE  2,28,'You can review  the watering'
9866  D9A7  20 73 63 68 65              BYTE  32,'schedule for ANYDAY of the week.'
9867  D9C8
```

```
9868  D9C8  02 1E 49 6E 64    SCROLL93: BYTE  2,30,'Indicate which  week # of your'
9869  D9E8  1E 6D 75 6C 74              BYTE    30,'multiple week    setup to view.'
9870  DA07
9871  DA07  05 1D 49 6E 64    SCROLL94: BYTE  5,29,'Indicate which  day # of your'
9872  DA26  1E 6D 75 6C 74              BYTE    30,'multiple day     setup to view.'
9873  DA45  1D 41 4C 4C 20              BYTE    29,'ALL active valvestations will'
9874  DA63  20 41 4C 57 41              BYTE    32,'ALWAYS water on DAY #1 no matter'
9875  DA84  1E 77 68 69 63              BYTE    30,'which day cycle you are using.'
9876  DAA3
9877  DAA3  08 20 50 72 65    SCROLL95: BYTE  8,32,'Press OK for    each ON time, or'
9878  DAC5  1C 70 72 65 73              BYTE    28,'press NO to STOPthis review.'
9879  DAE2  1F 45 61 63 68              BYTE    31,'Each screen      shows the VALVE'
9880  DB02  1F 4E 55 4D 42              BYTE    31,'NUMBER, the      CYCLE TYPE, the'
9881  DB22  1B 63 75 72 72              BYTE    27,'current & total ON CYCLE #s'
9882  DB3E  1E 28 4F 4E 20              BYTE    30,'(ON # _ of _),  and the ACTUAL'
9883  DB5D  1E 44 55 52 41              BYTE    30,'DURATION and    START TIME for'
9884  DB7C  0D 74 68 69 73              BYTE    13,'this ON time.'
9885  DB8A
9886  DB8A  03 1D 55 73 65    SCROLL96: BYTE  3,29,'Use the MINI    Set Up if you'
9887  DBA9  1A 6F 6E 6C 79              BYTE    26,'only need ONE   START TIME'
9888  DBC4  0A 70 65 72 20              BYTE    10,'per valve.'
9889  DBCF
9890  DBCF  06 15 54 68 65    SCROLL97: BYTE  6,21,'The AUTOSPLIT    Setup'
9891  DBE6  1C 6C 65 74 73              BYTE    28,'lets you SPLIT   the watering'
9892  DC03  1E 64 75 72 61              BYTE    30,'durations into  shorter repeat'
9893  DC22  1F 63 79 63 6C              BYTE    31,'cycles.  The    Controller then'
9894  DC42  1E 41 55 54 4F              BYTE    30,'AUTOMATICALLY   calculates all'
9895  DC61  1F 74 68 65 20              BYTE    31,'the sequential  split ON times.'
9896  DC81
9897  DC81  02 1E 55 73 65    SCROLL98: BYTE  2,30,'Use the RATION  Setup to water'
9898  DCA1  19 6F 6E 6C 79              BYTE    25,'only on EVEN or ODD days.'
9899  DCBB
9900                          ; ISC
9901  DCBB
9902  DCBB                    SCROLL99:
9903  DCBB
9904                          ; One-time
9905  DCBB
9906  DCBB                    SCROLL100:
9907  DCBB
9908                          ; Special
9909  DCBB
9910  DCBB  01 1E 54 68 69    SCROLL101: BYTE 1,30,'This feature is NOT AVAILABLE.'
9911  DCD8
9912  DCD8  05 20 55 73 65    SCROLL102: BYTE 5,32,'Use FAILSAFE to enter a watering'
9913  DCFD  1B 73 63 68 65              BYTE    27,'schedule to be  used if the'
9914  DD19  1E 43 6F 6E 74              BYTE    30,'Controller lens is covered for'
9915  DD38  1F 70 72 6F 6C              BYTE    31,'prolonged       periods causing'
9916  DD58  0D 61 20 70 6F              BYTE    13,'a power loss.'
9917  DD66
9918  DD66                    SCROLL103:
9919  DD66
9920  DD66                    SCROLL104:
9921  DD66
9922  DD66                    SCROLL105:
9923  DD66
9924  DD66  04 20 53 65 74    SCROLL106: BYTE 4,32,'Set Up ALREADY EXISTS. You can'
```

```
9925  DD88  1F 52 45 56 49              BYTE    31,'REVIEW the      current Set Up,'
9926  DDA8  1E 6F 72 20 45              BYTE    30,'or ERASE it by  entering a new'
9927  DDC7  07 53 65 74 20              BYTE    7,'Set Up.'
9928  DDCF
9929  DDCF  03 1E 54 68 65   SCROLL107: BYTE    3,30,'The ENDING TIME for the day is'
9930  DDEF  20 74 68 65 20              BYTE    32,'the time when   the last ON time'
9931  DE10  1A 66 6F 72 20              BYTE    26,'for the day is  completed.'
9932  DE2B
9933  DE2B  02 1D 53 45 4D   SCROLL108: BYTE    2,29,'SEMI-AUTO with SPECIFIC DAYS'
9934  DE4A  1D 69 73 20 4E              BYTE    29,'is NOT AVAILABLEat this time.'
9935  DE68
9936                                    ; wire checking
9937  DE68
9938  DE68  04 1E 54 68 65   SCROLL109: BYTE    4,30,'The LEFT symbol on the display'
9939  DE88  1A 73 68 6F 77              BYTE    26,'shows the statusof the TOP'
9940  DEA3  20 77 69 72 65              BYTE    32,'wire position   where "o" = OPEN'
9941  DEC4  20 22 56 22 20              BYTE    32,'"V" = VALVE,    and "x" = SHORT.'
9942  DEE5
9943                                    ; assign station IDs
9944  DEE5
9945  DEE5  05 1B 50 72 65   SCROLL110: BYTE    5,27,'Press OK to see the current'
9946  DF02  1C 53 74 61 74              BYTE    28,'Station ID #s. The LEFTMOST'
9947  DF1F  1F 6E 75 6D 62              BYTE    31,'number shows thenumber assigned'
9948  DF3F  1E 74 6F 20 74              BYTE    30,'to the TOP lightgrey connector'
9949  DF5E  1F 70 61 69 72              BYTE    31,'pair on the leftterminal strip.'
9950  DF7E
9951  DF7E  04 1E 50 72 65   SCROLL111: BYTE    4,30,'Press OK to     Enter new IDs.'
9952  DF9E  19 54 68 69 73              BYTE    25,'This allows you to change'
9953  DFB8  20 73 74 61 74              BYTE    32,'station #s      without changing'
9954  DFD3  0B 74 68 65 20              BYTE    11,'the wiring.'
9955  DFE5
9956  DFE5  03 1E 49 66 20   SCROLL112: BYTE    3,30,'If you do not   want to ID all'
9957  E005  20 74 68 65 20              BYTE    32,'the stations nowwired, press NO,'
9958  E026  1F 26 20 65 6E              BYTE    31,'& enter how manystations to ID.'
9959  E046
9960  E046  09 1F 54 6F 20   SCROLL113: BYTE    9,31,'To ID station 1,go to the valve'
9961  E067  1E 73 74 61 74              BYTE    30,'station that youwant to be #1.'
9962  E086  20 55 6E 70 6C              BYTE    32,'Unplug the wire connector on the'
9963  E0A7  1F 76 61 6C 76              BYTE    31,'valve pigtail,  wait 2 seconds,'
9964  E0C7  1F 74 68 65 6E              BYTE    31,'then reconnect  the wires. The'
9965  E0E7  1D 43 6F 6E 74              BYTE    29,'Controller will automatically'
9966  E105  1D 61 73 73 69              BYTE    29,'assign #1 to    this station.'
9967  E123  1F 52 65 70 65              BYTE    31,'Repeat this     process for all'
9968  E143  0F 77 69 72 65              BYTE    15,'wired stations.'
9969  E153
9970  E153  03 18 50 72 65   SCROLL114: BYTE    3,24,'Press OK to     SAVE the'
9971  E16D  1C 6E 65 77 20              BYTE    28,'new valve numberassignments,'
9972  E18A  19 61 6E 64 20              BYTE    25,'and ERASE the   old ones.'
9973  E1A4
9974  E1A4  07 1C 2A 45 52   SCROLL115: BYTE    7,28,'*ERROR* Shortedwire exists!'
9975  E1C2  1D 42 65 66 6F              BYTE    29,'Before you can  assign ID #s,'
9976  E1E0  1B 79 6F 75 20              BYTE    27,'you must repair all shorts.'
9977  E1FC  1D 55 73 65 20              BYTE    29,'Use built-in    WIRE CHECKING'
9978  E21A  1E 74 6F 20 69              BYTE    30,'to identify     shorted wires.'
9979  E239  1A 4E 45 56 45              BYTE    26,'NEVER USE A     CONTINUITY'
9980  E254  10 54 45 53 54              BYTE    16,'TESTER FOR THIS!'
9981  E265
```

```
9982                            ;Automatic mode
9983   E265
9984   E265  03 20 55 73 65    SCROLL116: BYTE  3,32,'Use this RAIN   DELAY to suspend'
9985   E287  20 77 61 74 65               BYTE  32,'watering for      0-14 days before'
9986   E2A8  20 79 6F 75 72               BYTE  32,'your watering     schedule starts.'
9987
9988   E2C9                    SCROLL117:
9989   E2C9
9990   E2C9  03 1A 53 65 6C    SCROLL118: BYTE  3,26,'Select which     previously'
9991   E2E5  18 65 6E 74 65               BYTE  24,'entered          schedule'
9992   E2FE  1D 79 6F 75 20               BYTE  29,'you want to use for watering.'
9993   E31C
9994   E31C  03 1D 49 66 20    SCROLL119: BYTE  3,29,'If you REMOVE   the POWER KEY'
9995   E33B  1D 6E 6F 77 2C               BYTE  29,'now, watering    will begin on'
9996   E359  1A 74 68 65 20               BYTE  26,'the first day    scheduled.'
9997   E374
9998                            ;Semi-Automatic
9999   E374
10000  E374  06 1D 49 66 20    SCROLL120: BYTE  6,29,'If you REMOVE   the POWER KEY'
10001  E393  1A 6E 6F 77 2C               BYTE  26,'now, watering    will begin'
10002  E3AE  19 69 6D 6D 65               BYTE  25,'immediately, andwhen this'
10003  E3C8  1B 77 61 74 65               BYTE  27,'watering         sequence is'
10004  E3E4  1F 63 6F 6D 70               BYTE  31,'completed, the  Controller will'
10005  E404  1E 72 65 76 65               BYTE  30,'revert to       AUTOMATIC RUN.'
10006  E423
10007                            ;Soak messages
10008  E423
10009  E423  04 1F 53 4F 41    SCROLL121: BYTE  4,31,'SOAK CYCLES let you do periodic'
10010  E444  1F 6C 6F 6E 67               BYTE  31,'long watering   cycles for deep'
10011  E464  1F 77 61 74 65               BYTE  31,'watering trees  in lawns or for'
10012  E484  0F 6C 65 61 63               BYTE  15,'leaching salts.'
10013  E494
10014  E494  04 1D 45 6E 74    SCROLL122: BYTE  4,29,'Enter the TOTAL SOAK TIME'
10015  E4AF  1D 70 65 72 20               BYTE  29,'per day for thisvalve. Enter'
10016  E4CD  1C 68 6F 75 72               BYTE  28,'hours (h), then minutes (m).'
10017  E4EA  1D 4F 4B 20 30               BYTE  29,'OK 0h to enter  minutes only.'
10018  E508
10019  E508  04 17 41 20 53    SCROLL123: BYTE  4,23,'A SOAK DURATION = 0h+0m'
10020  E521  1F 68 61 73 20               BYTE  31,'has been enteredfor this valve.'
10021  E541  1D 54 68 61 74               BYTE  29,'That tells the  Controller to'
10022  E55F  1B 4E 4F 54 20               BYTE  27,'NOT soak with   this valve.'
10023  E57B
10024  E57B  02 1C 45 6E 74    SCROLL124: BYTE  2,28,'Enter HOW OFTEN to soak from'
10025  E599  20 31 2D 39 30               BYTE  32,'1-90 days (every1 days = daily).'
10026  E5BA
10027  E5BA  05 1D 50 72 65    SCROLL125: BYTE  5,29,'Press OK for    each week day'
10028  E5D9  1E 74 68 61 74               BYTE  30,'that you to use as a SOAK day.'
10029  E5FB  1C 49 66 20 6F               BYTE  28,'If only one day is selected,'
10030  E615  1C 63 68 6F 6F               BYTE  28,'choose every    1wk (7 days)'
10031  E632  1E 75 70 20 74               BYTE  30,'up to every     9wk (63 days).'
10032  E651
10033  E651                    SCROLL126:
10034
10035
10036  E651                            INCLUDE    MSG.ASM
10037                            ;----------------------------------
10038                            ;       STRING STORAGE
```

```
10039                              ;-----------------------------------
10040
10041   E651  1E 20 50 72 65   MSG0:   BYTE    30,' Press OK when most readable '
10042   E670  0F 43 48 4F 4F   MSG1:   BYTE    15,'CHOOSE ONE (OK)'
10043   E680  0C 45 4E 54 45   MSG2:   BYTE    12,'ENTER SETUP '
10044   E68D  0D 52 55 4E 20   MSG3:   BYTE    13,'RUN STATIONS '
10045   E69B  0E 53 54 41 59   MSG4:   BYTE    14,'STAY IDLE/OFF '
10046   E6AA  0A 56 49 45 57   MSG5:   BYTE    10,'VIEW INFO '
10047   E6B5  00               MSG6:   BYTE    0
10048   E6B6  00               MSG7:   BYTE    0
10049   E6B7  1B 43 68 61 72   MSG8:   BYTE    27,'Charging...   Please Wait'
10050   E6D3  0C 52 75 6E 20   MSG9:   BYTE    12,'Run Stations'
10051   E6E0  0D 52 75 6E 20   MSG10:  BYTE    13,'Run Test Seq.'
10052   E6EE  0D 52 65 61 64   MSG11:  BYTE    13,'Read Sensors '
10053   E6FC  00               MSG12:  BYTE    0
10054   E6FD  09 45 58 49 54   MSG13:  BYTE    9,'EXIT now '
10055   E707  0D 53 65 74 20   MSG14:  BYTE    13,'Set SCHEDULES'
10056   E715  0E 53 65 74 20   MSG15:  BYTE    14,'Set ALT.SCHED.'
10057   E724  0D 53 65 74 75   MSG16:  BYTE    13,'Setup SYSTEM '
10058   E732  0D 41 55 54 4F   MSG17:  BYTE    13,'AUTOMATIC RUN'
10059   E740  0D 53 45 4D 49   MSG18:  BYTE    13,'SEMI-AUTO RUN'
10060   E74E  0A 4D 41 4E 55   MSG19:  BYTE    10,'MANUAL RUN'
10061   E759  0E 53 65 65 20   MSG20:  BYTE    14,'See DIRECTIONS'
10062   E768  0C 53 65 65 20   MSG21:  BYTE    12,'See HISTORY '
10063   E775  0E 53 65 65 20   MSG22:  BYTE    14,'See RUN TOTALS'
10064   E784  0D 44 6F 20 53   MSG23:  BYTE    13,'Do SELF TEST '
10065   E792  00               MSG24:  BYTE    0
10066   E793  07 20 73 70 6C   MSG25:  BYTE    7,' splits'
10067   E79B  09 4F 4E 20 64   MSG26:  BYTE    9,'ON days: '
10068   E7A5  1D 20 53 74 61   MSG27:  BYTE    29,' Stations     wired: ID all '
10069   E7C3  06 20 31 30 30   MSG28:  BYTE    6,' 100%='
10070   E7CA  03 20 4F 4E      MSG29:  BYTE    3,' ON'
10071   E7CE  1A 3A 55 73 65   MSG30:  BYTE    26,':Use Splits (100%=      )'
10072   E7E9  0F 40 20 20 6D   MSG31:  BYTE    15,'@ = ON, = OFF'
10073   E7F9  09 53 74 61 74   MSG32:  BYTE    9,'Station #'
10074   E803  05 20 64 61 79   MSG33:  BYTE    5,' days'
10075   E809  14 55 73 65 20   MSG34:  BYTE    20,'Use SAME settingfor '
10076   E81E  04 20 77 6B 73   MSG35:  BYTE    4,' wks'
10077   E823  18 53 74 61 72   MSG36:  BYTE    24,'Start Time each ON day ='
10078   E83C  13 20 57 61 74   MSG37:  BYTE    19,' Watering Duration='
10079   E850  06 65 76 65 72   MSG38:  BYTE    6,'every '
10080   E857  14 41 55 54 4F   MSG39:  BYTE    20,'AUTO emulation Day#'
10081   E86C  09 55 73 65 20   MSG40:  BYTE    9,'Use Mini '
10082   E876  0D 55 73 65 20   MSG41:  BYTE    13,'Use Autosplit'
10083   E884  0B 55 73 65 20   MSG42:  BYTE    11,'Use Ration '
10084   E890  09 55 73 65 20   MSG43:  BYTE    9,'Use ISC '
10085   E899  0D 55 73 65 20   MSG44:  BYTE    13,'Use One-time '
10086   E8A7  0C 55 73 65 20   MSG45:  BYTE    12,'Use Special '
10087   E8B4  0D 55 73 65 20   MSG46:  BYTE    13,'Use Failsafe '
10088   E8C2  09 45 58 49 54   MSG47:  BYTE    9,'EXIT now '
10089   E8CC  10 45 78 63 6C   MSG48:  BYTE    16,'Excluded Period:'
10090   E8DD  1F 44 6F 20 79   MSG49:  BYTE    31,'Do you want an  Excluded Period'
10091   E8FD  1B FF FF 48 49   MSG50:  BYTE    27,$FF,$FF,'HISTORY DONE',$FF,$FF,'Please Wait'
10092   E919  10 57 61 74 65   MSG51:  BYTE    16,'Water Day Cycle='
10093   E92A  0F 22 53 6F 20   MSG52:  BYTE    15,'"So many" days?'
10094   E93A  0E 53 70 65 63   MSG53:  BYTE    14,'Specific days?'
10095   E949  1A 20 57 61 74   MSG54:  BYTE    26,' Water only    on    days'
```

```
10096  E964  04 20 4F 44 44   MSG55:  BYTE   4,' ODD'
10097  E969  04 45 56 45 4E   MSG56:  BYTE   4,'EVEN'
10098  E96E  1B 42 61 73 65   MSG57:  BYTE   27,'Base Multiplier:Water    %'
10099  E98A  1D 57 61 74 65   MSG58:  BYTE   29,'Water Budget   to use =   %'
10100  E9A8  08 44 49 53 41   MSG59:  BYTE   8,'DISABLED'
10101  E9B1  08 45 4E 41 42   MSG60:  BYTE   8,'ENABLED '
10102  E9BA  07 53 74 6E 20   MSG61:  BYTE   7,'Stn #: '
10103  E9C2  07 20 53 65 6E   MSG62:  BYTE   7,' Sensor'
10104  E9CA  10 44 72 79 20   MSG63:  BYTE   16,'Dry Level :    %'
10105  E9DB  10 53 6F 61 6B   MSG64:  BYTE   16,'Soak Level:    %'
10106  E9EC  19 44 6F 20 79   MSG65:  BYTE   25,'Do you want    syringes '
10107  EA06  08 20 20 20 20   MSG66:  BYTE   8,'         '
10108  EA0F  04 54 69 6D 65   MSG67:  BYTE   4,'Time'
10109  EA14  0D 65 76 65 72   MSG68:  BYTE   13,'every    days'
10110  EA22  1C 53 74 6F 70   MSG69:  BYTE   28,'Stopping        all watering'
10111  EA3F  0A 69 73 20 52   MSG70:  BYTE   10,'is RUNNING'
10112  EA4A  1D 43 6F 6E 74   MSG71:  BYTE   29,'Controller IDLE (No watering)'
10113  EA68  1D 2A 2A 4C 4F   MSG72:  BYTE   29,'LOW BATTERY  in Power Key'
10114  EA86  03 53 74 6E      MSG73:  BYTE   3,'Stn'
10115  EA8A  05 53 65 74 75   MSG74:  BYTE   5,'Setup'
10116  EA90  02 2D 2D         MSG75:  BYTE   2,'--'
10117  EA93  00               MSG76:  BYTE   0
10118  EA94  03 4A 41 4E      MSG77:  BYTE   3,'JAN'
10119  EA98  03 46 45 42      MSG78:  BYTE   3,'FEB'
10120  EA9C  03 4D 41 52      MSG79:  BYTE   3,'MAR'
10121  EAA0  03 41 50 52      MSG80:  BYTE   3,'APR'
10122  EAA4  03 4D 41 59      MSG81:  BYTE   3,'MAY'
10123  EAA8  03 4A 55 4E      MSG82:  BYTE   3,'JUN'
10124  EAAC  03 4A 55 4C      MSG83:  BYTE   3,'JUL'
10125  EAB0  03 41 55 47      MSG84:  BYTE   3,'AUG'
10126  EAB4  03 53 45 50      MSG85:  BYTE   3,'SEP'
10127  EAB8  03 4F 43 54      MSG86:  BYTE   3,'OCT'
10128  EABC  03 4E 4F 56      MSG87:  BYTE   3,'NOV'
10129  EAC0  03 44 45 43      MSG88:  BYTE   3,'DEC'
10130  EAC4  08 54 69 6D 65   MSG89:  BYTE   8,'Time is '
10131  EACD  1D 52 65 70 6C   MSG90:  BYTE   29,'Replace Battery  in Power Key'
10132  EAEB  03 4D 4F 4E      MSG91:  BYTE   3,'MON'
10133  EAEF  03 54 55 45      MSG92:  BYTE   3,'TUE'
10134  EAF3  03 57 45 44      MSG93:  BYTE   3,'WED'
10135  EAF7  03 54 48 55      MSG94:  BYTE   3,'THU'
10136  EAFB  03 46 52 49      MSG95:  BYTE   3,'FRI'
10137  EAFF  03 53 41 54      MSG96:  BYTE   3,'SAT'
10138  EB03  03 53 55 4E      MSG97:  BYTE   3,'SUN'
10139  EB07  06 52 65 70 65   MSG98:  BYTE   6,'Repeat'
10140  EB0E  20 54 61 6B 65   MSG99:  BYTE   32,'Take Power Key  out now to IDLE!'
10141  EB2F  0C 48 49 53 54   MSG100: BYTE   12,'HISTORY for:'
10142  EB3C  05 43 6F 64 65   MSG101: BYTE   5,'Code#'
10143  EB42  0D 50 6F 77 65   MSG102: BYTE   13,'Power Key  in'
10144  EB50  03 6D 69 6E 2E   MSG103: BYTE   3,'min.'
10145  EB53  0D 4E 4F 20 57   MSG104: BYTE   13,'NO Watering ?'
10146  EB63  0A 45 58 49 54   MSG105: BYTE   10,'EXIT now ?'
10147  EB6E  1B 41 6C 6C 20   MSG106: BYTE   27,'All assigned    Stations OK'
10148  EB8A  0F 53 74 6E 20   MSG107: BYTE   15,'Stn wires OPEN:'
10149  EB9A  10 53 74 6E 20   MSG108: BYTE   16,'Stn wires SHORT:'
10150  EBAB  15 3A 20 56 69   MSG109: BYTE   21,': View     Site Info'
10151  EBC1  08 20 20 76 2E   MSG110: BYTE   8,'  v.2.09'
10152  EBCA  1C 52 65 70 65   MSG111: BYTE   28,'Repeat          the message '
```

| | | | | | |
|---|---|---|---|---|---|
|10153|EBE7|1F 54 61 6B 65|MSG112: BYTE|31,'Take Power Key out to quit, or'|
|10154|EC07|1A 52 65 70 65|MSG113: BYTE|26,'Repeat      self test '|
|10155|EC22|1E 53 65 6C 66|MSG114: BYTE|30,'Self test     in progress...'|
|10156|EC41|1F 48 45 4C 4C|MSG115: BYTE|31,'HELLO! Press OKto pick options'|
|10157|EC61|1E 54 6F 20 77|MSG116: BYTE|30,'To water, take Power Key out!'|
|10158|EC80|1D 54 75 72 6E|MSG117: BYTE|29,'Turn on valves    min. each?'|
|10159|EC9E|06 54 65 73 74|MSG118: BYTE|6,'Test: '|
|10160|ECA5|00|MSG119: BYTE|0|
|10161|ECA6|00|MSG120: BYTE|0|
|10162|ECA7|00|MSG121: BYTE|0|
|10163|ECA8|0E 4F 6E 2C 20|MSG122: BYTE|14,'On,     left'|
|10164|ECB7|0B 54 75 72 6E|MSG123: BYTE|11,'Turning Off'|
|10165|ECC3|1F 44 6F 20 79|MSG124: BYTE|31,'Do you want to do a self-test?'|
|10166|ECE3|1F 41 6E 79 20|MSG125: BYTE|31,'Any valves ON  are turning OFF'|
|10167|ED03|08 56 61 6C 76|MSG126: BYTE|8,'Valve # '|
|10168|ED0C|07 55 73 69 6E|MSG127: BYTE|7,'Using: '|
|10169|ED14|0B 49 73 20 74|MSG128: BYTE|11,'Is this OK '|
|10170|ED20|04 55 73 65 20|MSG129: BYTE|4,'Use '|
|10171|ED25|1E 44 6F 20 79|MSG130: BYTE|30,'Do you want to  delay watering'|
|10172|ED44|1B 44 65 6C 61|MSG131: BYTE|27,'Delay watering for    days'|
|10173|ED60|1B 56 69 65 77|MSG132: BYTE|27,'View active    station #s '|
|10174|ED7C|00|MSG133: BYTE|0|
|10175|ED7D|00|MSG134: BYTE|0|
|10176|ED7E|0D 52 65 76 69|MSG135: BYTE|13,'Review Setup?'|
|10177|ED8C|0D 4D 6F 64 69|MSG136: BYTE|13,'Modify Setup?'|
|10178|ED9A|0D 44 6F 20 4E|MSG137: BYTE|13,'Do New Setup?'|
|10179|EDA8|0A 45 58 49 54|MSG138: BYTE|10,'EXIT now ?'|
|10180|EDB3|16 53 79 72 69|MSG139: BYTE|22,'Syringe IntervalEvery '|
|10181|EDCA|1C 20 73 79 72|MSG140: BYTE|28,' syringes at         interval'|
|10182|EDE7|1D 44 6F 20 79|MSG141: BYTE|29,'Do you want    a Soak Cycle '|
|10183|EE05|17 52 65 76 69|MSG142: BYTE|23,'Review for     Day = #'|
|10184|EE1D|17 52 65 76 69|MSG143: BYTE|23,'Review for     week= #'|
|10185|EE35|04 4D 69 64 6E|MSG144: BYTE|4,'Midn'|
|10186|EE3A|04 4E 6F 6F 6E|MSG145: BYTE|4,'Noon'|
|10187|EE3F|09 3A 20 44 6F|MSG146: BYTE|9,': Do Soak'|
|10188|EE49|10 4E 4F 20 77|MSG147: BYTE|16,'NO watering for '|
|10189|EE5A|04 20 4F 4E 20|MSG148: BYTE|4,' ON '|
|10190|EE5F|04 20 53 59 52|MSG149: BYTE|4,' SYR'|
|10191|EE64|04 53 4F 41 4B|MSG150: BYTE|4,'SOAK'|
|10192|EE69|18 44 6F 20 79|MSG151: BYTE|24,'Do you want to  Emulate '|
|10193|EE82|1F 56 61 6C 76|MSG152: BYTE|31,'Valves:        starting at top'|
|10194|EEA2|1B 50 72 65 73|MSG153: BYTE|27,'Press OK to see ending time'|
|10195|EEBE|19 52 65 76 69|MSG154: BYTE|25,'Review daily    schedule '|
|10196|EED8|1B 3A 20 6E 6F|MSG155: BYTE|27,': not split (Are you sure?)'|
|10197|EEF4|07 52 65 76 69|MSG156: BYTE|7,'Review '|
|10198|EEFC|07 4D 6F 64 69|MSG157: BYTE|7,'Modify '|
|10199|EF04|0C 42 61 73 69|MSG158: BYTE|12,'Basic setup '|
|10200|EF11|0E 53 79 72 69|MSG159: BYTE|14,'Syringe setup '|
|10201|EF20|0B 53 6F 61 6B|MSG160: BYTE|11,'Soak setup '|
|10202|EF2C|1C 50 72 65 73|MSG161: BYTE|28,'Press OK to see each ON time'|
|10203|EF49|0F 4E 6F 6E 65|MSG162: BYTE|15,'None entered  '|
|10204|EF59|0A 53 79 73 74|MSG163: BYTE|10,'System Low'|
|10205|EF64|04 53 56 4C 20|MSG164: BYTE|4,'SVL '|
|10206|EF69|0D 50 6F 77 65|MSG165: BYTE|13,'Power key Low'|
|10207|EF77|0A 50 77 72 4B|MSG166: BYTE|10,'PwrKey Out'|
|10208|EF82|09 50 77 72 4B|MSG167: BYTE|9,'PwrKey In'|
|10209|EF8C|0E 53 74 61 72|MSG168: BYTE|14,'Start Watering'|

```
10210  EF9B   0D 48 61 6C 74   MSG169: BYTE    13,'Halt Watering'
10211  EFA9   1C 50 72 65 73   MSG170: BYTE    28,'Press HELP-NO-OKto RESET RAM'
10212  EFC6   1C 56 69 65 77   MSG171: BYTE    28,'View current    station IDs '
10213  EFE3   1C 45 6E 74 65   MSG172: BYTE    28,'Enter new       station IDs '
10214  F000   17 43 75 72 72   MSG173: BYTE    23,'Current ID (fromTOP) : '
10215  F018   20 53 74 6E 20   MSG174: BYTE    32,'Stn #s:        Unplug # to ID!'
10216  F039   1F 53 74 6E 20   MSG175: BYTE    31,'Stn #s:        Save new Stn ID'
10217  F059   0F 45 6E 61 62   MSG176: BYTE    15,'Enable/Disable '
10218  F069   0D 41 73 73 69   MSG177: BYTE    13,'Assign ID #s '
10219  F077   0D 41 73 73 69   MSG178: BYTE    13,'Assign Types '
10220  F085   10 53 41 56 49   MSG179: BYTE    16,'SAVING new Setup'
10221  F096   1A 50 72 65 73   MSG180: BYTE    26,'Press OK to see each event'
10222  F0B1   1C 50 72 65 73   MSG181: BYTE    28,'Press STOP to   STOP running'
10223  F0CE   12 57 61 74 65   MSG182: BYTE    18,'Watering ends   at '
10224  F0E2   09 53 6F 61 6B   MSG183: BYTE    9,'Soak Dur='
10225  F0EC   0F 77 69 74 68   MSG184: BYTE    15,'with      # ONs'
10226  F0FC   14 4E 4F 20 53   MSG185: BYTE    20,'NO Soak Cycle   for '
10227  F111   06 20 53 6F 61   MSG186: BYTE    6,' Soak='
10228  F118   0C 53 79 72 69   MSG187: BYTE    12,'Syringes ON '
10229  F125   0C 53 79 72 69   MSG188: BYTE    12,'Syringes OFF'
10230  F132   0D 53 65 74 20   MSG189: BYTE    13,'Set SITE INFO'
10231  F140   0D 20 53 79 72   MSG190: BYTE    13,' Syr Months :'
10232  F14E   17 53 79 72 69   MSG191: BYTE    23,'Syringe Duration =  #'
10233  F166   0F 4E 4F 20 53   MSG192: BYTE    15,'NO Syringes for'
10234  F176   10 53 79 72 69   MSG193: BYTE    16,'Syringe Period :'
10235  F187   0D 53 65 74 20   MSG194: BYTE    13,'Set TIME/DATE'
10236  F195   0D 44 6F 20 57   MSG195: BYTE    13,'Do WIRE CHECK'
10237  F1A3   0E 53 65 74 75   MSG196: BYTE    14,'Setup STATIONS'
10238  F1B2   0D 53 65 74 75   MSG197: BYTE    13,'Setup SENSORS'
10239  F1C0   0E 53 65 74 20   MSG198: BYTE    14,'Set USER CODES'
10240  F1CF   18 23 20 6F 66   MSG199: BYTE    24,'# of stations   to ID : '
10241  F1E8   0D 54 75 72 6E   MSG200: BYTE    13,'Turn #  OFF?'
10242  F1F6   0C 54 75 72 6E   MSG201: BYTE    12,'Turn #  ON?'
10243  F203   0E 47 6F 20 74   MSG202: BYTE    14,'Go to Stn #  ?'
10244  F212   0B 4D 69 6E 69   MSG203: BYTE    11,'Mini setup?'
10245  F21E   10 41 75 74 6F   MSG204: BYTE    16,'Autosplit setup?'
10246  F22F   0D 52 61 74 69   MSG205: BYTE    13,'Ration setup?'
10247  F23D   0A 49 53 43 20   MSG206: BYTE    10,'ISC setup?'
10248  F248   0F 4F 6E 65 20   MSG207: BYTE    15,'One-time setup?'
10249  F258   0E 53 70 65 63   MSG208: BYTE    14,'Special setup?'
10250  F267   0F 46 61 69 6C   MSG209: BYTE    15,'Failsafe setup?'
10251  F277   0A 45 58 49 54   MSG210: BYTE    10,'EXIT now ?'
10252  F282   1E 44 6F 20 79   MSG211: BYTE    30,'Do you want     to use splits '
10253  F2A1   0F 4D 61 78 20   MSG212: BYTE    15,'Max ON/Min OFF:'
10254  F2B1   0A 20 53 69 74   MSG213: BYTE    10,' Site Info'
10255  F2BC   1F 50 72 65 73   MSG214: BYTE    31,'Press ',0,' to splitusing site info'
10256  F2DC   0B 6C 65 76 65   MSG215: BYTE    11,'level sand?'
10257  F2E8   0B 68 69 6C 6C   MSG216: BYTE    11,'hilly sand?'
10258  F2F4   0B 6C 65 76 65   MSG217: BYTE    11,'level loam?'
10259  F300   0B 68 69 6C 6C   MSG218: BYTE    11,'hilly loam?'
10260  F30C   0B 6C 65 76 65   MSG219: BYTE    11,'level clay?'
10261  F318   0B 68 69 6C 6C   MSG220: BYTE    11,'hilly clay?'
10262  F324   0C 66 6C 61 74   MSG221: BYTE    12,'flat sprays?'
10263  F331   0C 6C 61 77 6E   MSG222: BYTE    12,'lawn sprays?'
10264  F33E   0C 72 6F 74 6F   MSG223: BYTE    12,'rotor heads?'
10265  F34B   0D 69 6D 70 61   MSG224: BYTE    13,'impact heads?'
10266  F359   0E 73 74 72 65   MSG225: BYTE    14,'stream sprays?'
```

```
10267  F36B  0C 6D 69 63 72   MSG226: BYTE     12,'microsprays?'
10268  F375  0E 64 72 69 70   MSG227: BYTE     14,'drip emitters?'
10269  F384  1F 55 73 69 6E   MSG228: BYTE     31,'Using site info to auto-split..'
10270  F3A4  1E 55 73 69 6E   MSG229: BYTE     30,'Using site info to calculate..'
10271  F3C3  09 4E 6F 74 20   MSG230: BYTE     9,'Not split'
10272
10273                                 ;---------------------------------
10274                                 ;      TABLES
10275                                 ;---------------------------------
10276
10277  F3CD  01               LCDTBL: BYTE     00000001B       ;Clear display
10278  F3CE  02                       BYTE     00000010B       ;Cursor home
10279  F3CF  06                       BYTE     00000110B       ;Entry mode, no scrolling
10280  F3D0  0E                       BYTE     00001110B       ;Display on, show cursor
10281  F3D1  08                       BYTE     00001000B       ;Display off
10282  F3D2  0C                       BYTE     00001100B       ;Display on, no cursor
10283  F3D3  0D                       BYTE     00001101B       ;Display on, blink cursor position
10284  F3D4  14                       BYTE     00010100B       ;Move cursor right
10285  F3D5  18                       BYTE     00011000B       ;Scroll display left
10286  F3D6  38                       BYTE     00111000B       ;Interface data length=8 bits
10287  F3D7                   ADDR_CMD:
10288  F3D7  80                       BYTE     10000000B       ;Set address for data display
                                                               ;AND address (0-50H) with command
10289
10290  F3D8  40                       BYTE     01000000B       ;Set Custom Character RAM to 0
10291
10292                         CUSTOMTBL:                       ;this is the custom char data
10293  F3D9  1C 14 1C 00 05           BYTE     $1C,$14,$1C,0,$05,$06,$05,0
10294
10295  F3E1  51E6             MSGTBL: WORD     MSG0            ;table of msg addresses
10296  F3E3  70E6                     WORD     MSG1
10297  F3E5  80E6                     WORD     MSG2
10298  F3E7  8DE6                     WORD     MSG3
10299  F3E9  9BE6                     WORD     MSG4
10300  F3EB  AAE6 B5E6 B6E6           WORD     MSG5,MSG6,MSG7,MSG8,MSG9
       F3F1  B7E6 D3E6
10301  F3F5  EBE6 EEE6 FCE6           WORD     MSG10,MSG11,MSG12,MSG13,MSG14
       F3F8  FDE6 07E7
10302  F3FF  15E7 24E7 32E7           WORD     MSG15,MSG16,MSG17,MSG18,MSG19
       F405  48E7 4EE7
10303  F409  59E7 68E7 75E7           WORD     MSG20,MSG21,MSG22,MSG23,MSG24
       F40F  84E7 92E7
10304  F413  93E7 9BE7 A5E7           WORD     MSG25,MSG26,MSG27,MSG28,MSG29
       F419  C3E7 CAE7
10305  F41D  CEE7 E9E7 F3E7           WORD     MSG30,MSG31,MSG32,MSG33,MSG34
       F423  83E8 89E8
10306  F427  1EE8 23E8 3CE8           WORD     MSG35,MSG36,MSG37,MSG38,MSG39
       F42D  50E8 57E8
10307  F431  6CE8 76E8 84E8           WORD     MSG40,MSG41,MSG42,MSG43,MSG44
       F437  90E8 99E8
10308  F43B  A7E8 B4E8 C2E8           WORD     MSG45,MSG46,MSG47,MSG48,MSG49
       F441  CCE8 DDE8
10309  F445  FDE8 19E9 2AE9           WORD     MSG50,MSG51,MSG52,MSG53,MSG54
       F44B  3AE9 49E9
10310  F44F  64E9 69E9 6EE9           WORD     MSG55,MSG56,MSG57,MSG58,MSG59
       F455  8AE9 A8E9
10311  F459  B1E9 BAE9 C2E9           WORD     MSG60,MSG61,MSG62,MSG63,MSG64
       F45F  CAE9 D8E9
```

```
10312  F463  ECE9 06EA 0FEA          WORD   MSG65,MSG66,MSG67,MSG68,MSG69
       F469  14EA 22EA
10313  F46D  3FEA 4AEA 68EA          WORD   MSG70,MSG71,MSG72,MSG73,MSG74
       F473  86EA 8AEA
10314  F477  90EA 93EA 94EA          WORD   MSG75,MSG76,MSG77,MSG78,MSG79
       F47D  98EA 9CEA
10315  F481  A0EA A4EA A8EA          WORD   MSG80,MSG81,MSG82,MSG83,MSG84
       F487  ACEA B0EA
10316  F48B  B4EA B8EA BCEA          WORD   MSG85,MSG86,MSG87,MSG88,MSG89
       F491  C0EA C4EA
10317  F495  CDEA EBEA EFEA          WORD   MSG90,MSG91,MSG92,MSG93,MSG94
       F49B  F3EA F7EA
10318  F49F  FBEA FFEA 03EB          WORD   MSG95,MSG96,MSG97,MSG98,MSG99
       F4A5  07EB 0EEB
10319  F4A9  2FEB 3CEB 42EB          WORD   MSG100,MSG101,MSG102,MSG103,MSG104
       F4AF  50EB 55EB
10320  F4B3  63EB 6EEB 8AEB          WORD   MSG105,MSG106,MSG107,MSG108,MSG109
       F4B9  9AEB ABEB
10321  F4BD  C1EB CAEB E7EB          WORD   MSG110,MSG111,MSG112,MSG113,MSG114
       F4C3  07EC 22EC
10322  F4C7  41EC 61EC 80EC          WORD   MSG115,MSG116,MSG117,MSG118,MSG119
       F4CD  9EEC A5EC
10323  F4D1  A6EC A7EC A8EC          WORD   MSG120,MSG121,MSG122,MSG123,MSG124
       F4D7  B7EC C3EC
10324  F4DB  E3EC 03ED 0CED          WORD   MSG125,MSG126,MSG127
10325
10326  F4E1  14ED 20ED      MSGTBL1: WORD   MSG128,MSG129
10327  F4E5  25ED 44ED 60ED          WORD   MSG130,MSG131,MSG132,MSG133,MSG134
       F4EB  7CED 7DED
10328  F4EF  7EED 8CED 9AED          WORD   MSG135,MSG136,MSG137,MSG138,MSG139
       F4F5  A8ED B3ED
10329  F4F9  CAED E7ED 05EE          WORD   MSG140,MSG141,MSG142,MSG143,MSG144
       F4FF  1DEE 35EE
10330  F503  3AEE 3FEE 49EE          WORD   MSG145,MSG146,MSG147,MSG148,MSG149
       F509  5AEE 5FEE
10331  F50D  64EE 69EE 82EE          WORD   MSG150,MSG151,MSG152,MSG153,MSG154
       F513  A2EE BEEE
10332  F517  D8EE F4EE FCEE          WORD   MSG155,MSG156,MSG157,MSG158,MSG159
       F51D  04EF 11EF
10333  F521  20EF 2CEF 49EF          WORD   MSG160,MSG161,MSG162,MSG163,MSG164
       F527  59EF 64EF
10334  F52B  69EF 77EF 82EF          WORD   MSG165,MSG166,MSG167,MSG168,MSG169
       F531  8CEF 9BEF
10335  F535  A9EF C6EF E3EF          WORD   MSG170,MSG171,MSG172,MSG173,MSG174
       F53B  00F0 18F0
10336  F53F  39F0 59F0 69F0          WORD   MSG175,MSG176,MSG177,MSG178,MSG179
       F545  77F0 85F0
10337  F549  96F0 B1F0 CEF0          WORD   MSG180,MSG181,MSG182,MSG183,MSG184
       F54F  E2F0 ECF0
10338  F553  FCF0 11F1 18F1          WORD   MSG185,MSG186,MSG187,MSG188,MSG189
       F559  25F1 32F1
10339  F55D  40F1 4EF1 66F1          WORD   MSG190,MSG191,MSG192,MSG193,MSG194
       F563  76F1 87F1
10340  F567  95F1 A3F1 B2F1          WORD   MSG195,MSG196,MSG197,MSG198,MSG199
       F56D  C0F1 CFF1
10341  F571  E8F1 F6F1 03F2          WORD   MSG200,MSG201,MSG202,MSG203,MSG204
       F577  12F2 1EF2
```

| | | | | | |
|---|---|---|---|---|---|
| 10342 | F57B | 2FF2 3DF2 48F2 | | WORD | MS6205,MS6206,MS6207,MS6208,MS6209 |
| | F581 | 58F2 67F2 | | | |
| 10343 | F585 | 77F2 82F2 A1F2 | | WORD | MS6210,MS6211,MS6212,MS6213,MS6214 |
| | F58B | B1F2 8CF2 | | | |
| 10344 | F58F | DCF2 E8F2 F4F2 | | WORD | MS6215,MS6216,MS6217,MS6218,MS6219 |
| | F595 | 00F3 0CF3 | | | |
| 10345 | F599 | 18F3 24F3 31F3 | | WORD | MS6220,MS6221,MS6222,MS6223,MS6224 |
| | F59F | 3EF3 48F3 | | | |
| 10346 | F5A3 | 59F3 68F3 75F3 | | WORD | MS6225,MS6226,MS6227,MS6228,MS6229 |
| | F5A9 | 84F3 A4F3 | | | |
| 10347 | F5AD | C3F3 | | WORD | MS6230 |
| 10348 | | | | | |
| 10349 | | | | | |
| 10350 | | | SCROLLTBL: | | ;groups of lines for scrolling |
| 10351 | F5AF | 16B6 36B6 6DB6 | | WORD | SCROLL0,SCROLL1,SCROLL2,SCROLL3,SCROLL4 |
| | F5B5 | A6B6 DAB6 | | | |
| 10352 | F5B9 | 0CB7 47B7 84B7 | | WORD | SCROLL5,SCROLL6,SCROLL7,SCROLL8,SCROLL9 |
| | F5BF | C7B7 26B8 | | | |
| 10353 | F5C3 | 7DB8 F2B8 50B9 | | WORD | SCROLL10,SCROLL11,SCROLL12,SCROLL13,SCROLL14 |
| | F5C9 | 46BA 54BB | | | |
| 10354 | F5CD | 0ABC FEBC E3BD | | WORD | SCROLL15,SCROLL16,SCROLL17,SCROLL18,SCROLL19 |
| | F5D3 | 3BBE 96BE | | | |
| 10355 | F5D7 | 0EBF 9ABF 14C0 | | WORD | SCROLL20,SCROLL21,SCROLL22,SCROLL23,SCROLL24 |
| | F5DD | 7FC0 39C1 | | | |
| 10356 | F5E1 | 96C1 8AC2 BDC2 | | WORD | SCROLL25,SCROLL26,SCROLL27,SCROLL28,SCROLL29 |
| | F5E7 | F9C2 F9C2 | | | |
| 10357 | F5EB | F9C2 54C3 95C3 | | WORD | SCROLL30,SCROLL31,SCROLL32,SCROLL33,SCROLL34 |
| | F5F1 | F6C3 52C4 | | | |
| 10358 | F5F5 | A9C4 A0C5 34C6 | | WORD | SCROLL35,SCROLL36,SCROLL37,SCROLL38,SCROLL39 |
| | F5FB | 34C6 53C6 | | | |
| 10359 | F5FF | 94C6 E9C6 48C7 | | WORD | SCROLL40,SCROLL41,SCROLL42,SCROLL43,SCROLL44 |
| | F605 | 11C8 51C8 | | | |
| 10360 | F609 | 8EC8 8EC8 8EC9 | | WORD | SCROLL45,SCROLL46,SCROLL47,SCROLL48,SCROLL49 |
| | F60F | 8EC8 E8C8 | | | |
| 10361 | F613 | 1FC9 56C9 56C9 | | WORD | SCROLL50,SCROLL51,SCROLL52,SCROLL53,SCROLL54 |
| | F619 | 8EC9 20CA | | | |
| 10362 | F61D | F8CA 3BCB A6CB | | WORD | SCROLL55,SCROLL56,SCROLL57,SCROLL58,SCROLL59 |
| | F623 | A6C8 52CC | | | |
| 10363 | F627 | A2CC DECC 46CD | | WORD | SCROLL60,SCROLL61,SCROLL62,SCROLL63,SCROLL64 |
| | F62D | 9FCD 58CE | | | |
| 10364 | F631 | CFCE 3BCF 8ECF | | WORD | SCROLL65,SCROLL66,SCROLL67,SCROLL68,SCROLL69 |
| | F637 | 61D0 99D0 | | | |
| 10365 | F63B | CCD0 47D1 ABD1 | | WORD | SCROLL70,SCROLL71,SCROLL72,SCROLL73,SCROLL74 |
| | F641 | 3FD2 7DD2 | | | |
| 10366 | F645 | E7D2 70D3 70D3 | | WORD | SCROLL75,SCROLL76,SCROLL77,SCROLL78,SCROLL79 |
| | F64B | 06D4 65D4 | | | |
| 10367 | F64F | 65D4 DDD4 03D5 | | WORD | SCROLL80,SCROLL81,SCROLL82,SCROLL83,SCROLL84 |
| | F655 | 29D5 80D5 | | | |
| 10368 | F659 | FBD5 9BD6 DCD6 | | WORD | SCROLL85,SCROLL86,SCROLL87,SCROLL88,SCROLL89 |
| | F65F | 34D7 80D7 | | | |
| 10369 | F663 | 26D8 DBD8 89D9 | | WORD | SCROLL90,SCROLL91,SCROLL92,SCROLL93,SCROLL94 |
| | F669 | C8D9 07DA | | | |
| 10370 | F66D | A3DA BADB CFDB | | WORD | SCROLL95,SCROLL96,SCROLL97,SCROLL98,SCROLL99 |
| | F673 | 81DC BBDC | | | |
| 10371 | F677 | BBDC BBDC DBDC | | WORD | SCROLL100,SCROLL101,SCROLL102,SCROLL103,SCROLL104 |
| | F67D | 66DD 66DD | | | |
| 10372 | F681 | 66DD 66DD CFDD | | WORD | SCROLL105,SCROLL106,SCROLL107,SCROLL108,SCROLL109 |

|       | F687 | 2BDE 68DE         |           |                                              |                |
|-------|------|-------------------|-----------|----------------------------------------------|----------------|
| 10373 | F6BB | E5DE 7EDF E5DF    | WORD      | SCROLL110,SCROLL111,SCROLL112,SCROLL113,SCROLL114 |            |
|       | F691 | 46E0 53E1         |           |                                              |                |
| 10374 | F695 | A4E1 65E2 C9E2    | WORD      | SCROLL115,SCROLL116,SCROLL117,SCROLL118,SCROLL119 |            |
|       | F69B | C9E2 1CE3         |           |                                              |                |
| 10375 | F69F | 74E3 23E4 94E4    | WORD      | SCROLL120,SCROLL121,SCROLL122,SCROLL123,SCROLL124 |            |
|       | F6A5 | 88E5 7BE5         |           |                                              |                |
| 10376 | F6A9 | BAE5 51E6         | WORD      | SCROLL125,SCROLL126                          |                |
| 10377 |      |                   |           |                                              |                |
| 10378 | F6AD |                   | SCROLLTBL1: |                                            |                |
| 10379 |      |                   |           |                                              |                |
| 10380 |      |                   |           |                                              |                |
| 10381 |      |                   | MENUTBL:  | ;mode mode+1 msg#,line 1 msg#,line2 help# jmp |               |
| 10382 | F6AD | 01 00 01 02 10    | BYTE      | 1,$0,1,2,16                                  |                |
| 10383 | F6B2 | 83AD              | WORD      | NEXTLEVEL                                    | ;SETUP         |
| 10384 | F6B4 | 02 00 01 03 11    | BYTE      | 2,$0,1,3,17                                  |                |
| 10385 | F6B9 | 83AD              | WORD      | NEXTLEVEL                                    | ;RUN           |
| 10386 | F6BB | 03 00 01 04 15    | BYTE      | 3,$0,1,4,21                                  |                |
| 10387 | F6C0 | B786              | WORD      | IDLE_MODE                                    | ;IDLE          |
| 10388 | F6C2 | 04 00 01 05 16    | BYTE      | 4,$0,1,5,22                                  |                |
| 10389 | F6C7 | 83AD              | WORD      | NEXTLEVEL                                    | ;INFO          |
| 10390 | F6C9 | 01 10 02 0E 10    | BYTE      | 1,$10,2,14,16                                |                |
| 10391 | F6CE | 83AD              | WORD      | NEXTLEVEL                                    | ;SETUP SCHED   |
| 10392 | F6D0 | 01 20 02 0F 10    | BYTE      | 1,$20,2,15,16                                |                |
| 10393 | F6D5 | 79AD              | WORD      | NA                                           | ;SETUP ALT SCHED |
| 10394 | F6D7 | 01 30 02 10 10    | BYTE      | 1,$30,2,16,16                                |                |
| 10395 | F6DC | 83AD              | WORD      | NEXTLEVEL                                    | ;SETUP SYSTEM  |
| 10396 | F6DE | 02 10 03 11 12    | BYTE      | 2,$10,3,17,18                                |                |
| 10397 | F6E3 | 2E8D              | WORD      | AUTO_MODE                                    | ;AUTO RUN      |
| 10398 | F6E5 | 02 20 03 12 13    | BYTE      | 2,$20,3,18,19                                |                |
| 10399 | F6EA | 248D              | WORD      | SEMI_MODE                                    | ;SEMI-AUTO RUN |
| 10400 | F6EC | 02 30 03 13 14    | BYTE      | 2,$30,3,19,20                                |                |
| 10401 | F6F1 | 83AD              | WORD      | NEXTLEVEL                                    | ;MANUAL RUN    |
| 10402 | F6F3 | 04 10 05 14 43    | BYTE      | 4,$10,5,20,67                                |                |
| 10403 | F6F8 | 79AD              | WORD      | NA                                           | ;DIRECTIONS    |
| 10404 | F6FA | 04 20 05 15 43    | BYTE      | 4,$20,5,21,67                                |                |
| 10405 | F6FF | 708B              | WORD      | HIST                                         | ;HISTORY       |
| 10406 | F701 | 04 30 05 16 43    | BYTE      | 4,$30,5,22,67                                |                |
| 10407 | F706 | 79AD              | WORD      | NA                                           | ;LOG RUN TOTALS |
| 10408 | F708 | 04 40 05 17 43    | BYTE      | 4,$40,5,23,67                                |                |
| 10409 | F70D | 79AD              | WORD      | NA                                           | ;SELF-TEST     |
| 10410 | F70F | 01 11 0E 28 60    | BYTE      | 1,$11,14,40,96                               |                |
| 10411 | F714 | 7791              | WORD      | VM0                                          | ;Mini          |
| 10412 | F716 | 01 12 0E 29 61    | BYTE      | 1,$12,14,41,97                               |                |
| 10413 | F71B | 7791              | WORD      | VM0                                          | ;Auto-split    |
| 10414 | F71D | 01 13 0E 2A 62    | BYTE      | 1,$13,14,42,98                               |                |
| 10415 | F722 | 79AD              | WORD      | NA                                           | ;Ration        |
| 10416 | F724 | 01 14 0E 2B 63    | BYTE      | 1,$14,14,43,99                               |                |
| 10417 | F729 | 79AD              | WORD      | NA                                           | ;ISC           |
| 10418 | F72B | 01 15 0E 2C 64    | BYTE      | 1,$15,14,44,100                              |                |
| 10419 | F730 | 79AD              | WORD      | NA                                           | ;One time      |
| 10420 | F732 | 01 16 0E 2D 65    | BYTE      | 1,$16,14,45,101                              |                |
| 10421 | F737 | 79AD              | WORD      | NA                                           | ;Special       |
| 10422 | F739 | 01 17 0E 2E 66    | BYTE      | 1,$17,14,46,102                              |                |
| 10423 | F73E | 79AD              | WORD      | NA                                           | ;Failsafe      |
| 10424 | F740 | 01 31 10 C2 27    | BYTE      | 1,$31,16,194,39                              |                |
| 10425 | F745 | 0087              | WORD      | SET_TIME                                     | ;Set Time      |

| | | | | | | |
|---|---|---|---|---|---|---|
| 10426 | F747 | 01 32 10 8D 26 | | BYTE | 1,$32,16,189,38 | |
| 10427 | F74C | 0B88 | | WORD | SET_SITE | ;Set Site Info |
| 10428 | F74E | 01 33 10 C3 6D | | BYTE | 1,$33,16,195,109 | |
| 10429 | F753 | F788 | | WORD | WIRE_CHECKV | ;Wire Checking |
| 10430 | F755 | 01 34 10 C4 29 | | BYTE | 1,$34,16,196,41 | |
| 10431 | F75A | 6D89 | | WORD | STATION_SETUP | ;Station Setup |
| 10432 | F75C | 01 35 10 C5 2A | | BYTE | 1,$35,16,197,42 | |
| 10433 | F761 | 79AD | | WORD | NA | ;Sensor Setup |
| 10434 | F763 | 01 36 10 C6 2B | | BYTE | 1,$36,16,198,43 | |
| 10435 | F768 | 4E8B | | WORD | SET_CODES | ;Secret Codes |
| 10436 | F76A | 02 31 13 09 14 | | BYTE | 2,$31,19,9,20 | |
| 10437 | F76F | 46BE | | WORD | MMV | ;Manual Valves |
| 10438 | F771 | 02 32 13 0A 14 | | BYTE | 2,$32,19,10,20 | |
| 10439 | F776 | 238F | | WORD | MMT | ;Manual Test Seq. |
| 10440 | F778 | 02 33 13 0B 14 | | BYTE | 2,$33,19,11,20 | |
| 10441 | F77D | 79AD | | WORD | NA | ;Manual Sensors |
| 10442 | F77F | FF | | BYTE | $FF | ;end of table |
| 10443 | | | | | | |
| 10444 | F780 | 00 | DAYTBL: | BYTE | 0 | ;number of days in each month |
| 10445 | F781 | 1F | | BYTE | 31 | ;JAN |
| 10446 | F782 | 1C | | BYTE | 28 | ;FEB |
| 10447 | F783 | 1F | | BYTE | 31 | ;MAR |
| 10448 | F784 | 1E | | BYTE | 30 | ;APR |
| 10449 | F785 | 1F | | BYTE | 31 | ;MAY |
| 10450 | F786 | 1E | | BYTE | 30 | ;JUN |
| 10451 | F787 | 1F | | BYTE | 31 | ;JUL |
| 10452 | F788 | 1F | | BYTE | 31 | ;AUG |
| 10453 | F789 | 1E | | BYTE | 30 | ;SEP |
| 10454 | F78A | 1F | | BYTE | 31 | ;OCT |
| 10455 | F78B | 1E | | BYTE | 30 | ;NOV |
| 10456 | F78C | 1F | | BYTE | 31 | ;DEC |
| 10457 | | | | | | |
| 10458 | | | SSTBL: | | | ;default system settings |
| 10459 | F78D | 01 00 05 01 01 | | BYTE | 1,0,5,1,1,88,31 | ;time |
| 10460 | F794 | 00 C8 C8 C8 C8 | | BYTE | 0,$C8,$C8,$C8,$C8,$C8,$C8,$C8 | ;VS |
| 10461 | F79D | 00 00 00 00 00 | | BYTE | 0,0,0,0,0,0,0,0 | ;sensor status |
| 10462 | F7A6 | 00 00 00 00 00 | | BYTE | 0,0,0,0,0,0,0,0 | ;dry level |
| 10463 | F7AF | 00 00 00 00 00 | | BYTE | 0,0,0,0,0,0,0,0 | ;soak level |
| 10464 | F7B8 | 00 | | BYTE | 0 | ;rain sensor |
| 10465 | F7B9 | 00 00 00 00 00 | | BYTE | 0,0,0,0,0,0,0,0,0,0,0 | ;codes |
| 10466 | F7C6 | 41 42 43 44 45 | | BYTE | 'ABCDEF' | ;controller ID |
| 10467 | F7CC | 05 00 0A 00 | | BYTE | 5,0,10,0 | ;emergency |
| 10468 | F7D0 | 00 | | BYTE | 0 | ;default valve ID table |
| 10469 | F7D1 | 00 | | BYTE | 00000000B | ;valve 1, position 0, + |
| 10470 | F7D2 | 09 | | BYTE | 00001001B | ;valve 2, position 1, + |
| 10471 | F7D3 | 12 | | BYTE | 00010010B | ;valve 3, position 2, + |
| 10472 | F7D4 | 1B | | BYTE | 00011011B | ;valve 4, position 3, + |
| 10473 | F7D5 | 24 | | BYTE | 00100100B | ;valve 5, position 4, + |
| 10474 | F7D6 | 2D | | BYTE | 00101101B | ;valve 6, position 5, + |
| 10475 | F7D7 | 36 | | BYTE | 00110110B | ;valve 7, position 6, + |
| 10476 | F7D8 | 3F | | BYTE | 00111111B | ;valve 8, position 7, + |
| 10477 | F7D9 | 00 00 00 00 00 | | BYTE | 0,0,0,0,0,0,0,0 | ;sensor ID |
| 10478 | F7E2 | 01 01 01 01 01 | | BYTE | 1,1,1,1,1,1,1,1,1 | ;terrain |
| 10479 | F7EB | 01 01 01 01 01 | | BYTE | 1,1,1,1,1,1,1,1,1 | ;sprinkler types |
| 10480 | | | | | | |
| 10481 | | | RUNTBL: | | | ;default RUN settings |
| 10482 | F7F4 | 00 00 00 | | BYTE | 0,0,0 | ;no setups yet |

```
10483  F7F7  00 64                  BYTE    0,100                  ;no rain delay or global budget
10484  F7F9  00 64 64 64 64         BYTE    0,100,100,100,100,100,100,100,100
10485
10486                       SOURCEADDR:                             ;start addresses of valve setups, etc
10487  F802  0000                   WORD    0
10488  F804  0009                   WORD    SRC1                    ;Mini
10489  F806  AC09                   WORD    SRC2                    ;Auto-split
10490  F808  580A                   WORD    SRC3                    ;Ration
10491  F80A  040B                   WORD    SRC4                    ;ISC
10492  F80C  B00B                   WORD    SRC5                    ;One-time
10493  F80E  5C0C                   WORD    SRC6                    ;Special
10494  F810  080D                   WORD    SRC7                    ;Failsafe
10495  F812  0C0D                   WORD    SRC8                    ;ISC starts
10496  F814  0C11                   WORD    SRC9                    ;Special starts
10497  F816  7602                   WORD    SYSTEM_BLOCK            ;system settings
10498  F818  FA02                   WORD    RUN_BLOCK               ;run settings
10499
10500                       OBJECTADDR:                             ;start addresses object areas
10501  F81A  4015                   WORD    OBJBASE
10502  F81C  4015                   WORD    OBJBASE
10503  F81E  4015                   WORD    OBJBASE
10504  F820  4015                   WORD    OBJBASE
10505  F822  4015                   WORD    OBJBASE
10506  F824  4015                   WORD    OBJBASE
10507  F826  0000                   WORD    0
10508  F828  F115                   WORD    STARTS
10509  F82A  F115                   WORD    STARTS
10510
10511                       SOURCELEN:                              ;length of blocks
10512  F82C  0000                   WORD    0
10513  F82E  AC00                   WORD    172
10514  F830  AC00                   WORD    172
10515  F832  AC00                   WORD    172
10516  F834  AC00                   WORD    172
10517  F836  AC00                   WORD    172
10518  F838  AC00                   WORD    172
10519  F83A  0400                   WORD    4
10520  F83C  0004                   WORD    1024
10521  F83E  0004                   WORD    1024
10522  F840  8400                   WORD    132
10523  F842  2300                   WORD    35
10524
10525  F844  4D 54 57 54 46  SDTBL: BYTE    'MTWTFSS'
10526
10527  F84B  20 4A 46 4D 41  MONTBL: BYTE   ' JFMAMJJASOND'
10528
10529                       CBTBL:                                  ;cycle byte specific days
10530  F858  80                     BYTE    10000000B               ;bit not used
10531  F859  40                     BYTE    01000000B               ;Mon
10532  F85A  20                     BYTE    00100000B               ;Tue
10533  F85B  10                     BYTE    00010000B               ;Wed
10534  F85C  08                     BYTE    00001000B               ;Thur
10535  F85D  04                     BYTE    00000100B               ;Fri
10536  F85E  02                     BYTE    00000010B               ;Sat
10537  F85F  01                     BYTE    00000001B               ;Sun
10538
10539                       TYPETBL:                                ;start type for set ups
```

```
10540  F860  00                   BYTE   0
10541  F861  E0                   BYTE   11100000B          ;mini
10542  F862  E0                   BYTE   11100000B          ;normal
10543  F863  E0                   BYTE   11100000B          ;special
10544  F864  E0                   BYTE   11100000B          ;ration
10545  F865  81                   BYTE   10000001B          ;add-on soak
10546  F866  82                   BYTE   10000010B          ;add-on syringe
10547
10548                 LABELTBL:                             ;letter designations for source
10549  F867  46                   BYTE   'F'
10550  F868  4D                   BYTE   'M'
10551  F869  41                   BYTE   'A'
10552  F86A  52                   BYTE   'R'
10553  F86B  49                   BYTE   'I'
10554  F86C  4F                   BYTE   'O'
10555  F86D  53                   BYTE   'S'
10556
10557                 BITON:                                ;use OR to turn bit on
10558  F86E  01                   BYTE   00000001B          ;bit 0
10559  F86F  02                   BYTE   00000010B
10560  F870  04                   BYTE   00000100B
10561  F871  08                   BYTE   00001000B
10562  F872  10                   BYTE   00010000B
10563  F873  20                   BYTE   00100000B
10564  F874  40                   BYTE   01000000B
10565  F875  80                   BYTE   10000000B
10566
10567                 BITOFF:                               ;use AND to turn bit off
10568  F876  FE                   BYTE   11111110B          ;bit 0
10569  F877  FD                   BYTE   11111101B
10570  F878  FB                   BYTE   11111011B
10571  F879  F7                   BYTE   11110111B
10572  F87A  EF                   BYTE   11101111B
10573  F87B  DF                   BYTE   11011111B
10574  F87C  BF                   BYTE   10111111B
10575  F87D  7F                   BYTE   01111111B
10576
10577                                                       ;wait times are 25 per second
10578                 CMDRATE1:                             ;wait time before 1st auto key
10579  F87E  00 64 64 64          BYTE   0,100,100,100      ;slow, med, fast
10580
10581                 CMDRATE2:                             ;wait time between auto keys
10582  F882  00 64 32 12          BYTE   0,100,50,18
10583
10584                 CONTRAST_TBL:                         ;contrst for LCD
10585  F886  00 08 06 04 02       BYTE   0,8,6,4,2,0
10586
10587                 MINOFFTBL:                            ;minimum OFF times for terrain
10588  F88C  0F 0F 1E 1E 2D       BYTE   15,15,30,30,45,45
10589
10590                 MAXONTBL:                             ;maximum ON times for sprinkler type,
10591  F892  03 03 06 03 03       BYTE   3,3,6,3,3,2        ;and terrain
10592  F898  05 05 09 05 05       BYTE   5,5,9,5,5,3
10593  F89E  08 08 10 08 08       BYTE   8,8,16,8,8,5
10594  F8A4  08 08 10 08 08       BYTE   8,8,16,8,8,5
10595  F8AA  08 08 10 08 08       BYTE   8,8,16,8,8,5
10596  F8B0  0A 0A 14 0A 0A       BYTE   10,10,20,10,10,7
```

```
10597  F886  1E 1E 3C 1E 1E          BYTE    30,30,60,30,30,30
10598                 .
10599                         SOAKDURTBL:                              ;Soak durations for sprinkler type,
10600  F88C  1500 1500 2400          WORD    21,21,36,36,48,32        ;and terrain
       F8C2  2400 3000 2000
10601  F8C8  2300 2300 3600          WORD    35,35,54,60,80,48
       F8CE  3C00 5000 3000
10602  F8D4  3800 3800 6000          WORD    56,56,96,96,128,80
       F8DA  6000 8000 5000
10603  F8E0  3800 3800 6000          WORD    56,56,96,96,128,80
       F8E6  6000 8000 5000
10604  F8EC  3800 3800 6000          WORD    56,56,96,96,128,80
       F8F2  6000 8000 5000
10605  F8F8  4600 4600 7800          WORD    70,70,120,120,168,112
       F8FE  7800 A000 7000
10606  F904  D200 D200 6801          WORD    210,210,360,360,480,480
       F90A  6801 E001 E001
10607
10608                         ;----------------------------------
10609                         ;         VECTORS
10610                         ;----------------------------------
10611
10612  FFFA                          ORG     0FFFAH
10613  FFFA  1586                    WORD    NMIINT
10614  FFFC  0000                    WORD    RESET
10615  FFFE  63B4                    WORD    INTR
10616
10617
10618
10619
10620
10621
10622
10623
10624  0000                          END
```

What is claimed is:

1. A method of programming an irrigation controller comprising:

generating a program, executable by an irrigation controller in order to control irrigation, off-line in a computer and not within any irrigation controller that will in fact execute the program to control irrigation;

downloading the generated and executable program from the computer into a transportable memory device capable of holding the generated and executable program;

transporting the transportable memory device to an irrigation controller within which the executable program is not yet resident;

communicatively connecting the transportable memory device with the irrigation controller through a communication connection;

connecting power from the transportable memory device to the irrigation controller through a power connection;

unloading the executable program from the transportable memory device into the irrigation controller through the communication connection;

supplying power from the transportable memory device to the irrigation controller via the power connection for the irrigation controller's uploading of the program;

communicatively disconnecting the transportable memory device from the irrigation controller, leaving the irrigation controller programmed with the generated and executable program; and executing the executable program in any by the irrigation controller into which it is loaded in order to effect the control of irrigation.

2. The method of claim 1 expanded for the programming of plurality of irrigation controllers that are interrelated in their performance of an irrigation function within a single irrigation system, wherein the off-line generating is of a plurality of different irrigation programs each executable by a corresponding one of a plurality of interrelated irrigation controllers, the plurality of programs being interrelated so as to permit, upon their execution by the plurality of interrelated irrigation controllers, coordinated irrigation within an irrigation system;

wherein the downloading is of the plurality of generated irrigation programs into a transportable memory device capable of simultaneously holding each such program;

wherein the transporting is of the plurality of irrigation programs simultaneously;

wherein the communicatively connecting is to each of the plurality of irrigation controllers in turn;

wherein the uploading is of a one of the plurality of irrigation programs into an associated one of the plurality of irrigation controllers; and wherein the executing is of the plurality of programs each in and by an associated one of the plurality of irrigation controllers to effect the coordinated control of irrigation within a single irrigation system.

3. The expanded plural irrigation controller programming method according to claim 2
wherein the uploading of each one of the plurality of irrigation programs into its associated one of the plurality of irrigation controllers is automatic, and without human intervention other than the communicatively connecting.

4. The expanded plural irrigation controller programming method according to claim 2 that, while at least one of the plurality of irrigation controllers is communicatively connected to the transportable memory device, further comprises:
loading information from a communicatively connected irrigation controller into the transportable memory device automatically, and without human intervention other than the communicatively connecting.

5. The expanded plural irrigation controller programming method according to claim 4
wherein the loading is of historical data on the irrigation control effected by that irrigation controller that is communicatively connected.

6. The expanded plural irrigation controller programming method according to claim 4
wherein the loading is of the program that was within the communicatively connected irrigation controller prior to the uploading.

7. The irrigation controller programming method according to claim 1
wherein the off-line generating is in a computer system emulating an actual irrigation controller.

8. The irrigation controller programming method according to claim 1
wherein the downloading of the generated program is into a memory of the transportable memory device; and
wherein the uploading of the program is from the memory of the transportable memory device under control of a communications controller in the transportable memory device.

9. The irrigation controller programming method according to 1 that while the irrigation controller is communicatively interconnected to the transportable memory device further comprises:
loading information from the communicatively connected irrigation controller into the transportable memory device.

10. The irrigation controller programming method according to claim 1 that, at other times than the transportable device is communicatively connected to the irrigation controller, further comprises:
connecting to the irrigation controller at it's same physical port that is elsewise and at other times used for communicatively connecting to the transportable device another device suitable to exercise the controller; and
exercising the irrigation controller by a connected controller exercise device.

11. The irrigation controller programming method according to claim 10, wherein the exercising comprises:
causing the irrigation controller tot urn on an irrigation valve that is connected to, and controlled by, the irrigation controller.

12. An irrigation control programming system comprising:
irrigation control program generation means for generating a plurality of executable programs that, if each is stored in and executed by an irrigation controller means, will control irrigation;
program communicating and communication powering means, connected at times to the program generation means and at other times to each of a plurality of irrigation controller means,
for receiving the plurality of programs from the program generation means,
for transporting the plurality of programs to each of the plurality of irrigation controller means one at a time,
for transferring a particular one of the plurality of programs to an associated particular one of the plurality of irrigation controller means, and
for powering the associated one of the irrigation controller means for its receipt of the associated particular one of the plurality of programs; and
a plurality of irrigation controller means, each initially without any program for executing in order to effect the control of irrigation, each
for temporarily connecting to the program transporting means for receiving a program therefrom while being powered to do so by the program transporting means,
for storing the received program, and
for executing its received and stored program to control irrigation.

13. The irrigation control programming system according to claim 12
wherein the program generation means is for generating a plurality of different irrigation programs interrelated so as permit, when executed by the plurality of irrigation controller means, coordinated irrigation within an irrigation system;
wherein the program communicating means is for receiving the plurality of irrigation programs simultaneously and for transporting them together to the plurality of irrigation controller means; and
wherein the irrigation controller means comprises:
a plurality of irrigation controllers, interrelated within a single irrigation system, each for receiving in turn an associated one of the plurality of programs from the program communicating means and for executing this associated program to control irrigation within the irrigation system in a coordinated manner based on chronological time.

14. The irrigation control programming system according to claim 12 wherein the program generation means comprises:
a digital computer generating the plurality of executable programs; wherein the program communicating means comprises:
a digital memory; and wherein the each of the plurality of irrigation controller means comprises:
a programmable digital electronic irrigation controller executing a one of the plurality of executable programs to effect the control of irrigation.

* * * * *